United States Patent
Ogawa et al.

(10) Patent No.: US 9,392,246 B2
(45) Date of Patent: Jul. 12, 2016

(54) RECORDING MEDIUM, PLAYBACK DEVICE, RECORDING DEVICE, ENCODING METHOD, AND DECODING METHOD RELATED TO HIGHER IMAGE QUALITY

(75) Inventors: Tomoki Ogawa, Osaka (JP); Taiji Sasaki, Osaka (JP); Hiroshi Yahata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 326 days.

(21) Appl. No.: 14/113,283

(22) PCT Filed: Apr. 26, 2012

(86) PCT No.: PCT/JP2012/002853
§ 371 (c)(1),
(2), (4) Date: Oct. 22, 2013

(87) PCT Pub. No.: WO2012/147350
PCT Pub. Date: Nov. 1, 2012

(65) Prior Publication Data
US 2014/0056577 A1    Feb. 27, 2014

Related U.S. Application Data

(60) Provisional application No. 61/479,954, filed on Apr. 28, 2011.

(51) Int. Cl.
*H04N 19/30* (2014.01)
*H04N 9/808* (2006.01)
(Continued)

(52) U.S. Cl.
CPC ........ *H04N 9/8082* (2013.01); *G11B 20/10527* (2013.01); *G11B 20/1251* (2013.01);
(Continued)

(58) Field of Classification Search
None
See application file for complete search history.

(56) References Cited

U.S. PATENT DOCUMENTS 5,907,373 A       5/1999  Yamagishi
2005/0010396 A1*  1/2005  Chiu ..................... G10L 19/24
                                                              704/200.1
(Continued)

FOREIGN PATENT DOCUMENTS

CN    1139359 A      1/1997
EP    2 309 763 A1   4/2011
(Continued)

OTHER PUBLICATIONS
International Search Report issued Aug. 7, 2012 in corresponding International Application No. PCT/JP2012/002853.
(Continued)

*Primary Examiner* — Eileen Adams
(74) *Attorney, Agent, or Firm* — Wenderoth, Lind & Ponack, L.L.P.

(57) ABSTRACT

A recording method for recording a base video stream and an enhancement video stream. The recording method includes: a first step of generating the base video stream by performing an irreversible conversion on an original image; and a second step of generating the enhancement video stream that includes a shift parameter and picture data. A gradation bit sequence of each pixel constituting the picture data of the enhancement video stream represents a difference between a gradation bit sequence of each pixel constituting picture data of the original image and a gradation bit sequence of each pixel constituting picture data of the base video stream. The shift parameter defines a shift operation that is performed by a playback device when the gradation bit sequence of the base video stream is added to the gradation bit sequence of the enhancement video stream.

7 Claims, 64 Drawing Sheets

(51) Int. Cl.
  *G11B 20/10* (2006.01)
  *G11B 20/12* (2006.01)
  *H04N 9/804* (2006.01)
  *G11B 20/00* (2006.01)

(52) U.S. Cl.
  CPC ............ *G11B20/1262* (2013.01); *H04N 9/804* (2013.01); *H04N 19/30* (2014.11); *G11B 2020/00072* (2013.01); *G11B 2020/10537* (2013.01); *G11B 2020/1289* (2013.01)

(56) References Cited

U.S. PATENT DOCUMENTS

| | | | |
|---|---|---|---|
| 2005/0185795 A1* | 8/2005 | Song | H04N 7/1675 380/218 |
| 2007/0133950 A1 | 6/2007 | Yoshida et al. | |
| 2008/0095228 A1 | 4/2008 | Hannuksela et al. | |
| 2010/0020866 A1* | 1/2010 | Marpe | H04N 19/00569 375/240.02 |
| 2010/0325676 A1 | 12/2010 | Kim et al. | |
| 2011/0145432 A1 | 6/2011 | Kato | |
| 2011/0164121 A1 | 7/2011 | Ikeda et al. | |

FOREIGN PATENT DOCUMENTS

| | | |
|---|---|---|
| JP | 2004-015226 | 1/2004 |
| JP | 2007-158983 | 6/2007 |
| JP | 2007-266749 | 10/2007 |
| JP | 2008-129127 | 6/2008 |
| JP | 2010-507310 | 3/2010 |
| JP | 2010-512096 | 4/2010 |
| JP | 2 343 906 A1 | 7/2011 |
| WO | 2010/143441 | 12/2010 |
| WO | 2010/150674 | 12/2010 |

OTHER PUBLICATIONS

A. Tanju Erdem et al., "Compression of 10-bit video using the tools of MPEG-2", Signal Processing: Image Communication, vol. 7, issue 1, Mar. 1995, pp. 27-56.

Office Action issued Aug. 19, 2015 in corresponding Chinese Application No. 201280020329.3 (with English translation of Search Report).

* cited by examiner

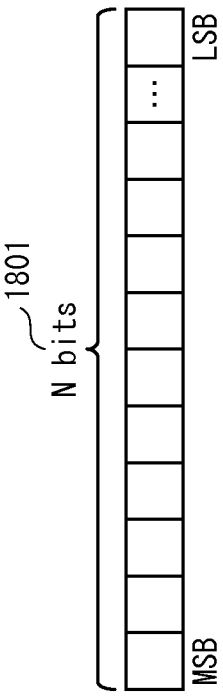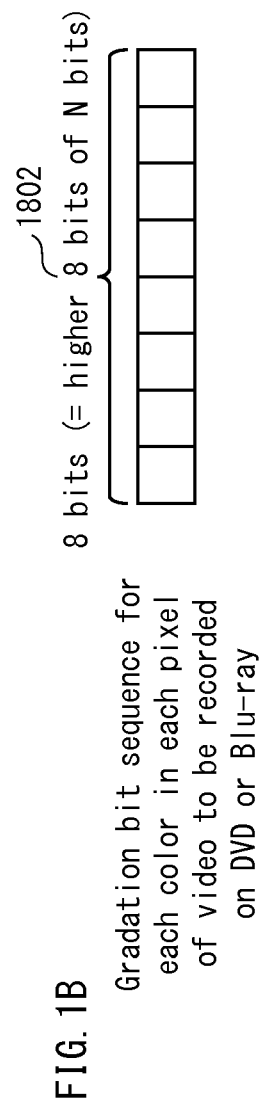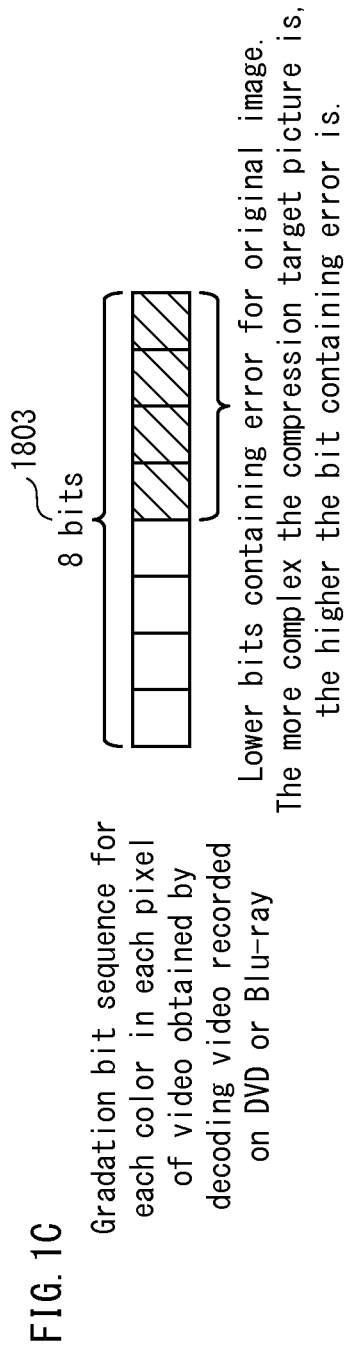
FIG. 1A Gradation bit sequence for each color in each pixel of original image
FIG. 1B Gradation bit sequence for each color in each pixel of video to be recorded on DVD or Blu-ray
FIG. 1C Gradation bit sequence for each color in each pixel of video obtained by decoding video recorded on DVD or Blu-ray

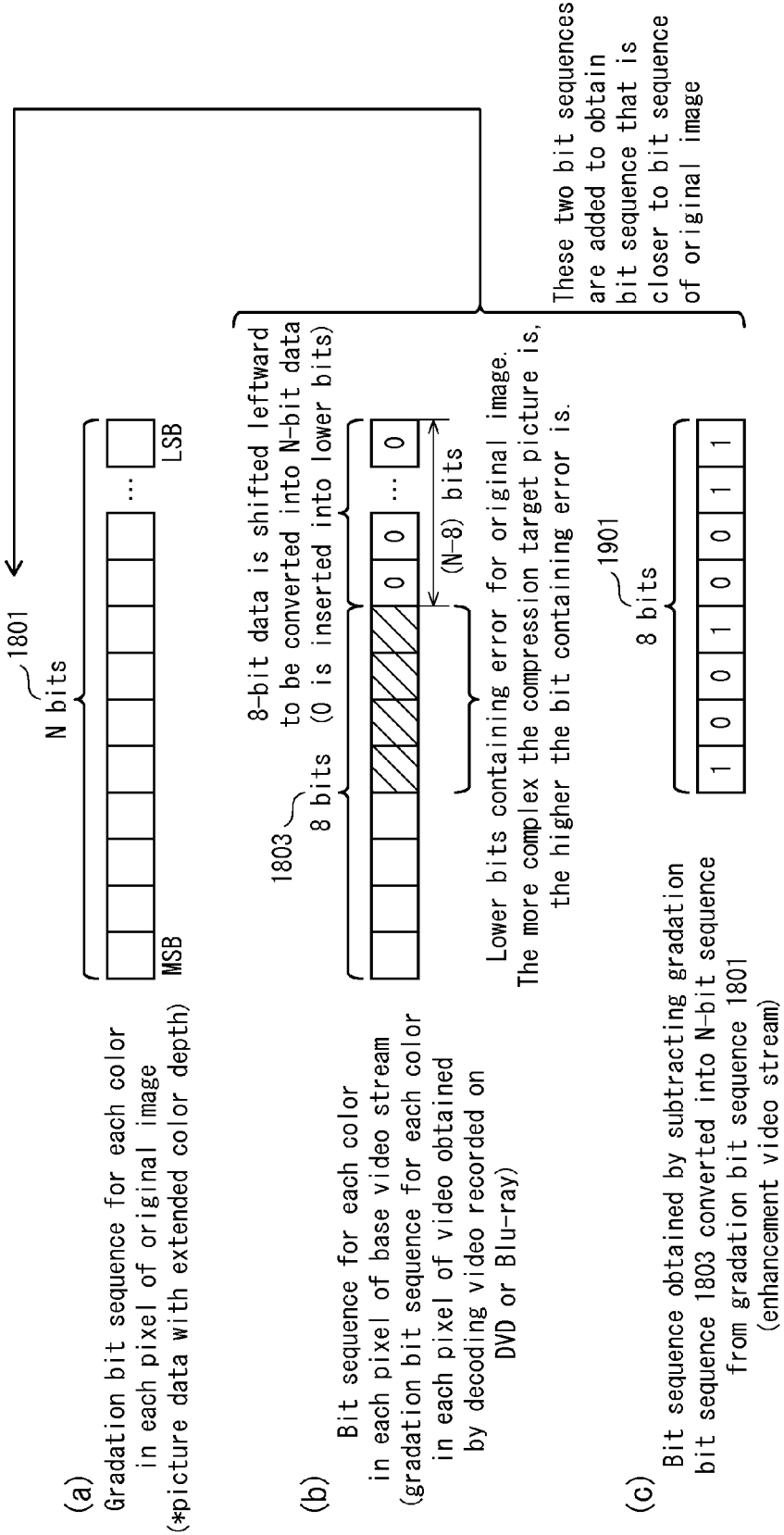

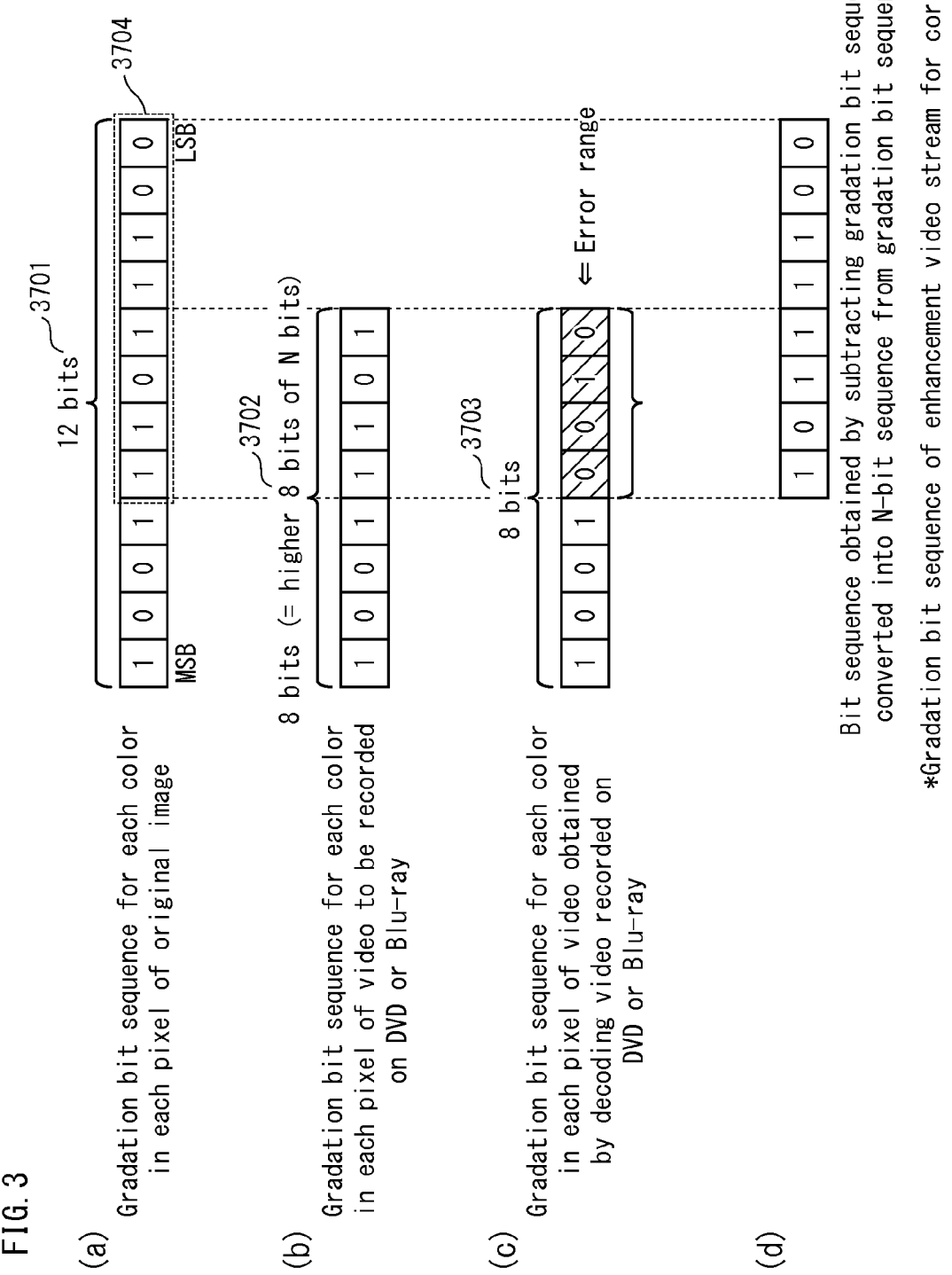

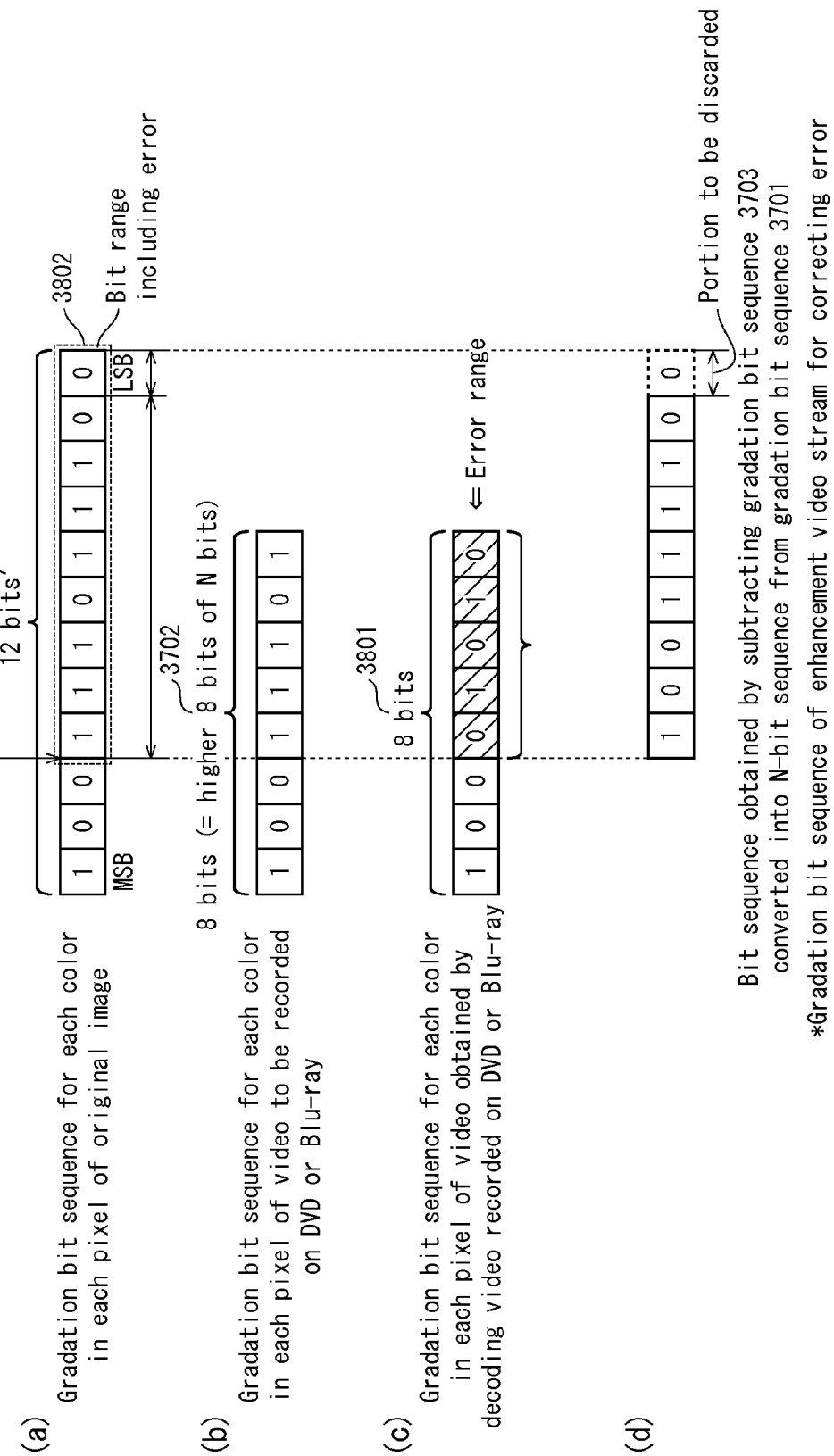

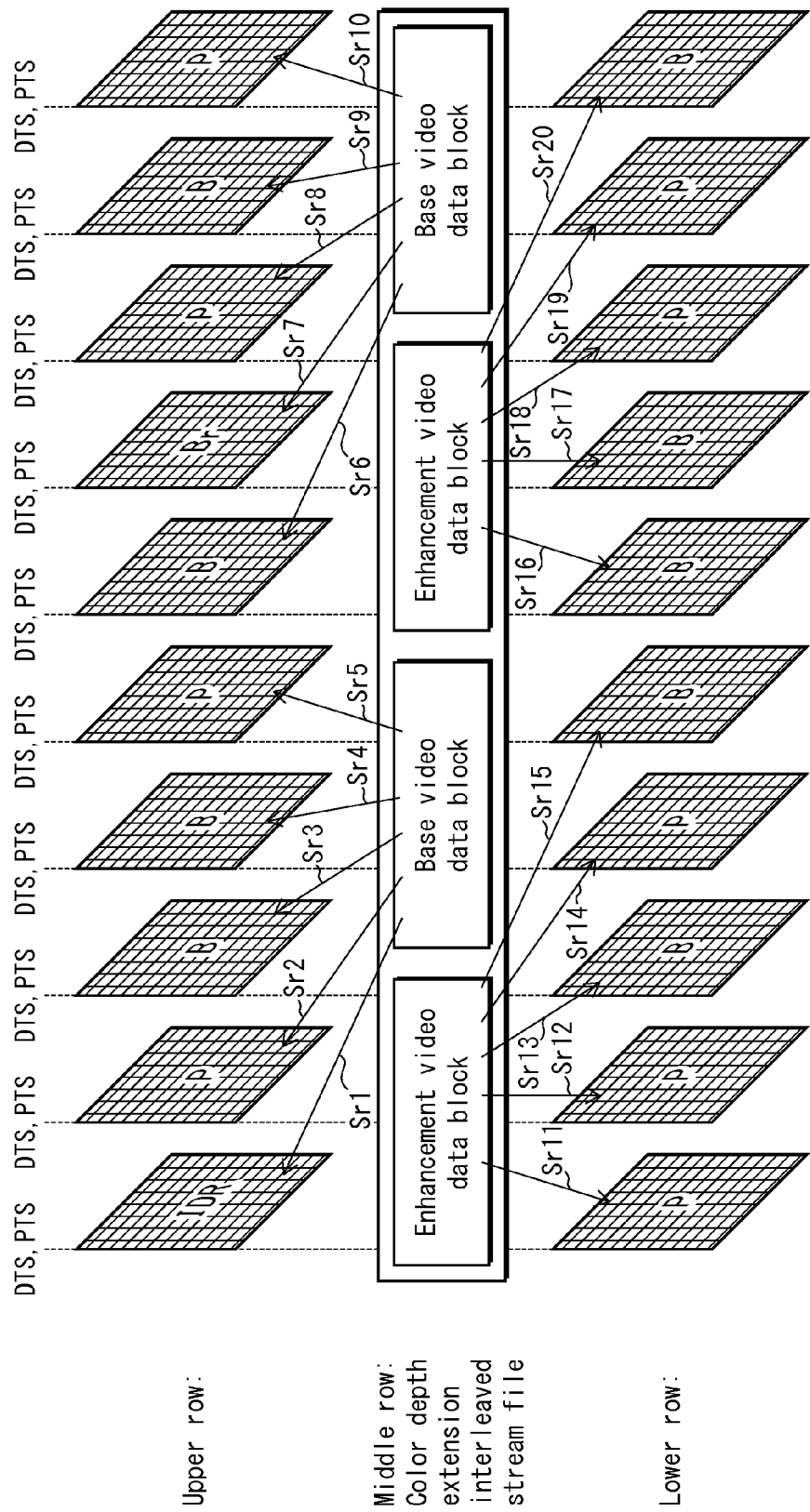

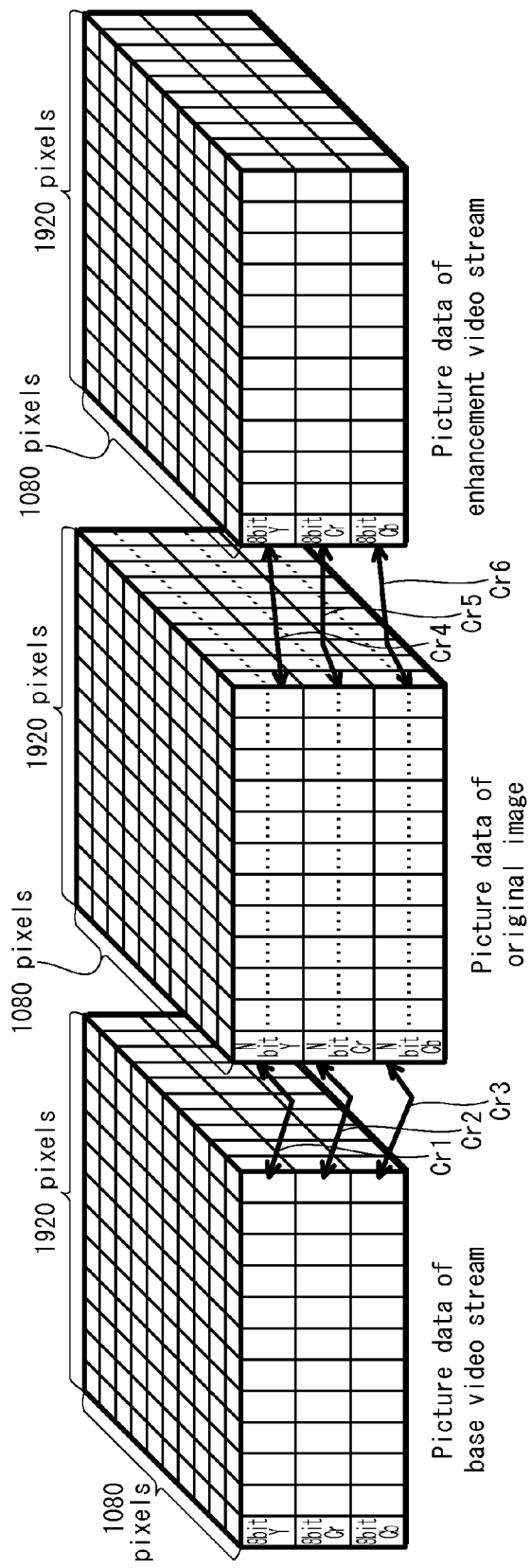
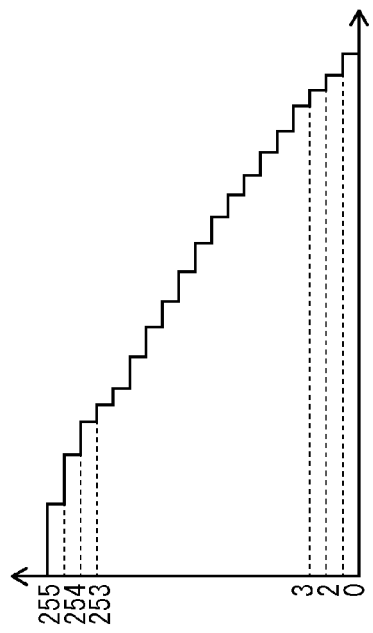
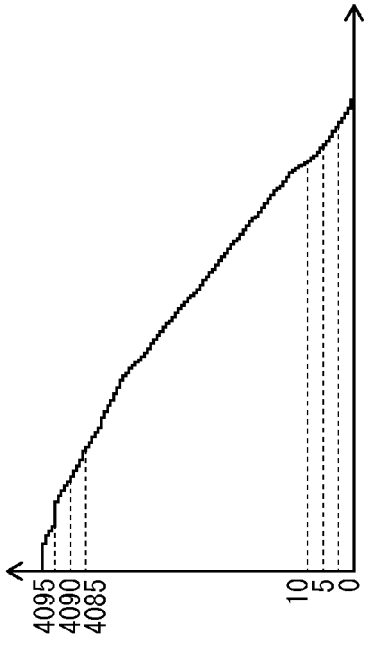
FIG. 6A
FIG. 6B
FIG. 6C

Image in base video stream represented by 8-bit gradation

Original image represented by N-bit gradation

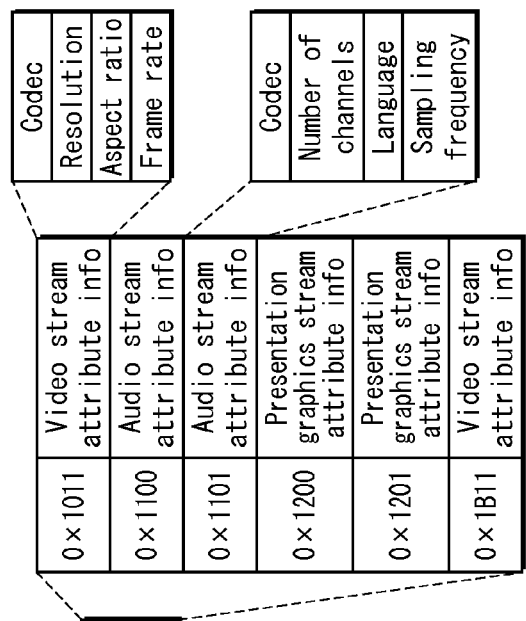
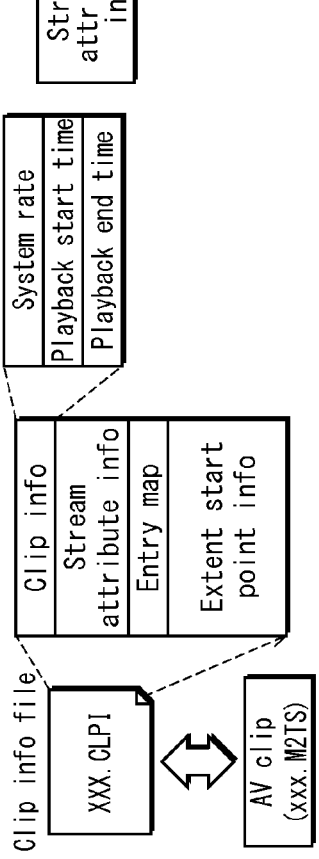
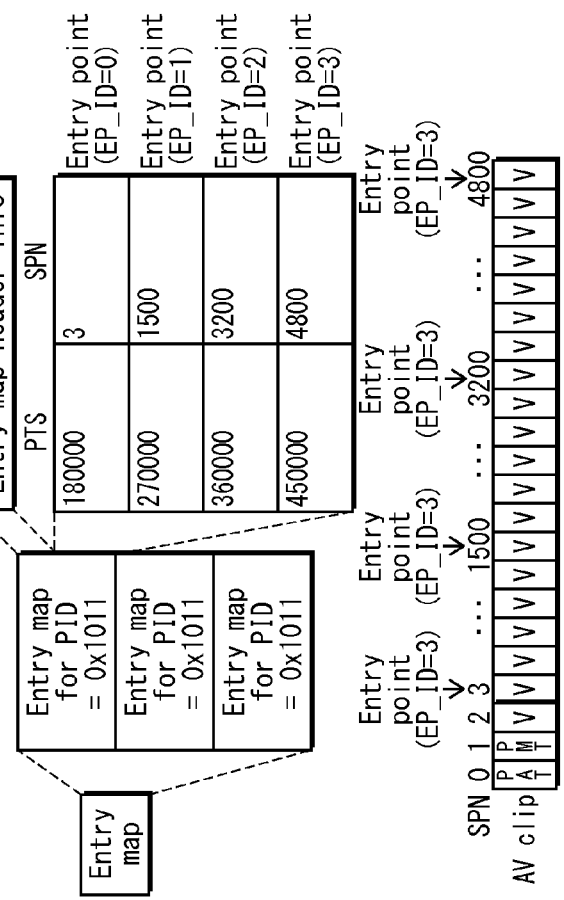

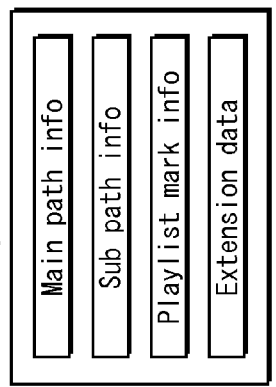
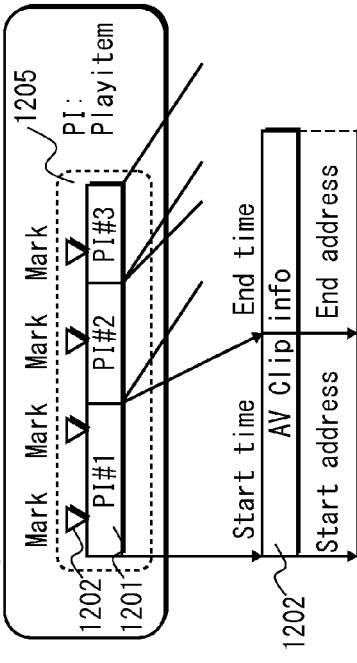
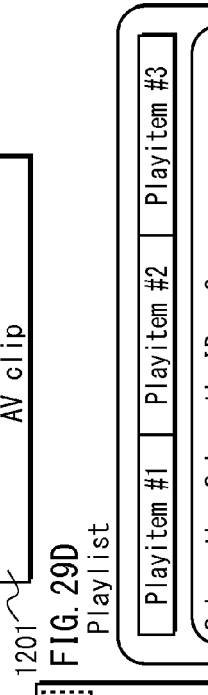
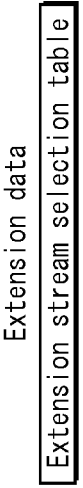
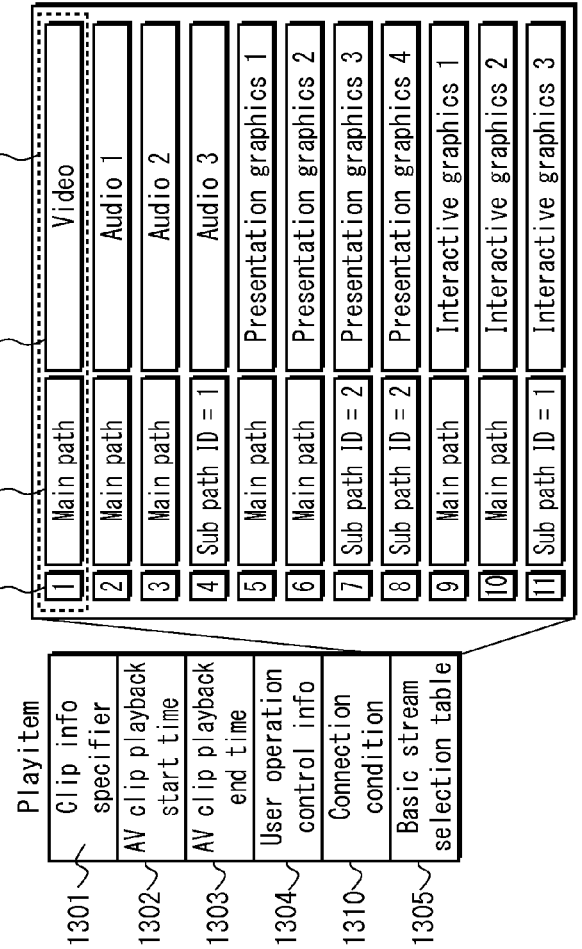

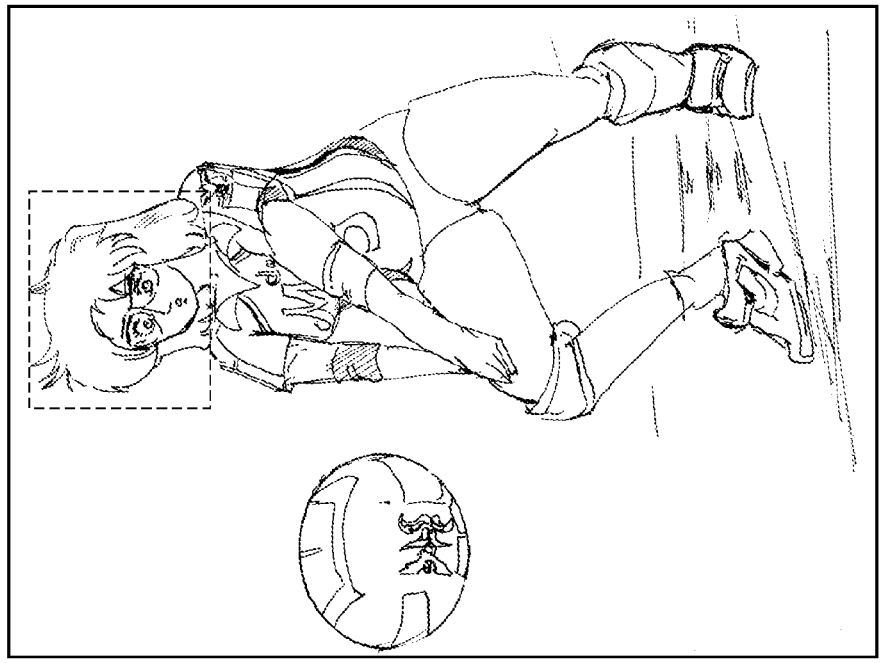
FIG. 55B  Picture of PinP video stream
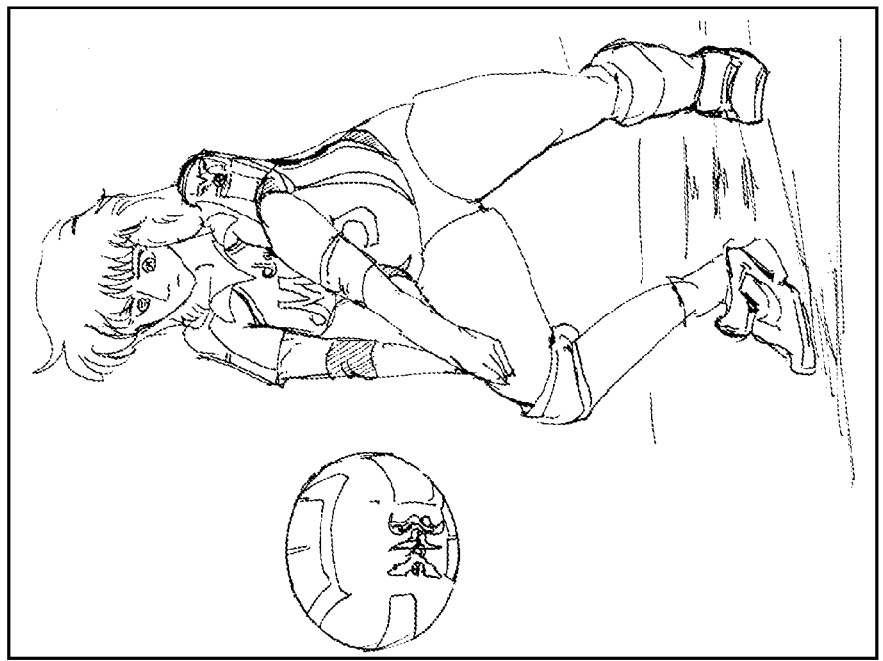
FIG. 55A  Picture of base video stream

RECORDING MEDIUM, PLAYBACK DEVICE, RECORDING DEVICE, ENCODING METHOD, AND DECODING METHOD RELATED TO HIGHER IMAGE QUALITY

This application is the National Stage of PCT/JP2012/002853, filed Apr. 26, 2012, which claims the benefit of U.S. Provisional Application No. 61/479,954, filed Apr. 28, 2011.

TECHNICAL FIELD

The present invention relates to a technical field of recording color depth of video.

BACKGROUND ART

The color depth recording is a technology for recording, on a recording medium, data representing the color depth of the original image, with the gradation of each color in the RGB or YCrCb color space being assigned a predetermined bit length. In images recorded on an existing recording medium for playback or display, the luminance Y, red color difference Cr and blue color difference Cb are each represented by an eight-bit pixel bit value, namely an eight-bit gradation bit sequence.

CITATION LIST

Patent Literature

Patent Literature 1:
Japanese Patent Application Publication No. 2008-129127

SUMMARY OF INVENTION

Technical Problem

The original video image recorded on a DVD or Blu-ray disc may be, for example, digital data converted from a film of a movie by scanning, or data such as a CG movie rendered on a computer. In the original image data, each color element in the RGB or YCbCr color space of each pixel is often expressed by a gradation bit value composed of more than eight bits.

On the other hand, in the case of video recorded on a DVD or Blu-ray disc, the gradation of each color is represented by an 8-bit value. That is to say, the original image data includes gradation bit values that are each composed of more than eight bits, but when the original image data is recorded on a DVD or Blu-ray disc, the gradation bit values are rounded to 8-bit values. The 8-bit bit width was determined in view of the number of gradation levels that can be represented by the TV displays and the processing capabilities of LSIs available at the time when the standards of the above-mentioned recording mediums were established. Due to the rounding of values, the image quality of the images of a movie or the like recorded on the above-mentioned recording mediums is lower than the original image. Accordingly there is still room for improving the image quality. It should be noted here that the reduction in image quality due to rounding to an eight-bit value is merely one example, but there are other elements for degrading the images. For example, in the encoding of the moving pictures, the irreversible conversion is used due to its high compression rate, and the irreversible conversion process produces a conversion error that degrades the display quality.

The above problem is based on the premise that the image data is recorded on a DVD or Blu-ray disc. However, this premise is merely a result of selecting a popular subject to explain the above technical problem, but the present application is not limited to the case where the image data is recorded on a DVD or Blu-ray disc. Eliminating the degradation of the display quality that occurs in image transfer via any medium such as a broadcast medium, communication medium or the like, as a whole is the technical problem to be solved by the present application. This is a technical obstacle to be faced by one having ordinary skill in the art in the near future when he/she attempts to put the above technology into practical use in the field of industrial products.

It is therefore an object of the present invention to improve representation of the color depth.

Solution to Problem

The above object is fulfilled by an aspect of the invention including a base video stream and an enhancement video stream, wherein the base video stream is obtained by performing an irreversible conversion on an original image; and the enhancement video stream includes a shift parameter and picture data, a gradation bit sequence of each pixel constituting the picture data of the enhancement video stream represents a difference between a gradation bit sequence of each pixel constituting picture data of the original image and a gradation bit sequence of each pixel constituting picture data of the base video stream, and the shift parameter defines a shift operation that is performed by a playback device when the gradation bit sequence of the base video stream is added to the gradation bit sequence of the enhancement video stream.

Advantageous Effects of Invention

The enhancement video stream represents a difference between a gradation bit sequence of each pixel constituting picture data of the original image and a gradation bit sequence of each pixel constituting picture data of the base video stream. As a result, a conversion error that occurs in the process of generating the base video stream is represented by a gradation bit sequence of each pixel constituting the picture data of the enhancement video stream. Accordingly, it is possible to obtain an image that is almost identical as the original image, by combining the gradation bit sequence of a picture of the enhancement video stream and the gradation bit sequence of a picture of the base video stream.

In the above-described aspect of the invention, the shift parameter is set so that the color depth of a predetermined picture can be deepened. Also, the shift parameter is recorded on the recording medium independently of the base video stream. Thus the above-described structure does not increase the capacity of the recording medium for recording the image data, or the scales of the decoder and the plane memory.

BRIEF DESCRIPTION OF DRAWINGS

FIGS. 1A-1C illustrate gradation bit sequences recorded on Blu-ray disc.

FIG. 2 is a diagram illustrating the principle of the color depth extension.

FIG. 3 is a diagram illustrating the pixel shift amount b.

FIG. 4 illustrates a case where a bit sequence after the compression and decoding includes many errors due to use of a natural image as the original image or an insufficient bit rate at the compression.

FIG. 5 illustrates the color depth extension interleaved stream file.

FIGS. 6A-6C illustrate pictures of the base video stream, the enhancement video stream and the original image.

FIGS. 28A-28D illustrate one example of the clip information file.

FIGS. 29A-29E illustrate one example of the internal structure of the playlist information.

FIGS. 55A and 55B illustrate in comparison a picture in the base video stream and a picture in the PinP video stream.

DESCRIPTION OF EMBODIMENTS

Figure 7B:
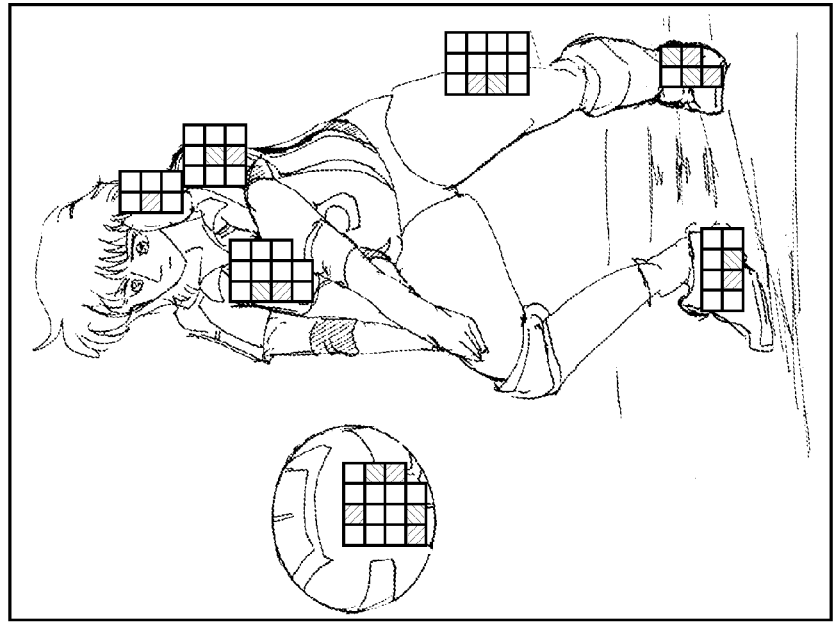
FIGS. 7A and 7B illustrate a picture of the original image and a picture of the base video stream.

A recording medium including the above-described problem solving means can be implemented as a package medium for the over-the-counter sales of contents. A playback device including the above-described problem solving means can be implemented as a player device for playing back the package medium. An aspect of the invention directed to an integrated circuit can be implemented as a system LSI imbedded in the player device. An aspect of the invention directed to a playback method can be implemented in the form of a time series procedure realized in the player device. An aspect of the invention directed to a program can be implemented as an executable program that is recorded on a computer-readable recording medium and installed in the player device.

Embodiment 1

Embodiment 1 relates to an improvement for deepening the color depth when the original image is encoded and recorded on a commercial package medium.

Problems the Inventors Found in Implementation of Present Embodiment

When, for example, original image data of a movie is recorded on a package medium such as a DVD or Blu-ray disc for distribution, each gradation bit value composed of more than eight bits is rounded to an 8-bit value. With this rounding to an 8-bit value, the gradation that is represented smoothly in the original image is represented as steps of color in the video played back with the DVD or Blu-ray disc since the eight bits are not enough to provide smooth change in color.

One method for solving the problem would be to increase the pixel bit value from 8-bit value to a higher bit value. With continuous efforts having been made for improvement in image quality, many of current display devices, such as the plasma display, liquid crystal display, and organic EL display, support display of gradation represented by gradation bit values each composed of more than eight bits. Accordingly, the basic measure would be to increase the pixel bit value used when encoding the original image, following such improvement in display devices.

However, increasing the pixel bit width in encoding would increase the cost for the display device, the required capacity of the recording medium for recording the image data, the required scales of the decoder and the memory in the playback device, thereby resulting in the shortage of capacity in the recording medium and cost increase for the playback device. Furthermore, whether or not the 8-bit gradation value causes an error compared with the original image depends on how fast an object moves in the image, or how complex a pattern in the image is, and thus it is not a wisest idea to increase the bit width of the pixel gradation bit values uniformly.

It is therefore an object of the invention described in Embodiment 1 (hereinafter referred to as "present invention") to provide a recording medium that can represent smooth gradation of the original image, without causing the shortage of capacity in the recording medium or a cost increase for the playback device.

Means for Solving the Problem

The above-described problem can be solved by one aspect of the present invention: a recording medium on which a base video stream and an enhancement video stream are recorded, wherein the base video stream is obtained by performing an irreversible conversion on an original image; and the enhancement video stream includes a shift parameter and picture data, a gradation bit sequence of each pixel constituting the picture data of the enhancement video stream represents a difference between a gradation bit sequence of each pixel constituting picture data of the original image and a gradation bit sequence of each pixel constituting picture data of the base video stream, and the shift parameter defines a shift operation that is performed by a playback device when the gradation bit sequence of the base video stream is added to the gradation bit sequence of the enhancement video stream.

For the above problem solving means as a superordinate concept, various subordinate concepts can be provided. The following are typical ones among the possible subordinate concepts.

(Subordinate Concept of "Difference")

It is desirable that the difference is obtained by extending a bit width of the gradation bit sequence of the base video stream to a bit width of the gradation bit sequence of the original image to obtain an extended gradation bit sequence, subtracting the extended gradation bit sequence from the gradation bit sequence of the original image to obtain a subtraction-result value, and converting the subtraction-result value into a positive value. This subordinate concept clarifies how the above-described difference can be obtained. With the above structure, the difference between pictures of the original image and the base video stream is represented by a positive value. This makes it possible to realize shifting of the gradation bit sequence adapted to the color depth extension by using an existing decoder or plane memory, thereby making it possible for an existing decoder model or player model to deal with the enhancement video stream. This enables the product manufacturers to produce new recording media or playback devices supporting the color depth extension while making use of the design know-how that have been acquired through the past product development. This makes it possible for the product manufacturers to shorten the product development cycle and make model change of products more frequently, enabling them to introduce a new product into the market more often and establishing their brand images, and gaining a share of the market.

(Subordinate Concept of Shifting Base Video Stream)

It is desirable that the shift operation includes an operation for extending a bit width of the gradation bit sequence of the base video stream to a bit width of the gradation bit sequence of the original image, and the shift parameter specifies a shift count, the shift count being the number of times the gradation bit sequence of the base video stream is to be shifted toward the most significant bit when the gradation bit sequence of the base video stream is added to the gradation bit sequence of the enhancement video stream. This subordinate concept clarifies how the shift parameter acts upon the gradation bit sequence of the base video stream. When the conversion error due to the irreversible conversion is present in the lower bits of the gradation bit sequence of the original image, the gradation bit sequence of the original image is restored by shifting the gradation bit sequence of the base video stream toward the most significant bit.

(Subordinate Concept of Shifting Enhancement Video Stream)

It is desirable that the shift operation includes an operation for extending a bit width of the gradation bit sequence of the base video stream to a bit width of the gradation bit sequence of the original image, and the shift parameter specifies a target bit position, the target bit position being a bit position in the gradation bit sequence of the original image to which the gradation bit sequence of the base video stream is to be shifted when the gradation bit sequence of the base video stream is added to the gradation bit sequence of the enhancement video stream. This subordinate concept clarifies how the shift parameter acts upon the gradation bit sequence of the enhancement video stream. The shift amount of picture data of a frame is determined in accordance with the highest bit in the error range. Accordingly, when the conversion error due to the irreversible conversion exceeds the gradation bit sequence of the enhancement video stream, the gradation bit sequence of the enhancement video stream is shifted to the highest bit in the error range when the 8-bit gradation value of the enhancement video stream is shifted in accordance with the shift amount. The pixel bit value of the enhancement video stream after this shifting is added to the lower-bit side of the N-bit gradation value. As a result, when the error range exceeds the pixel gradation value of the enhancement video stream, a portion of the original image that is to be discarded in the restoration process after encoding and decoding is present in the lower-bit side. With this arrangement, even if the higher bits of the image have the influence of the error range, in the reproduced image, merely the lower-bit portion of the gradation bit value appears to be slightly different. In this way, the influence of rounding off some bits can be restricted, and a smooth gradation change of the original image can be restored.

(Subordinate Concept of Shift Parameter Storage Method)

It is desirable that each of the picture data of the base video stream and the picture data of the enhancement video stream is composed of a plurality of groups of pictures, each of the plurality of groups of pictures is composed of a plurality of frames, and a plurality of shift parameters respectively corresponding to the plurality of frames are provided as a parameter sequence. This subordinate concept clarifies how the shift parameters are stored and supplied to the playback device. With the above-described structure, in the case of a video content, a plurality of shift parameters are stored in bulk in units of groups of pictures (GOPs), the GOP being a unit of random access. This increases the use efficiency of the shift parameters.

(Aspect of Playback Device)

The above-described problem can be solved by another aspect of the present invention: a playback device for reading a base video stream and an enhancement video stream from a recording medium and playing back the base video stream and the enhancement video stream, wherein the base video stream is obtained by performing an irreversible conversion on an original image, the enhancement video stream includes a shift parameter and picture data, a gradation bit sequence of each pixel constituting the picture data of the enhancement video stream represents a difference between a gradation bit sequence of each pixel constituting picture data of the original image and a gradation bit sequence of each pixel constituting picture data of the base video stream, and the shift parameter defines a shift operation that is performed by a playback device when the gradation bit sequence of the base video stream is added to the gradation bit sequence of the enhancement video stream, the playback device comprising: a video decoder configured to obtain a gradation bit sequence for each pixel constituting picture data of the base video stream by decoding the base video stream; and a color depth extension unit configured to execute a color depth extension by performing a bit operation on the gradation bit sequence for each pixel constituting picture data of the base video stream by using the shift parameter and a gradation bit sequence of each pixel constituting the picture data of the enhancement video stream.

For the above problem solving means as a superordinate concept, various subordinate concepts can be provided. The following are typical ones among the possible subordinate concepts.

(Subordinate Concept of Difference)

the color depth extension unit includes: a first shift unit configured to obtain an extended gradation bit sequence by extending a bit width of the gradation bit sequence of the base video stream by shifting, toward the most significant bit, the gradation bit sequence obtained by the video decoder; a subtracting unit configured to convert the gradation bit sequence of the enhancement video stream into a signed bit stream by subtracting a correction value from the gradation bit sequence of the enhancement video stream; and an adding unit configured to add the signed bit stream to the gradation bit sequence of the base video stream. This subordinate concept supports implementation of the color depth extension by using hardware elements. Details of this are provided below. Since this makes it possible to implement the color depth extension by using generally known hardware elements, implementation of the color depth extension function becomes more realistic.

(Subordinate Concept of Shifting Base Video Stream)

It is desirable that the first shift unit shifts the gradation bit sequence obtained by the video decoder, based on the shift parameter, and the color depth extension unit further includes: a second shift unit configured to extend a bit width of a gradation bit sequence, which is obtained by the adding unit by adding the signed bit stream to the gradation bit sequence of the base video stream, to a bit width of the gradation bit sequence of the original image. This subordinate concept clarifies how the shift operation of the base video stream is realized by hardware. This makes it possible to change the N-bit gradation bit sequence as described below in detail.

(Subordinate Concept of Shifting Enhancement Video Stream)

It is desirable that the color depth extension unit further includes: a second shift unit configured to obtain a shifted signed bit stream by shifting the signed bit stream, which is converted from the gradation bit sequence of the enhancement video stream by the subtracting unit, by a shift amount indicated by the shift parameter, and the adding unit configured to add the shifted signed bit stream to the gradation bit sequence of the base video stream. This subordinate concept enables the rounding off error, which is described below, to be minimized.

(Subordinate Concept of Video Decoder—1)

It is desirable that the video decoder is a first video decoder configured to decode the base video stream, and the playback device further comprises a second video decoder configured to decode the enhancement video stream. This subordinate concept enables the hardware resources to be effectively used in, for example, a playback device that includes two video decoders for stereoscopic playback.

(Subordinate Concept of Video Decoder—2)

It is desirable that the video decoder is a multi-view video decoder configured to decode both the picture data of the base video stream and the picture data of the enhancement video stream. This subordinate concept enables the hardware resources to be effectively used in, for example, a playback device in which a multi-view video decoder is implemented for stereoscopic playback or multi-angle playback.

(Subordinate Concept of Obtaining Shift Parameter)

It is desirable that each of the picture data of the base video stream and the picture data of the enhancement video stream is composed of a plurality of groups of pictures, each of the plurality of groups of pictures is composed of a plurality of frames, and, and a plurality of shift parameters respectively corresponding to the plurality of frames are provided as a parameter sequence, and the video decoder, when decoding an arbitrary picture in the base video stream, decodes a picture in the enhancement video stream that is to be played back together with the arbitrary picture in the base video stream at a same time, extracts, from a parameter sequence, a shift parameter corresponding to the picture in the enhancement video stream, and sets the shift parameter in the color depth extension unit. This subordinate concept clarifies that shift parameters can be switched with the accuracy of frames so that a closer color depth extension can be executed.

(Aspect of Recording Device)

The above-described problem can be solved by a still another aspect of the present invention: a recording device for recording a base video stream and an enhancement video stream onto a recording medium, the recording device comprising: a first encoding unit configured to obtain the base video stream by performing an irreversible conversion on an original image, the base video stream being composed of pixels each including a gradation bit sequence of a predetermined bit width; a decoding unit configured to obtain a non-compressed picture by decoding the base video stream, the non-compressed picture being composed of pixels each including a gradation bit sequence that is shorter than a gradation bit sequence of pixels of the original image in bit width; a calculating unit configured to calculate a difference between a gradation bit sequence of each pixel constituting the original image and a corresponding gradation bit sequence of the non-compressed picture of the base video stream; and a second encoding unit configured to generate the enhancement video stream, wherein a gradation bit sequence of each pixel constituting picture data of the enhancement video stream is the difference calculated by the calculating unit.

For the above problem solving means as a superordinate concept, various subordinate concepts can be provided. The following are typical ones among the possible subordinate concepts.

(Subordinate Concept of Calculating Unit)

It is desirable that the calculating unit includes: a shift unit configured to obtain shifted gradation bit sequences by shifting a gradation bit sequence of each pixel constituting the non-compressed picture of the base video stream toward the most significant bit; a subtracting unit configured to obtain subtraction results by subtracting each of the obtained shifted gradation bit sequences from the gradation bit sequence of each pixel constituting the original image; and an adding unit configured to obtain differences by adding a predetermined correction value to each of the obtained subtraction results, wherein the second encoding unit generates the enhancement video stream that includes the differences obtained by the adding unit, and a shift value that is used by the shift unit in shifting. This subordinate concept supports implementation of the color depth extension by using generally known hardware elements. With the introduction of this subordinate concept, implementation of the color depth extension function becomes more realistic.

The following describes the approach taken by the above problem solving means to solve the problem, with reference to the accompanying drawings. To eliminate the influence of the conversion error caused by the irreversible conversion, the present invention introduces two types of video streams. One is a base video stream that is generated by the irreversible conversion performed on the original image. The other one is an enhancement video stream, wherein the gradation bit sequence of each of the pixels constituting each picture of the enhancement video stream indicates a difference between the gradation bit sequence of the original image and the gradation bit sequence of the base video stream. The difference described here includes the difference caused by the above-described irreversible conversion.

The following describes the relationship between the gradation bit sequence of the original image and the gradation bit sequence of the base video stream.

FIG. 1A illustrates an N-bit gradation bit sequence. FIG. 1B illustrates an 8-bit gradation bit sequence to be recorded on a Blu-ray ReadOnly or DVD-Video disc. FIG. 1C illustrates an 8-bit gradation bit sequence that is obtained by performing the irreversible conversion on the N-bit gradation bit sequence and decoding the conversion result. The hatched portion in FIG. 1C indicates a conversion error caused by the irreversible conversion.

In FIGS. 1-3, three gradation bit sequences are illustrated. The three gradation bit sequences are: (i) the N-bit gradation bit sequence (gradation bit sequence 1801) that represents the color depth of each color of each pixel constituting the original image targeted to be recorded on a Blu-ray disc; (ii) an 8-bit gradation bit sequence (gradation bit sequence 1802) that, for example, is composed of higher eight bits of the N-bit gradation bit sequence, or obtained by rounding the $9^{th}$ bit of the N-bit gradation bit sequence, to compress the gradation bit sequence 1801 for the Blu-ray disc; and (iii) an 8-bit gradation bit sequence (gradation bit sequence 1803) that is obtained by compressing the gradation bit sequence 1802 by the compression technology such as MPEG2 or MPEG-4AVC and further decoding the compression result.

Here, in the process of converting the gradation bit sequence 1801 of the original image into the gradation bit sequence 1803 of the video recorded on the Blu-ray disc, information of the lower (N−8) bits is lost before the compression, and an error is caused in the lower bits by the irreversible compression before the gradation bit sequence 1803 is finally obtained. The color depth extension refers to obtaining a bit sequence that is close to the N-bit gradation bit sequence of the original image in an attempt to restore it, by adding additional information to the bit sequence obtained by the compression and decoding.

In the color depth extension, an attempt is made to restore the information of the lower (N−8) bits that is lost when the original N-bit sequence is converted into the 8-bit sequence for the Blu-ray disc, and to restore the correct information of the lower bits of the gradation bit sequence 1803 containing an error caused by the compression. The following describes the color depth extension with reference to FIG. 2.

FIG. 2 uses the same reference numbers as FIGS. 1A-1C for identical elements. FIG. 2, portion (a) illustrates the N-bit gradation bit sequence 1801 of the original image. FIG. 2, portion (b) illustrates an N-bit gradation bit sequence that is obtained by converting the 8-bit gradation bit sequence 1803, which is to be recorded on a Blu-ray ReadOnly or DVD-Video disc, to an N-bit gradation bit sequence. FIG. 2, portion (c) illustrates an 8-bit gradation bit sequence 1901 for the enhancement video stream that is obtained by subtracting the N-bit gradation bit sequence 1803 for the base video stream from the N-bit gradation bit sequence 1801 of the original image. It is possible to restore the N-bit gradation bit sequence of the original image by adding the N-bit gradation bit sequence illustrated in portion (b) of FIG. 2 and the 8-bit gradation bit sequence 1901 illustrated in portion (c) of FIG. 2.

First, the gradation bit sequence 1803 is shifted leftward (toward the most significant bit) by a shift amount b that is specified by the shift parameter, and the gradation bit sequence 1803 is converted into an N-bit sequence. Here, the "shift amount b" refers to a numerical parameter (shift parameter) that defines the shift operation that is performed on the playback device side when the gradation bit sequence for the base video stream is added to the gradation bit sequence for the enhancement video stream. The parameter may "specify the shift count" or "specify the target bit position". To "specify the shift count" is to specify the number of times the shift operation is to be performed. The "target bit position" is a bit position in the gradation bit sequence of the original image to which the bit sequence is shifted.

In FIG. 2, the shift amount b specifies the shift count, and is set as: b=N−8. With this setting, the shift operation is performed (N−8) times. After the shift, a sequence of (N−8) 0s constitutes the lower bits of the gradation bit sequence 1803. Next, FIG. 2, the gradation bit sequence 1803 that has been made N-bit by this conversion is subtracted from the N-bit gradation bit sequence 1801 of the original image. As illustrated in portion (b) of FIG. 2, the lower (N−8) bits of the converted N-bit gradation bit sequence 1803 are all 0s, while the higher (N−8) bits of the original image include some 1s. Thus if the gradation bit sequence 1803 is composed of the higher eight bits among the N-bit gradation bit sequence of the original image, the higher eight bits among the N-bit gradation bit sequence are to be the 8-bit gradation bit sequence to be recorded on the Blu-ray ReadOnly disc or the DVD-Video disc, and the lower (N−8) bits should be a conversion error caused by the irreversible conversion.

As a result, the subtraction is performed as illustrated in portion (c) of FIG. 2. The gradation bit sequence 1901, which is obtained as a result of the subtraction, is the bit sequence that is used to compensate the (N−8) bits lost from the original image and correct the error caused by the compression. Accordingly, by converting the gradation bit sequence 1803 into an N-bit sequence and then adding the gradation bit sequence 1901 to the N-bit gradation bit sequence 1803, the N-bit gradation bit sequence 1801 is restored. A video stream composed of the picture data whose pixel bit value is the gradation bit sequence 1803 is the "base video stream". On the other hand, a video stream composed of the picture data whose pixel bit value is the gradation bit sequence 1901 is the "enhancement video stream".

The following describes the pixel shift amount b in more detail with reference to FIG. 3. FIG. 3 is a diagram illustrating the pixel shift amount b. In this example, the N bits of the original image are assumed to be 12 bits, for simplicity's sake.

Portion (a) of FIG. 3 illustrates a 12-bit gradation bit sequence of the original image. Portion (b) of FIG. 3 illustrates an ideal 8-bit gradation bit sequence to be recorded on the Blu-ray ReadOnly disc or the DVD-Video disc. Portion (c) of FIG. 3 illustrates an 8-bit gradation bit sequence obtained by performing the irreversible conversion on the 12-bit gradation bit sequence. Portion (d) of FIG. 3 illustrates an 8-bit gradation bit sequence obtained by subtracting the converted 12-bit gradation bit sequence of the base video stream from the gradation bit sequence of the original image.

It is assumed here that the color of each pixel of the original image is represented by 12-bit information, a gradation bit sequence 3701. In the compression for Blu-ray, the lower four bits of the gradation bit sequence 3701 are rounded off to create an 8-bit gradation bit sequence 3702. The 8-bit original image composed of the 8-bit color information, namely the gradation bit sequence 3702, is compressed by an encoding method such as MPEG2, and a gradation bit sequence 3703 is obtained by decoding the compressed image data. In the example of portion (c) of FIG. 3, the lower four bits of the gradation bit sequence 3703 include an error caused by the irreversible compression. In the gradation bit sequence 3701 of the original image, a gradation bit sequence 3704 enclosed by a dotted line is the bit sequence that is to be restored by the color depth extension.

The following describes the gradation bit sequence of the enhancement video stream illustrated in FIG. 3, using specific computation examples. The bit sequence 3701 is 100111011100. When the bit sequence 3701 is converted into an 8-bit base video stream, it is ideal that the higher eight bits of the gradation bit sequence of the original image, namely 10011101, constitute the gradation bit sequence of the base video stream. However, in the reality, due to an error caused by the irreversible conversion, the 8-bit gradation bit sequence of the base video stream is 10010010, while it should be 10011101.

Thus the 8-bit gradation bit sequence of the base video stream is converted into a 12-bit gradation bit sequence, and then the 12-bit gradation bit sequence 100100100000 is subtracted from the gradation bit sequence 100111011100 of the original image. As a result of this subtraction, a bit sequence 10111100 illustrated in portion (d) of FIG. 3 is obtained. By recording the bit sequence 10111100 on a recording medium as the gradation bit sequence of the enhancement video stream, it is possible to restore the original 12-bit gradation bit sequence by adding the 8-bit gradation bit sequence to the 8-bit gradation bit sequence of the base video stream that includes an error.

Next, the following describes, with reference to FIG. 4, a case where a bit sequence after the compression and decoding includes many errors due to use of a natural image as the original image or an insufficient bit rate at the compression. In FIG. 4, the gradation bit sequence 3701 of the original image and the gradation bit sequence 3702, which has been made 8-bit for the Blu-ray disc, are the same as those explained above, but the gradation bit sequence obtained by performing the irreversible conversion and decoding is different from the one in FIG. 3.

More specifically, while the gradation bit sequence 3703 of FIG. 3 includes an error in the lower four bits, a bit sequence 3801 of FIG. 4 includes an error in the lower five bits thereof. That is to say, if this is applied to the gradation bit sequence 3701 of the original image, the gradation bit sequence 3701 includes an error in the lower nine bits thereof.

That is to say, when the above-explained technique is used, a 9-bit sequence is obtained as the difference between the 12-bit sequence of the original image and the 12-bit sequence, which is obtained after performing the irreversible conversion and decoding, and shifting the resultant bit sequence 3801 by four bits. There is no problem in it if the 9-bit sequence as the difference can be recorded as the information for the color depth extension. However, it must be taken into account that the bit stream is compressed as another enhancement video stream. A typical video encoder of a commercial device cannot deal with a bit length exceeding eight bit, and thus cannot compress the 9-bit information.

One method for solving the problem is to compress only the higher eight bits on the Most Significant Bit (MSB) side among the nine bits, for the enhancement video stream, and round off the one bit on the Least Significant Bit (LSB) side. In that case, the Least Significant Bit (LSB) of the sequence of 12 bits of the original image is not compressed for the enhancement video stream. However, this is not a problem considering that, as the color depth information, priorities should be given to the restoration of higher bits.

When priorities are given to the restoration of higher bits, it is inappropriate for the base video stream to be always converted into an N-bit stream by a shift circuit, and it is also inappropriate to select the lower eight bits of the original image by comparison between the original image and the bit sequence obtained by decoding the base video stream. Rather, it is appropriate to compare the original image with the decoded bit sequence, specify the higher bits including the error range as the target bit position by the shift amount, and determine the eight bits toward the LSB as the encoding target.

In view of this, the bit sequence of the original image is compared with a bit sequence that is obtained by decoding the encoded base video stream, and the shift amount b for the pixel bit value is used to indicate a bit position from which a sequence of bits among the 12 bits of the original image that should be corrected starts.

The following describes the gradation bit sequence of the enhancement video stream illustrated in FIG. 4, using specific computation examples. When the irreversible conversion is performed on the 12-bit gradation bit sequence of the original image, the result of the conversion should be "10011101", namely the higher eight bits of the 12-bit gradation bit sequence. However, in the reality, due to the conversion error caused by the irreversible conversion, the result of the conversion is 10001010. To make it possible to eliminate the error, the gradation bit sequence of the enhancement video stream is generated. More specifically, the 8-bit sequence of the base video stream is extended to a 12-bit sequence, and the 12-bit gradation bit sequence is subtracted from the 12-bit gradation bit sequence of the original image. The result of the subtraction is 100111100, which is a 9-bit sequence. This cannot be stored in the 8-bit width of the enhancement video stream. Accordingly, the higher eight bits, "10011110", are taken as the gradation bit sequence of the enhancement video stream. Furthermore, the highest bit in the error range, namely the $9^{th}$ bit, is specified as the shift amount. This makes it possible to restore the gradation of the original image by using the $9^{th}$ bit specified as the shift amount and the 8-bit value of the enhancement video stream.

<Change of Restoration Method Based on Position of Conversion Error>

It would be understood, from FIGS. 2 and 4 described above, that the restoration method changes based on the position of the conversion error. In general, when an N-bit gradation bit sequence of the original image is converted into an 8-bit gradation bit sequence of the base video stream, the lower (N−8) bits of the original image include the conversion error. The lower (N−8) bits are rounded off in the conversion to the base video stream. On the other hand, an error might be included in the 8-bit gradation bit sequence of the base video stream.

When a conversion error occurs only to the lower (N−8) bits of the original image, the shift amount b may be used to indicate the highest bit of the conversion error, and the gradation bit sequence of the base video stream may be shifted by the shift amount b. In this case, the shift amount b specifies the shift count. That is to say, the shift amount b specifying the shift count indicates the number of times the 8-bit gradation bit sequence of the base video stream is shifted toward the MSB before the gradation bit sequence of the enhancement video stream is added to the gradation bit sequence of the base video stream.

On the other hand, when a conversion error occurs to the higher eight bits of the original image, the effect of the error must be restricted to the minimum. More specifically, the shift amount b is used to indicate the highest bit of the conversion error, and the gradation bit sequence of the enhancement video stream is shifted toward the MSB in accordance with the shift amount b. In this case, the shift amount b specifies the target bit position. The shift amount b specifying the target bit position indicates a bit position in the gradation bit sequence of the enhancement video stream to which the bit sequence is shifted when the gradation bit sequence of the enhancement video stream is added to the gradation bit sequence of the base video stream whose bit width has been extended.

In the present embodiment, as the bit operation for the color depth extension, the shift amount for each frame is used to shift the gradation bit sequence of the base video stream and the gradation bit sequence of the enhancement video stream. The latter bit operation is used to minimize the effect of the round-off of the bit value when the difference between the original image and the base video stream is represented by not more than eight bits, which constitute the bit width of the enhancement video stream.

The following describes the embodiments of the present invention in the aspects of the recording medium, recording device, and playback device for the above-described narrower concepts, with reference to the accompanying drawings. The storage location of the pixel value shift amount b in the recording medium is explained. As the storage location of the pixel value shift amount b, the following locations may be considered.

The first one is in the base video stream. In this case, the pixel value shift amount b is unknown to the existing players, and thus a malfunction may occur due to the unknown data included in the base video stream.

The second location is in the enhancement video stream. In this case, there is no influence on the existing players since the existing players do not pass the enhancement video stream to a decoder located after a packet identifier filter.

Either the above first location or second location can be selected. In the present embodiment, the second storage location is selected by giving priority on guaranteeing the operation in the existing playback devices. A description is given of the form in which the shift amount b for the enhancement video stream is stored. According to the shift amount b storage form, shift amounts, which are respectively set for frames/fields, are united in predetermined units into a sequence of one parameter, and then stored in the video stream. In the present embodiment, the shift amounts, which are respectively set for frames/fields, are united in units of random access in the recording medium, and the united shift amount is, as a shift amount sequence, embedded into the unit of random access in the enhancement video stream. Here, when the base video stream and the enhancement video stream are moving pictures, the unit of random access is GOP (Group Of Pictures); and when the base video stream and the enhancement video stream are browsable slide shows, the unit of random access is the browsing unit. When the video stream has been encrypted, the encryption unit (chunk) is the unit of random access. In this way, for each of various forms of random access, the shift amount sequence is stored in bulk. This makes it possible for the playback device to read the shift amount without fail.

The above-described base video stream and enhancement video stream are divided into a plurality of data blocks, and the data blocks are arranged in an interleaved manner to adapt the playback device to the playback processing. The stream file, which is obtained by arranging a plurality of data blocks constituting the base video stream and a plurality of data blocks constituting the enhancement video stream in an interleaved manner, is called a "color depth extension interleaved stream file".

FIG. 5 illustrates the color depth extension interleaved stream file. The middle portion of FIG. 5 illustrates the internal structure of the color depth extension interleaved stream file. As illustrated therein, the color depth extension interleaved stream file includes the base video data blocks and the enhancement video data blocks that are arranged alternately. The base video data block stores pictures of the base video stream, and the enhancement video data block stores pictures of the enhancement video stream. The arrows sr1, sr2, sr3 . . . indicate the contents of these data blocks. As the arrows sr1, sr2, sr3 . . . indicate, each base video data block stores a plurality of pictures of the base video stream. Also, as the arrows sr11, sr12, sr13 . . . indicate, each enhancement video data block stores a plurality of pictures of the enhancement video stream. The pictures of the base video stream are classified into the IDR picture, P picture and B picture, and these pictures constitute each GOP.

The base video stream and the enhancement video stream have the same number of pictures, and the same values of DTS and PTS are set for the pictures of the base video stream and the enhancement video stream that are to be displayed in the same frame such that they are decoded at the same frame time and displayed at the same frame time.

The following describes the processes through which the picture data constituting the base video stream and enhancement video stream are generated. FIGS. 6A-6C illustrate the picture data of the base video stream, the picture data of the enhancement video stream, and the picture data of the original image.

In FIG. 6A, the middle portion illustrates the picture data of the original image, the left portion illustrates the picture data of the base video stream, and the right portion illustrates the picture data of the enhancement video stream. These picture data are each composed of 1920×1080 pixels. The thickness of each picture data schematically illustrates the color depth of the pixels constituting the picture data. In the picture data of the original image, each pixel is composed of an N-bit luminance Y, an N-bit red color difference Cr, and an N-bit blue color difference Cb. In the picture data of the base video stream, each pixel is composed of an 8-bit luminance Y, an 8-bit red color difference Cr, and an 8-bit blue color difference Cb. In the picture data of the enhancement video stream, each pixel is composed of an (N−8)-bit luminance Y, an (N−8)-bit red color difference Cr, and an (N−8)-bit blue color difference Cb.

The arrows cr1-cr6 indicate which parts of the pixel bit value of the original image correspond to the pixel bit values of pictures of the base and enhancement video streams. As indicated by the arrows, the pixel bit values of pictures of the base video stream constitute higher pixel bit values of pictures of the original image, and the pixel bit values of pictures of the enhancement video stream constitute lower pixel bit values of pictures of the original image. That is to say, the 8-bit value of the base video stream represents the higher bits of the original image, and the gradation bit sequence of the enhancement video stream represents the difference between the gradation bit sequence of the base video stream and the gradation bit sequence of pixels of the original image. Thus it is possible to restore the N-bit gradation bit sequence constituting the original image by decoding the base and enhancement video streams and adding the bit values obtained by the decoding. Based on this correspondence between the original image and the video streams, the pictures of the base and enhancement video streams may be recorded on a recording medium so that a playback device loaded with the recording medium can restore the pixel bit values of the original image by adding the pixel bit values of pictures of the base and enhancement video streams in accordance with the arrows cr1-cr6.

Here, a description is given of how the gradation of image changes depending on the gradation bit values. FIG. 6B illustrates the gradation change with the N-bit gradation bit sequence of the original image. Note that FIG. 6B illustrates the case where N in the N-bit is 12, which enables 4,096 gradation levels to be represented. FIG. 6B illustrates the gradation change by a graph whose horizontal axis represents the x coordinates and vertical axis represents the gradation values ranging from 0 to 4,095. FIG. 6C illustrates the gradation change in the pictures of the base video stream. The 8-bit bit width enables 256 gradation levels to be represented. Thus FIG. 6C illustrates the gradation change by a graph whose horizontal axis represents the x coordinates and vertical axis represents the gradation values ranging from 0 to 255. A comparison between graphs of FIG. 6B and FIG. 6C suggests that the gradation change represented by the 256 gradation levels is discrete, and small patterns in an image cannot be represented with sufficient accuracy. On the other hand, the gradation change represented by the 4,096 gradation levels looks smooth, with the discreteness softened.

Figure 7A:
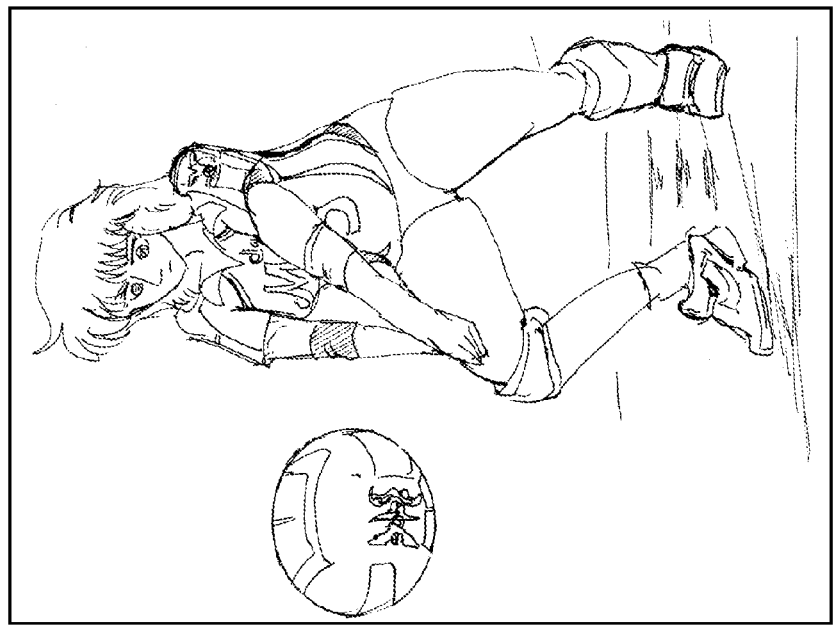

It is understood that the color depth represented by the N-bit pixel values of the original image is represented by the combination of pixel bit values of pictures of the base video stream and the enhancement video stream. The following describes the color depth extension with a specific example, for more technical understanding. The specific example discussed here is encoding of video content of sports including a fast-moving subject, as illustrated in FIGS. 7A and 7B. FIGS. 7A and 7B illustrate an original image and an image as a picture in the base video stream. FIG. 7B illustrates an example of an image as a picture in the base video stream. Blocks included in FIG. 7B represent macroblocks in which an error has occurred during conversion from the N-bit sequence to the 8-bit sequence. The example of FIGS. 7A and 7B is one scene taken from a sports video content. It indicates that an error (an error which appears as block noise in the MPEG video, for example) has occurred in some portions, such as printed patterns of the ball and the uniform, due to the fast movement of the subject, where the portions with the errors appear as mosaic patterns. To obtain, from the image of FIG. 7B, an image that is almost identical as the original image, the image of FIG. 7B is supplemented by using the shift amount and pixel values of the enhancement video stream. FIG. 7A illustrates the result of this supplement. As illustrated in FIG. 7A, there is no error in the supplemented image. Thus the enhancement video stream is recorded on a recording medium together with pictures of the base video stream so that the playback device can restore the original image.

With the introduction of the color depth extension using the enhancement video stream, the image is represented by the resolution of 4,096 gradation levels as illustrated in FIG. 6B based on the 12-bit gradation bit sequence, which enables, for example, the delicate pattern on the uniform to be restored. This makes it possible to restore the original image, with the beauty close to that of the natural image.

Figure 8:
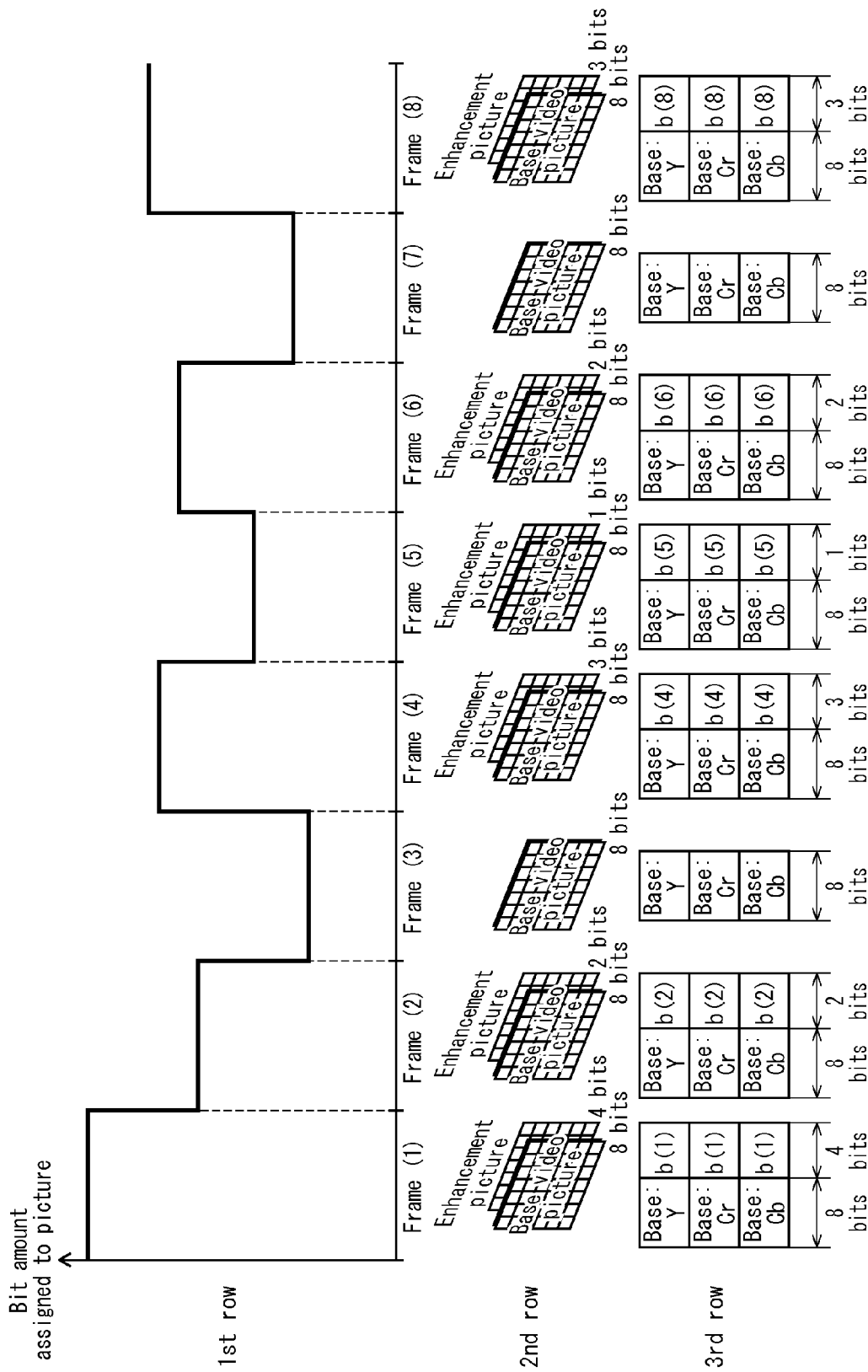
FIG. 8 illustrates the change in the bit amount assigned to the picture data of eight frames, pixel bit values of luminance Y, red color difference Cr, and blue color difference Cb in each frame at this change, and settings of the shift range when the color depth is extended to the pixel bit values of the original image.

The following describes a case where the gradation bit sequence of pictures of the base video stream is shifted based on the shift amount b for each frame, with reference to FIG. 8.

FIG. 8 illustrates the change in the bit amount assigned to the picture data of eight frames, gradation bit width of pixels of the base video picture in each frame at this change, and the gradation bit width of pixels of the enhancement video picture.

The first row of FIG. 8 is a graph whose vertical axis represents the bit amounts assigned to the respective frames and horizontal axis represents the time axis. The second row of FIG. 8 illustrates the gradation bit sequence of pictures of the base and enhancement video streams for each of the frames. For each of the frames, the bit width of pictures of the base video stream is eight bits. On the other hand, the bit width of pictures of the enhancement video stream is four, two, and zero bits at frames (1), (2), and (3), respectively. Furthermore, the bit width of pictures of the enhancement video stream is three, one, two, zero, and three bits at frames (4), (5), (6), (7), and (8), respectively. The third row of FIG. 8 illustrates how much is shifted the gradation bit sequence of pictures of the base video stream toward the MSB. It is specified that the highest bit of the conversion error in the irreversible conversion is bit 4, 2, and 0 at the frames (1), (2), and (3), respectively. As a result, each of the gradation bit sequences Y, Cr, and Cb of pictures of the base video stream is shifted toward the MSB by four, two, and zero bits at the respective frames. Similarly, each gradation bit sequence of the base video stream is shifted by three bits and one bit at the frames (4) and (5), respectively, and is shifted by two, zero, and three bits toward the MSB at the frames (6), (7) and (8), respectively.

Figure 9:
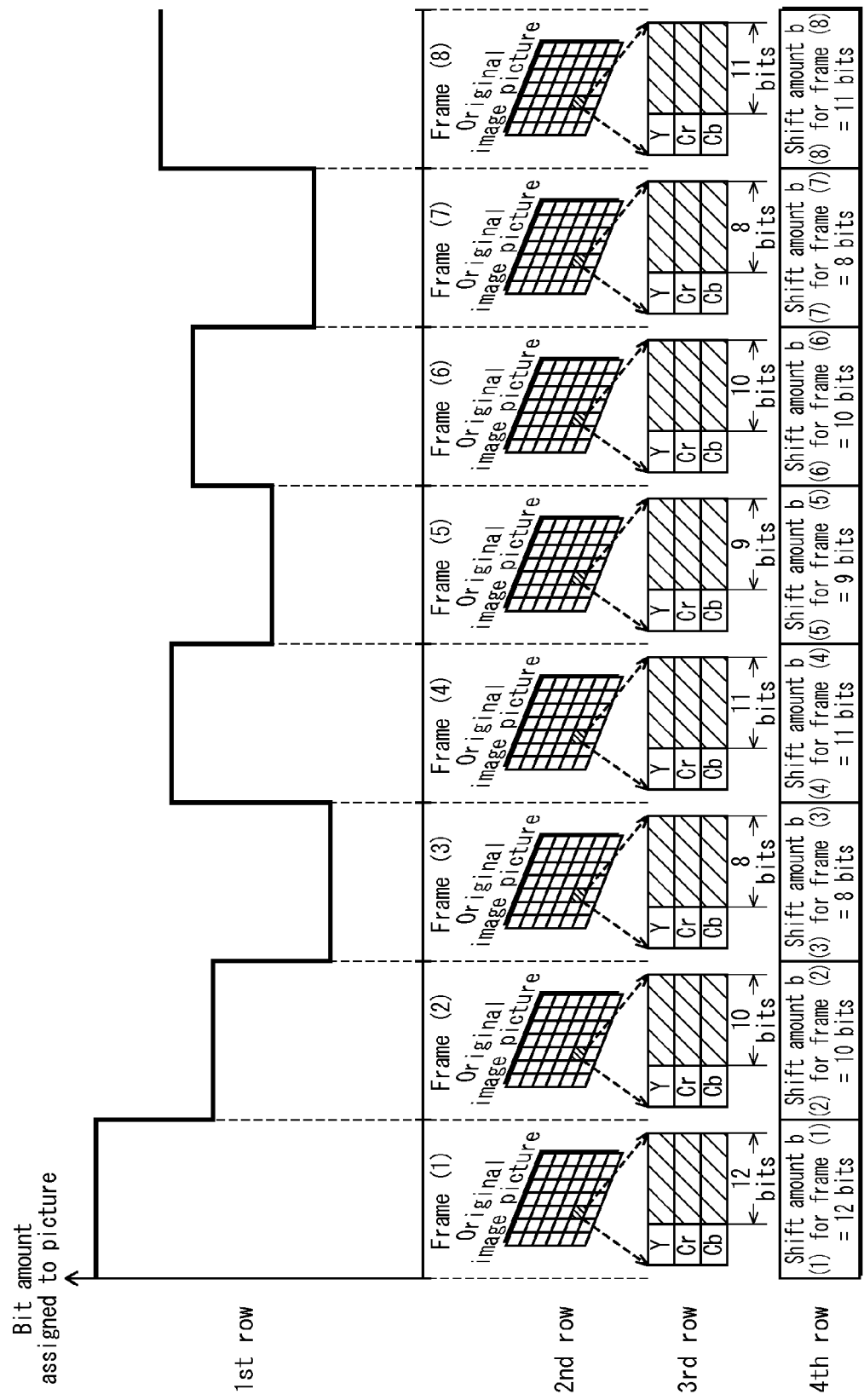
FIG. 9 illustrates the change in the bit amount assigned to the picture data of eight frames, gradation bit width of pixels of the base video picture in each frame at this change, and the gradation bit width of pixels of the enhancement video picture.

The following describes a case where the gradation bit sequence of pictures of the enhancement video stream is shifted based on the shift amount b for each frame, with reference to FIG. 9.

FIG. 9 illustrates the change in the bit amount assigned to the picture data of eight frames, pixel bit values of the luminance Y, red color difference Cr, and blue color difference Cb in each frame at this change, and the settings of the shift range when the color depth is extended up to the pixel bit values of the original image.

The first row of FIG. 9 is a graph whose vertical axis represents the bit amounts assigned to the respective frames and horizontal axis represents the time axis. In this example, a highest amount of bits is assigned at frame (1), the amount of assigned bits is decreased in the order of frame (2) and frame (3). Following this, a "high" amount of bits and a "low" amount of bits are assigned at frames (4) and (5), respectively, and a "high" amount of bits and a "low" amount of bits are assigned at frames (6) and (7), respectively. In this graphs, the highest amount of bits is assigned at frame (1), followed by frames (2) and (6), and then frames (3) and (7). This is reflects the results of responding to the complexity of the image patterns and the fastness of the movements.

The difference in error range for each frame is represented, with the accuracy of frame, as the difference in shift amount for each frame and the difference in pixel bit value of the enhancement video stream for each frame.

The second row of FIG. 9 illustrates pixels of one screen to be displayed at each of the frames (1) to (8). The third row of FIG. 9 illustrates the highest bit in the range in which a conversion error has occurred by the irreversible conversion for the gradation of the luminance Y, red color difference Cr, and blue color difference Cb. The fourth row of FIG. 9 indicates the location of the gradation bit sequence of the enhancement video stream in the range of 12 bits. In this example, 12, 10, and 8 bits are specified for the frames (1), (2), and (3), respectively. Accordingly, each of the gradation bit sequences Y, Cr, and Cb of pictures of the enhancement video stream is arranged at the bit 12, 10, and 8, respectively. Similarly, the gradation bit sequence of the enhancement video stream is arranged at the bit 11 and 9 at the frames (4) and (5), respectively, and is arranged at the bit 10, 8 and 11 at the frames (6), (7) and (8), respectively.

As described above, the bit position of the bit sequence indicating the pixel gradation of pictures of the enhancement video stream changes depending on the shift amount set for each frame. As described above, the difference in error range for each frame is represented, with the accuracy of frame, as the difference in shift amount for each frame and the difference in pixel bit value of the enhancement video stream for each frame, resulting in a high-quality reproduction of the video content of sports. Such reproduction with the accuracy of frame and pixel is one of the above-described specific forms of the color depth extension.

This completes the explanation of the enhancement video stream. The following describes details of the recording device for recording the enhancement video stream on the recording medium together with the base video stream.

Figure 10:
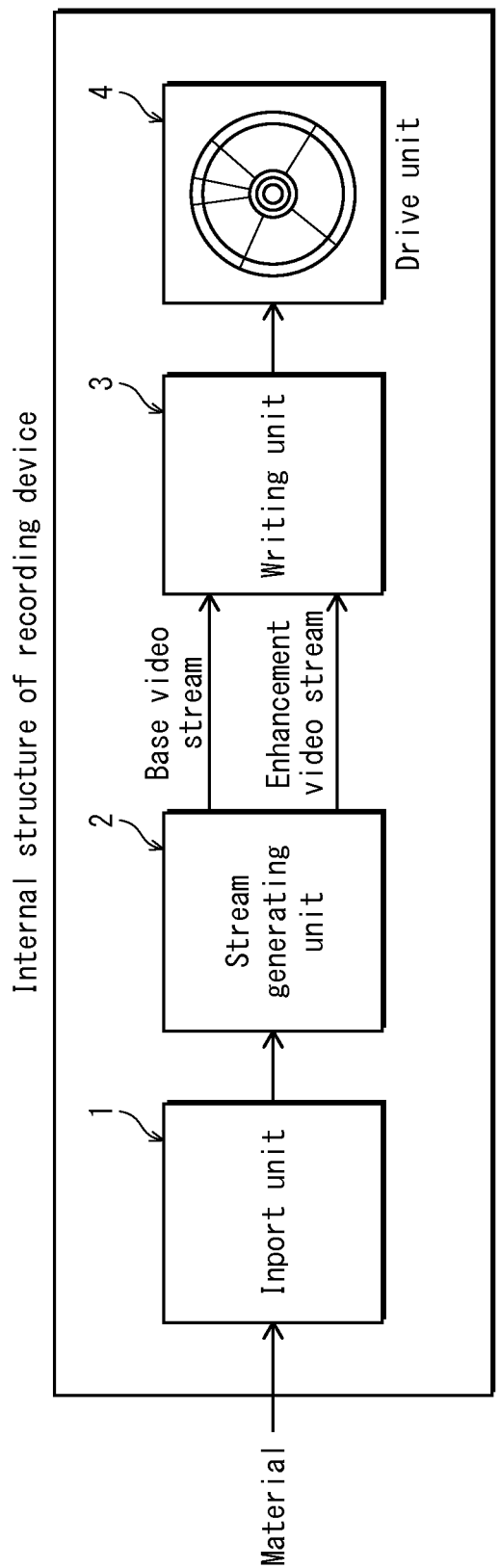
FIG. 10 illustrates one example of the internal structure of the recording device.

FIG. 10 illustrates one example of the internal structure of the recording device. As illustrated in FIG. 10, the recording device includes an inport unit 1, a stream generating unit 2, a writing unit 3, and a drive unit 4, wherein the inport unit 1 inports the original image data composed of N-bit pixel bit values, the stream generating unit 2 generates the base video stream and the enhancement video stream from the original image data, the writing unit 3 write the generated base and enhancement video streams onto the recording medium, and the drive unit 4 for holding the recording medium loaded therein.

(Mechanism for Compressing Color Depth Extension)

Figure 11:
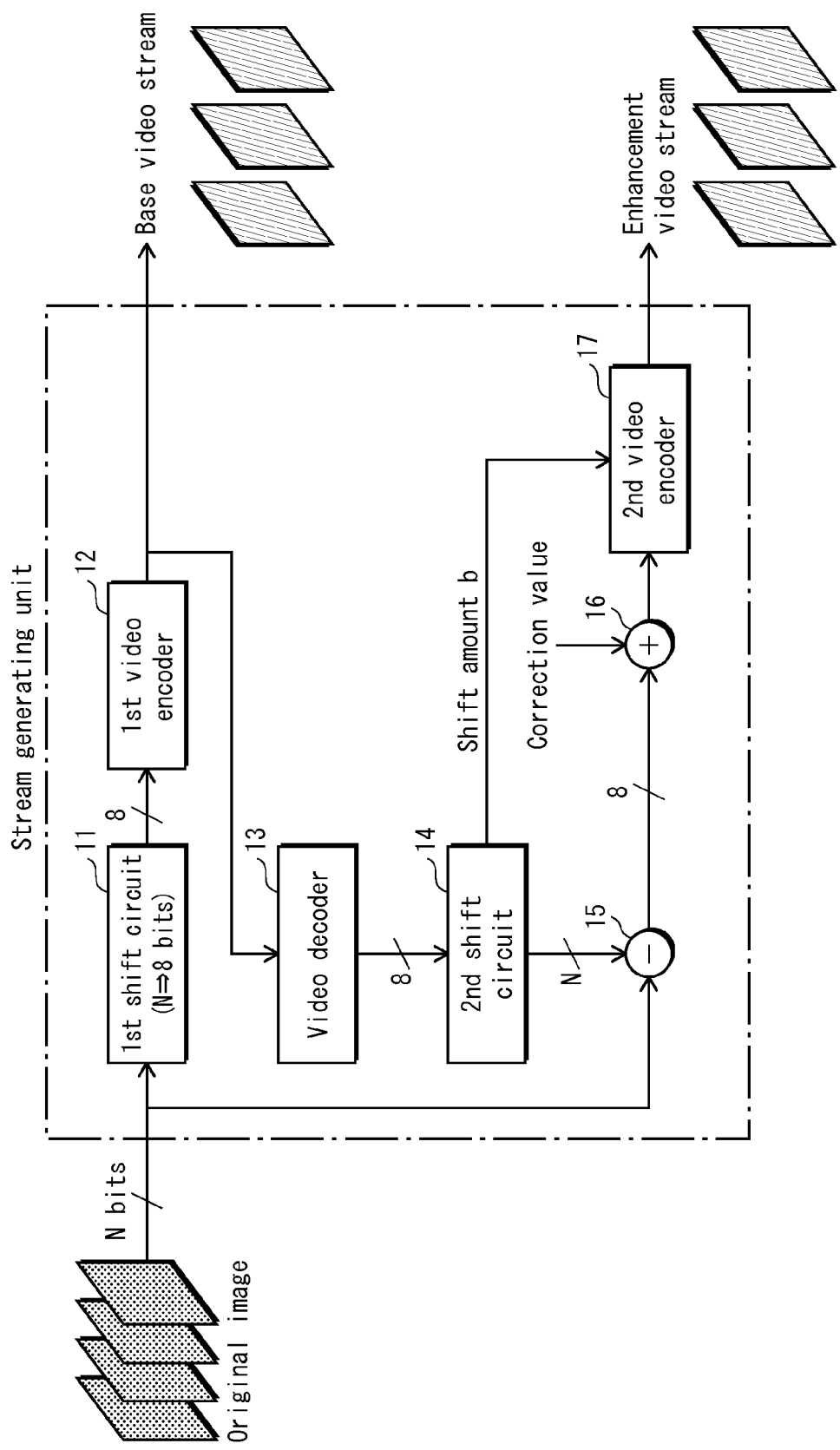
FIG. 11 illustrates one example of the internal structure of the stream generating unit that includes video encoders for extension of color depth.

FIG. 11 illustrates one example of the internal structure of the stream generating unit 2 that includes video encoders for extension of color depth. As illustrated in FIG. 11, the stream generating unit 2 includes: a first shift circuit 11 for shifting and converting N-bit pixel bit values of the original image into 8-bit pixel bit values; a first video encoder 12 for encoding image data composed of the converted 8-bit pixel bit values; a video decoder 13 for obtaining image data composed of 8-bit pixel bit values by decoding the image data encoded by the first video encoder 12; a second shift circuit 14 for obtaining image data composed of N-bit pixel bit values by shifting the 8-bit pixel bit values obtained by the video decoder 13 toward the MSB; a subtractor 15 for subtracting the N-bit pixel bit values obtained by the second shift circuit 14 respectively from the N-bit pixel bit values of the original image; an adder 16 for adding correction values respectively to N-bit pixel bit values which are results of the subtraction performed by the subtractor 15; and a second video encoder 17 for obtaining an enhancement video stream by encoding 8-bit pixel bit values, which are results of the addition performed by the adder 16, and a shift amount of the shifting performed by the second shift circuit 14.

The original image is composed of a plurality of pictures, and each color of each pixel of the pictures is represented by an N-bit value. The N-bit values of the original image are converted by the first shift circuit into 8-bit values. The converted 8-bit values are input to the first video encoder, and are output therefrom as a base video stream. Subsequently, the base video stream output from the first video encoder is decoded by the video decoder and is output as video composed of 8-bit values. In the video composed of the 8-bit values, each color of each pixel is represented by the gradation bit sequence 1803 illustrated in FIG. 1, and the bit sequences are converted by the second shift circuit into an image composed of N-bit values. Next a subtraction process is performed to subtract each N-bit gradation value for each color output from the second shift circuit from each N-bit gradation value of the original image. This subtraction process corresponds to the subtraction of the N-bit gradation bit sequence 1803 from the N-bit gradation bit sequence 1801 of the original image for each color of each pixel, which is illustrated in FIG. 2.

As a result of this subtraction process, a difference image composed of 8-bit gradation bit sequences is obtained, wherein each of the 8-bit gradation bit sequences includes lower bits of the N-bit gradation bit sequence of the original image that are lost in the base video stream, and lower-bit information (information described as "lower bits including error for original image" regarding the gradation bit sequence 1803 in FIG. 1) that includes an error caused by the compression performed by the first video encoder.

Each 8-bit gradation bit sequence in the difference image may have become a negative value through the above-described subtraction process. Accordingly, a correction value is added to the 8-bit gradation bit sequence as necessary for it to be a positive value, and then each gradation bit sequence is input to the second video encoder, which then outputs the enhancement video stream.

Figure 12:
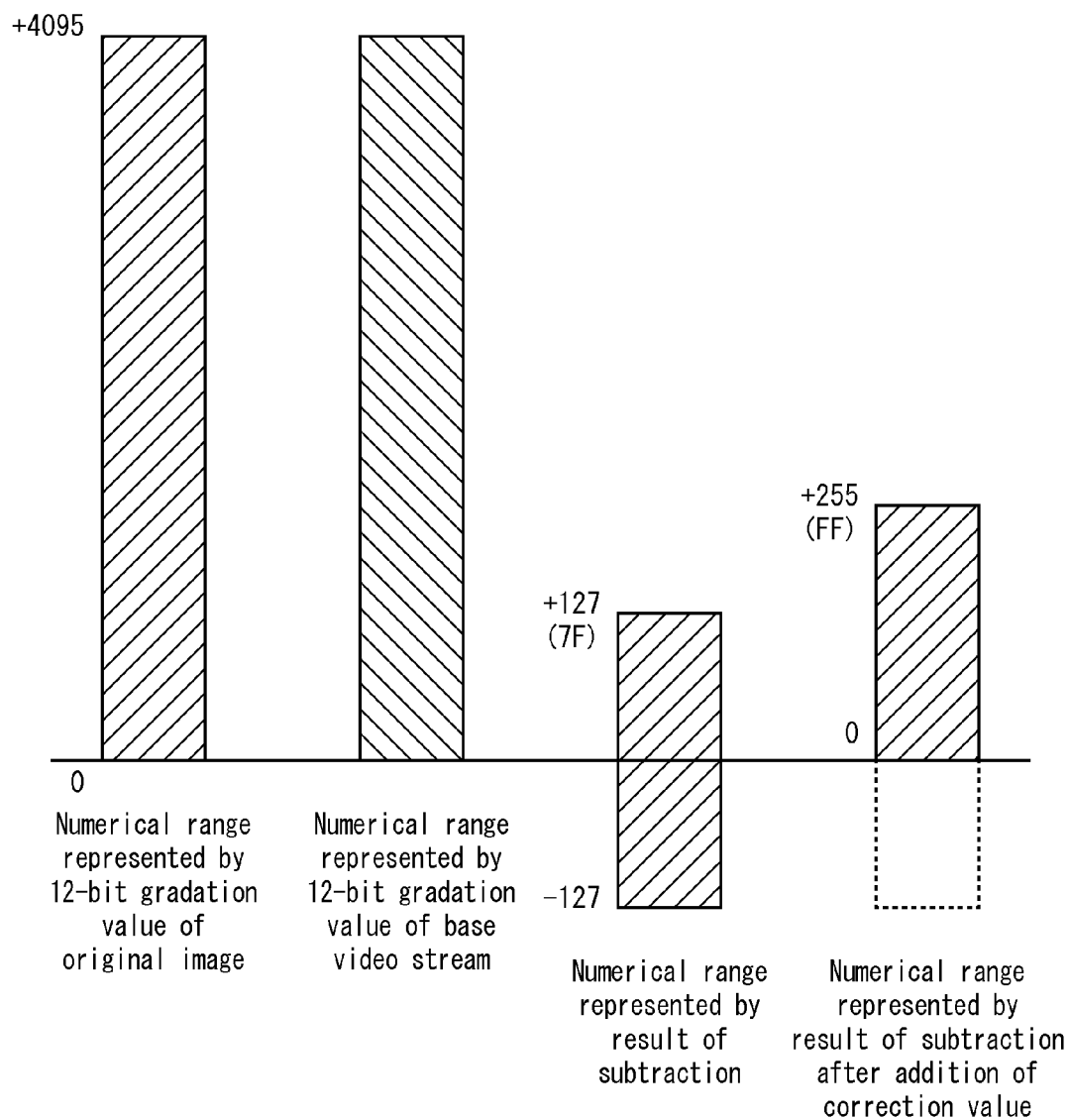
FIG. 12 illustrates the process for turning negative values into positive values performed by the adder 16.

The adder 16 executes the process for turning negative values into positive values on the difference between the gradation bit sequence of pictures of the base video stream and the gradation bit sequence of pictures of the enhancement video stream. The following describes the process for turning negative values into positive values performed by the adder 16. FIG. 12 illustrates the process for turning negative values into positive values performed by the adder 16. The left portion of FIG. 12 illustrates the numerical range represented by a 12-bit gradation value of the original image. The middle-left portion of FIG. 12 illustrates the numerical range represented by a 12-bit gradation value of the base video stream. The middle-right portion of FIG. 12 illustrates the numerical range represented by the result of subtraction. The right portion of FIG. 12 illustrates the numerical range represented by the enhancement video stream. The result of subtraction is a signed 8-bit value representing the numerical range from −127 to +127. Thus the result of subtraction can be turned into a positive value representing the numerical range from 0 to +254, by adding a correction value "+127" thereto. Conversely, when a playback is performed, it is possible to represent the numerical range from −127 to +127 by subtracting 127 from the gradation bit sequence of the enhancement video stream.

It is judged whether or not an error has been caused during the conversion to the N-bit gradation bit sequence, by checking whether or not the result of subtracting the N-bit gradation bit sequence, which is obtained by shifting the 8-bit gradation bit sequence, from the N-bit gradation bit sequence of the original image is 0. It is also possible to convert this subtraction result into an N-bit value that indicates the higher bits of the error range, by inputting the subtraction result into a priority encoder. With this operation, it is possible to obtain a shift amount unique to an arbitrary frame.

Figure 13:
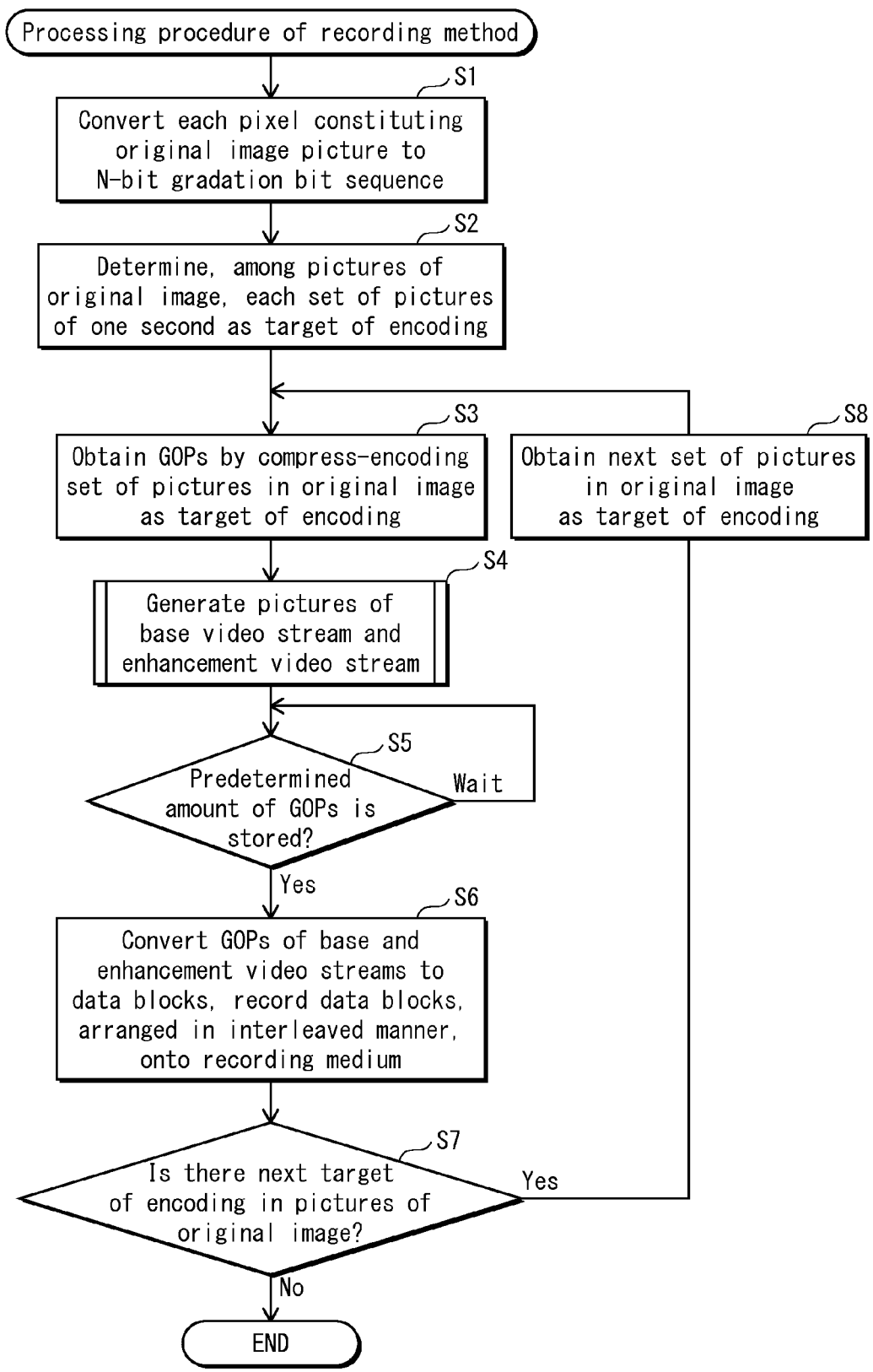
FIG. 13 is a flowchart illustrating the processing procedure of the recording method.

The recording device of the present embodiment can be manufactured industrially by implementing the above-described structural elements of the recording device on a hardware integrated circuit such as ASIC (Application Specific Integrated Circuit). When a general-purpose computer architecture including a CPU, code ROM and/or RAM is adopted in the hardware integrated circuit, it is necessary to embed a program, in which the processing procedure of the above-described structure elements is described, into the code ROM in advance, and cause the CPU in the hardware integrated circuit to execute the program. The following describes the processing procedure required for the software implementation when an architecture of a general-purpose computer system is adopted. FIG. 13 is a flowchart illustrating the processing procedure of the recording method.

In step S1, each pixel constituting the pictures of the original image is converted into N-bit gradation bit sequences, and in step S2, each set of pictures of one second among the pictures of the original image is determined as the target of encoding. The control then proceeds to a loop composed of steps S3 to S8. In this loop, GOPs are obtained by compression-encoding a set of pictures in the original image as the target of encoding (step S3), pictures of the base video stream and enhancement video stream are generated (step S4), and it is waited until a predetermined amount of GOPs is stored (step S5). After the predetermined amount of GOPs is stored, GOPs of the base video stream and enhancement video stream are converted into data blocks, then arranged in the interleaved manner, and then recorded onto a recording medium (step S6). The step S7 defines the condition for ending the loop. In step S7, it is judged whether or not there is the next target of encoding in the pictures of the original image. If it is judged that there is the next target of encoding, the control proceeds to step S8 in which the next target of encoding is obtained, and the control returns to step S3. With the execution of the loop, the pictures of the base video stream and enhancement video stream are recorded on the recording medium.

Figure 14:
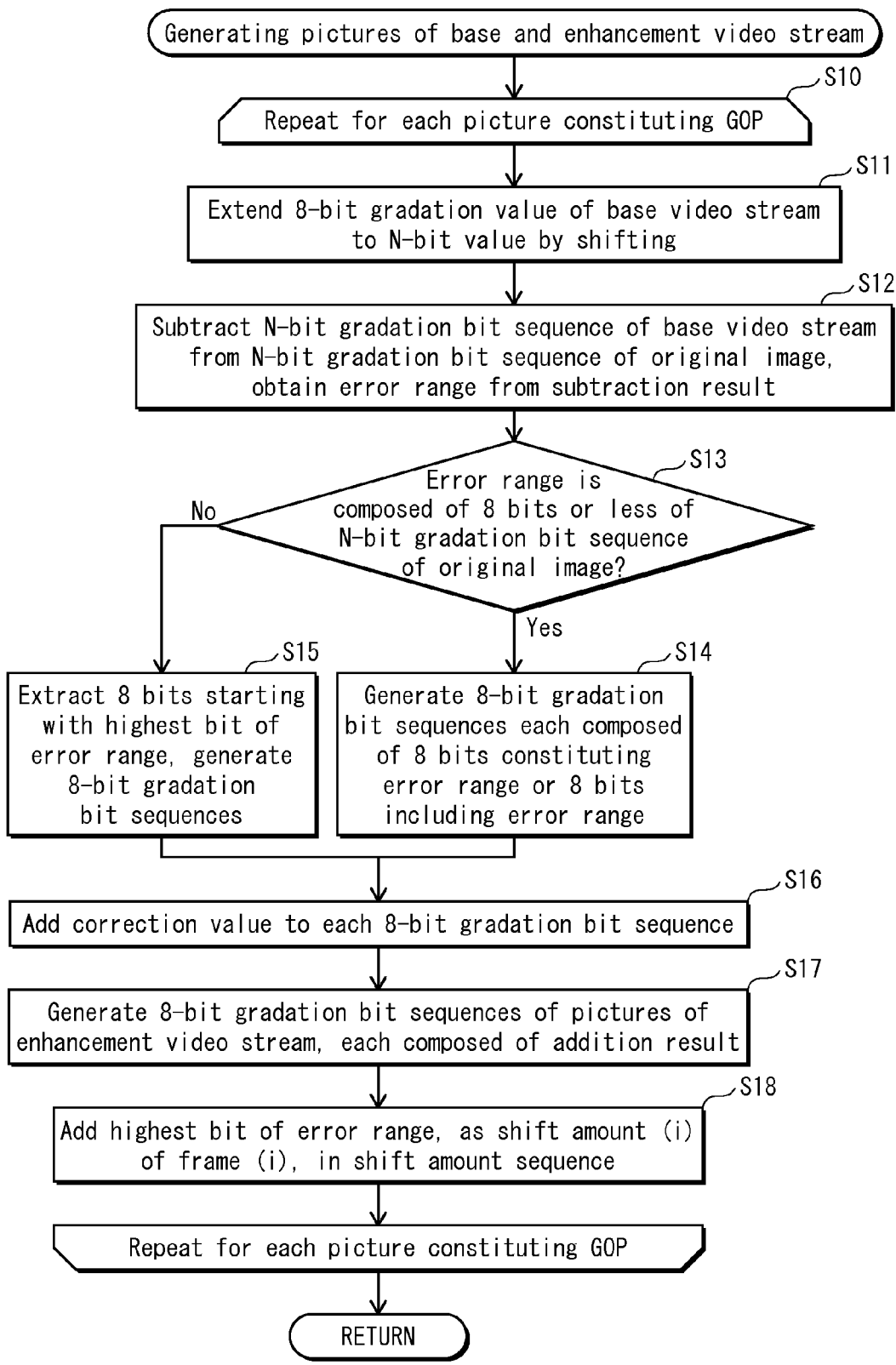
FIG. 14 is a flowchart illustrating the procedure of generating the base video stream and the enhancement video stream.

FIG. 14 is a flowchart illustrating the procedure of generating the base video stream and the enhancement video stream. In this flowchart, variable (i) is a control variable that identifies a processing target picture. Accordingly, in the following description of the flowchart, the processing target picture in the "$i^{th}$" round of processing in the loop is denoted as "picture (i)". Furthermore, a frame in which the picture (i) is to be displayed is denoted as "frame (i)", and a shift amount unique to the frame (i) is denoted as "shift amount (i)".

The step S10 defines the structure of a loop in which processing of steps S11 to S18 is repeated for each picture constituting the GOP. The target of the repetitive processing in the loop is the picture (i). In step S11, 8-bit gradation bit sequences constituting the picture (i) are extended to N-bit gradation bit sequences. In step S12, N-bit gradation bit sequences of the base video stream are subtracted from respective N-bit gradation bit sequences of the original image, and the error range is obtained from the subtraction result. In step S13, it is judged whether or not the error range is composed of eight bits or less of the N-bit gradation bit sequence of the original image.

When it is judged Yes in step S13, the control proceeds to step S14. In step S14, 8-bit gradation bit sequences each composed of eight bits constituting the error range or eight bits including the error range are generated. When it is judged No in step S13, the control proceeds to step S15. In step S15, eight bits starting with the highest bit of the error range are extracted from the error range and 8-bit gradation bit sequences each composed of the extracted bits are generated. In step S16, a correction value is added to each of the 8-bit gradation bit sequences so that negative values are converted into positive values, and in step S17, 8-bit gradation bit sequences of pictures of the enhancement video stream, which are each composed of the addition result, are generated. In step S18, the highest bit of the error range is described, as the shift amount (i) of the frame (i), in the shift amount sequence.

This completes the explanation of the recording device. Next, the playback device is described in detail.

Figure 15:
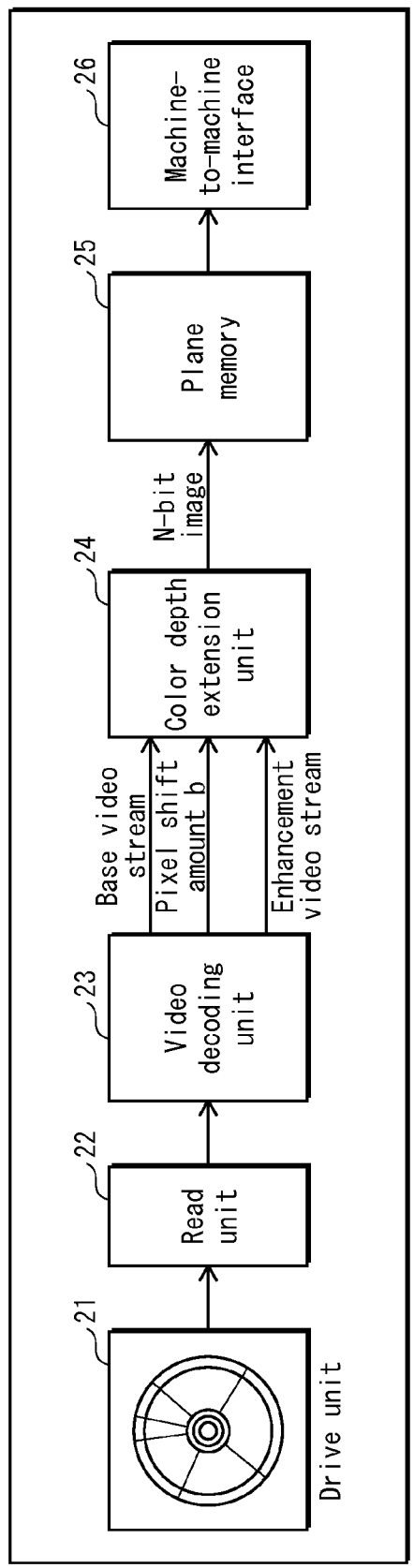
FIG. 15 illustrates one example of the internal structure of the playback device.

FIG. 15 illustrates one example of the internal structure of the playback device. As illustrated in FIG. 15, the playback device includes: a drive unit 21 for holding a recording medium loaded therein, the base video stream and the enhancement video stream being recorded in the recording medium; a read unit 22 for reading a transport stream containing the base video stream and a transport stream containing the enhancement video stream from the recording medium; a video decoding unit 23 for obtaining pictures of the base and enhancement video streams and a shift amount by decoding the base and enhancement video streams; a color depth extension unit 24 for obtaining image data composed of N-bit gradation bit sequences by performing the color depth extension by using the pictures of the enhancement video stream and the shift amount; a plane memory 25 for storing image data composed of N-bit gradation bit sequences; and a machine-to-machine interface 26 for transferring image data to the display device.

Here, a description is given of the color depth extension unit that reconstructs video composed of N-bit gradation bit sequences from the above-described base and enhancement video streams.

Figure 16:
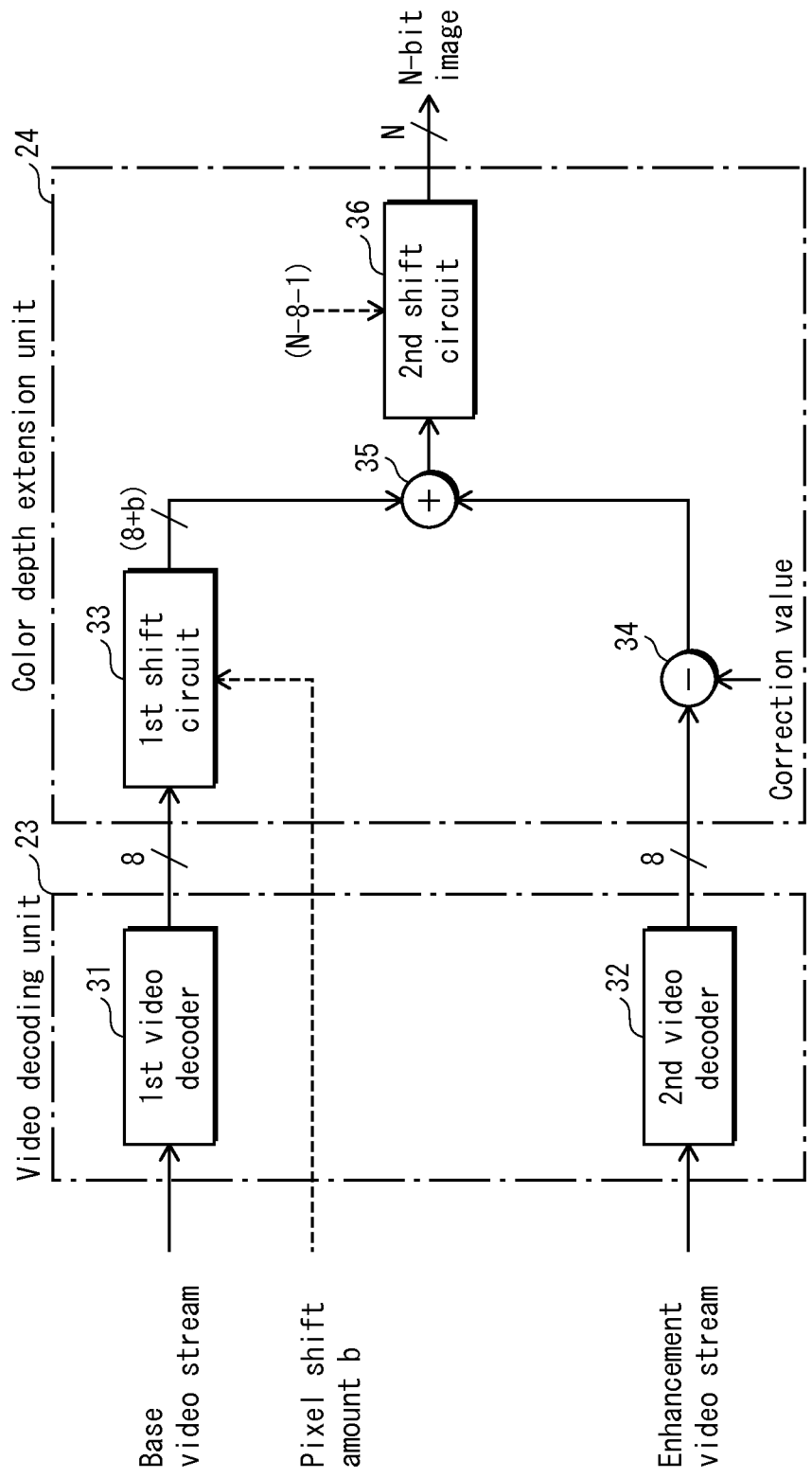
FIG. 16 illustrates one example of the internal structures of the video decoding unit 23 and the color depth extension unit 24.

First, a description is given of the internal structure of the color depth extension unit in a case where each gradation bit sequence of pictures of the base video stream is shifted by using shift amount b defined for each frame. FIG. 16 illustrates one example of the internal structures of the video decoding unit 23 and the color depth extension unit 24. As illustrated in FIG. 16, the video decoding unit 23 includes: a first video decoder 31 for decoding the base video stream; and a second video decoder 32 for decoding the enhancement video stream.

The color depth extension unit 24 includes: a first shift circuit 33 for shifting the gradation bit sequence of the base video stream by the shift amount b toward the MSB; a subtractor 34 for converting the 8-bit gradation bit sequence of pictures of the enhancement video stream into a signed bit value sequence by subtracting a correction value therefrom; an adder 35 for adding the 8-bit gradation bit sequence of pictures of the base video stream and the subtraction result output from the subtractor 34; and a second shift circuit 36 for converting the addition result output from the adder 35 into an N-bit gradation bit sequence by shifting thereof toward the MSB by (N−8−1) bits.

With this structure, each color of each pixel of the base video stream is shifted by the shift amount b by the first shift circuit (this process corresponds to the process of shifting the gradation bit sequence 1803 leftward and inserting 0s in the lower bits, which is illustrated in FIG. 2). Also, a correction value is subtracted from the color depth of each color of each pixel of the enhancement video stream, and the subtraction-result bit value of the enhancement video stream is added to the gradation bit sequence of the base video stream after the shifting, and the addition result is shifted by (N−8−1) bits by the second shift circuit, and an image composed of N-bit gradation bit sequences is output. It is assumed that the correction value mentioned here is the same as the correction value used in the encoding as illustrated in FIG. 11. The reason why the adder 16 adds the correction value is to make it possible to use the subtraction result as the gradation bit sequence of each pixel of the enhancement video stream. The subtraction of the 8-bit gradation bit sequence obtained by decoding the base video stream from the N-bit gradation bit sequence of each pixel of the original image may result in a negative value. In view of this, a correction value, which is determined in advance as a value to be used in common both in encoding and decoding, is added to the 8-bit gradation bit sequence to make it a positive value. With this structure, the above-described subtraction result can be used as a pixel of the enhancement video stream.

The structure of the color depth extension unit for shifting the gradation bit sequence of pictures of the base video stream by the shift amount as illustrated in FIG. 16 is provided for the purpose of making the value "N", which represents the color depth after the extension, a variable value. Here, to make N a variable value, the gradation bit sequence of the base video stream needs to be shifted toward the MSB by a bit value indicated by the shift amount b, and the gradation bit sequence of the enhancement video stream, after made to be a positive value, needs to be added, and then the addition result needs to be shifted by (N−8−1). In the color depth extension unit illustrated in FIG. 16, the second shift circuit 36 plays a role to adjust the value (N−8−1), which is the difference between the bit width of the gradation bit sequence of pixel of the original image and the bit width of the gradation bit sequence of the base video stream. Thus the structure of the color depth extension unit illustrated in FIG. 18 applies to "N" that is made to be a variable value representing the color depth after the extension.

Figure 17:
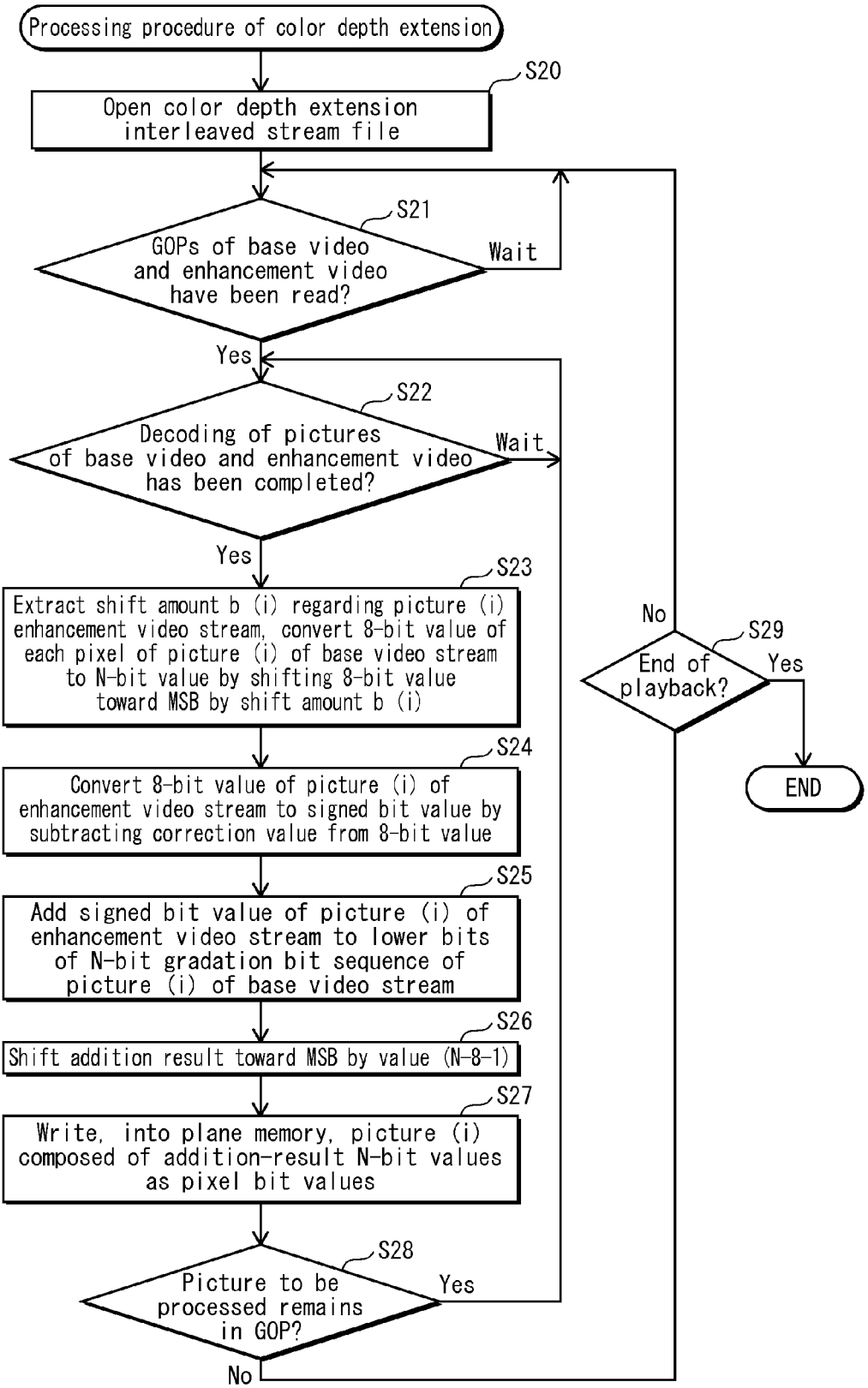
FIG. 17 is a flowchart illustrating the procedure of the color depth extension for shifting the gradation bit sequence of pictures of the base video stream by the shift amount b of the base video stream.

The following describes the processing procedure that is necessary for the software implementation when the product of the above-described playback device is developed. FIG. 17 is a flowchart illustrating the procedure of the color depth extension for shifting the gradation bit sequence of pictures of the base video stream by the shift amount b of the base video stream. In this flowchart, variable (i) is a control variable that identifies a processing target picture. Accordingly, in the following description of the flowchart, the processing target picture in the "i"$^{th}$ round of processing in the loop is denoted as "picture (i)". Furthermore, a frame in which the picture (i) is to be displayed is denoted as "frame (i)", and a shift amount unique to the frame (i) is denoted as "shift amount (i)".

This flowchart defines a loop structure in which the process of steps S21 to S28 is repeated after a color depth extension interleaved stream file is opened in step S20 until the condition for ending is satisfied in step S29. In step S21, it is waited until it is judged that GOPs of the base video stream and enhancement video stream have been read. In step S22, it is judged whether or not decoding of pictures of the base video stream and enhancement video stream has been completed. When it is judged Yes in both steps S21 and S22, the control proceeds to step S23, in which the shift amount regarding GOP is extracted from a GOP to which the picture of the base video stream belongs, and the 8-bit gradation bit sequence of each pixel of the picture of the base video stream is converted into an N-bit gradation bit sequence by shifting the 8-bit gradation bit sequence toward the MSB by the shift amount.

In step S24, the 8-bit gradation bit sequence of pictures of the enhancement video stream is converted into a signed bit value by subtracting a correction value from the 8-bit gradation bit sequence. In step S25, the signed bit value of picture (i) of the enhancement video stream is added to the lower bits of the N-bit gradation bit sequence that has been obtained by the shifting toward the MSB. In step S26, the addition result is shifted toward the MSB by value (N−8−1).

In step S27, the picture (i), which is composed of gradation bit sequences that are each an addition-result N-bit value, is written into a plane memory. In step S28, it is judged whether or not a picture to be processed remains in the GOP. When it is judged Yes in step S28, the control returns to step S22. Step S29 is performed when it is judged No in step S28. In step S28, it is judged whether or not a playback has ended. When it is judged in step S29 that the playback has not ended, the control returns to step S21.

This completes the explanation of the structure for shifting the gradation bit sequence of a picture of the base video stream by using the shift amount b defined for each frame. The following describes the internal structure of the color depth extension unit in the case where the gradation bit sequence of a picture of the enhancement video stream is shifted by using the shift amount b defined for each frame.

Figure 18:
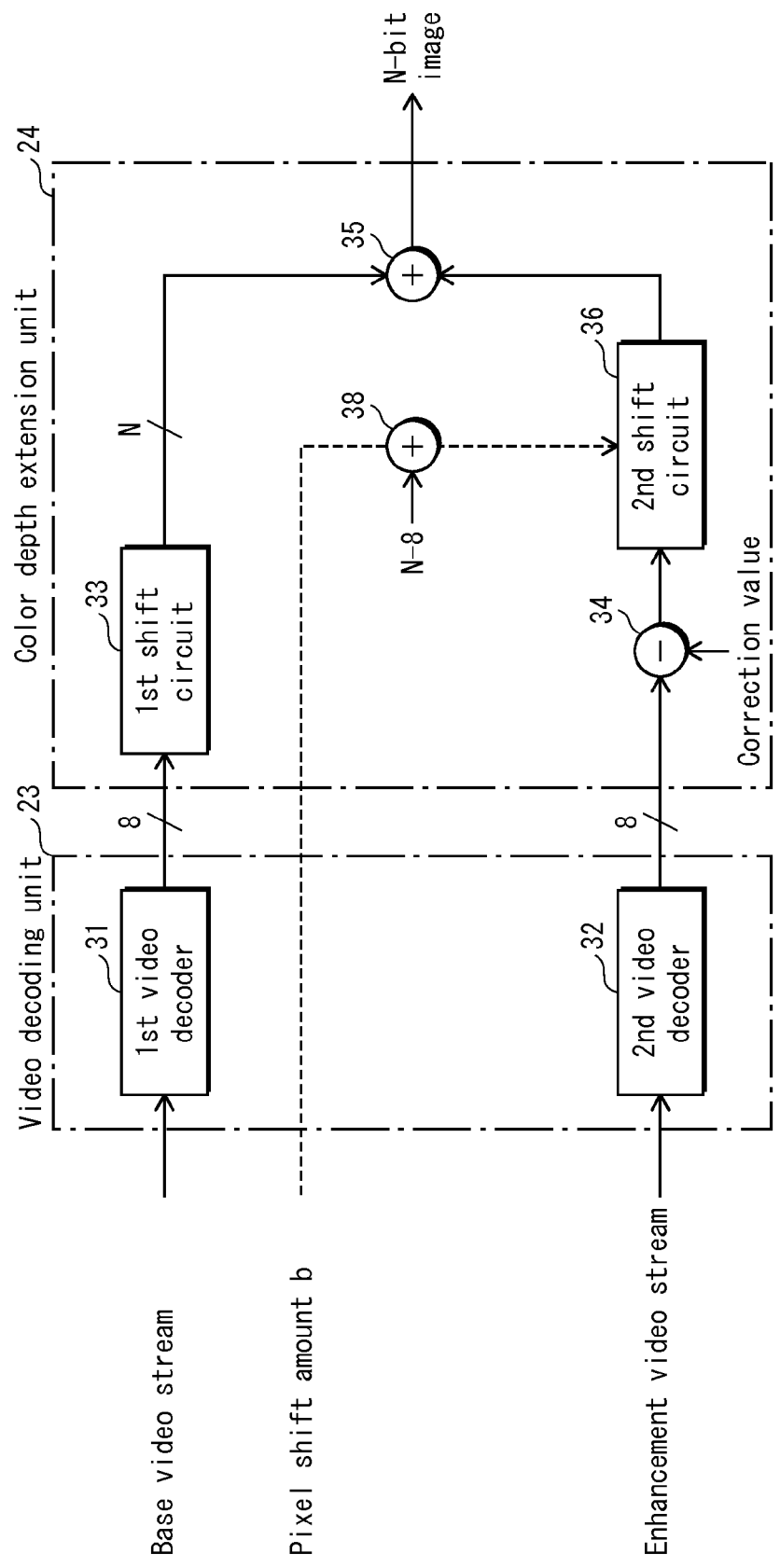
FIG. 18 illustrates one example of the internal structure of the device that reconstructs video composed of N-bit gradation bit sequences from the base and enhancement video streams.

FIG. 18 illustrates one example of the internal structure of the device that reconstructs video composed of N-bit gradation bit sequences from the base and enhancement video streams. In this structure, the shift amount b for each frame is used as the target bit position. That is to say, the shift amount b indicates what bit in the N-bit gradation bit sequence of the original image contains the highest bit of the conversion error. As a result, for the gradation bit sequence of the enhancement video stream to be moved to the bit position indicated by the shift amount b, it is necessary to subtract bit width "8" of the gradation bit sequence of the enhancement video stream from the shift amount b, and the subtraction result "b−8" is determined as the number of shift counts. The adder in FIG. 18 performs the calculation, N−8. In comparison, FIG. 18 differs from FIG. 16 in the internal structure of the color depth extension unit wherein input of the pixel value shift amount b into the first shift circuit is not necessary since the shift amount of the first shift circuit is always fixed, and the second shift circuit 36, which is necessary before an image composed of N-bit gradation bit sequences is output, is not necessary.

As illustrated in FIG. 18, the color depth extension unit 24 includes: the first shift circuit 33 for converting the 8-bit gradation bit sequence of pictures of the base video stream into an (8+b)-bit gradation bit sequence; the subtractor 34 for converting the 8-bit gradation bit sequence of pictures of the enhancement video stream into a signed bit value sequence by subtracting a correction value therefrom; the second shift circuit 36 for shifting the gradation bit sequence of the enhancement video stream, which has been converted into the signed bit value sequence by the subtraction by the subtractor 34, toward the MSB by (b−8) bits; and the adder 35 for adding the (8+b)-bit gradation bit sequence of pictures of the base video stream and the shifting result output from the second shift circuit 36.

When an error is included in a higher bit of the bit sequence constituting each color of video decoded by the first video decoder 31, for example, when an error is included in the bit 6 from the LSB in the 8-bit gradation bit sequence of the base video stream, the error bit corresponds to the bit 10 (=6+4) in the gradation bit sequence of the original image. In this case, the pixel value shift amount b is set to "10". A shift count "2" (=10−8) is then set in the second shift circuit 36. With this structure, the 8-bit gradation bit sequence, which is obtained by decoding the enhancement video stream, is shifted by two bits toward the MSB, and the shifting result is added to the output from the first shift circuit.

When the bit sequences constituting each color of video decoded by the first video decoder 31 do not include many errors, namely, when an error is included only in lower four bits of the 12-bit gradation bit sequences, the pixel value shift amount b is set to "4". In this case, N−8=−4. Thus the second shift circuit 36 does not shift the enhancement video stream. The 8-bit gradation bit sequence of the enhancement video stream obtained by decoding by the video decoder is added to the output from the first shift circuit.

The internal structure illustrated in FIG. 18 for shifting the gradation bit sequence of pictures of the enhancement video stream by the shift amount b is the structure for fixing "N" representing the color depth. This color depth extension shifts the gradation bit sequence of the base video stream by (N−8), and shifts the gradation bit sequence of the enhancement video stream, which has been made to be a positive value, by (b−8). In the color depth extension unit illustrated in FIG. 18, the second shift circuit plays a role to displace the gradation bit sequence of the enhancement video stream to the target bit position specified by the shift amount b in the bit width of the gradation bit sequence of each pixel of the original image. Thus the structure of the color depth extension unit illustrated in FIG. 18 is suitable for the fixation of "N" representing the color depth after the extension.

Figure 19:
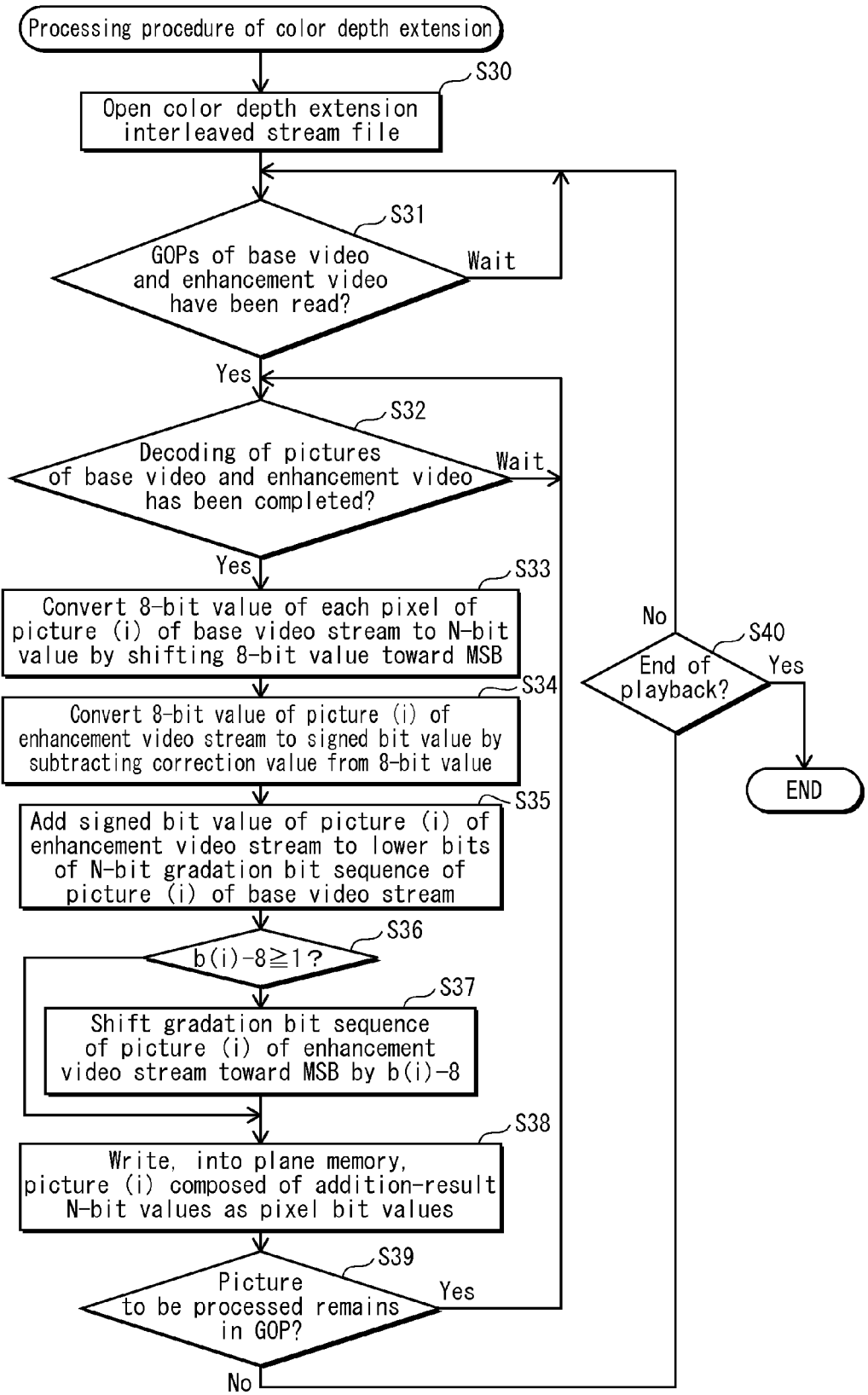
FIG. 19 is a flowchart illustrating the procedure of the color depth extension for shifting the gradation bit sequence of pictures of the enhancement video stream by the shift amount b.

FIG. 19 is a flowchart illustrating the color depth extension processing procedure. In this flowchart, variable (i) is a control variable that identifies a processing target picture. Accordingly, in the following description of the flowchart, the processing target picture in the "i"th round of processing in the loop is denoted as "picture (i)". Furthermore, a frame in which the picture (i) is to be displayed is denoted as "frame (i)", and a shift amount unique to the frame (i) is denoted as "shift amount (i)".

This flowchart defines a loop structure in which the process of steps S31 to S38 is repeated after a color depth extension interleaved stream file is opened in step S30 until the condition for ending is satisfied in step S39. In step S31, it is waited until it is judged that GOPs of the base video stream and enhancement video stream have been read. In step S32, it is judged whether or not decoding of pictures of the base video stream and enhancement video stream has been completed. When it is judged Yes in both steps S31 and S32, the control proceeds to step S33.

In step S33, the 8-bit gradation bit sequence of each pixel of a picture of the base video stream is converted into an N-bit gradation bit sequence by being shifted toward the MSB by the shift amount.

In step S34, the 8-bit gradation bit sequence of a picture of the enhancement video stream is converted into a signed bit value sequence by subtracting a correction value is therefrom. In step S35, the signed bit value sequence of the picture of the enhancement video stream is added to the lower bits of the N-bit gradation bit sequence obtained by shifting toward the MSB.

In step S36, it is judged whether or not the shift amount b (i) of the frame (i) of the enhancement video stream is higher than 8. When it is judged that the shift amount b (i) is not higher than 8, step S37 is skipped. When it is judged that the shift amount b (i) is higher than 8, the control proceeds to step S37 in which the gradation bit sequence of the picture of the enhancement video stream is shifted toward the MSB by (N−8) bits. In step S38, the picture (i), which is composed of gradation bit sequences that are each an addition-result N-bit value, is written into a plane memory. In step S39, it is judged whether or not a picture to be processed remains in the GOP. When it is judged Yes in step S39, the control returns to step S32. Step S40 is performed when it is judged No in step S39. In step S40, it is judged whether or not a playback has ended.

When it is judged in step S40 that the playback has not ended, the control returns to step S31.

To realize the color depth extension with the above-described structure, how to operate the bits of the gradation bit sequences of each picture of the base video stream is important. Due to the importance of the bit operation, a detailed description thereof is given with reference to FIGS. 20 and 21, in addition to the above description of the internal structure. The following is a detailed description with reference to the figures.

Figure 20:
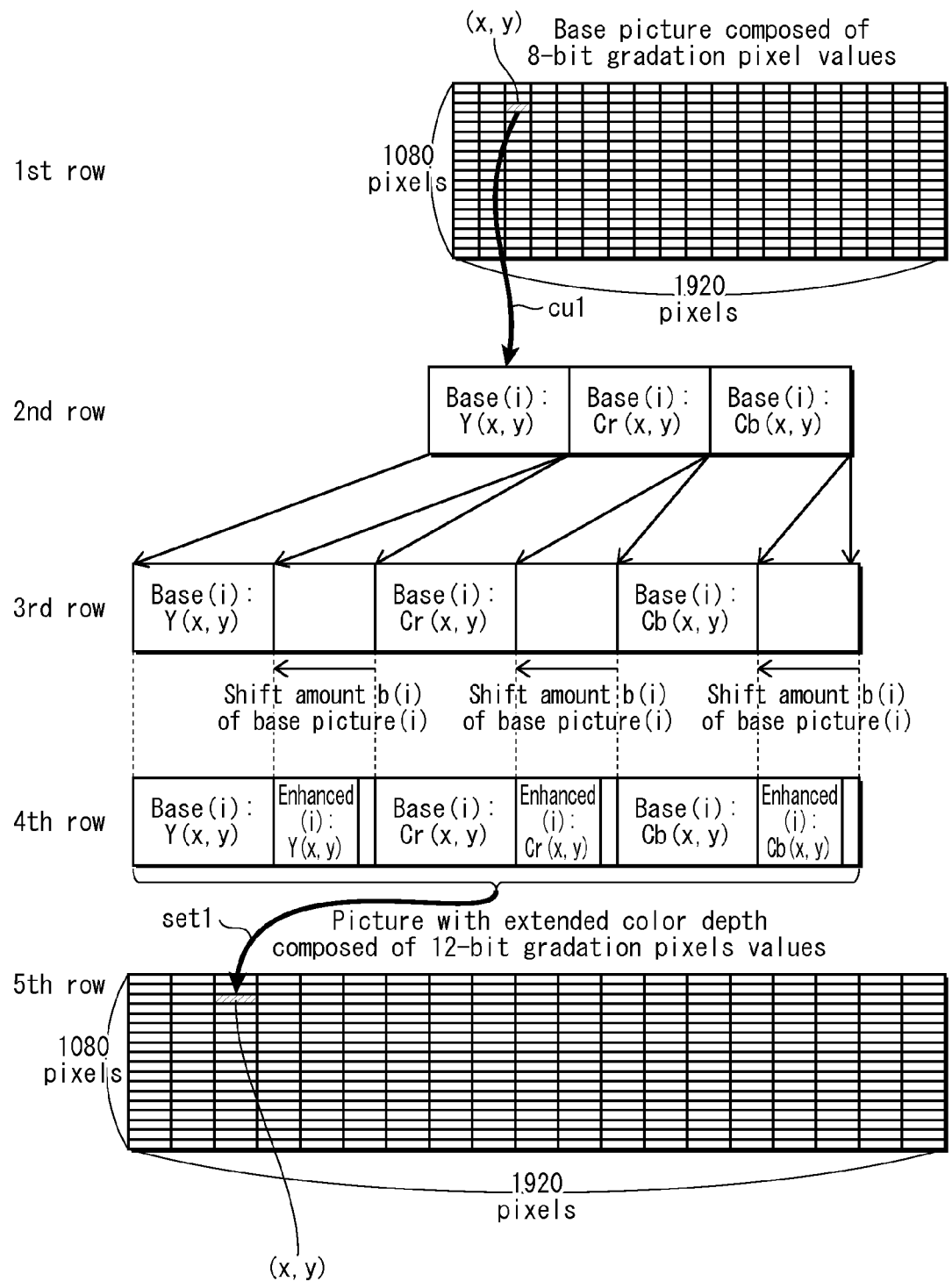
FIG. 20 illustrates the process of conversion of the luminance Y, red color difference Cr, and blue color difference Cb in the pixel at coordinates (x,y) in a picture after the color depth extension.

FIG. 20 illustrates the process of conversion of the luminance Y, red color difference Cr, and blue color difference Cb in the pixel at coordinates (x,y) in a picture after the color depth extension. The first row illustrates a 1920×1080 picture "Base (i)" that is composed of pixel bit values that are each represented by three 8-bit gradation bit sequences. The second row illustrates the luminance Y (x,y), red color difference Cr (x,y), and blue color difference Cb (x,y) that constitute the pixel located at coordinates (x,y) in the picture Base (i). The third row illustrates the shifting process performed on the luminance Y (x,y), red color difference Cr (x,y), and blue color difference Cb (x,y). The shifting of the luminance Y (x,y), red color difference Cr (x,y), and blue color difference Cb (x,y) is realized by shifting the 8-bit values of the luminance Y (x,y), red color difference Cr (x,y), and blue color difference Cb (x,y) toward the MSB by a shift amount b (i) that corresponds to Base (i).

The fourth row illustrates the setting of the lower bits by using the luminance Y (x,y), red color difference Cr (x,y), and blue color difference Cb (x,y) located at coordinates (x,y) in a picture "Enhanced (i)" of the enhancement video stream displayed in frame (i). As described above, the luminance Y (x,y), red color difference Cr (x,y), and blue color difference Cb (x,y) are the values from which the correction value has been subtracted. The pixel bit value of Enhanced (i) from which the correction value has been subtracted is set to the lowest bit, and 12 (bits)×3 pixel bit values are obtained. The fifth row illustrates a picture on which the color depth extension has been performed, the picture being composed of 1920×1080 pixels each represented by 12-bit gradation bit sequences. The arrow set1 indicates a pixel setting using the pixel bit values after the color depth extension.

Figure 21:
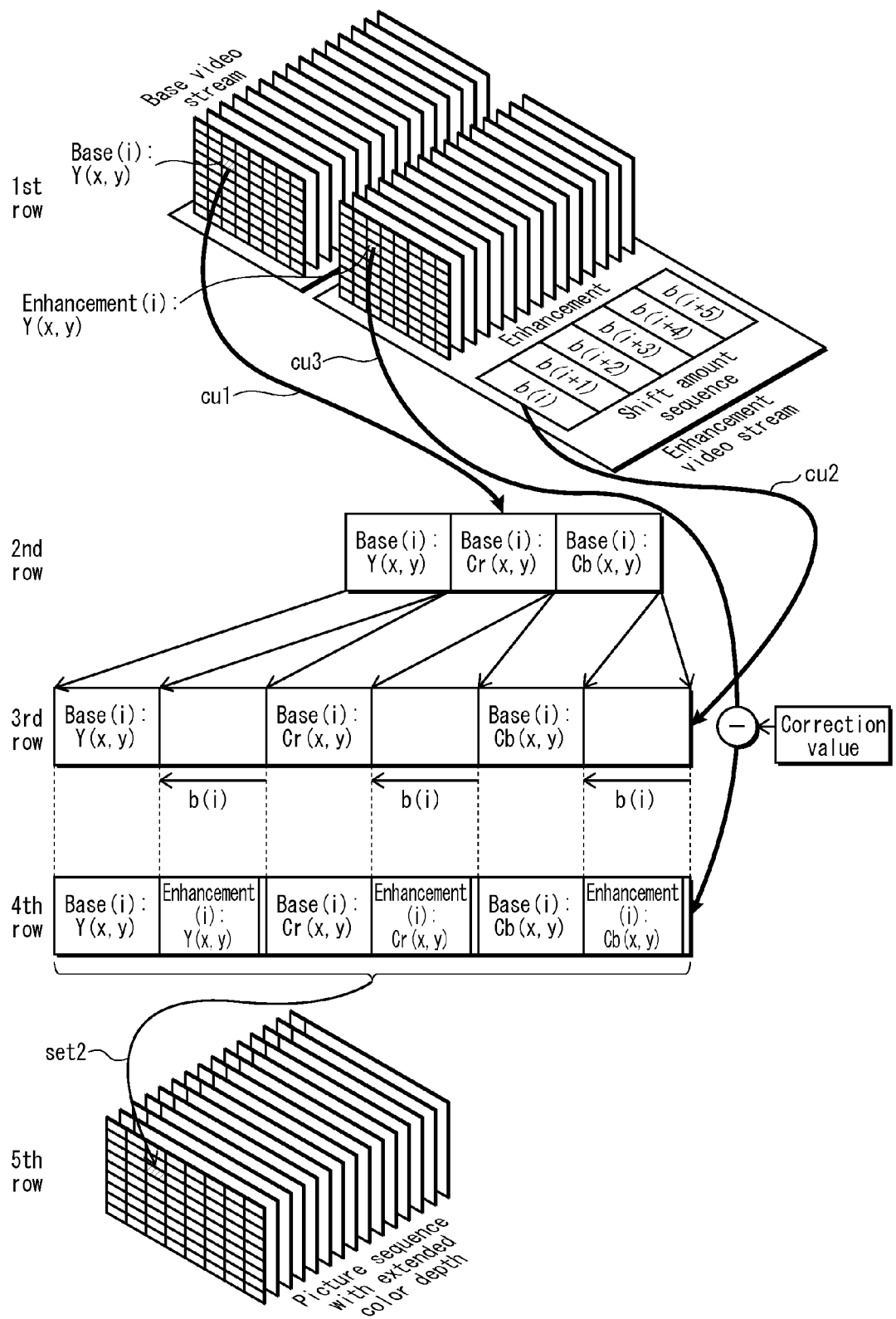
FIG. 21 illustrates what parameters are used in the process of the color depth extension illustrated in FIG. 20.

FIG. 21 illustrates what parameters are used in the process of the color depth extension illustrated in FIG. 20. The first row illustrates pictures of the base video stream, pictures of the enhancement video stream, and a shift amount sequence. In these base video stream, enhancement video stream and shift amount sequence, PTSs of picture Base (i) to be displayed in frame (i) of the base video stream and picture Enhanced (i) to be displayed in frame (i) of the enhancement video stream are set to the same value so that they are displayed in the frame (i). Furthermore, as the shift amount in the frame, b (i) is included in the shift amount sequence of a GOP to which the picture Base (i) belongs. The arrows cu1, cu2 and cu3 schematically indicate how the pictures Base (i) and Enhanced (i) and the shift amount b (i) are set. As indicated by these arrows, when (x,y) of picture Base (i) becomes a processing target, b (i) that is unique to frame (i) is selected as a shift amount parameter, and the pixel bit value at (x,y) in picture Enhanced (i) is used as the lower bits. The arrow set2 indicates that an image generated through the above-described process is used as the pixel bit values after the color depth extension. As described above, the lower bits are set in units of pixels.

When the shift amount and the pixel bit values of the enhancement video stream change as illustrated in FIGS. 8 and 9, the bit sequences are extended to an optimum bit length for each frame, by going through the process of the color depth extension illustrated in FIG. 20. This process is performed on pixels constituting picture data of the base video stream or the enhancement video stream. The picture data has a resolution in the order of 1920×1080 and 24 pieces of picture data are played back per second during a playback of a moving image, the above-described bit operation is performed in the order of 1920×1080×24.

As described above, according to the present embodiment, it is possible to obtain an image that is almost identical as the original image, by combining a gradation bit sequence of a picture of the enhancement video stream and a gradation bit sequence of a picture of the base video stream. Thus when the display device side has a display capability of expressing color depths of gradation represented by more than eight bits, it is possible to bring out a video content that allows the display device to fully show the display capability. This activates the content industry and display device manufacturing industry, thereby promoting the domestic industry.

Embodiment 2

The present embodiment is an embodiment for realizing distribution of a movie content by using the base video stream and the enhancement video stream described in Embodiment 1.

Figure 22:
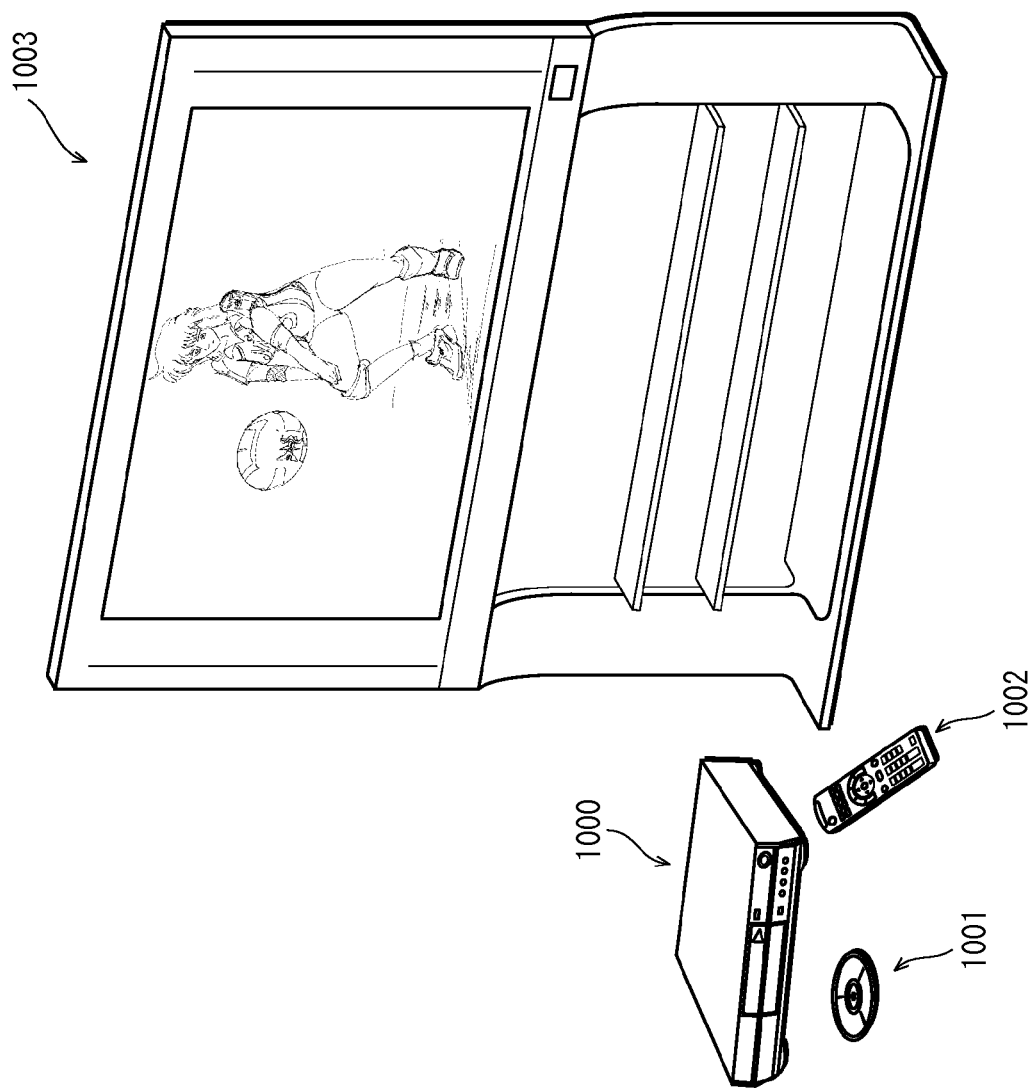
FIG. 22 illustrates a home theater system in which the recording medium and the playback device described in Embodiment 2 are used.

FIG. 22 illustrates a home theater system in which the recording medium and the playback device described in Embodiment 2 are used.

A disc medium 1001 is an optical recording medium for storing the base video stream and the enhancement video stream described in Embodiment 1, in the Blu-ray ReadOnly disc application format, Blu-ray Rewritable application format, and AVC-HD application format.

A playback device 1002 reads the base video stream and enhancement video stream in accordance with the program, playlist information, and stream information defined in the above application formats, and decodes the read video streams. The playback device 1002 then outputs pixel gradation bit sequences of one screen to the display device, in accordance with the present playback mode. The playback device 1002 can be set to a normal mode (non-color-depth-extension mode) or a color depth extension mode. In the color depth extension mode, the pixel bit value output from the playback device 1002 is an N-bit gradation bit sequence; and in the non-color-depth-extension mode, the pixel bit value output from the playback device 1002 is an 8-bit gradation bit sequence.

A display device 1003 receives pixel bit values of one screen sent from the playback device 1002 via a machine-to-machine interface, and displays an image by driving the display elements of the display panel in accordance with the pixel bit values. This image display can be performed in a normal mode (non-color-depth-extension mode) for the 8-bit gradation representation or a color depth extension mode for the 12-bit gradation representation. This completes the explanation of the home theater system. The following describes the disc medium in detail.

Figure 23:
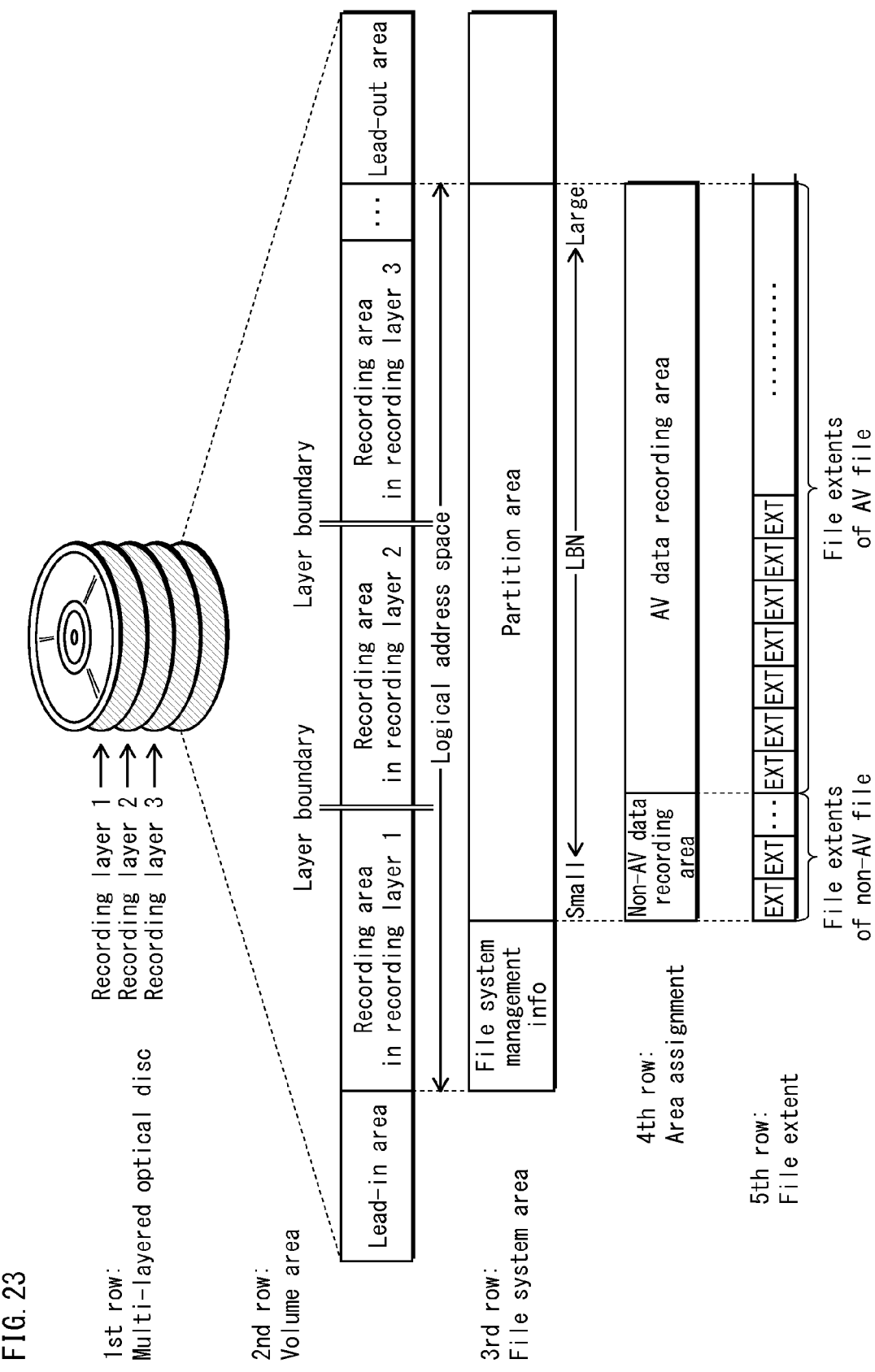
FIG. 23 illustrates one example of the internal structure of a disc medium which is a multi-layered optical disc.

FIG. 23 illustrates one example of the internal structure of a disc medium which is a multi-layered optical disc.

In this figure, the first row illustrates one example of a multi-layered optical disc, and the second row shows tracks in the horizontally extended format though they are in reality formed spirally in the recording layers. These spiral tracks in the recording layers are treated as one continuous volume area. The volume area is composed of a lead-in area, recording areas of recording layers 1 through 3, and a lead-out area, where the lead-in area is located at the inner circumference, the lead-out area is located at the outer circumference, and the recording areas of recording layers 1 through 3 are located between the lead-in area and the lead-out area. The recording areas of recording layers 1 through 3 constitute one consecutive logical address space.

The volume area is sectioned into units in which the optical disc can be accessed, and serial numbers are assigned to the access units. The serial numbers are called logical addresses. A data reading from the optical disc is performed by specifying a logical address. Here, in the case of a read-only disc such as the Blu-ray ReadOnly disc, basically, sectors with consecutive logical addresses are also consecutive in the physical disposition on the optical disc. That is to say, data stored in the sectors with consecutive logical addresses can be read without performing a seek operation. However, at the boundaries between recording layers, consecutive data reading is not possible even if the logical addresses are consecutive. It is thus presumed that the logical addresses of the boundaries between recording layers are registered in the recording device in advance.

In the volume area, file system management information is recorded immediately after the lead-in area. Following this, a partition area managed by the file system management information exists. The file system is a system for identifying data on the disc in units of directories or files, and in the case of the Blu-ray ReadOnly disc, data is recorded in the UDF (Universal Disc Format). Even in the case of an everyday PC (personal computer), when data is recorded with a file system called FAT or NTFS, the data recorded on the hard disk under directories and files can be used on the computer, thus improving usability. The file system makes it possible to read logical data in the same manner as in an ordinary PC, using the directory/file structure.

The fourth row shows assignment of the areas contained in the file system area which is managed by the file system. A non-AV data recording area is present in the innermost circumference side of the file system area. The non-AV data recording area is followed by an AV data recording area. The fifth row illustrates the contents recorded in the non-AV data recording area and the AV data recording area. Extents constituting an AV file are recorded in the AV data recording area. Extents constituting a non-AV file are recorded in the non-AV data recording area.

Figure 24:
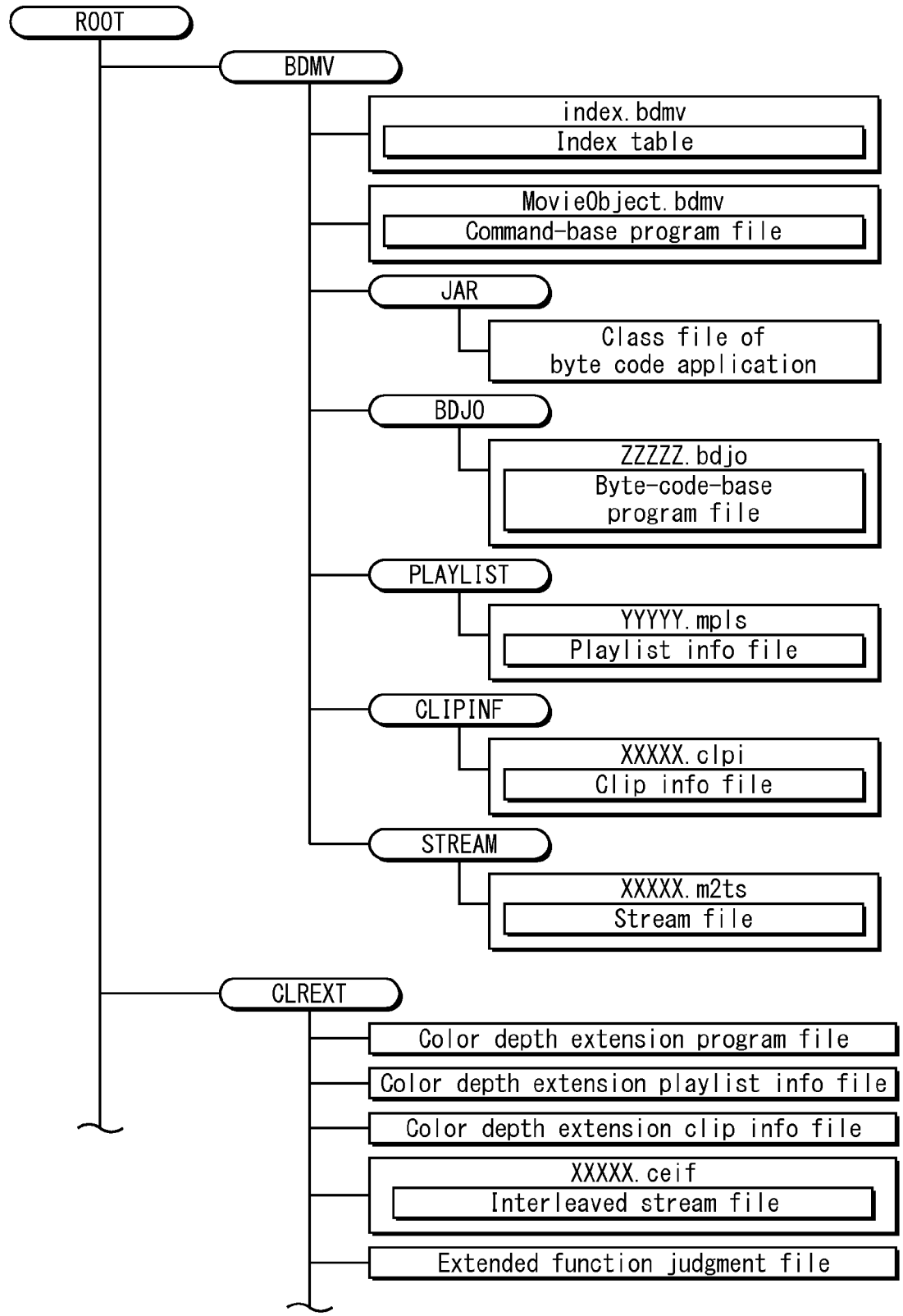
FIG. 24 illustrates the application format of the optical disc premised on the file system.

FIG. 24 illustrates the application format of the optical disc premised on the file system.

A BDMV directory is a directory in which data, such as transport streams that can be stored in the Blu-ray ReadOnly disc and management information, is recorded. Five sub directories called "BDJO directory", "JAR directory", "PLAYLIST directory", "CLIPINF directory", and "STREAM directory" are present under the BDMV directory. Also, two types of files (i.e. "index.bdmv" and "MovieObject.bdmv") are arranged under the BDMV directory.

The file "index.bdmv" (the file name is fixed) stores an index table. The index table shows correspondence between a plurality of title numbers that can be stored in the title number register provided in the playback device, and program files that define operation modes. It should be noted here that title numbers that can be stored in the title number register include "0", "1" through "999", and an undefined value "0xFFFF". A title number "0" is a title number of the top menu title. The top menu title is a title that can be called by a menu call operation performed by the user. The title number by the undefined value "0xFFFF" is a title number of the first play title. The first play title is a title that displays a warning to the viewer, a logo of the content provider and so on immediately after the recording medium is loaded. The index table includes entries (title indexes) in one-to-one correspondence with title numbers. A program file that defines an operation mode is described in each title index. With this structure, the index table defines in detail how each title operates in a corresponding operation mode.

The file "MovieObject.bdmv" (the file name is fixed) stores one or more movie objects. The movie object is a program file that defines a control procedure to be performed by the playback device in the operation mode (HDMV mode) in which a command interpreter is a controller. The movie object includes one or more commands and mask flags that each define whether or not to mask a menu call or a title call when the call is performed by the user onto the GUI.

The BDJO directory stores a program file with extension "bdjo" (xxxxx.bdjo ["xxxxx" is variable, the extension "bdjo" is fixed]). This program file stores a BD-J object that defines a control procedure to be performed by the playback device in the operation mode of the object-oriented programming language.

A substance of such a Java™ application is a Java™ archive file (YYYYY.jar) stored in the JAR directory under the BDMV directory. An application may be, for example, a Java™ application that is composed of one or more xlet programs having been loaded into a heap area (also called work memory) of a virtual machine. The application is constituted from the xlet programs having been loaded into the work memory, and data.

The "PLAYLIST directory" stores a playlist information file with extension "mpls" ("xxxxx.mpls" ["xxxxx" is variable, and the extension "mpls" is fixed]). A playlist information file with the extension "mpls" to be stored in the BDMV directory is called "mpls file".

The "CLIPINF directory" stores a clip information file with extension "clpi" ("xxxxx.clpi" ["xxxxx" is variable, and the extension "clpi" is fixed]).

The Extents constituting the files existing in the above directories are recorded in the non-AV data area.

The "STREAM directory" is a directory storing a stream file, and stores the stream file in a form "xxxxx.m2ts" ("xxxxx" is variable, and the extension "m2ts" is fixed). A stream file with the extension "m2ts" to be stored in the BDMV directory is called "m2ts file".

A CLREXT directory stores "color depth extension program file", "color depth extension playlist information file", "color depth extension clip information file", and "color depth extension interleaved stream file", which are extended versions of the program file, playlist information file, clip information file, and stream file stored in the BDMV directory, respectively. The color depth extension interleaved stream file is the stream file that is generated by arranging the base video stream and the enhancement video stream in the interleaved manner. The CLREXT directory further stores an "extended function judgment file". The extended function judgment file is used to judge the capability to perform an extended function when the color depth extension program file performs a process adapted to the color depth extension. Among these files stored in the CLREXT directory (color depth extension directory), the color depth extension program file, color depth extension playlist information file, color depth extension clip information file, and extended function judgment file are recorded in the innermost circumference side of the spiral track. The color depth extension interleaved stream file is recorded in the outermost circumference side of the spiral track. The reason for recording the files in this way is to store the color depth extension program file, color depth extension playlist information file, color depth extension clip information file, and extended function judgment file into the memory before reading the color depth extension interleaved stream file.

Figure 25A:
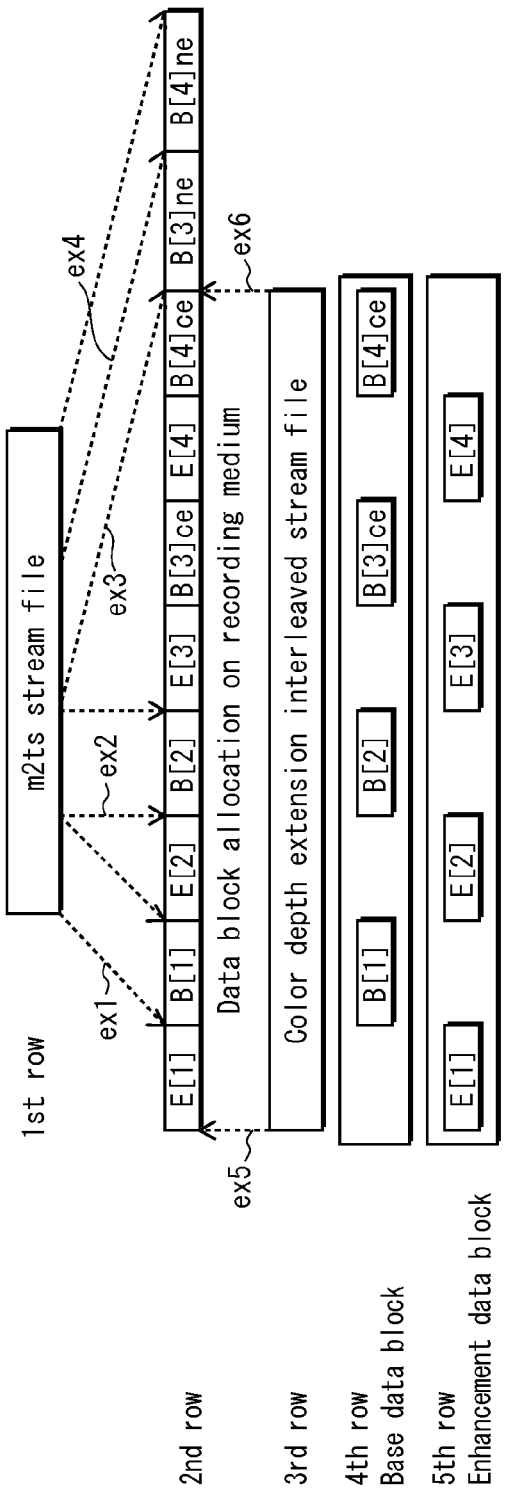
FIGS. 25A-25C illustrate the interrelation among the color depth extension interleaved stream file, the m2ts stream file, and the file Base.

FIG. 25A illustrates the interrelation among the color depth extension interleaved stream file, the m2ts stream file, and the file Base. The first row indicates the m2ts stream file. The second row illustrates data blocks on the recording medium. The data block is classified into: a base data block that is a portion of a main TS (a transport stream that includes the base video stream); and an enhancement data block that is a portion of a sub TS (a transport stream that includes the enhancement video stream). The base data block is further classified into: a base data block that is accessed in both the non-color-depth-extension mode and the color depth extension mode (data blocks B[1] and B[2] in FIG. 25); a base data block that is accessed only in the non-color-depth-extension mode, not in the color depth extension mode (data blocks B[3]ne and B[4]ne in FIG. 25, wherein "ne" stands for "non-color-depth-extension"); and a base data block that is accessed only in the color depth extension mode, not in the non-color-depth-extension mode (data blocks B[3]ce and B[4]ce in FIG. 25, wherein "ce" stands for "color depth extension"). Normally, a base data block is used in common in both the non-color-depth-extension mode and the color depth extension mode. However, a base data block that is located at a boundary between recording layers is divided into B[x]ce and B[x]ne. This is because it is necessary to provide a playback path for the non-color-depth-extension mode and a playback path for the color depth extension mode separately in an area close to a boundar between layers to secure a continuous length. On the other hand, the enhancement data block includes E[1], E[2], E[3]. The arrows ex1, ex2, ex3, ex4 indicate the belongingness where, among the data blocks E[1], B[1], E[2], B[2], E[3], B[3]ce, D[4], B[4]ce, B[3]ne, B[4]ne illustrated in the second row, the data blocks B[1], B[2], B[3]ne, B[4]ne constitute extents of the m2ts stream file.

This completes the explanation of the data blocks. The following describes a stream file composed of the extents of these data blocks. The third row illustrates an interleaved stream file. The fourth row illustrates a file Base. The fifth row illustrates a file Enhancement. The file Base is a file composed of data blocks B[x]ne ("ne" stands for "non-color-depth-extension") and data blocks B[x], and is played back in the non-color-depth-extension mode. Clip base information is clip information corresponding to the file Base.

The file Enhancement is a file composed of E[x]s, and is accessed in the color depth extension mode. Clip enhancement information is clip information corresponding to the file Enhancement. The clip base information includes a basic entry map that is an entry map used to perform a random access to an I picture or an IDR picture at the head of a GOP in the base video stream. The clip enhancement information includes an extended entry map that is an entry map used to perform a random access to an I picture or an IDR picture at the head of a GOP in the enhancement video stream. With the presence of the clip base information and the clip enhancement information, the file Base and the file Enhancement are treated as different AV clips.

The arrows ex5, ex6 indicate the belongingness where, among the data blocks, the data blocks E[1], B[1], E[2], B[2], E[3], B[3]ce, D[4], B[4]ce constitute extents of the interleaved stream file.

The fourth row indicates that, among the data blocks constituting the interleaved stream file, the data blocks B[1], B[2], B[3]ce, B[4]ce constitute extents of the file Base. The fifth row indicates that, among the data blocks constituting the interleaved stream file, the data blocks E[1], E[2], E[3], E[4]ce constitute extents of the file Enhancement.

The file Base, file Enhancement, and m2ts file are each composed on one or more extents. The data length of the extent can be varied freely, except that the lower limit of the data length is defined. The lower limit of the data length is defined based on the BD-3D player model that is a player model for the stereoscopic playback.

The following describes the lower limits of the extents that are included in the file Base, file Enhancement, and m2ts file.

The extent of the file Base has the same lower limit of the data length as an extent EXT1[n] that is a file extent of the BaseView video stream in the BD-3D player model. In this case, the lower limit of EXT1[n] of the file Base including the base video stream is determined so that an underflow does not occur in a double buffer in a jump period which extends from the last extent in a base data block to the first extent in the next enhancement data block, and a jump period which extends from the last extent in the enhancement data block to the first extent in the next base data block, during a playback in the color depth extension mode. Here, the double buffer is composed of a first read buffer and a second read buffer. The first read buffer is the same as the read buffer provided in a playback device for playing back the Blu-ray ReadOnly disc in the 2D mode.

Here, let TFjump3D(n) denote the time period required for a jump from the last extent in the $n^{th}$ base data block to the first extent in the $p^{th}$ enhancement data block, and let TBjump3D(n) denote the time period required for a jump from the last extent in the $p^{th}$ enhancement data block to the first extent in the $(n+1)^{th}$ base data block, during a playback in the color depth extension mode. Note that TFjump3D(n) and TBjump3D(n) are jump time periods in the 3D playback mode in the BD-3D player model.

Also, let Rud3D denote the speed at which each base data block is read into the first read buffer and at which each enhancement data block is read into the second read buffer, and let Rbext3D denote the average speed at which the base data block is transferred from the first read buffer to the video decoder. Then, the lower limit of EXT1[n] is represented by the following expression for the condition A.

Lower limit of $EXT1[n] \geq (Rud3D \times Rbext3D)/(Rud3D - Rbext3D) \times (TFjump3D(n) + EXT2[n]/(Rud3D + TBjump3D(n)))$     <Condition A>

The extent of the file Enhancement has the same lower limit of the data length as an extent EXT2[n] that is a file extent of the dependent view video stream in the BD-3D player model. The lower limit of EXT2[n] is determined so that an underflow does not occur in the double buffer in a jump period which extends from an extent in an enhancement data block to an extent in the next base data block, and a jump period which extends from an extent in the base data block to an extent in the next enhancement data block, during a playback in the color depth extension mode. Here, let TFjump3D(n+1) denote the time period required for a jump from the last extent in the $(n+1)^{th}$ base data block to the first extent in the $(p+1)^{th}$ enhancement data block, and let Rdext3D denote the average speed at which the dependent-view video stream file is transferred from the second read buffer to the decoder. Then, the lower limit of EXT2[n] is represented by the following expression for the condition B. Note that the speed Rud3D and the average speed Rbext3D are the speeds in the 3D playback mode in the BD-3D player model.

Lower limit of $EXT2[n] \geq (Rud3D \times Rbext3D)/(Rud3D - Rdext3D) \times (TBjump3D(n) + EXT1[n+1]/(Rud3D + TFjump3D(n+1)))$     <Condition B>

Among the extents included in the color depth extension interleaved stream file, extents that are structural elements common to the m2ts file have the same lower limits as extent "EXT2D" that is read only in the 2D output mode in the BD-3D player model. The lower limit of EXT2D is determined so that an underflow does not occur in the read buffer of the playback device in a jump period which extends from the last extent in a base data block to the first extent in the next base data block, during a playback in the non-color-depth-extension mode.

Here, let Tjump2D(n) denote the time period required for a jump from the $n^{th}$ base data block to the $(n+1)^{th}$ base data block, let Rud2D denote the speed at which each base data block is read into the read buffer, and let Rbext2D denote the average speed at which the base data block is transferred from the read buffer to the video decoder. Then, the lower limit of EXT2D is represented by the following expression for the condition C.

$$\text{Lower limit of } EXT2D \geq (Rud2D \times Rbext2D)/(Rud2D-Rbext2D) \times Tjump2D(n) \qquad \text{<Condition C>}$$

Extents included in data blocks B[n]ce, which are played back only in the color depth extension mode, among the data blocks included in the file Base, have the same lower limits as extent "Sextss" that is read only in the 3D output mode in the BD-3D player model. Here, Sextss is calculated as a value satisfying the following condition D.

$$SextSS[\text{Byte}] \geq \text{ceil}[(Tjump+Tdiff \times Rud72)/(1000 \times 8)] \times (Rextss \times 192)/(Rud72 \times 188 - Rextss \times 192)] \qquad \text{<Condition D>}$$

In the above Condition D, Rud72 represents a data rate of 72 mbps in transfer from the BD-ROM drive in the 3D output mode, and Tdiff represents a delay time that occurs when reading Extent EXT2[n] constituting an enhancement data block.

Figure 25B:
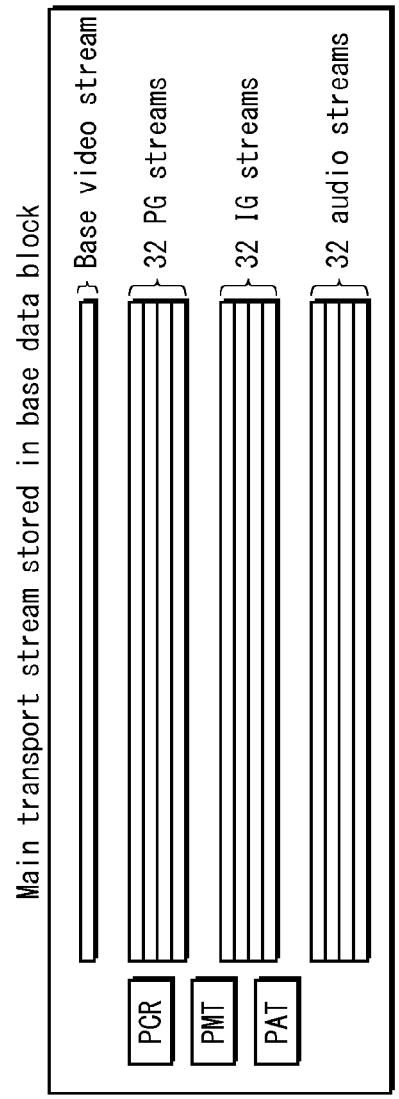
Figure 25C:
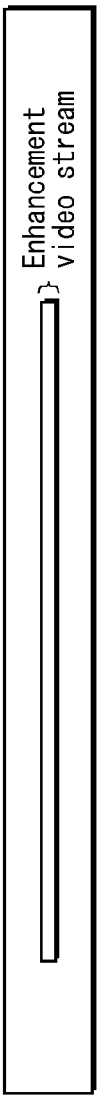

FIG. 25B illustrates the internal structure of the main TS. FIG. 25C illustrates one example the internal structure of the sub TS. As illustrated in FIG. 25B, the main TS includes one base video stream, 32 PG streams, 32 IG streams, and 32 audio streams. As illustrated in FIG. 25C, the sub TS includes one enhancement video stream, 32 PG streams, and 32 IG streams.

The following describes the video stream, audio stream, presentation graphics stream, and interactive graphics stream that are elementary streams (ES) multiplexed in TSs.

As illustrated in FIG. 25B, in the main TS, one or more video streams, one or more audio streams, one or more presentation graphics (PG) streams, and one or more interactive graphics streams are multiplexed.

The audio stream is classified into a primary audio stream and a secondary audio stream. The primary audio stream is an audio stream that is to be a primary audio when the mixing playback is performed; and the secondary audio stream is an audio stream that is to be a sub audio when the mixing playback is performed. The secondary audio stream includes information for downsampling for the mixing, and information for the gain control.

The presentation graphics (PG) stream is a graphics stream that can be synchronized closely with the video, with the adoption of the pipeline in the decoder, and is suited for representing subtitles. Since a close synchronization of the graphics stream and the video is achieved by the pipeline decoding, the use of the PG stream is not limited to the playback of characters such as the subtitle characters. For example, it is possible to display a mascot character of the movie that is moving in synchronization with the video. In this way, any graphics playback that requires a close synchronization with the video can be adopted as a target of the playback by the PG stream.

The interactive graphics (IG) stream is a graphics stream which, having information for interactive operation, can display menus with the progress of playback of the video stream and display pop-up menus in accordance with user operations.

The video stream is classified into: a video stream that represents parent-screen pictures in the picture-in-picture; and a video stream that represents child-screen pictures in the picture-in-picture. The following describes a structure that is common to the video stream that represents parent-screen pictures and the video stream that represents child-screen pictures. In the video compression encoding methods such as MPEG-2, MPEG-4 AVC, and SMPTE VC-1, the data is compressed in amount by using the redundancy of the video images in the space direction and time direction. As the method that uses the redundancy in the time direction, the inter-picture predictive encoding is used. In the inter-picture predictive encoding, a picture, which is present before or after a picture that is an encoding target, is called a reference picture. Subsequently, an amount of motion of the encoding target picture relative to the reference picture is detected, and the data amount is compressed removing the portions that are redundant in the space direction, from a difference value between the encoding target picture and a picture on which a motion compensation has been done.

In the present embodiment, a picture, on which an intra-picture predictive coding is performed by using only the encoding-target picture without using the reference picture, is called an intra (I) picture. Note that the picture is a unit of encoding, including both the frames and fields. Also, a picture, on which the inter-picture predictive coding is performed by referencing a picture that has been processed, is called a predictive (P) picture; a picture, on which the inter-picture predictive coding is performed by referencing two pictures that have been processed, is called a bi-predictive (B) picture; and among the B pictures, a picture that is reference by another picture is called a Br picture. Furthermore, in the present embodiment, the frame in the frame structure and the field in the field structure are called video access unit.

Each stream included in the AV clip is identified by the PID. For example, an alignment 0x1011 is allocated to the video stream representing video of a movie, alignments 0x1100 to 0x111F are allocated to the audio streams, alignments 0x1200 to 0x121F are allocated to the presentation graphics streams, alignments 0x1400 to 0x141F are allocated to the interactive graphics streams, alignments 0x1B00 to 0x1B1F are allocated to the video streams used as child-screen pictures of the movie, and alignments 0x1A00 to 0x1A1F are allocated to the audio streams used as secondary audio mixed with the primary audio.

The following describes the internal structure of the main TS. FIGS. 26A to 26D illustrate the procedure for generating the main TS. FIG. 26A is a diagram schematically illustrating how the main TS is multiplexed. First, a video stream 501 composed of a plurality of video frames and an audio stream 504 composed of a plurality of audio frames are converted into PES packet sequences 502 and 505, and further to TS packet sequences 503 and 506, respectively. Similarly, a presentation graphics stream 507 and an interactive graphics stream 510 are converted into PES packet sequences 508 and 511, and further to TS packet sequences 509 and 512, respectively. An AV clip 513 is generated by multiplexing TS packets included in these packet sequences into one stream.

Figure 26B:
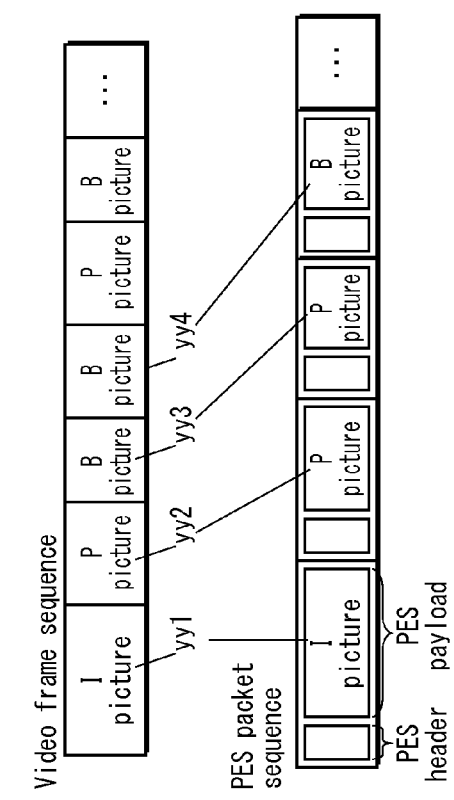
FIGS. 26A-26D illustrate the procedure for generating the main TS.

FIG. 26B illustrates in detail how the video stream is stored in the PES packet sequence. The first row of FIG. 26B illustrates a video frame sequence of the video stream. The second row illustrates a PES packet sequence. As indicated by arrows yy1, yy2, yy3 and yy4 in FIG. 26B, the pictures that are a plurality of video presentation units in the video stream, including the I picture, B picture, and P picture, are separated from each other and stored in the payloads of the PES packets. Each PES packet has a PES header in which a PTS (Presentation Time-Stamp), which indicates the presentation time of the picture, and a DTS (Decoding Time-Stamp), which indicates the decoding time of the picture, are stored.

Figure 26D:
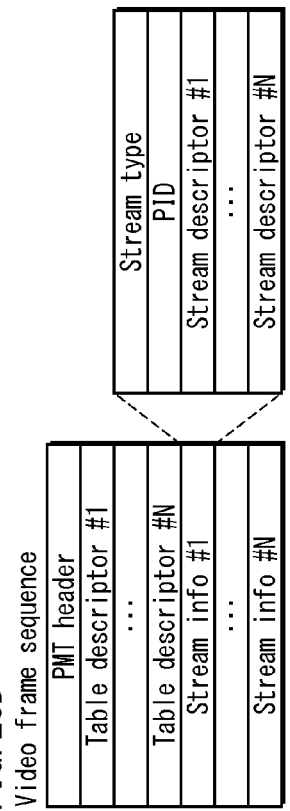
Figure 26A:
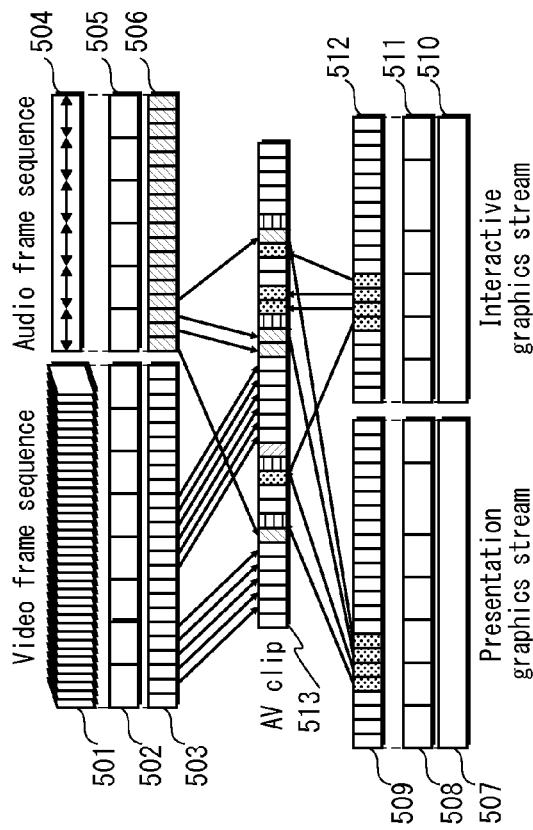
Figure 26C:
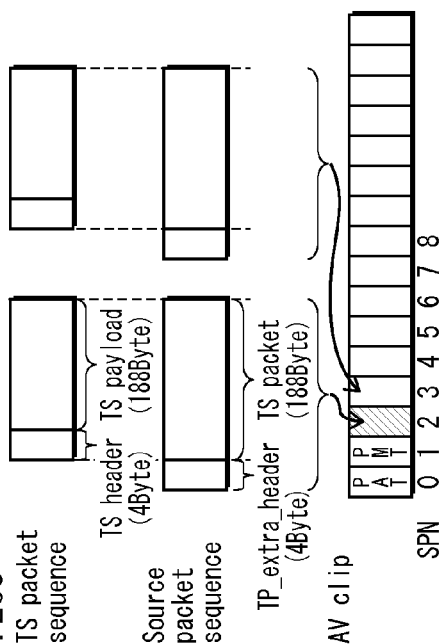

FIG. 26C illustrates the format of the TS packets that are ultimately written in the AV clip. Each TS packet is a fixed-length, 188-byte packet composed of a 4-byte TS header carrying information such as a PID identifying the stream, and a 184-byte TS payload storing data. The above-described PES packets are stored in the divided form in the TS payloads. In the case of the BD-ROM, each TS packet is attached a 4-byte TP_Extra_Header, thus constituting a 192-byte source packet. The source packets are written in the AV clip. The TP_Extra_Header stores information such as an ATS (Arrival_Time_Stamp). The ATS indicates a transfer start time at which the TS packet is to be transferred to a PID filter of a system target decoder 1503, which will be described later. The source packets are arranged in the AV clip as illustrated in the lower row of FIG. 26C, where the numbers incrementing by one starting with the head of the AV clip are called SPNs (Source Packet Numbers).

In addition to TS packets of audio, video, subtitles and the like, the AV clip also includes TS packets of a PAT (Program Association Table), a PMT (Program Map Table) and a PCR (Program Clock Reference). The PAT shows a PID of a PMT used in the AV clip, and is registered with the PID arrangement of the PAT itself. The PMT stores PIDs of the streams of video, audio, subtitles and the like, and attribute information of the streams corresponding to the PIDs. The PMT also has various descriptors relating to the AV clip. The descriptors include copy control information indicating whether or not copying of the stream file storing the digital stream is permitted. The PCR stores information of an STC (System Time Clock) time that corresponds to an ATS showing when the PCR packet is transferred to a decoder, to synchronize an ATC (Arrival Time Clock) that is a time axis of the ATS, to an STC (System Time Clock) that is a time axis of the PTS/DTS. A PAT packet and a PMT packet are stored at the head of the main TS of the AV clip.

FIG. 26D describes in detail the data structure of the PMT. The PMT includes a PMT header at the head thereof. The PMT header contains information such as the length of data included in the PMT. The PMT header is followed by a plurality of table descriptors pertaining to the AV clip. The above-described copy control information and the like are described as the table descriptors. The table descriptors are followed by a plurality of pieces of stream information pertaining to the streams included in the AV clip. The stream information is composed of: a stream type for identifying the compression codec of the stream; a PID of the stream; and a plurality of stream descriptors in which attribute information (frame rate, aspect ratio, etc.) of the stream are described. The number of the plurality of stream descriptors corresponds to the number of streams included in the AV clip.

This completes the description of the main TS. The following describes the sub TS in detail. The sub TS differs from the main TS in that it stores only the enhancement video stream for the color depth extension. The base video stream and the enhancement video stream are converted into the NAL unit format, and then further converted into the MPEG2-TS format. Since, in this way, the base video stream and the enhancement video stream are recorded onto a recording medium after being converted into the NAL unit format, it is possible for a mixture of a part of the base video stream and a part of the enhancement video stream to be input into the video decoder.

Figure 27:
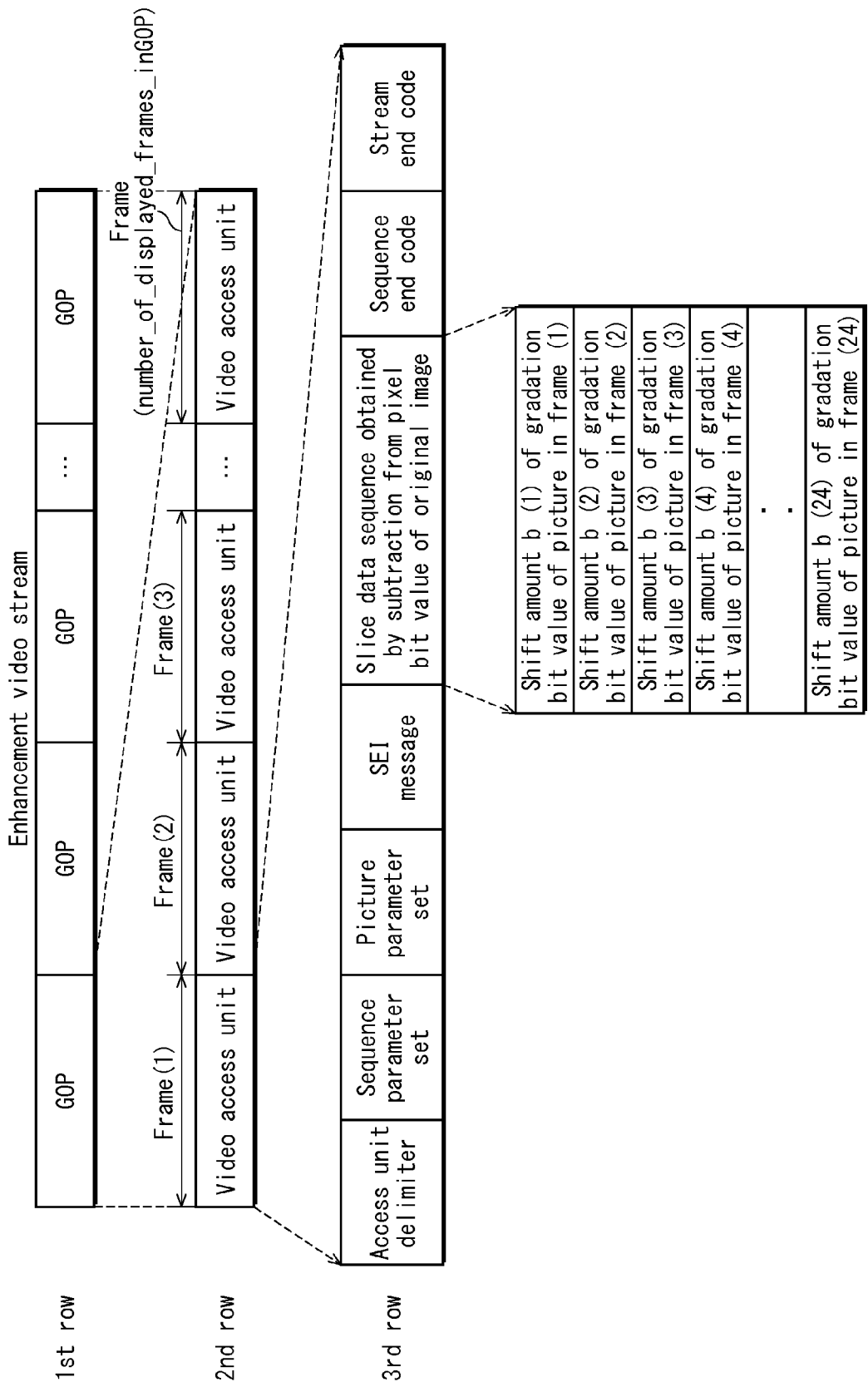
FIG. 27 illustrates one example of the internal structure of the enhancement video stream.

FIG. 27 illustrates one example of the internal structure of the enhancement video stream. The first row illustrates a plurality of GOPs. The second row illustrates a plurality of video access units that constitute each GOP. These video access units are picture data and are displayed at respective display frames (Frame(1) . . . Frame(number_of_displayed_frames_in_GOP) in FIG. 27) of each GOP.

The third row illustrates one example of the internal structure of the video access unit. The video access unit is composed of the following in the form of NAL units: an access unit delimiter; a sequence parameter set; a picture parameter set; an SEI (Supplemental Enhancement Information) message; a slice data sequence obtained by a subtraction from the gradation bit sequence of each pixel in the original image; a sequence end code; and a stream end code.

Here, a description is given of a sequence parameter set (SPS) and a picture parameter set (PPS) that are each stored in one NAL unit among the above-described NAL units.

The sequence parameter set (SPS) stored in one NAL unit contains a sequence number. The picture parameter set (PPS) stored in one NAL unit contains a reference to a sequence number. Tracing the reference contained in the PPS makes it possible to identify a sequence to which the NAL unit storing the PPS belongs to, the sequence being either a sequence of the base video stream or a sequence of the enhancement video stream in one bit stream stored in the interleaved stream file. Thus, by using the reference to the sequence number, it is possible to classify the NAL units storing the PPSs into the sequence of the base video stream and the sequence of the enhancement video stream.

Both the NAL unit and the slice header contain the SPS number reference. It is thus possible to recognize which of the sequence of the base video stream or the sequence of the enhancement video stream each piece of slice data belongs to. Also, since the slice header contains a reference to a PPS number, it is possible to recognize which picture each piece of slice data belongs to. Based on these structures, it is possible to restore base picture data and enhancement picture data from the NAL units by unifying each plurality of pieces of slice data that are included in the same sequence and the same picture.

Furthermore, a slice header that is a NAL unit contains a frame number. This makes it possible to recognize which frame each piece of slice data belongs to. Based on these structures, it is possible to restore a pair of base picture data and enhancement picture data that constitute the same frame, from the NAL units that are in the mixed state.

Furthermore, the SEI message contains a shift amount sequence. The shift amount sequence includes: (1) a shift amount of a pixel bit value of a picture in frame (1); (2) a shift amount of a pixel bit value of a picture in frame (2); (3) a shift amount of a pixel bit value of a picture in frame (3); (4) a shift amount of a pixel bit value of a picture in frame (4); . . . (N) a shift amount of a pixel bit value of a picture in frame (N). The shift amounts included in the respective shift amount sequences illustrated in FIG. 27 correspond to pictures arranged in the order of presentation, and define the shift amounts that are unique to the frames at which the corresponding pictures are to be displayed.

It would be understood that the above-described data structure of the enhancement video stream, the difference in shift amount is represented with the accuracy of frame.

This completes the description of the main TS and the sub TS. On the recording radium, clip information is recorded as information dedicated to the realization of the random access to the main TS and sub TS. The clip information is stored in the clip information file included in the above-described file structure.

As illustrated in FIG. 28A, the clip information file is management information of an AV clip, corresponds one to one to the AV clip, and includes the clip information, stream attribute information, and entry map. The clip information stored in the clip information file includes: clip base information for the main TS including the base video stream; and clip enhancement information for the sub TS including the enhancement video stream. FIG. 28A is a diagram illustrating the internal structure of the clip information file.

As illustrated in FIG. 28A, the clip information is composed of a system rate, a playback start time, and a playback end time. As well as these information, extent start point information is provided as information for accessing the interleaved stream file.

The system rate indicates the maximum transfer rate in the transfer of the AV clip to the PID filter of a system target decoder, which will be described later. The interval between ATSs included in the AV clip is set to be lower than the system rate. The playback start time is the PTS of a video frame at the head of the AV clip, and the playback end time is obtained by adding a playback interval of one frame to the PTS of a video frame at the end of the AV clip.

As illustrated in FIG. 28B, the stream attribute information includes, for each PID, attribute information of the streams included in the AV clip. The attribute information is different for each of the video stream, audio stream, presentation graphics stream, and interactive graphics stream. The video stream attribute information includes information indicating, for example: the compression codec by which the video stream was compressed; the resolution of each piece of picture data constituting the video stream; the aspect ratio; and the frame rate. The audio stream attribute information includes information indicating, for example: the compression codec by which the audio stream was compressed; the channel number included in the audio stream; the language supported; and the sampling frequency. These information are used for, for example, initializing the decoder before a playback is performed by the player.

As illustrated in FIG. 28C, each entry map is information that is composed entry map header information 1101 and a table indicating correspondence between PTSs and SPNs, wherein each PTS indicates a presentation time of an I picture of the video stream included in the AV clip, and the SPN, which corresponding to that PTS, is the SPN of the source packet of the AV clip started by the I picture. Here, a pair of PTS and SPN included in one row of the table is called an entry point. Also, a value incremented for each entry point, starting with "0", is called an entry point ID (hereinafter referred to as "EP_ID"). By using this entry map, the playback device can identify a file position of an AV clip that corresponds to an arbitrary point on the time axis of the video stream. For example, when a special playback such as a fast forward or rewinding is to be performed, an I picture registered in the entry map is identified, selected, and played back. This makes it possible to process efficiently without analyzing the AV clip. Also, the entry maps are created for each video stream which is multiplexed in the AV clip, and are managed by the PIDs. Also, each entry map stores the entry map header information 1101 at the head thereof. The entry map header information 1101 stores information such as the PID of the video stream indicated by the entry map, and the number of entry points.

FIG. 28D illustrates one example of the internal structure of the extent start point information table. As illustrated in FIG. 28D, the extent start point information table includes "number_of_extent_start_points" and as many "SPN_start_point"s as indicated by the "number_of_extent_start_points".

The number_of_extent_start_points indicates the number of extents that belong to the related AV stream file. The two number_of_extent_start_points included respectively in the extent start point information tables of the clip base information and the clip enhancement information, which make a pair, have the same value.

The number of "SPN_extent_start"s ("SPN_extent_start [0]" . . . "SPN_extent_start[number_of_extent_start_point])=(the number indicated by the "number_of_extent_start_points")+1. The SPN_extent_start is specified by an extent identifier [extent_id] and is a 32-bit value indicating the source packet number of the source packet started by the (extent_id)$^{th}$ extent in the AV stream file.

The following describes a playlist file (YYY.MPLS).

The playback path defined by the playlist file is a so-called "multi-path". The multi-path is a combination of a main path and a sub path, wherein the main path is defined for a main transport stream that includes the base video stream, and the sub path is defined for a sub transport stream that includes the enhancement video stream. By defining the playback path of the base video stream by the main path and defining the playback path of the enhancement video stream by the sub path in the multi-path, it is possible to suitably define a combination of a base video stream and an enhancement video stream for the color depth extension mode. The playlist information has a hierarchical structure which is composed of, from top to bottom, playitem information, stream information, and transport stream, wherein the combination of the transport stream and the stream information may be "one" and the playitem information may be "many" in the one-to-many relationship, thereby realizing a multi-referencing in which a plurality of pieces of playitem information can reference one transport stream. This makes it possible to adopt, as a bank film, a transport stream created for a playlist so that the bank film can be referenced by a plurality of pieces of playitem information in a plurality of pieces of playlist information, making it possible to create a plurality of variations of a movie effectively.

FIG. 29A illustrates one example of the internal structure of the playlist information. As shown in FIG. 29A, the playlist information includes main-path information, sub-path information, playlist mark information, and extension data, wherein the main-path information defines a playback path for a main TS, the sub-path information defines a playback path for a sub TS, and the playlist mark information is used to set entry marks and link points in playback sections. As illustrated in FIG. 29B, the main path in the playlist is composed of one or more playitems 1201 that respectively indicate playback sections of the AV clip. The playitems 1201 are identified by the playitem IDs and are described in the order of playback in the playlist. The playlist also includes playlist marks 1202 that indicate playback start points. The playlist marks 1202 can be put in the playback sections defined by the playitems. The playlist marks 1202 are placed at positions that can be playback start points of playitems, and are used for the search-and-play function. The playlist mark information includes a time stamp and attribute information, wherein the time stamp indicates the position of the mark point in a playitem, and the attribute information indicates an attribute of the mark point, namely, whether the mark point defined by the playlist mark information is a link point or an entry mark.

The link point is a mark point that can be linked by the link command, but is not a target of selection when the user performs the chapter skip operation.

The entry mark is a mark point that can be linked by the link command, and is a target of selection when the user performs the chapter skip operation.

The link command embedded in the button information of the IG stream specifies a search-and-play position in the format of an indirect reference that is provided via the playlist mark information.

The following describes the contents of the playlist information with reference to FIG. 29C. The playitem includes: a clip information specifier 1301 that specifies a piece of clip information that is to be referenced during a playback of a video stream by using the file name of the clip information file (clip_information_file_name); a playback start time 1302 of an AV clip that specifies a time point (In_Time) at which a playback is to be started on the STC time axis of the video stream; a playback end time 1303 of an AV clip that specifies a time point (Out_Time) at which a playback is to be ended on the STC time axis of the video stream; a connection condition 1310; and a basic stream selection table 1305. The playback start time and playback end time are time information. Thus the player device obtains an SPN corresponding to the specified playback start time or playback end time by referencing the entry map of the clip information file, thereby identifies the reading start position, and starts the playback process.

The connection condition 1310 indicates a preceding playitem and the type of connection. When set to "1", the connection condition 1310 of a playitem indicates that a seamless connection is not ensured between an AV clip specified by the playitem and an AV clip specified by a preceding playitem that precedes the playitem. When set to "5" or "6", the connection condition 1310 of the playitem indicates that a seamless connection is ensured between an AV clip specified by the playitem and an AV clip specified by a preceding playitem that precedes the playitem. When set to "5", the connection condition 1310 indicates a seamless connection associated with a clean break. Here, the "clean break" means that the STC continuity may be interrupted between two succeeding playitems, that is to say, the video display time at the end of the AV clip of the preceding playitem may be discontinuous with the video display time at the start of the AV clip of the subsequent playitem. However, there are restrictive conditions for the above. That is to say, the AV clips need to be created in such a manner that the decoding performed by a system target decoder 1503 does not fail when the AV clip of the preceding playitem is input to the PID filter of the system target decoder 1503, then the AV clip of the subsequent playitem is input to the PID filter and then a playback is performed. Also, the last audio frame of the AV clip of the preceding playitem needs to be overlapped, on the playback time axis, with the first audio frame of the AV clip of the subsequent playitem.

When set to "6", the connection condition 1310 indicates a "seamless connection with continuous ATSs and PTSs", which means that an AV clip, which is obtained by linking together the AV clip of the preceding playitem and the AV clip of the subsequent playitem, must to be able to be played back as one AV clip. That is to say, the ATSs and the PTSs are respectively continuous between the AV clip of the preceding playitem and the AV clip of the subsequent playitem.

The stream selection table 1305 includes a plurality of stream entries 1309, each of which is composed of a stream selection number 1306, stream path information 1307, and stream identification information 1308. The stream selection numbers 1306 are numbers that increment by one with each insertion of a first stream entry 1309 in the stream selection table, and are used for identification of streams in the player. The stream path information 1307 is information indicating an AV clip on which the stream indicated by the stream identification information 1308 is multiplexed on. For example, when the stream path information 1307 is "main path", it indicates that the stream indicated by the stream identification information 1308 is multiplexed on the AV clip of the corresponding playitem, and when the stream path information 1307 is "sub-path ID=1", it indicates that the stream indicated by the stream identification information 1308 is multiplexed on the AV clip of a sub playitem corresponding to a playitem playback section in a sub path identified by the sub-path ID. The stream identification information 1308 is information such as PIDs, and indicates streams multiplexed on the AV clip to be referenced. Furthermore, attribute information of each stream is also recorded in the stream entries 1309. Here, the attribute information is information indicating the property of each stream, and for instance includes a language attribute in the case of audio, presentation graphics, and interactive graphics.

As illustrated in FIG. 29D, a playlist may include one or more sub paths. The IDs are assigned to the sub paths in the order of their registration in the playlist. These IDs are used as sub-path IDs for identifying the sub paths. Each sub path indicates a stream playback path by a series of sub playitems to be played back in synchronization with the main path. Each sub playitem, as is the case with the playitem, has the clip information 1301, playback start time 1302 and playback end time 1303. The playback start time 1302 and the playback end time 1303 of the sub playitem are expressed based on the same time axis as that of the main path. For example, if a certain stream entry 1309 registered in the stream selection table 1305 of the playitem #2 shows sub-path ID=0 and presentation graphics 1, the presentation graphics 1 multiplexed on the stream file storing the digital steam of the sub playitem #2 played back in synchronization with the playback section of the playitem #2, among the sub paths of sub-path ID=0, will be played back in the playitem #2 playback section. Furthermore, each sub playitem includes a field called a SP connection condition, which has the same meaning as a connection condition of a playitem. An AV clip on a boundary between sub playitems whose SP connection conditions are "5" or "6" needs to meet the same conditions as for connection conditions "5" or "6".

The extension data illustrated in FIG. 29E is an information element that is present only in the color depth extension playlist, and includes an extension stream selection table. The extension stream selection table includes a stream entry and a stream attribute of the enhancement video stream, and specifies the demultiplexing of the enhancement video stream to the playback device by this stream entry.

Figure 30:
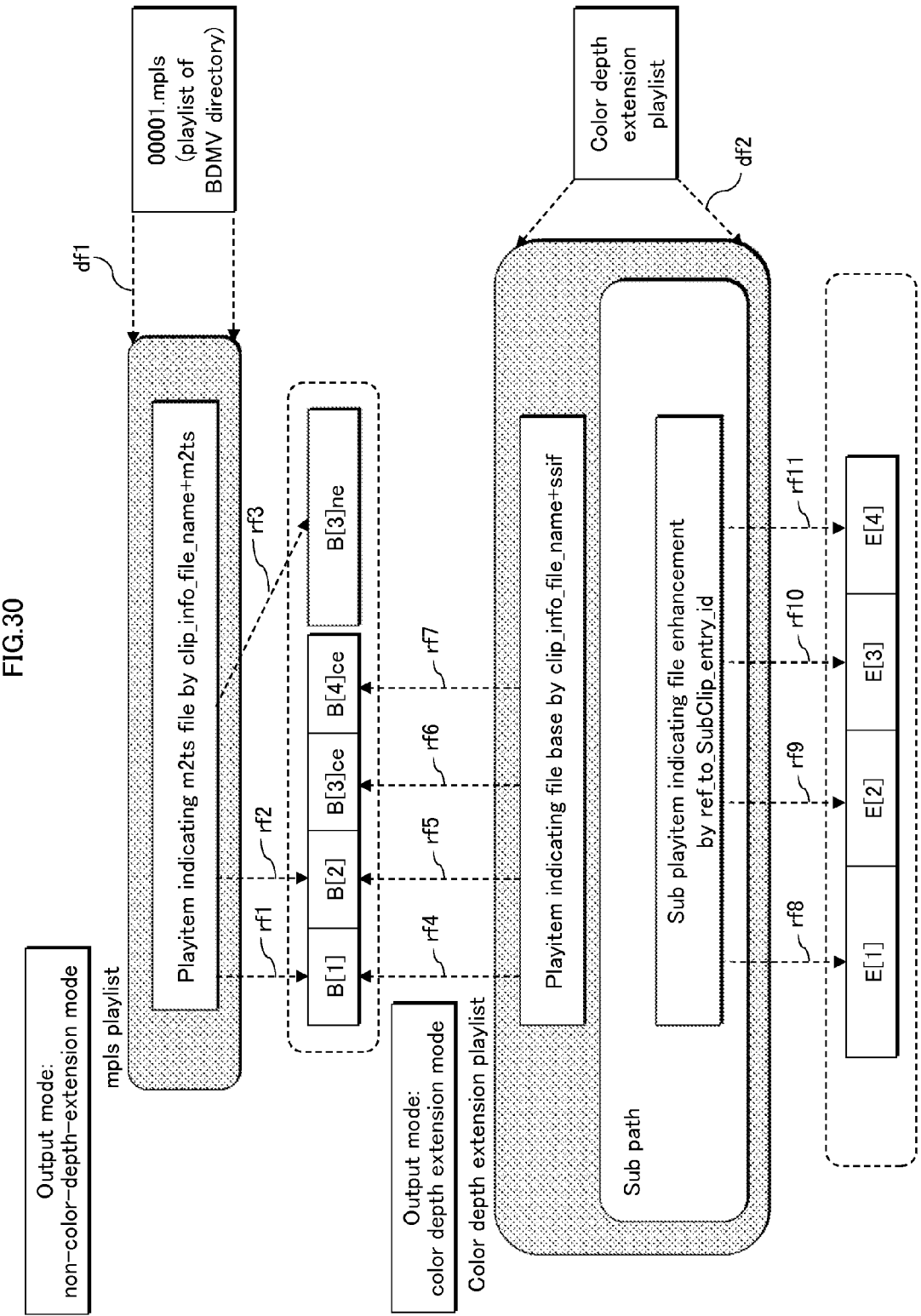
FIG. 30 illustrates a playlist recorded in the BDMV directory and a color depth extension playlist.

FIG. 30 illustrates a playlist defined by a playlist file (mpls file) recorded in the BDMV directory, and a color depth extension playlist. The first row illustrates the playlist information of the BDMV directory. The second row illustrates the base data blocks. The third row illustrates the color depth extension playlist. The fourth row illustrates the enhancement data blocks.

The arrows rf1, rf2, rf3 indicate a playback path that is a combination of the file name "00001" described in "clip_information_file_name" in the playitem information of the playlist information in the BDMV directory, and extension "m2ts". In this case, the playback path on the base video side is composed of the data blocks B[1], B[2], B[3]ne.

The arrows rf4, rf5, rf6, rf7 indicate a playback path specified by the playitem information of the color depth extension playlist information. In this case, the playback path on the base video side is composed of the data blocks B[1], B[2], B[3]ce, B[4]ce.

The arrows rf8, rf9, rf10, rf11 indicate a playback path specified by the sub playitem information of the color depth extension playlist information. In this case, the playback path on the enhancement video side is composed of E[1], E[2], E[3], E[4]. The data blocks that constitute the playback paths specified by the playitem information and sub playitem information may be read by performing a file open by combining the file name described in the clip_information_file_name in the playitem information, and extension "ceif".

When the main TS and sub TS are stored in an interleaved stream file, a file name of an m2ts file is described in the clip_information_file_name in the playitem information of the playlist in the BDMV directory. A file name of the file Base is described in the clip_information_file_name in the playitem information of the color depth extension playlist. The file Base is a virtual file, and the file name thereof is the same as the file name of the interleaved stream file. Thus the file name of the interleaved stream file may be described in the clip_information_file_name in the playitem information. The file name of the file Enhancement is described in ref_to_sub-clip_entry_id in the stream registration information in the extension stream selection table. It is assumed here that the file name of the file Enhancement is obtained by adding 1 to the identification number of the interleaved stream file.

As described above, while the base video data blocks and the enhancement data blocks are stored in one interleaved stream file, it is possible to open the interleaved stream file as an m2ts file, file Base, or file Enhancement. This makes it possible for the decoder side to treat the interleaved stream file in the same manner as a normal stream file. Accordingly, the interleaved stream file can be positively incorporated into the storage structure of the base video stream and the enhancement video stream.

Also, in the color depth extension playlist, the main-path information and the sub-path information of the playlist information can be used to unite the base video stream and the enhancement video stream as one multi-path. Therefore the base video stream and the enhancement video stream can be recorded in the Out-of-MUX format, not in the format of the color depth extension interleaved stream file as described in Embodiment 1. Furthermore, the base video stream and the enhancement video stream may be recorded in different stream files in the same recording medium, or may be recorded in different stream files in different recording mediums.

The enhancement video stream for the color depth extension and the playlist information corresponding to the color depth extension can be stored in the Out-of-MUX format. This makes it possible to sell Blu-ray ReadOnly discs storing only the base video stream as package media, and provide users, who purchased the package media, with the enhancement video stream as a bonus. That is to say, when a Blu-ray ReadOnly disc, which is a package medium storing only the base video stream, is loaded in a playback device, the playback device downloads, from the server, an AV clip containing the enhancement video stream corresponding to the base video stream, the clip information file corresponding thereto, the color depth extension playlist information file, and the color depth extension program. This makes it possible to realize the color depth extension by forming a virtual package in which the downloaded files and the files in the Blu-ray ReadOnly disc are combined in one unit.

(Playback Device for Playing Back Video of Color Depth Extension)

The following describes a playback device for playing back a Blu-ray ReadOnly disc storing color depth extension video of the present invention.

Figure 31:
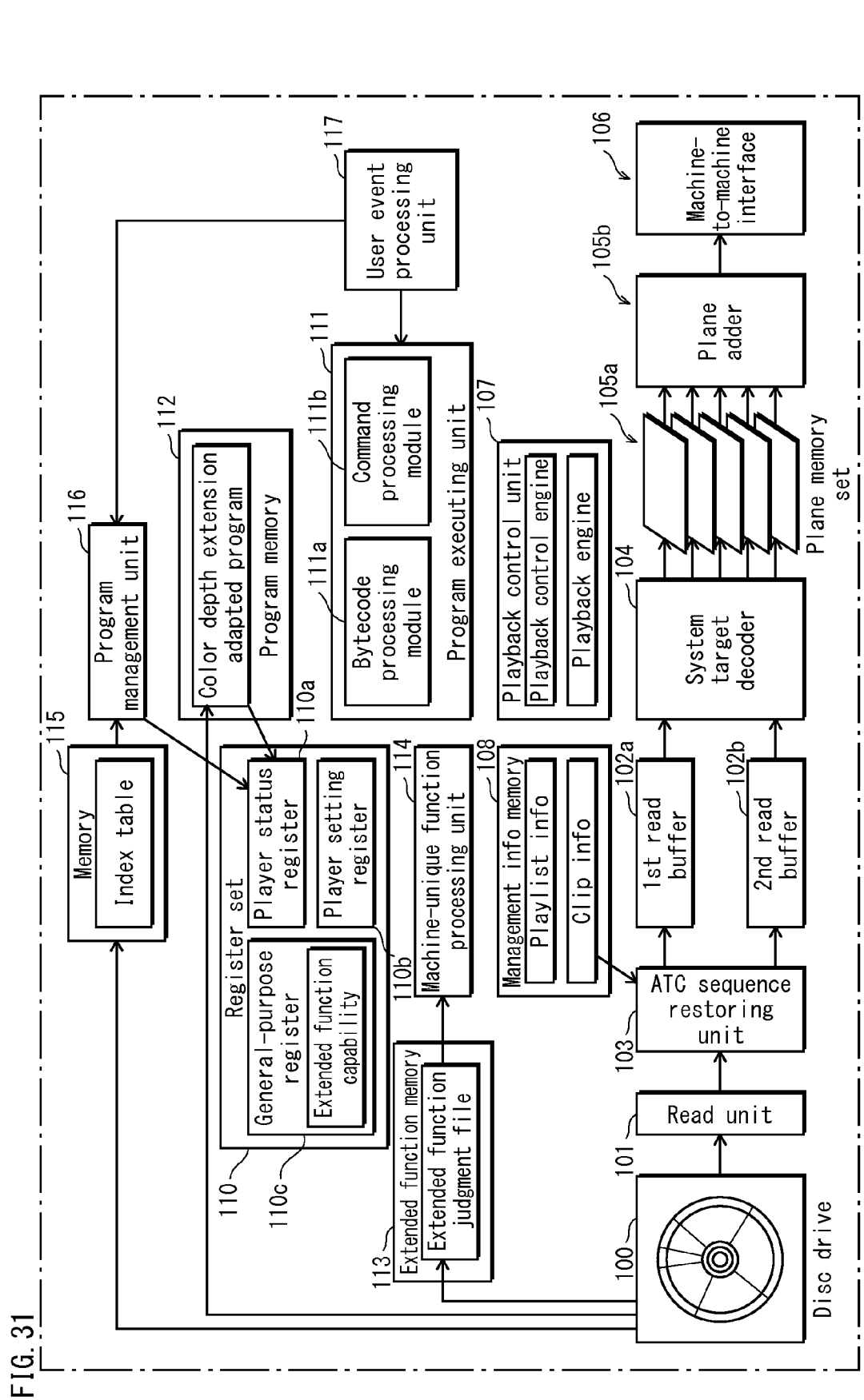
FIG. 31 illustrates the structure of a playback device 1002.

FIG. 31 illustrates the structure of a playback device 1002. In the internal structure illustrated in FIG. 31, the above-described color depth extension unit is arranged as the core, and structural elements for securing the functions of the playback device are arranged in the preceding, succeeding and peripheral elements of the color depth extension unit. The playback device includes a disc drive 100, a read unit 101, a first read buffer 102a, a second read buffer 102b, an ATC sequence restoring unit 103, a system target decoder 104, a plane memory set 105a, a plane adder 105b, a machine-to-machine interface 106, a playback control unit 107, a management information memory 108, a register set 110, a program executing unit 111, a program memory 112, an extended function memory 113, a machine-unique function processing unit 114, an index memory 115, a program management unit 116, and a user event processing unit 117.

The disc drive 100, as is the case with an ordinary disc drive, read data from the Blu-ray ReadOnly disc based on a request from the playback control unit 107, but differs in that it transfers an AV clip read from the Blu-ray ReadOnly disc to the first read buffer 102a or the second read buffer 102b. When a disc containing color depth extension video is to be played back, the playback control unit 107 sends alternately a request for reading an AV clip including the base video stream and a request for reading an AV clip including the enhancement video stream. Switching between the transfer destinations, the disc drive 100 transfers data of an AV clip containing the base video stream to the first read buffer 102a, and transfers data of an AV clip containing the enhancement video stream to the second read buffer 102b. To play back video containing color depth extension video, it is necessary to read simultaneously both an AV clip including the base video stream and an AV clip including the enhancement video stream, and thus the disc drive 100 is required to have an access speed performance higher than an ordinary Blu-ray ReadOnly disc drive.

The read unit 101 executes reading from a loaded recording medium on which a content has been recorded. The read unit 101 also executes a random access from an arbitrary time point on a time axis of the video stream. More specifically, when instructed to play back from an arbitrary time point on the time axis of the video stream, the read unit 101 searches a source packet number of an access unit corresponding to the arbitrary time point, by using an entry map. With this search, the read unit 101 identifies a source packet number of a source packet that stores an access unit delimiter of the access unit. The read unit 101 then reads and decodes data based on the source packet number. When executing a scene jump, the read unit 101 executes a random access by executing the above search using the time information indicating the branch destination.

The first read buffer 102a stores TS packets constituting the main TS read from the disc drive 100.

The second read buffer 102b stores TS packets constituting the sub TS read from the disc drive 100.

The ATC sequence restoring unit 103 separates an ATC sequence constituting the base video stream and an ATC sequence constituting the enhancement video stream from the source packets included in the interleaved stream file read from one recording medium, and writes the ATC sequences into the respective two read buffers. With this structure, the playback device can process the ATC sequence constituting the base video stream and the ATC sequence constituting the enhancement video stream as if they were read from different recording mediums.

The system target decoder 104 performs demultiplexing process onto the source packets read into the first read buffer 102a and the source packets read into the second read buffer 102b, and decodes streams. The system target decoder 104 performs the color depth extension by decoding the base video stream and the enhancement video stream.

The plane memory set 105a is composed of a plurality of plane memories. These plane memories constitute a layer model, and the storage contents of these plane memories are overlaid with each other by the layer overlay. Gradation bit sequences of non-compressed images of one screen are written to these plane memories. The writing of the bit sequences is performed when a playback start time indicated by the presentation time stamp of each access unit arrives.

The plane adder 105b performs layer overlays in the plurality of plane memories. The layer overlays in the plurality of plane memories are realized by executing a superimposing process onto all combinations of the two layers in the layer model. In the superimposing process, pixel values of pixel data stored in the plane memories between layers are superimposed. The plane adder 105b realizes the layer overlay by executing a superimposing process onto all combinations of the two layers in the layer model. In the superimposing process, pixel values of pixel data stored in the plane memories between layers are superimposed.

The superimposing between layers is performed as follows. A transmittance α as a weight is multiplied by a pixel value in unit of a line in the plane memory of a certain layer, and a weight of (1−transmittance α) is multiplied by a pixel value in unit of a line in the plane memory of a layer below the certain layer. The pixel values with these luminance weights are added together. The resultant pixel value is set as a pixel value in unit of a line in the layer. The layer overlay is realized by repeating this superimposing between layers for each pair of corresponding pixels in unit of a line in adjacent layers in the layer model.

The machine-to-machine interface 106 transits to a data transfer phase via a negotiation phase, when a connection with another device in the home theater system is made via an interface, and performs data transmission/reception in the data transfer phase. In the negotiation phase, the capabilities (including the decode capability, playback capability, and display frequency) of the partner device are grasped, and the capabilities are set in the player setting register so that the transfer method for the succeeding data transfers is determined. The negotiation phase includes a mutual authentication phase. After the negotiation phase, one line of the pixel data in the non-compression/plaintext format in the picture data after the layer overlay is transferred to the display device at a high transfer rate in accordance with the horizontal sync period of the display device. Here, in the color depth extension, the pixel data to be transferred is composed of the luminance Y, red color difference Cr, and blue color difference Cb that are each represented by an N-bit sequence that has been extended from an eight-bit sequence. Accordingly, in the data transfer phase in the color depth extension mode, prior to transferring data, a transmission/reception unit notifies the display device of the bit width of the pixel bit values.

On the other hand, in the horizontal and vertical blanking intervals in the display device, audio data in the non-compression/plaintext format is transferred to other devices (including an amplifier and a speaker as well as the display device) connected with the playback device. With this structure, the devices such as the display device, amplifier and speaker can receive the picture data and audio data that are both in the non-compression/plaintext format, and a reproduction output is realized. Furthermore, when the partner device has the decode capability, a pass-through transfer of the video and audio streams is possible. In the pass-through transfer, it is possible to transfer the video stream and audio stream in the compressed/encrypted format, as they are.

The playback control unit 107 has a function to control the playback of the AV clip by controlling the drive 100 and the system target decoder 104. The playback control unit 107 controls the playback of the AV clip by interpreting the playlist information based on a playback instruction from the program executing unit 111, or a notification from the user event processing unit 117. To perform the above controls, the playback control unit 107 includes a playback control engine for interpreting the playlist information, and a playback engine for controlling the playback of AV clips. Furthermore, the playback control unit 107 performs playback operation by referencing the system parameters. When instructed, by the program executing unit 111 or the like, to play back a playlist for playing back an AV clip including the base video stream for the color depth extension, the playback control unit 107 identifies the AV clip including the base video stream of a playback-target playitem in the playlist, and identifies an AV clip including an enhancement video stream for the color depth extension of the base video stream. To identify the AV clip including the enhancement video stream, the AV clip may be associated with the name of the AV clip including the base video stream, or a management file may be used. After identifying the AV clips, the playback control unit 107 interprets the entry maps of the corresponding clip information files, and based on the extent start type indicating an extent of which AV clip is arranged at the start, requests the disc drive 100 to read extents of the AV clips including the base video stream and the enhancement video stream alternately from the playback start point. At the start of the playback, the initial extent is read into the first read buffer 102a or the second read buffer 102b, then the transfer of data from the first read buffer 102a and the second read buffer 102b to the system target decoder 104 is started.

The management information memory 108 stores, among a plurality of pieces of playlist information and clip information recorded on the recording medium, processing targets of the playback control unit 107 (the current playlist information and the current clip information).

The register set 110 includes a plurality of player status registers, a plurality of player setting registers, and a general-purpose register. Each of the player status registers and player setting registers has a word length of 32 bits, each 32-bit register is assigned a register number so that a register to be accessed is identified by the register number.

The player status register 110a is reset to initial values when an optical disc is loaded, and the validity of the stored values is checked when the status of the playback device changes, such as when the current playitem is changed. The values that can be stored in the player status register include a current title number, current playlist number, current playitem number, current stream number, current chapter number, and so on. The values stored in the player status register are temporary values because the player status register is reset to initial values each time an optical disc is loaded. The values stored in the player status register become invalid when the optical disc is ejected, or when the playback device is powered off.

The player setting register 110b differs from the player status register in that it is provided with power handling measures. With the power handling measures, the values stored in the player setting register are saved into a nonvolatile memory when the playback device is powered off, and the values are restored when the playback device is powered on. The values that can be set in the player setting register include: various configurations of the playback device that are determined by the manufacturer of the playback device when the playback device is shipped; various configurations that are set by the user in accordance with the set-up procedure; and the capability of a partner device which is detected through negotiation with the partner device when the device is connected with the partner device, the partner device being, for example, a TV system, stereo, amplifier or the like. The color depth extension mode is a playback mode unique to the present embodiment. This is a special playback mode that can be set only when the connection partner device is a display device supporting the 12-bit sequence and the user validates the color depth extension mode while setting up the playback device. Any value, which is a 32-bit bit sequence stored in the player status register or the player setting register of a predetermined register number and is within an arbitrary bit range [bx:by], is treated as an environment variable (system parameter) in an operation system where a program operates.

The system parameters that can be set in the player status register and player setting register include the following.

| SPRM (0) | Language Code |
|---|---|
| SPRM (1) | Primary audio stream number |
| SPRM (2) | Subtitle stream number |
| SPRM (3) | Angle number |
| SPRM (4) | Title number |
| SPRM (5) | Chapter number |
| SPRM (6) | Program number |
| SPRM (7) | Cell number |
| SPRM (8) | Selected key information |
| SPRM (9) | Navigation timer |
| SPRM (10) | Current playback time |
| SPRM (11) | Mixing mode for Karaoke |
| SPRM (12) | Country information for parental management |
| SPRM (13) | Parental level |
| SPRM (14) | Player setting value (video) |
| SPRM (15) | Player setting value (audio) |
| SPRM (16) | Language Code for audio stream |
| SPRM (17) | Language code for audio stream (extension) |
| SPRM (18) | Language Code for subtitle stream |
| SPRM (19) | Language code for subtitle stream (extension) |
| SPRM (20) | Player region code |
| SPRM (21) | Child-screen video stream number |
| SPRM (22) | Secondary audio stream number |
| SPRM (23) | Playback status |
| SPRM (24) | 3D video playback capability |

SPRM(10) is updated each time picture data belonging to the AV clip is displayed. That is to say, when the playback device displays new picture data, SPRM(10) is updated to a value indicating the presentation time (PTS) of the new picture data. By referencing SPRM(10), it is possible to recognize the current playback time point.

The "language code for audio stream" in SPRM (16) and "language code for subtitle stream" in SPRM (18) can be set via the setup menu when the player draws the setup menu using an on-screen display, and indicate a default language code of the player. For example, the control program file may have the following function. Namely, when a playlist is played back while English is set as the "language code for audio stream" in SPRM (16), the stream selection table of the playitem is searched for a stream entry having the same language code and the corresponding audio stream is selected and played back. Furthermore, the playback control unit 107 checks the status of the system parameter while playing back. The SPRM (1), SPRM (2), SPRM (21) and SPRM (22) indicate the audio stream number, subtitle stream number, child-screen video stream number and secondary audio stream number, respectively. These values correspond to the above-described stream selection number 606. For example, suppose that the audio stream number SPRM (1) is changed by the program execution unit 111. Then the playback control unit 107 makes a comparison between the stream section number 606 and the stream selection table 605 of the playitem currently being played back, refers to the matching stream entry 609, and switches audio streams to be played back. In this way, it is possible to change the audio, subtitle or child-screen video stream to be played back.

The general-purpose register (GPR) 110c is a hardware resource for storing values that are to be used as operands when the MPU of the playback device performs an arithmetic operation or a bit operation. Programs are prohibited to write values into the player status register, but are allowed to write values into the general-purpose register. In the present embodiment, the general-purpose register is used as a color depth extension capability register. The color depth extension capability register is a register that indicates whether or not there are capabilities to process extended functions that are realized by the color depth extension. There are a plurality of types of extended functions, and it is possible to set whether or not there is a capability to process the extended function, for each of the plurality of types of extended functions.

Any value of an arbitrary bit range [bx:by] in a 32-bit sequence stored in a general-purpose register of a predetermined register number is treated as a player variable (general purpose parameter: GPRM) that is a variable of an operation system in which a program runs.

The program executing unit 111 is a processor for executing a program stored in the BD program file. A command executing module 111a includes a command interpreter, and performs the control of the HDMV mode by decoding and executing a navigation command constituting a movie object. A byte code executing module 111b is a platform unit of a so-called Java™ virtual machine. The byte code executing module 111b converts (i) the byte codes constituting the BD-J application stored in the heap memory and (ii) the byte codes constituting the system application, into native codes, and causes the MPU to execute the native codes.

The program memory 112 stores programs that are targets of execution by the program executing unit 111. The programs include a color depth extension program adapted to the color depth extension process.

The index memory 113 is a memory in which the extended function judgment file is stored.

The machine-unique function processing unit 114 executes machine-unique functions that are not supported by normal Blu-ray ReadOnly disc players. In the present embodiment, setting of the color depth extension mode and initialization of the extended function capability are performed as one example of the machine-unique functions.

The setting of the color depth extension mode is executed when the playback device is set in the home theater system and connected with the display device for the first time. During the first connection, the machine-unique function processing unit 114 obtains the color depth of the display device via the machine-to-machine interface. When the pixel gradation bit sequence of the display device exceeds eight bits and the 12-bit color depth representation is possible on the display device, the playback device pops up a setup menu urging a transition to the color depth extension mode, and asks the user whether to transit to the color depth extension mode. When the selects to transit to the color depth extension mode, the machine-unique function processing unit 114 sets the player setting register to indicate that the current mode is the color depth extension mode. Furthermore, in the negotiation phase of the machine-to-machine interface, the machine-unique function processing unit 114 sets the display device in the color depth extension mode via the machine-to-machine interface. When the display device does not support the 12-bit color depth representation or when the user does not select to transit to the color depth extension mode, the machine-unique function processing unit 114 sets the player setting register to indicate that the current mode is the non-color-depth-extension mode.

The initialization of the extended function capability is executed when the recording medium is loaded in the playback device. When a recording medium is loaded while the current mode is set to the color depth extension mode, the machine-unique function processing unit 114 initializes the extended function capability for the program to be loaded from the recording medium. In this initialization, initial values are set in the respective extended function capability registers that indicate whether or not various extended function capabilities are present. With this structure, the program loaded from the recording medium can judge which functions among the various functions to which the color depth extension is applied are executable.

The index memory 115 is a memory into which the index table is read from a disc medium after the disc medium is loaded into the playback device.

The program management unit 116 selects a title as the current title based on the playback device status or a user operation from among a plurality of titles defined in the index table, and stores the title number of the selected title into the current title number register, which is one of player status registers. Furthermore, the program management unit 116 selects a program file corresponding to the current title number, and instructs the navigation command processing module and the bytecode processing module to process the selected program file. The program files include a program file for the byte code operation mode and a program file for the navigation code operation mode.

The user event processing unit 117, in response to a user operation that is input via a remote control, requests the program executing unit 111 or the playback control unit 107 to execute a process. For example, when the user presses a button on the remote control, the user event processing unit 117 requests the program executing unit 111 to execute a command corresponding to the button. For example, when a fast forward/rewind button on the remote control is pressed, the user event processing unit 117 requests the playback control unit 107 to execute a fast forward/rewind process onto an AV clip of a playlist that is currently played back.

The above-described structures of the recording medium and the playback device are based on the BD-3D application format for realizing the stereoscopic playback by MPEG4-MVC, and its player model. It is possible to introduce a recording medium or a playback device for the color depth extension by introducing the enhancement video stream in place of a video stream representing video of a different viewpoint in the above-described application format and its player model. This makes it possible to use the design know-how that has been acquired through the development of BD-3D, in creation of the authoring environment and the operation verification mechanism of the playback device. This makes it possible to shorten the period required to achieve the practical use of color depth extension contents.

Figure 32A:
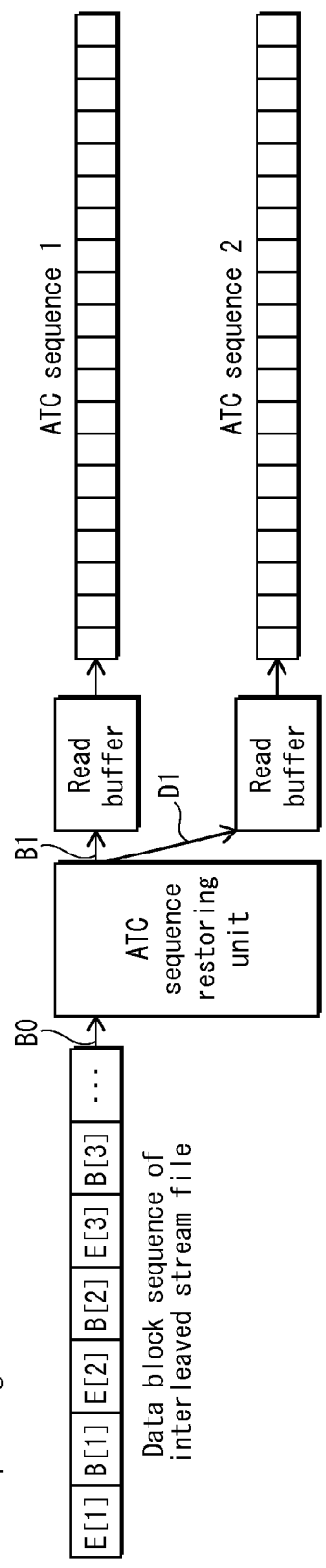
FIGS. 32A-32B illustrate how the ATC sequences are restored from data blocks constituting the color depth extension interleaved stream file.

FIG. 32A is a diagram illustrating how the ATC sequences are restored from the interleaved stream file. FIG. 32A illustrates one example of the internal structure of a read unit that includes an ATC sequence restoring unit. As described above, the ATC sequence restoring unit is placed between a set of two drivers and a set of two read buffers. The arrow B0 in the diagram symbolically indicates input of the base data blocks and enhancement data blocks from one drive. The arrow B1 indicates that an ATC sequence 1 constituting the base video stream is written into one read buffer, and the arrow D1 indicates that an ATC sequence 2 constituting the enhancement video stream is written into another read buffer.

Figure 32B:
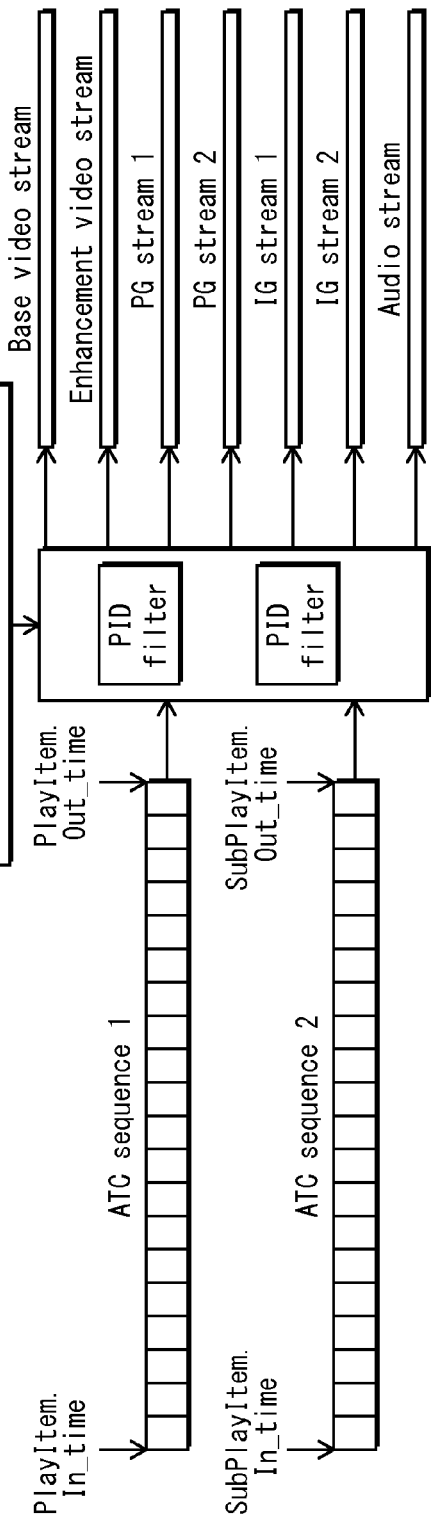

FIG. 32B illustrates how the two ATC sequences obtained by the ATC sequence restoring unit are processed. The middle part of the FIG. 32B illustrates PID filters. The left-hand side of FIG. 32B illustrates the two ATC sequences obtained by the ATC sequence restoring unit. The right-hand side of FIG. 32B illustrates the base video stream, enhancement video stream, PG streams 1 and 2, IG streams 1 and 2, and audio stream that are obtained by demultiplexing the two ATC sequences. The correspondence between these ATC sequences and STC sequences is indicated by the entry map included in the clip information.

Arrival time stamps are attached to TS packets that constitute the ATC sequences 1 and 2 that correspond to the base video stream and enhancement video stream respectively. The total data size per unit time of TS packets, which constitute the elementary streams that are permitted to be played back simultaneously in the basic steam selection table, is at most 48 Mbps. The total data size per unit time is calculated in a window that is a frame on the time axis which is the basis of the arrival time stamps, and the total data side per unit time is always 48 Mbps or lower regardless of the time point of the window on the time axis which is the basis of the arrival time stamps.

Since the data size per second is at most 48 Mbps, even if the amount of supplied TS packets rises to 96 Mbits locally due to the simultaneous reading of the streams, the bit amount per second is restricted to 48 Mbits or less. Thus the worst case, namely the supply of data of 96 Mbits, does not continue for more than 0.5 seconds.

As described above, it is guaranteed that the worst case does not continue for more than 0.5 seconds at any time point on the playback time axis. Accordingly it is possible to avoid an underflow of a buffer in the decoder by structuring the playback device to always prepare in advance and supply a TS packet of 96 Mbits×0.5 second in size to the decoder.

Figures 33A, 33B, 33C, 33D:
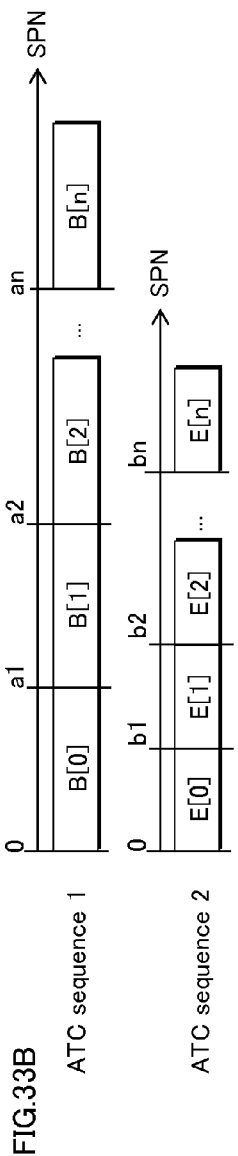
FIGS. 33A-33D illustrate one example of the extent start point information in the base video clip information and one example of the extent start point information in the enhancement video clip information.

FIGS. 33A to 33D illustrate one example of the extent start point information in the base video clip information and one example of the extent start point information in the enhancement video clip information. FIG. 33A illustrates the extent start point information of the base video clip information and the extent start point information of the enhancement video clip information. FIG. 33B illustrates base video data blocks B[0], B[1], B[2] . . . B[n] that constitute the ATC sequence 1 and enhancement video data blocks E[0], E[1], E[2] . . . E[n] that constitute the ATC sequence 2. FIG. 33C illustrates the number of source packets in each enhancement data block and the number of source packets in each base data block.

FIG. 33D illustrates the starting source packet number (SPN) of each enhancement data block and the starting SPN of each base data block.

In this example of the interleaved stream file, the starting SPN of E[0] is "0", and the starting SPN of B[0] is "b1".

The starting SPN of E[1] is "b1+a1", wherein "b1" denotes the number of source packets in the preceeding E[0] and "a1" denotes the number of source packets in B[0].

The starting SPN of B[1] is "b2+a1 (=b1+a1+b2−b1)", wherein "b1" denotes the number of source packets in the preceeding E[0], "a1" denotes the number of source packets in B[0], and "b2−b1" denotes the number of source packets in the preceeding E[1].

The starting SPN of E[2] is "b2+a2 (=b1+a1+b2−b1+a2−a1)", wherein "b1" denotes the number of source packets in the preceeding E[0], "a1" denotes the number of source packets in B[0], "b2−b1" denotes the number of source packets in the preceeding E[1], and "a2−a1" denotes the number of source packets in B[1].

Figure 34:
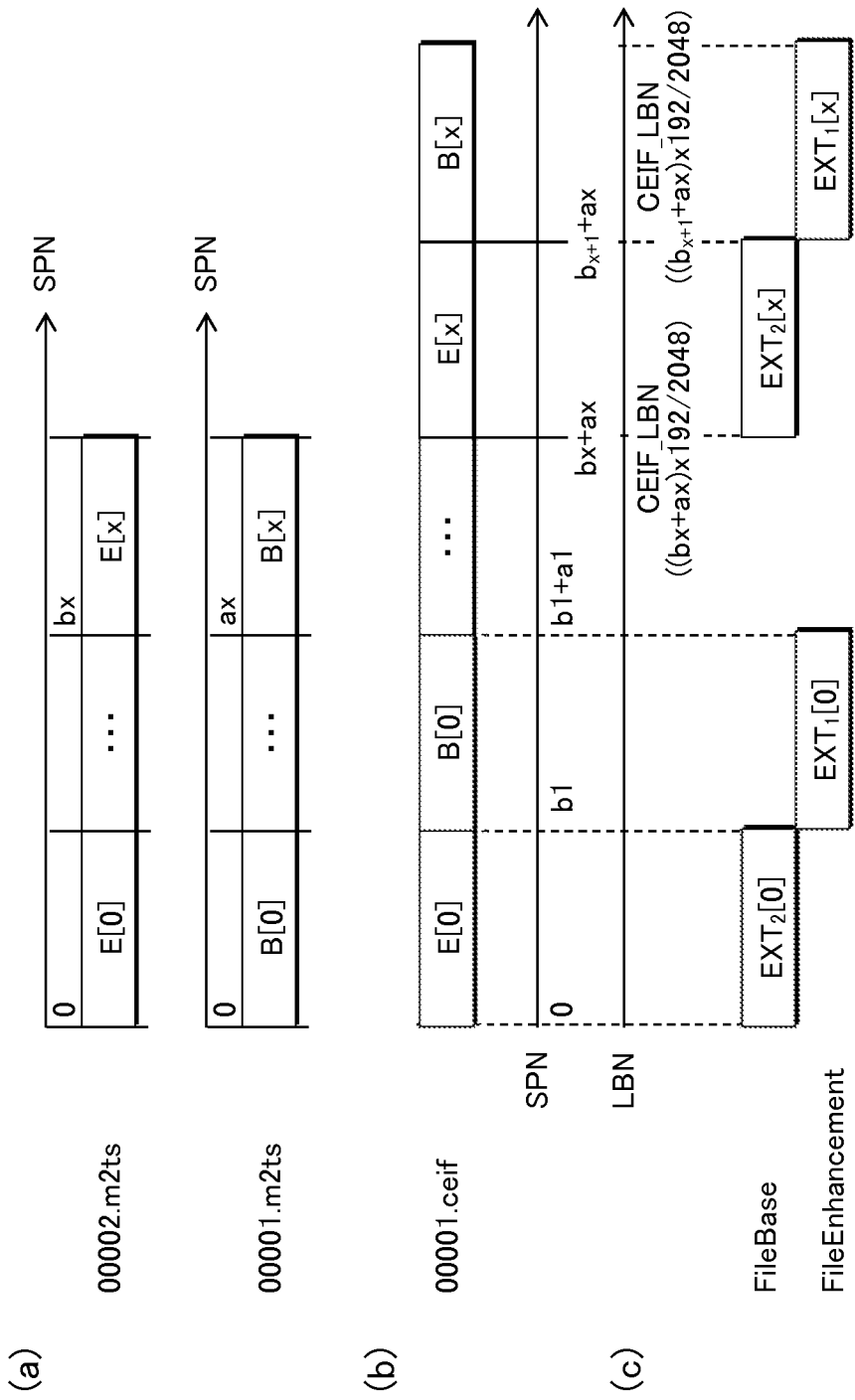
FIG. 34 is a diagram illustrating source packet numbers in arbitrary data blocks in the ATC sequences 1 and 2.

The starting SPN of B[2] is "b3+a2 (=b1+a1+b2−b1+a2−a1+b3−b2", wherein "b1" denotes the number of source packets in the preceeding E[0], "a1" denotes the number of source packets in B[0], "b2−b1" denotes the number of source packets in the preceeding E[1], "a2−a1" denotes the number of source packets in B[1], and "b3−b2" denotes the number of source packets in E[2]. FIG. 34 is a diagram illustrating source packet numbers in arbitrary data blocks in the ATC sequences 1 and 2. Here, how to obtain the starting source packet number (SPN) of E[x] in the interleaved stream file is considered, where the starting SPN of E[x] in the ATC sequence 2 is "bx" as illustrated in portion (a) of FIG. 34. In this case, the starting source packet number (SPN) of E[x] equals the total number of source packets in E[0], B[0], E[1], B[1], E[2], B[2] ... E[x−1], B[x−1], and thus is "bx+ax" as indicated in portion (b) of FIG. 34.

Here, how to obtain the starting source packet number (SPN) of B[x] in the interleaved stream file is considered, where the starting SPN of B[x] in the ATC sequence 1 is "ax" as illustrated in portion (a) of FIG. 34. In this case, the starting source packet number (SPN) of B[x] equals the total number of source packets in E[0], B[0], E[1], B[1], E[2], B[2] ... E[x−1], B[x−1], E[x] and thus is "bx+1+ax" as indicated in portion (b) of FIG. 34.

FIG. 34, portion (c) illustrates a file Base whose extents are the above-described base data blocks, and a file Enhancement whose extents are the above-described enhancement data blocks.

The following explains how to obtain the starting logical block number (LBN) and the continuous length of extent EXT1[x] of the file Base that corresponds to B[x], and how to obtain the starting LBN and the continuous length of extent EXT2[x] of the file Enhancement that corresponds to E[x].

To obtain the starting LBN from the starting source packet number (SPN) of E[x], the SPN is converted into the LBN by performing a calculation ((bx+ax)*192/2048). Similarly, to obtain the starting LBN from the starting source packet number (SPN) of B[x], the SPN is converted into the LBN by performing a calculation ((bx+1+ax)*192/2048). In the above, the number "192" is the number of bytes representing the source packet size, and the number "192" is the number of bytes representing the sector size (logical block size). With the above-described conversion, the logical address of the reading target is obtained.

Figure 35:
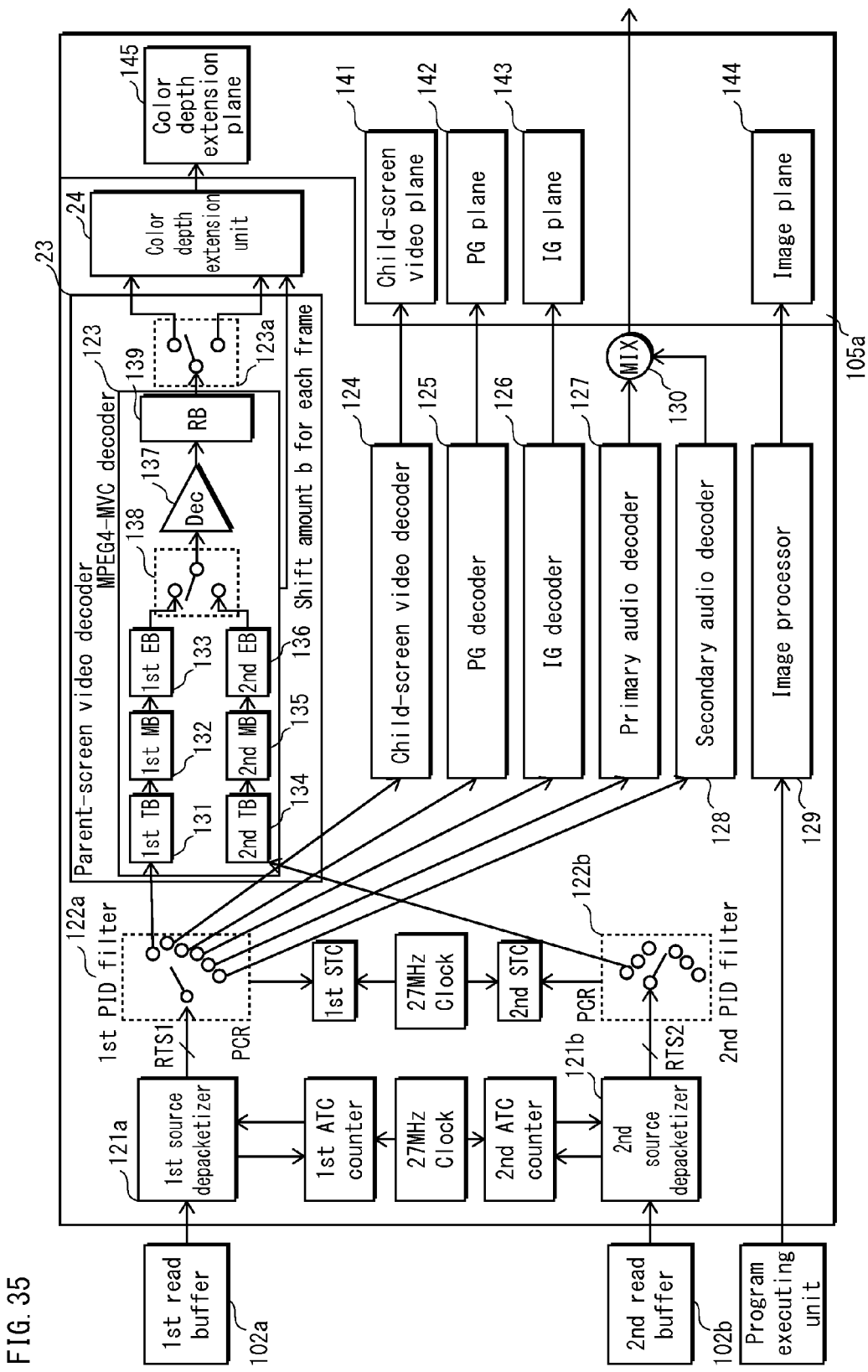
FIG. 35 illustrates one example of the internal structure of the system target decoder 104.

The following describes the internal structure of the system target decoder 104 with reference to FIG. 35. In the internal structure of the system target decoder 104, unique structural elements for processing the Blu-ray ReadOnly disc have been arranged around the video decoding unit 23 and the color depth extension unit 24 that are described in Embodiment 1. In FIG. 35, structural elements of the system target decoder 104 are assigned reference numbers in the 120s for the sake of understanding. As illustrated in FIG. 35, the system target decoder 104 includes a first source depacketizer 121a, a second source depacketizer 121b, a first PID filter 122a, a second PID filter 122b, a parent-screen video decoder 123, a child-screen video decoder 124, a PG decoder 125, a picture switch 123a, an IG decoder 126, a primary audio decoder 127, a secondary audio decoder 128, and an image processor 129.

The first source depacketizer 121a interprets the source packets stored in the first read buffer 102a, extract TS packets, and sends the TS packets to the first PID filter 122a.

The second source depacketizer 121b interprets the source packets stored in the second read buffer 102b, extracts TS packets, and sends the TS packets to the second PID filter 122b. When the TS packets are sent, the input times at which the TS packets are input to the decoders are adjusted based on the ATSs of the source packets. More specifically, at the instant when an ATC value generated by the ATC counter and an ATS value of a source packet become the same, only a TS packet corresponding to the source packet is transferred to the PID filter at the recording rate of the clip stream file.

As a result, the first PID filter 122a transfers, among TS packets having been output from the source depacketizer, a TS packet having a PID that matches a PID required for playback, to any of the video decoder, child-screen video decoder, IG decoder, PG decoder, audio decoder and secondary audio decoder, based on the PID of the TS packet. For instance, in the case of the BD-ROM, a TS packet having a PID 0x1011 is transferred to the parent-screen video decoder, TS packets having PIDs 0x1B00 to 0x1B1F are transferred to the child-screen video decoder, TS packets having PIDs 0x1100 to 0x111F are transferred to the primary audio decoder, TS packets having PIDs 0x1A00 to 0x1A1F are transferred to the secondary audio decoder, TS packets having PIDs 0x1200 to 0x121F are transferred to the PG decoder, and TS packets having PIDs 0x1400 to 0x141F are transferred to the IG decoder.

The second PID filter 122b transfers, among TS packets having been output from the second source depacketizer 121b, a TS packet having a PID that matches a PID required for playback, to the second transport buffer of the video decoder. As a process unique to the present embodiment, the first and second PID filters 122a and 122b execute demultiplexing based on the display mode. More specifically, when the display mode is the non-color-depth-extension mode, the first PID filter 122a demultiplexes only TS packets that belong to the base video stream, and outputs the demultiplexed TS packets to the video decoder. When the display mode is the color depth extension mode, the first PID filter 122a demultiplexes TS packets that belong to the base video stream, and the second PID filter 122b demultiplexes TS packets that belong to the enhancement video stream, and the demultiplexed TS packets are output to the video decoder.

The parent-screen video decoder 123 is an MPEG4-MVC video decoder. When the color depth extension mode is set, the parent-screen video decoder 123 inputs the two lines of the base video stream and the enhancement video stream, performs the color depth extension, and performs a screen output.

The picture switch 123a judges whether a decoded frame/field image transferred from the parent-screen video decoder 123 is an 8-bit base picture or an 8-bit enhancement picture, and then transfers the decoded frame/field image to the color depth extension unit 24.

The child-screen video decoder 124 has the same structure as the parent-screen video decoder. The child-screen video decoder 124 performs decoding of an input child-screen video stream, and writes resultant pictures to the child screen video plane at the timings of presentation times indicated by the PTSs.

The PG decoder 125 extracts a presentation graphics stream from the TS packets input from the source depacketizer, decodes the extracted presentation graphics stream, and writes the non-compressed graphics data to the PG plane at the timing of the presentation time (PTS). More specifically, the PG decoder includes a coded data buffer, a stream graphics processor, an object buffer, a composition buffer, and a composition controller. The coded data buffer stores functional segments read from the PG stream. The stream graphics processor obtains a graphics object by decoding the screen composition segment. The object buffer stores the graphics object obtained by the decoding. The composition buffer stores the screen composition segment. The composition controller decodes the screen composition segment stored in the composition buffer, and performs a screen composition on the graphics plane by using the graphics object stored in the object buffer, based on the control items included in the screen composition segment.

The IG decoder 126 extracts an interactive graphics stream from the TS packets input from the source depacketizer, decodes the extracted interactive graphics stream, and writes the non-compressed graphics data to the IG plane at the timing of the presentation time (PTS). More specifically, the IG decoder includes a coded data buffer, a stream graphics processor, an object buffer, a composition buffer, and a composition controller. The coded data buffer stores functional segments read from the IG stream. The stream graphics processor obtains a graphics object by decoding the screen composition segment. The object buffer stores the graphics object obtained by the decoding. The composition buffer stores the screen composition segment. The composition controller decodes the screen composition segment stored in the composition buffer, and performs a screen composition on the graphics plane by using the graphics object stored in the object buffer, based on the control items included in the screen composition segment.

The primary audio decoder 127 has a buffer. While accumulating data in the buffer, the primary audio decoder 127 removes information such as a TS header and a PES header, and performs audio stream decode processing to obtain decompressed LPCM-state audio data. The primary audio decoder 127 outputs the obtained audio data to the audio mixer at the timings of presentation times (PTS). Possible compression encoding formats of the audio stream multiplexed on the AV clip include AC3 and DTS, and therefore the decoding scheme used to decode the compressed audio is changed in accordance with the stream attributes.

The secondary audio decoder 128 has the same structure as the primary audio decoder. The secondary audio decoder 128 performs decoding of an input secondary audio stream, and outputs resultant decompressed LPCM-state audio data to the audio mixer at the timing of presentation times. Possible compression encoding formats of the audio stream multiplexed on the AV clip include DolbyDigitalPlus and DTS-HD LBR, and therefore the decoding scheme used to decode the compressed audio is changed in accordance with the stream attributes.

The audio mixer 128a mixes the decompressed audio data output from the primary audio decoder and the decompressed audio data output from the secondary audio decoder with each other, and outputs the resultant audio to a speaker or the like.

The image processor 129 decodes graphics data (PNG or JPEG format) transferred from the program executing unit, and outputs the resultant decoded data to the image plane in accordance with a presentation time designated by the program executing unit.

The following describes the internal structure of the parent-screen video decoder 123. In FIG. 35, structural elements of the parent-screen video decoder 123 are assigned reference numbers in the 130s for the sake of understanding. More specifically, the parent-screen video decoder 123 includes a first TB 131, a first MB 132, a first EB 133, a second TB 134, a second MB 135, a second EB 136, a compressed video decoder 137, a buffer switch 138, and a DPB 139.

The first TB (Transport Buffer) 131 is a buffer in which TS packets of the base video stream output from the first PID filter 122a are temporarily stored as they are.

The first MB (Muliplexed Buffer) 132 is a buffer for storing PES packets temporarily when the base video stream is output from the first TB 131 to the first EB 133. When data is transferred from the first TB 131 to the first MB 132, the TS header of each TS packet is removed.

The first EB (Elementary Buffer) 133 is a buffer that stores a video access unit in an encoded state. When data is transferred from the first MB 132 to the first EB 133, the PES header is removed.

The second TB (Transport Buffer) 134 is a buffer in which TS packets of the enhancement video stream output from the second PID filter 122b are temporarily stored as they are.

The second MB (Muliplexed Buffer) 135 is a buffer for temporarily storing PES packets constituting the enhancement video stream when the enhancement video stream is output from the second TB 134 to the second EB 136. When data is transferred from the second TB 134 to the second MB 135, the TS header of each TS packet is removed.

The second EB (Elementary Buffer) 136 is a buffer that stores a video access unit of the enhancement video stream in an encoded state. When data is transferred from the second MB 135 to the second EB 136, the PES header is removed.

The compressed video decoder 137 generates a frame/field image by decoding each video access unit of the video elementary stream at a predetermined decoding time (DTS). The video stream to be multiplexed in an AV clip is encoded in a compression-encoding format such as MPEG2, MPEG4AVC, or VC1. Accordingly, the decoding method of the compressed video decoder 137 is changed depending on the attributes of the stream. The compressed video decoder 137 transfers the decoded frame/field image to the DPB (Decoded Picture Buffer) 139, and transfers a corresponding frame/field image to the picture switch at the timing of the presentation time (PTS).

The buffer switch 138 transfers the pictures stored in the first and second EBs to the compressed video decoder 137 at the timing of the decoding time (DTS). Here, the decode switch information obtained when the compressed video decoder 137 decodes a video access unit may be used to determine from which of the first EB or the second EB the next access unit is to be extracted.

The DPB (Decoded Picture Buffer) 139 is a buffer for storing the decoded frame/field images temporarily. The compressed video decoder 137 makes use of the DPB 139 to refer to pictures that have already been decoded when it decodes video access units such as a P picture and a B picture encoded by the inter-picture predictive encoding.

The following describes the internal structure of the plane memory set. In FIG. 35, structural elements of the plane memory set are assigned reference numbers in the 140s for the sake of understanding. More specifically, the plane memory set includes a child-screen video plane 141, a PG plane 142, an IG plane 143, an image plane 144, and a color depth extension plane 145.

The child-screen video plane 141 receives picture data for child-screen video output from the system target decoder 104.

The PG plane 142 stores graphics data that is obtained by decoding the presentation graphics stream and is output from the system target decoder 104.

The IG plane 143 stores graphics data that is obtained by decoding the interactive graphics stream and is output from the system target decoder 104.

The image plane 144 stores image data output from the system target decoder 104.

The color depth extension plane 145 stores non-compressed pictures by using a first allocation for storing picture data composed of 8-bit gradation bit sequences or a second allocation for storing picture data composed of 12-bit gradation bit sequences. The color depth extension plane 145 is set to the first allocation when the current mode is the normal playback mode. The color depth extension plane 145 is set to the second allocation when the current mode is the color depth extension mode.

Figure 36A:
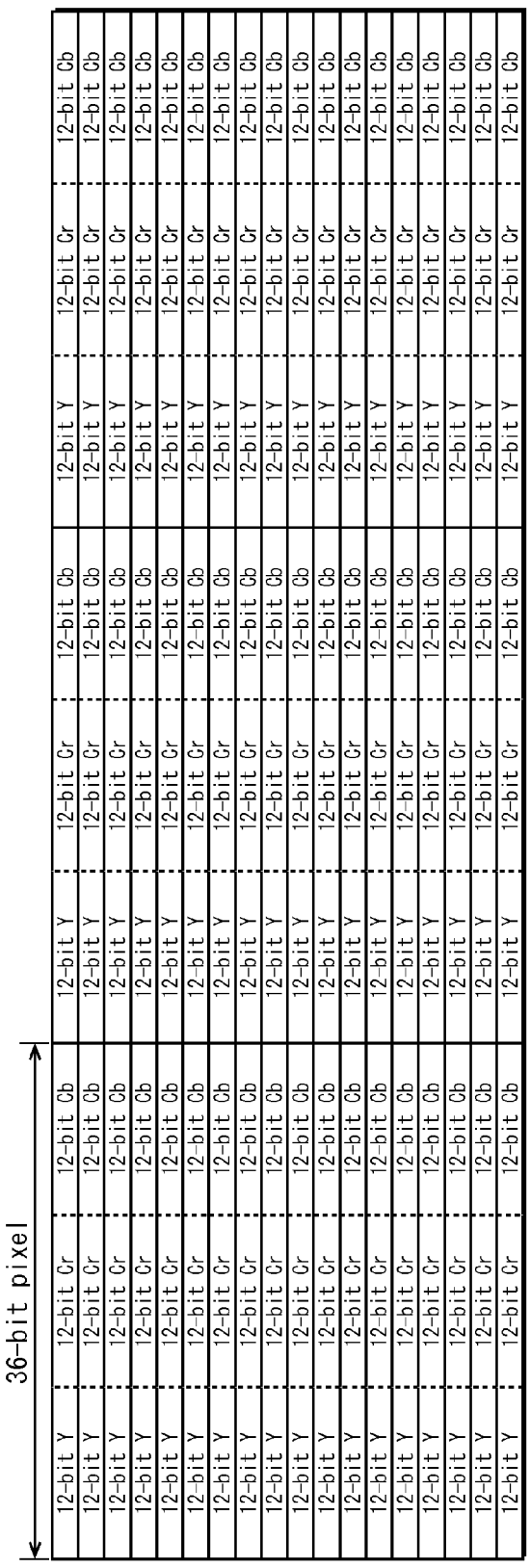
FIGS. 36A-36B illustrate one example of storage contents of the color depth extension plane.
Figure 36B:
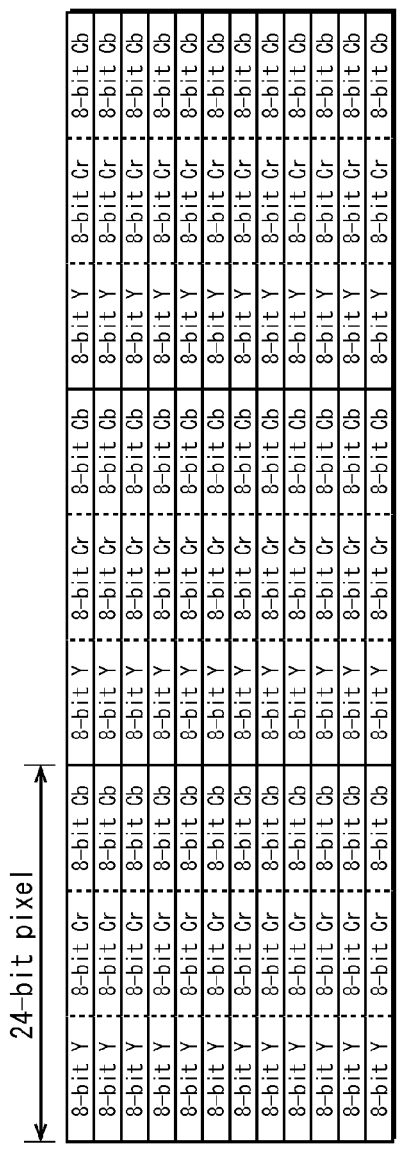

FIGS. 36A and 36B illustrate one example of storage form of the color depth extension plane. In FIGS. 36A and 36B, the storage area in the memory is drawn in a grid pattern. Each box in the grid pattern measure a storage element of the memory. When the plane memory is a dynamic RAM such as SD-RAM or RD-RAM, each of the storage elements is identified b a row address and a column address, wherein the row address is a page area in the dynamic RAM, and the column address is a relative address of the storage element in the page area, each storage element having a word length of 32 bits. Accordingly, the gradation bit sequences of each pixel constituting a picture are stored in a set of storage elements in a page area. The plane memory is connected with a memory controller. The memory controller plays a role of converting (x,y) coordinates on the screen into row and column addresses of the storage element. Each pixel is composed of components such as the luminance Y, red color difference Cr, and blue color difference Cb. In the plane memory, the values of a same component common to plurality of pixels, such as values of the luminance of a plurality of pixels, or values of the red color difference of a plurality of pixels, are stored in a same page area.

FIG. 36A illustrates the allocation for the color depth extension. As illustrated in FIG. 36A, in the color depth extension mode, a set of pixel data composed of a 12-bit luminance Y value, a 12-bit red color difference Cr value, and a 12-bit blue color difference Cb value is stored in the scale of 1920×1080, 1280×720 or the like. FIG. 36B illustrates the allocation for the non-color-depth extension. In this allocation, 8-bit gradation bit sequences constituting a picture of the base video stream are stored. Compared with the non-color-depth-extension mode, in the color depth extension mode, the bit length increases from 24 bits to 36 bits, and the scale of the plane memory is 1.5 times the scale in the non-color-depth-extension mode.

The system target decoder has an internal structure for using MPEG-4MVC as the video codec for the color depth extension. MPEG-4MVC (Multiview Video Coding) is a video compression technology developed for the purpose of efficiently compressing a plurality of video streams of images seen from a plurality of viewing positions. The system target decoder is structured to comply with MPEG-4MVC. More specifically, the base view of MPEG-4MVC is used as the base video stream, and the non-base view of MPEG-4MVC is used as the enhancement video stream. An MPEG-4MVC video stream, which is composed of the base video stream and the non-base video stream of MPEG-4MVC, is input into an MPEG-4MVC decoder. An 8-bit base picture and an 8-bit enhancement picture are output from the MPEG-4MVC decoder and are input into the color depth extension unit.

Figure 37:
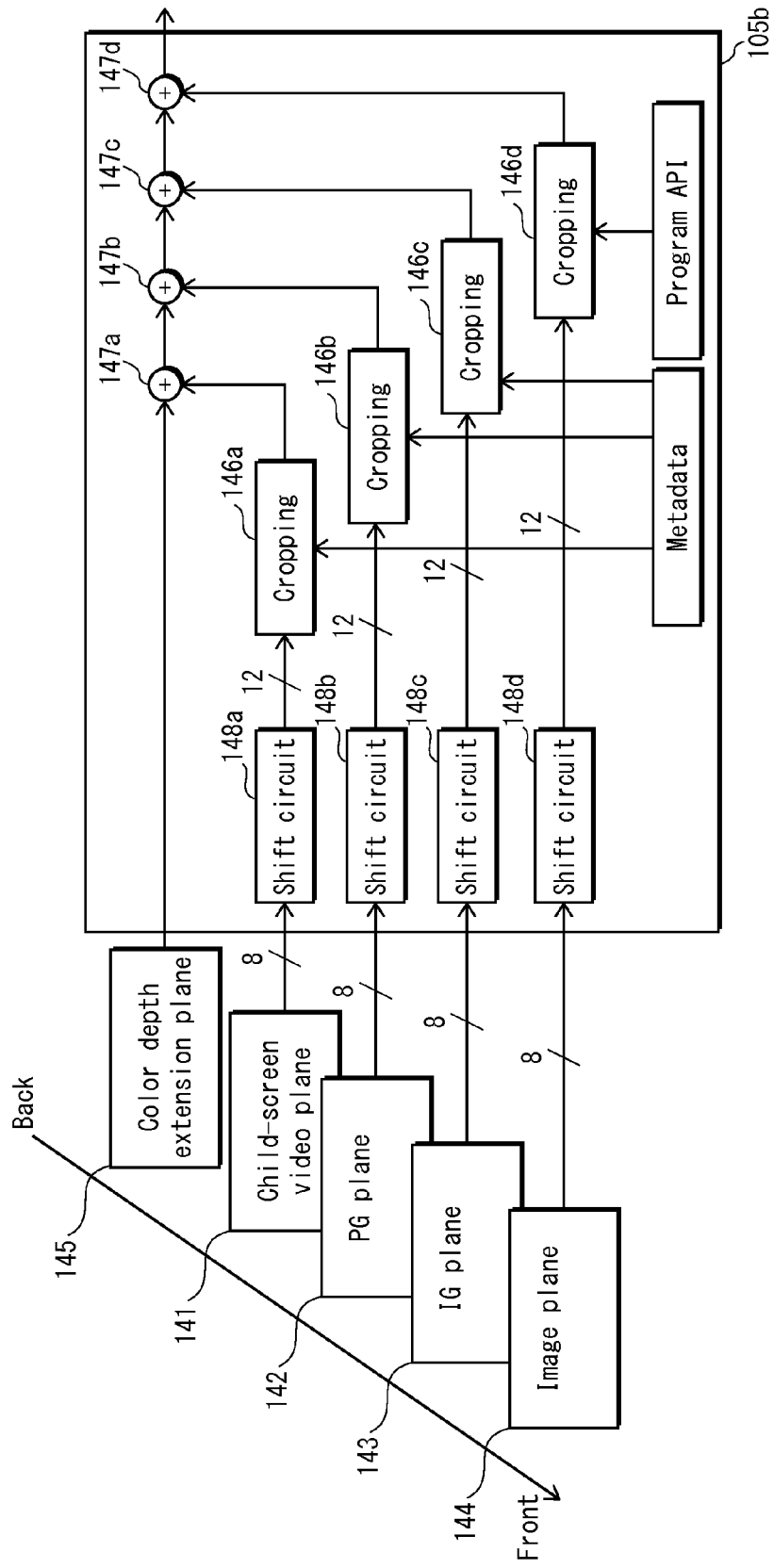
FIG. 37 is a diagram illustrating the internal structure of the plane adder.

FIG. 37 is a diagram illustrating the internal structure of the plane adder.

The plane adder performs cropping of metadata with each of the child-screen video plane, PG plane, and IG plane, adds the cropping results to the color depth extension plane, and transfers the result to the image plane superimposing process. Cropping units 146a, 146b and 146c perform cropping of the non-compressed picture data and graphics data stored in the planes, based on the metadata. Cropping unit 146d performs cropping of the non-compressed graphics data stored in the image plane, based on the program API.

Adders 147a, 147b, 147c and 147d add the planes.

Shift circuits 148a, 148b, 148c and 148d extend the pixel values of the child-screen video plane, PG plane, IG plane, and image plane, from eight bits to N bits, respectively. The extension of the pixel gradation bit sequences to N bits makes it possible for them to be combined with the picture data that has been extended to N bits.

Figure 38:
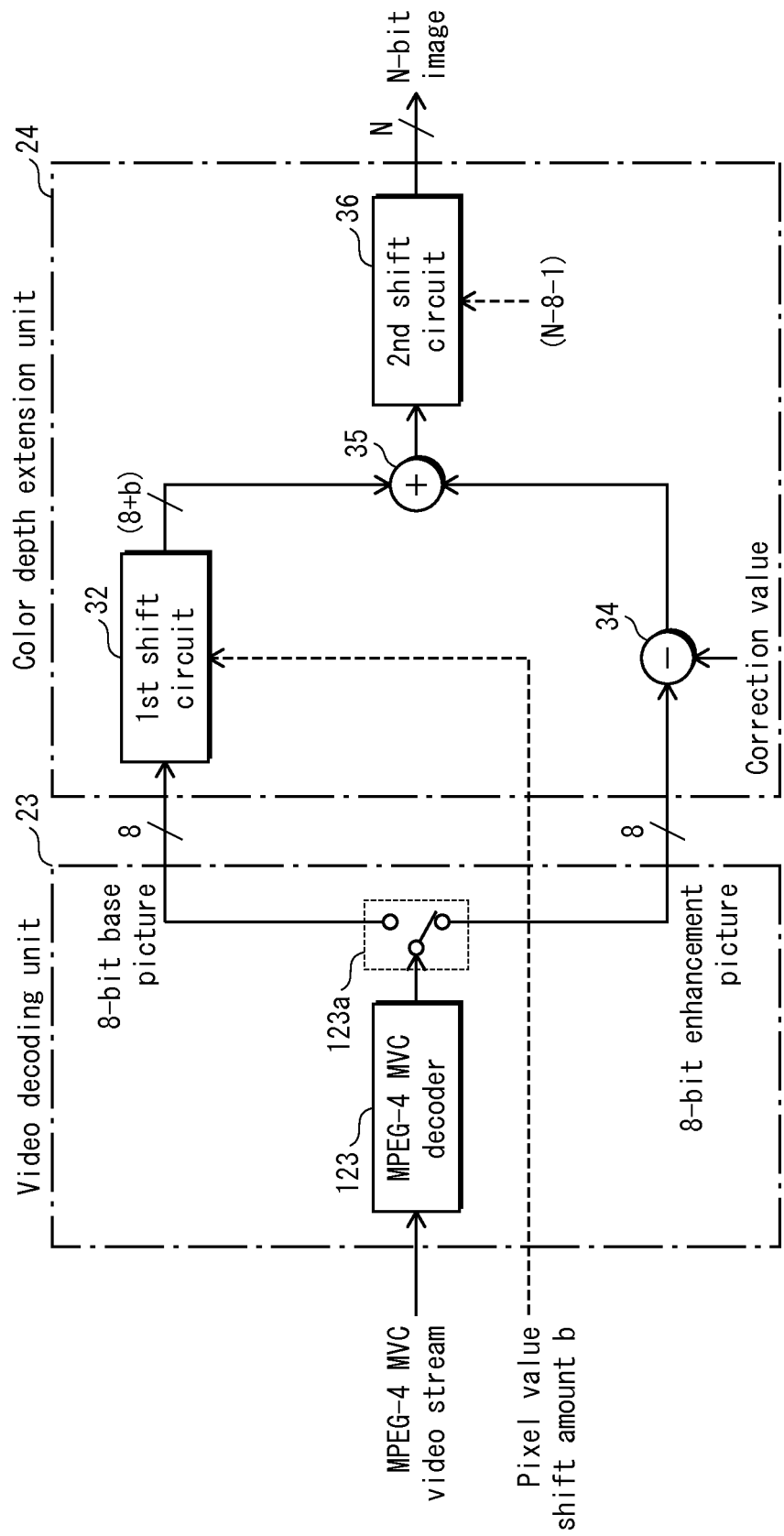
FIG. 38 illustrates one example of the internal structure of the color depth extension unit 24 in the case where it is applied to the playback device.

FIG. 38 illustrates one example of the internal structure of the color depth extension unit 24 in the case where it is applied to the playback device. As illustrated in FIG. 38, the color depth extension unit 24 includes: a first shift circuit 32 for converting 8-bit pictures of the base video stream into (8+b)-bit pictures; a subtractor 34 for subtracting a correction value from each 8-bit sequence of the enhancement video stream; an adder 35 for adding (8+b)-bit pictures of the base video stream to the subtraction results of the subtractor 34; and a second shift circuit 36 for obtaining N-bit pictures by shifting the addition results of the adder 35 by the shift amount b.

In FIG. 38, when the current presentation time (PTM), which is managed by the player status register of the playback device, reaches the time indicated by the PTS the video decoder, the video decoder, prior to the display of a piece of base video picture data, to which the PTS has been attached, extracts a shift amount corresponding to the piece of base video picture data from the SEI shift sequence, and set the shift amount in the shift circuit of the color depth extension unit. The video decoder also outputs a picture of the enhancement video stream, which has a PTS indicating the same time as that PTS, to the plane memory. After these, a picture of the base video stream is output as a target of the color depth extension. This causes the pixel bit value of the picture of the base video stream to be shifted toward the MSB by the shift amount of the frame to which the picture of the base video stream belongs.

Figure 39:
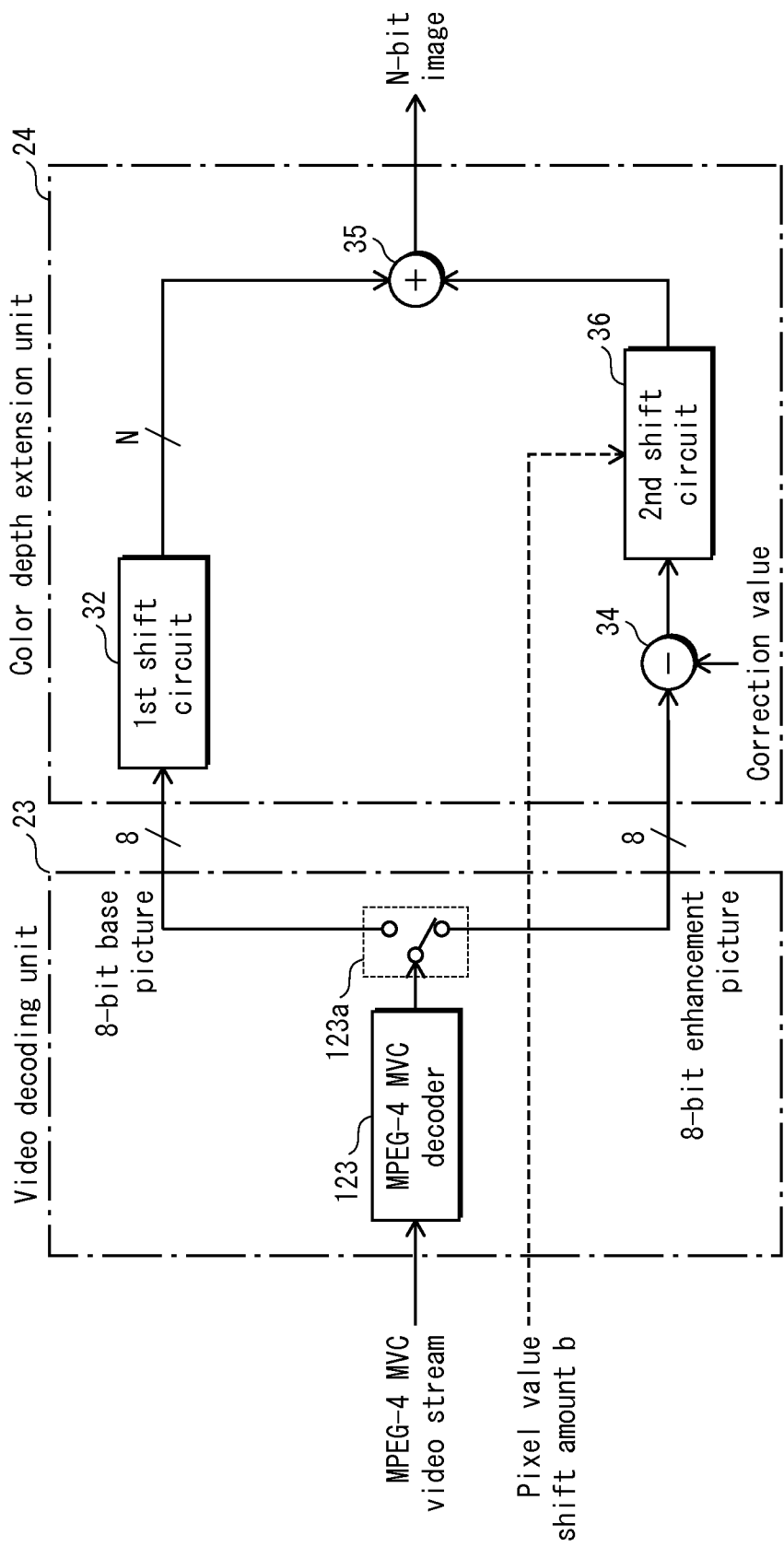
FIG. 39 illustrates one example of the internal structure of the color depth extension unit 24 in a variation of Embodiment 1.

FIG. 39 illustrates one example of the internal structure of the color depth extension unit 24 in a variation of Embodiment 1. As illustrated in FIG. 39, the color depth extension unit 24 includes: the first shift circuit 32 for converting 8-bit pictures of the base video stream into (8+b)-bit pictures; the subtractor 34 for subtracting a correction value from each 8-bit sequence of the enhancement video stream; the second shift circuit 36 for shifting the subtraction results of the subtractor 34 by the shift amount b; and the adder 35 for adding (8+b)-bit pictures of the base video stream to the shift results of the second shift circuit 36.

The merit of using MPEG-4MVC for the color depth extension is that, since MPEG-4MVC has already been used in Blu-ray for recording/displaying of 3D images, it is easy to perform the color depth extension by using part of the hardware resources of a player supporting "Blu-ray 3D".

Figure 40:
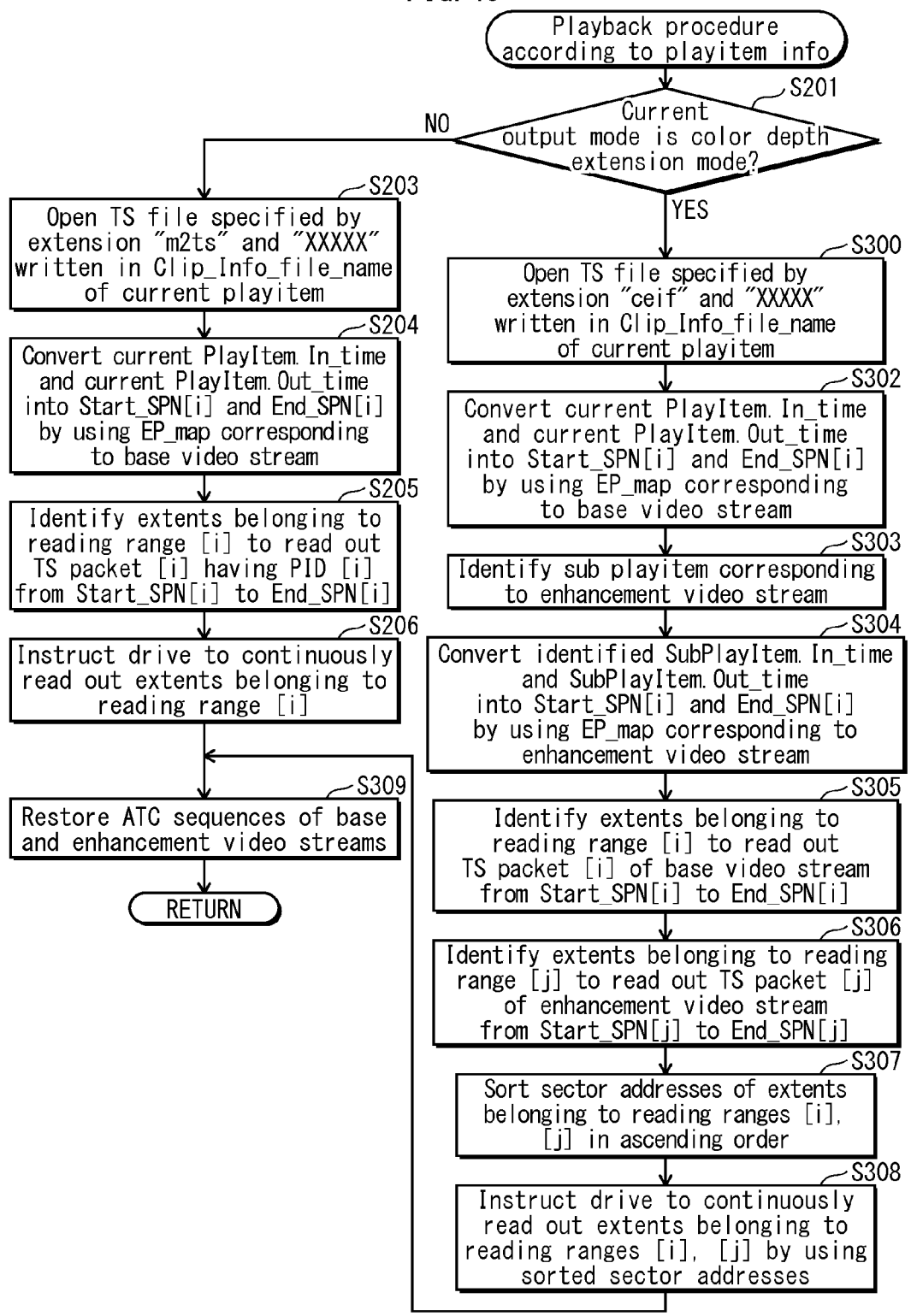
FIG. 40 illustrates a playback procedure of a playitem.

In the development of the product of the above-described playback device, it is necessary to cause the CPU of the playback device to execute a processing procedure for processing the above-described playlist, playitem, and AV clip. The following describes the processing procedure that is necessary in this software implementation. FIG. 40 illustrates a playback procedure of a playitem.

In step S201, it is judged whether or not the current output mode is the color depth extension mode. When it is judged that the current output mode is the non-color-depth-extension mode, steps S203 to S206 are executed.

In step S203, a stream file specified by extension "m2ts" and "XXXXX" written in Clip_Information_file_name of the current playitem is opened. In step S204, the current PlayItem.In_time and the current PlayItem.Out_time are converted into Start_SPN[i] and End_SPN[i] by using the entry points corresponding to the packet ID of the video stream.

In step S205, extents belonging to a reading range [i] are identified to read out TS packet [i] having packet ID [i] from Start_SPN[i] to End_SPN[i]. In step S206, the drive of the recording medium is instructed to continuously read out extents belonging to the reading range [i].

When it is judged that the current output mode is the color depth extension mode, the control proceeds to a loop composed of steps S301 to S308.

In step S300, a stream file specified by extension "ceif" and "XXXXX" written in Clip_Information_file_name of the current playitem is opened.

In step S302, the current PlayItem.In_time and the current PlayItem.Out_time are converted into Start_SPN[i] and End_SPN[i] by using the basic entry map corresponding to the base video stream.

In step S303, a sub playitem corresponding to the enhancement video stream is identified. In step S304, SubPlayItem-In_time and SubPlayItemOut_time are converted into Start_SPN[j] and End_SPN[j] by using the enhancement entry map corresponding to the enhancement video stream.

In step S305, extents belonging to the reading range [i] are identified to read out TS packet [i] of the base video stream from Start_SPN[i] to End_SPN[i]. In step S306, extents belonging to the reading range [j] are identified to read out TS packet [j] of the packet ID [j] from Start_SPN[j] to End_SPN [j]. In step S307, the drive is instructed to sort the extents belonging to the reading ranges [i], [j], in the order of addresses. In step S308, the drive is instructed to continuously read out extents belonging to the reading ranges [i], [j], by using the sorted addresses. Subsequently, after a source packet sequence is read out, in step S309, ATC sequences of the base video stream and enhancement video stream are restored, and the restored ATC sequences are supplied to PID filters for the base video and enhancement video, respectively.

Figure 41:
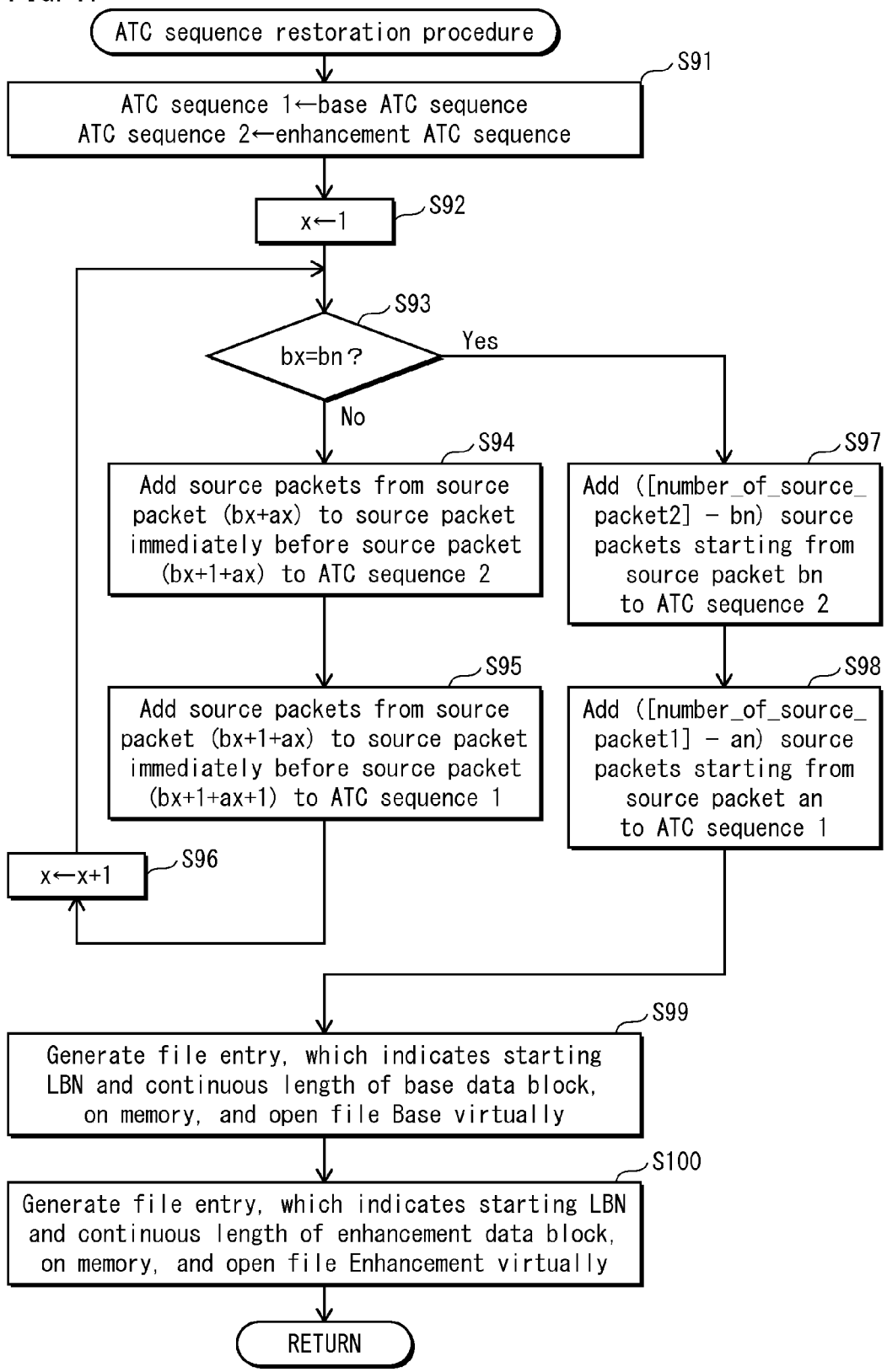
FIG. 41 illustrates the ATC sequence restoration procedure.

FIG. 41 illustrates the ATC sequence restoration procedure. In step S91, the ATC sequence 1 is set as the ATC sequence for base video, and the ATC sequence 2 is set as the ATC sequence for enhancement video. In step S92, variable x is initialized to 1. The variable x specifies an enhancement data block and a base data block. After this, the control enters a loop composed of steps S93 to S96.

In this loop, the following process is repeated until it is judged Yes in step S93: it is judged whether a source packet number bx specified by the variable x is a source packet number bn specified by the last value n in the base data block (step S93); when it is judged No in step S93, a sequence of source packets from a source packet (bx+ax), which is specified by source packet number "bx+ax", to a packet immediately before a source packet (bx+1+ax), which is specified by source packet number "bx+1+ax", are added to the ATC sequence 2 (step S94); a sequence of source packets from a source packet (bx+1+ax) to a packet immediately before a source packet (bx+1+ax+1) are added to the ATC sequence 1 (step S95); and the variable x is incremented (step S96).

When it is judged Yes in step S93, a sequence of ([number_of_source_packet2]–bn) source packets starting from a source packet bn are added to the ATC sequence 2 (step S97). Subsequently, a sequence of ([number_of_source_packet1]–an) source packets starting from a source packet "an" are added to the ATC sequence 1 (step S98).

After the ATC sequences 1 and 2 are restored by the above process, a file entry, which indicates the starting LBN and the continuous length of the base data block, is generated on the memory, and a file Base is opened virtually (step S99). Similarly, a file entry, which indicates the starting LBN and the continuous length of the enhancement data block, is generated on the memory, and a file Enhancement is opened virtually (step S100).

To cause the playback device, which performs the above-described playback control, to play back a playlist adapted to the color depth extension, the following improvements need to be made on the index table and the program file.

Figure 42:
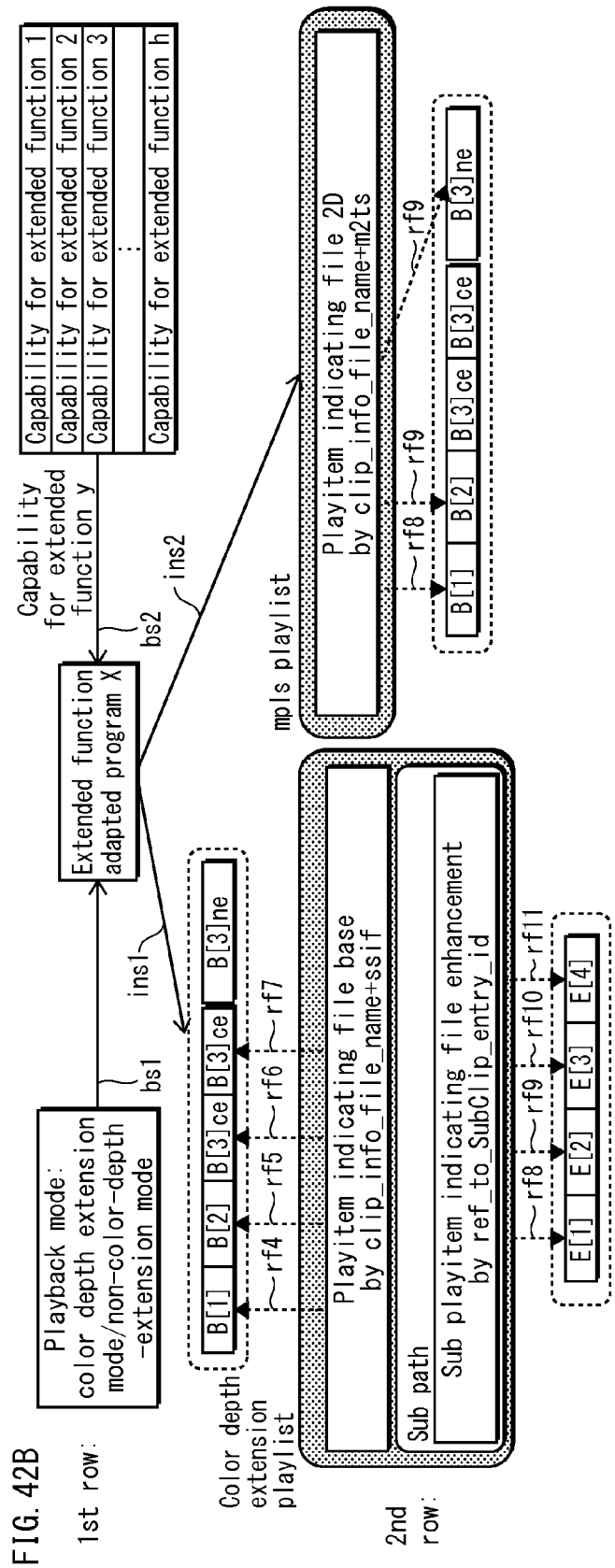
FIGS. 42A and 42B illustrate one example of the internal structure of the index table.

First, the improvements on the index table are explained. FIGS. 42A and 42B illustrate one example of the internal structure of the index table. As illustrated in FIG. 42A, the index table indicates correspondence between a plurality of titles and a plurality of program files, wherein a title makes a pair with a program file that is a processing target when the title is the current title. In this example, identifiers of (n+2) color depth extension adapted program files respectively corresponding to (n+2) titles are indicated. With this structure, when a title is selected, a corresponding color depth extension adapted program is activated. The above index table enables a color depth extension adapted program to be activated immediately after the First Play title is selected.

FIG. 42B schematically illustrates processing by an extended function program. The first row of FIG. 42B illustrates correspondence among a playback mode set in the player status register, an extended function adapted program, and an extended function capability register. The second row of FIG. 42B illustrates a color depth extension playlist and an mpls playlist. The arrows ins1 and ins2 schematically illustrate playlist playback instructions issued by the program. In this way, the extended function adapted program selectively plays back one of the two playlists by referencing the register based on the playback mode. This enables a pair of base video stream and enhancement video stream to be played back appropriately by using the color depth extension playlist.

Figure 43:
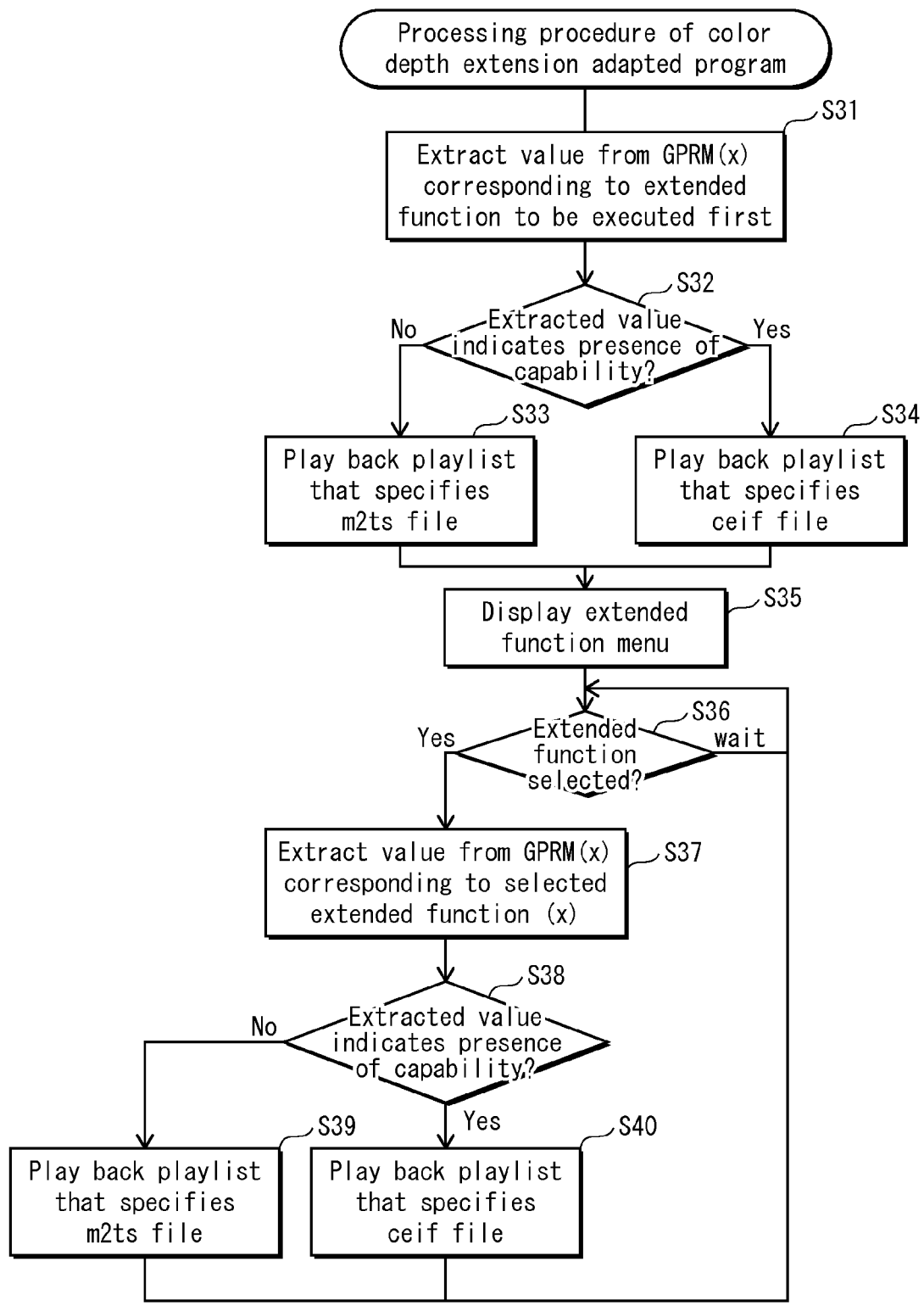
FIG. 43 is a flowchart illustrating processing procedure of the color depth extension adapted program.

FIG. 43 is a flowchart illustrating processing procedure of the color depth extension adapted program. In step S31, a value is extracted from a GPRM that corresponds to an extended function to be executed first. In step S32, it is judged whether the value extracted from the GPRM indicates that the capability is present. When it is judged that the value indicates that the capability is present, the control proceeds to step S34, in which a playlist, which specifies a color depth extension interleaved stream file, starts to be played back. When it is judged in step S32 that the value indicates that the capability is not present, the control proceeds to step S33, in which a playlist, which specifies an m2ts stream file, starts to be played back.

In step S35, an extended function menu is displayed. In step S36, selection of an extended function by the user is waited. After an extended function is selected, a value is extracted from a GPRM that corresponds to the selected extended function, and in step S38, it is judged whether the extracted value indicates that the capability is present. When it is judged that the value indicates that the capability is present, the control proceeds to step S40, in which a playlist, which specifies a color depth extension interleaved stream file, starts to be played back. When it is judged in step S38 that the value indicates that the capability is not present, the control proceeds to step S39, in which a playlist, which specifies an m2ts stream file, starts to be played back.

As described above, when the GPRM indicates that the capability for the extended function is present, the program of the program file selects and plays back a color depth extension interleaved stream file. Accordingly, only when the capability for the extended function is present, playback of a color depth extension adapted playlist is executed, and when the capability is not present, a normal playlist is selected and played back.

This completes the explanation of the playback device.

(Format of Recording Device/Method)

Next, a description is given of the recording method for writing the base video stream and the enhancement video stream of the present embodiment onto a disc medium such as the Blu-ray WriteOnce disc, Blu-ray Rewritable disc, or AVC-HD disc.

The recording method of the present embodiment can be realized as a real-time recording in which, when an original image having an N-bit grayscale bits is input, AV files (stream files) and non-AV files (files other than the stream files) are generated in real time, and are written directly into the AV data recording area and the non-AV data recording area provided in the recording medium. However, not limited to this, the recording method of the present embodiment can be realized as a pre-format recording in which bit streams to be recorded into the volume area are generated in advance, a master disc is generated based on the bit streams, and the master disc is pressed, thereby making possible a mass production of the optical disc. The recording method of the present embodiment is applicable to either the real-time recording or the pre-format recording. When the recording method is to be realized by the real-time recording technology, the recording device for performing the recording method creates an AV clip in real time and stores the AV clip into the Blu-ray WriteOnce disc, Blu-ray Rewritable disc, or AVC-HD disc.

The recording device for executing the real-time recording may be a camera including: an imaging unit for performing shooting using an optical apparatus and obtaining original image data whose color gradation is represented by N-bit gradation values; a stream generating unit for obtaining a pair of a base video stream and an enhancement video stream by encoding the original image data; an audio encoder for obtaining an audio stream by encoding audio signals; a multiplexer for obtaining a digital stream conforming to MPEG-TS by multiplexing a video stream, an audio stream and the like; a source packetizer for converting TS packets constituting the digital stream into source packets; a writing unit for storing an MPEG2 digital stream composed of the converted source packets into an AV clip and writing the AV clip onto a Blu-ray WriteOnce disc, a Blu-ray Rewritable disc, an AVC-HD disc or the like; and a control unit. The control unit of the recording device performs a process for generating clip information and playlist information on a memory, as well as writing of the digital stream. More specifically, when requested by the user to perform a recording process, the control unit creates a clip information file and a stream file for an AV clip on a Blu-ray WriteOnce disc, a Blu-ray Rewritable disc, or an AVC-HD disc. Subsequently, after the encoder generates a GOP of the video stream, the control unit of the recording device obtains (i) a PTS of an intra picture at the head of the GOP and (ii) a packet number of a source packet storing the head portion of the GOP, and describes the pair of PTS and packet number in the entry map of the clip information file as a pair of EP_PTS entry and EP_SPN entry. Subsequently, each time a GOP is generated, a pair of EP_PTS entry and EP_SPN entry is described in the entry map of the clip information file. During this process, when the head portion of the GOP is an IDR picture, the "is_angle_change" flag that has been set ON is added to the pair of EP_PTS entry and EP_SPN entry. When the head portion of the GOP is not an IDR picture, the "is_angle_change" flag that has been set OFF is added to the pair of EP_PTS entry and EP_SPN entry.

Also, setting of the stream attribute information in the clip information file is performed based on the attributes of the stream to be recorded. After an AV clip and clip information are generated and written onto the Blu-ray WriteOnce disc, Blu-ray Rewritable disc, AVC-HD disc as described above, playlist information that defines the playback path is generated via the basic entry map in the clip information and is written onto the Blu-ray WriteOnce disc, Blu-ray Rewritable disc, AVC-HD disc. Performing the above-described process by the real-time recording technique makes it possible to create a hierarchical structure which is composed of, from top to bottom, AV clip, clip information, and playlist information on the Blu-ray WriteOnce disc, Blu-ray Rewritable disc, or AVC-HD disc when the shooting is performed.

This completes the explanation of the recording device for executing the real-time recording. The following describes the recording method by the pre-format recording.

The recording method by the pre-format recording is an optical disc manufacturing method in which the recording device executes the authoring step. The recording device for executing the authoring step includes: an inport unit for inputting an original image whose color gradation is represented by N-bit values, video material for the child-screen video, audio material, subtitle material, and menu material; a stream generating unit for generating a base video stream and an enhancement video stream from the original image; a child-screen video encoder for encoding the video material for the child-screen video; an audio encoder for encoding the audio material; a PG generator for generating a PG stream from the subtitle material; an IG generator for generating an interactive graphics stream from the menu material; storages for storing the generated various types of streams after they are classified according to the file system; a multiplexer for obtaining a transport stream by multiplexing the generated various types of streams; and an authoring unit for defining, in accordance with an interactive input from the user, a stream playback structure of the data to be recorded on a Blu-ray ReadOnly disc, and based on the stream playback structure, generating a volume image in the Blu-ray ReadOnly disc.

The above storages are network drives in a campus network, and the video stream, audio stream and the like are stored as files in a predetermined directory structure in the storages. The encoder is a server computer in the campus network, accesses the storages via the campus network, and, for example, read the various types of streams and write the transport stream to/from the storages.

The files containing the video stream, audio stream, subtitle stream, transport stream and the like and being stored in the storages in the campus network are visually represented as icons, thumbnails or the like by the GUI. The user can execute various editing operations, such as copying and deleting, onto the video stream, audio stream, subtitle stream, transport stream and the like by performing operations such as dragging, dropping, clicking and the like onto the icons or thumbnails displayed by the GUI which is a user interface.

Figure 44A:
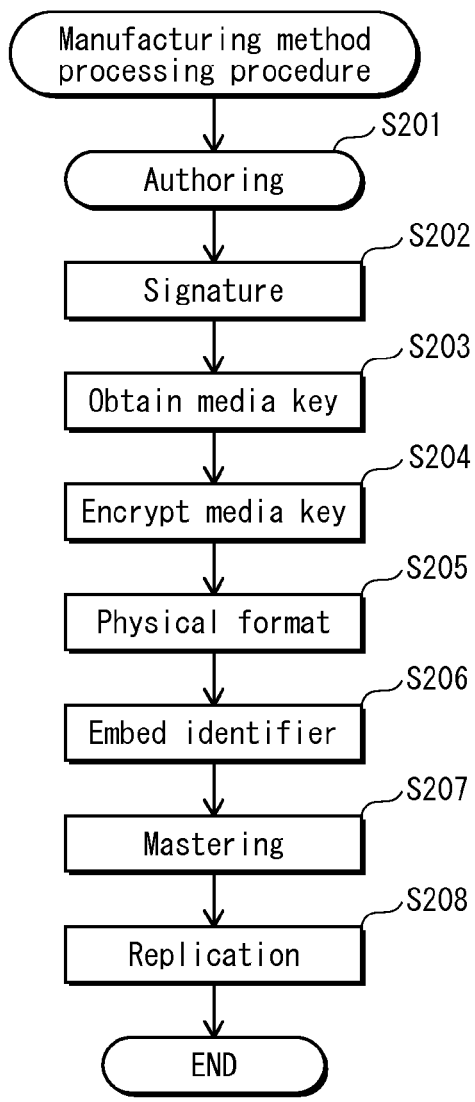
FIGS. 44A and 44B illustrate the recording method of an optical disc.
Figure 44B:
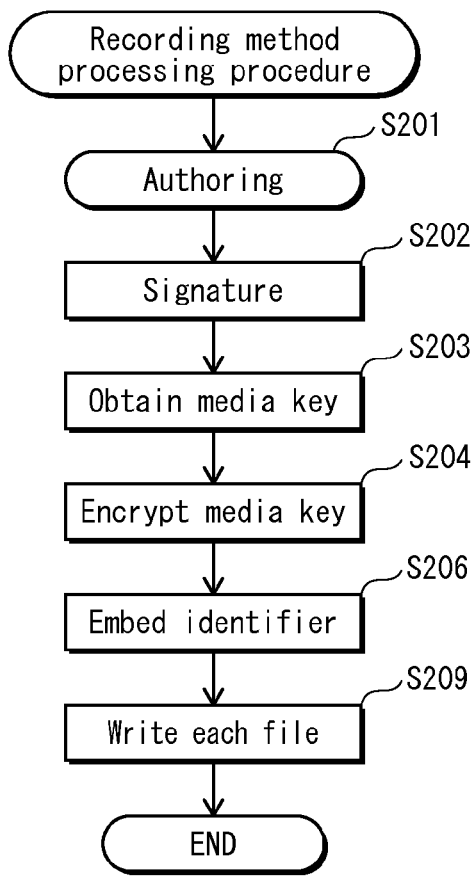

FIGS. 44A and 44B illustrate the recording method of an optical disc. FIG. 44A is a flowchart of the recording method by the pre-format recording and illustrates the procedure of the optical disc manufacturing method. The optical disc manufacturing method includes the authoring step, signature step, media key obtaining step, media key encrypting step, physical format step, identifier embedding step, mastering step, and replication step.

In the authoring step S201, a bit stream representing the whole volume area of the optical disc is generated.

In the signing step S202, a request for signature is made to the AACS LA to manufacture the optical disc. More specifically, a portion of the bit stream is extracted and sent to the AACS LA. Note that the AACS LA is an organization for managing the license of the copyrighted work protection technologies for the next-generation digital household electric appliances. The authoring sites and mastering sites are licensed by the AACS LA, where the authoring sites perform authoring of optical discs by using authoring devices, and the mastering sites execute mastering by using mastering devices. The AACS LA also manages the media keys and invalidation information. Subsequently, the portion of the bit stream to which a signature has been attached by the AACS LA is obtained.

In the media key obtaining step S203, a media key is obtained from the AACS LA. The media key provided from the AACS LA is not fixed to a predetermined one, but is updated to a new one when the number of manufactured optical discs reaches a certain number. The update of the media key makes it possible to exclude certain manufacturers or devices, and to invalidate an encryption key by using the invalidation information even if the encryption key is cracked.

In the media key encrypting step S204, a key used for encrypting a bit stream is encrypted by using the media key obtained in the media key obtaining step.

In the physical format step S205, the physical formatting of the bit stream is performed.

In the identifier embedding step S206, an identifier, which is unique and cannot be detected by ordinary devices, is embedded as an electronic watermark into the bit stream to be recorded on the optical disc. This prevents mass production of pirated copies by unauthorized mastering.

In the mastering step S207, a master disc of the optical disc is generated. First, a photoresist layer is formed on the glass substrate, a laser beam is radiated onto the photoresist layer in correspondence with desired grooves or pits, and then the photoresist layer is subjected to the exposure process and the developing process. The grooves or pits represent values of the bits constituting the bit stream that has been subjected to the eight-to-sixteen modulation. After this, the master disc of the optical disc is generated based on the photoresist whose surface has been made uneven by the laser cutting in correspondence with the grooves or pits.

In the replication step S208, copies of the optical disc are produced by a mass production by using the master disc of the optical disc. FIG. 44B illustrates the procedure of the recording method by the pre-format recording when a general user records any of the various files described in the embodiment so far onto a recording medium such as BD-R or BD-RE by using a personal computer, not when the optical disc is mass-produced. Compared with FIG. 44A, in the recording method shown in FIG. 44B, the physical format step S205, mastering step S207 and replication step S208 have been omitted, and each file writing step S209 has been added.

Figure 45:
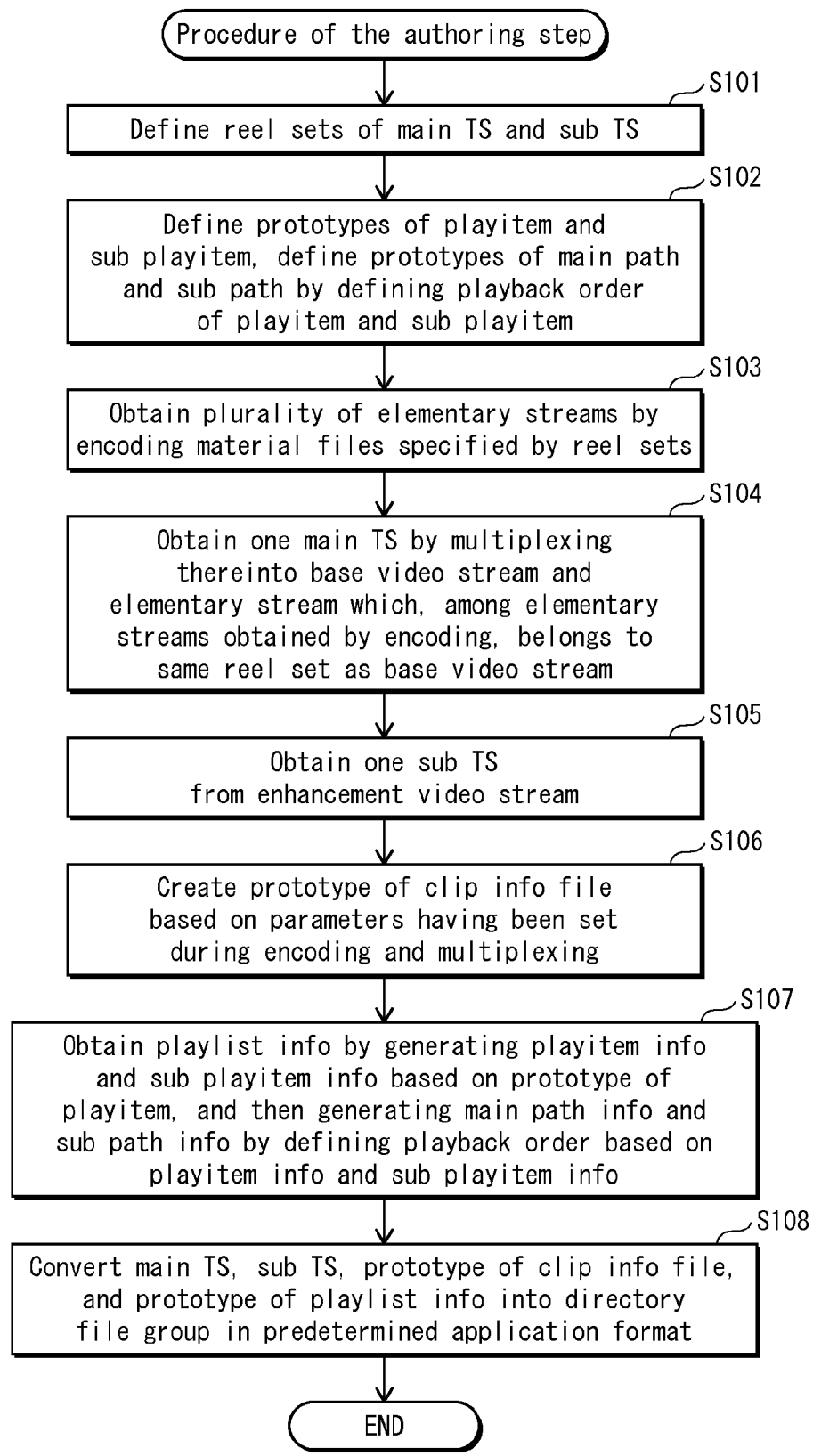
FIG. 45 is a flowchart illustrating processing procedure of the authoring step.

Next, the authoring step is explained. FIG. 45 is a flowchart illustrating processing procedure of the authoring step.

In step S101, the reel sets of the main TS and sub TS are defined. A "reel" is a file which stores the material data of an elementary stream. In the authoring system, the reels exist on a drive on a local network. The reels are data representing, for example, images shot by a camera, audio recorded at the shooting, audio recorded after the shooting, subtitles for each language, and menus. A "reel set" is a group of links to the material files, representing a set of elementary streams to be multiplexed into one transport stream. In this example, a reel set is defined for each of the main TS and the sub TS.

In step S102, the prototypes of playitem and sub playitem are defined, and the prototypes of the main path and sub path are defined by defining a playback order of playitem and sub playitem. The prototype of the playitem can be defined by receiving, via a GUI, a specification of a reel that is permitted to be played back by a targeted playitem in the monoscopic playback mode, and a specification of In_Time and Out_Time. The prototype of the sub playitem can be defined by receiving, via a GUI, a specification of a reel that is permitted to be played back by a playitem corresponding to a targeted sub playitem in the stereoscopic playback mode, and a specification of In_Time and Out_Time.

For the specification of a reel to be permitted to be played back, a GUI is provided to make it possible to check a check box corresponding to, among the links to the material files in the reel set, a link to a material file permitted to be played back. With this GUI, numeral input columns are displayed in correspondence with the reels. With use of the numeral input columns, the priority of each reel is received, and based on this, the priorities of the reels are determined. With the setting of the reels permitted to be played back and the setting of the priorities, the stream selection table and the extension stream selection table are generated.

The specification of In_Time and Out_Time is performed when the recording device executes the process in which the time axis of the base video stream or the enhancement video stream is displayed as a graphic on the GUI, a slide bar is moved on the graphic of the time axis, and specification of a positional setting of the slide bar is received from the user. The definition of the playback order of the playitem and the sub playitem is realized by the following process: a picture at In_Time of the playitem is displayed as a thumbnail on the GUI, and the recording device receives from the user an operation made onto the thumbnail to set the playback order.

In step S103, a plurality of elementary streams are obtained by encoding the material files specified by the reel sets. With this encoding step, the process of generating the base video stream and the enhancement video stream form the original image is realized. The plurality of elementary streams include the base video stream and the enhancement video stream, and the audio stream, PG stream, and IG stream that are to be multiplexed with the base video stream and the enhancement video stream.

In step S104, one main TS is obtained by multiplexing thereinto the base video stream and an elementary stream which, among the elementary streams obtained by the encoding, belongs to the same reel set as the base video stream.

In step S105, one sub TS is obtained by multiplexing thereinto the enhancement video stream and an elementary stream which, among the elementary streams obtained by the encoding, belongs to the same reel set as the enhancement video stream. In step S106, the prototype of the clip information file is created based on the parameters having been set during the encoding and multiplexing.

In step S107, the playlist information is defined by generating the playitem information and the sub playitem information based on the prototype of the playitem, and then generating the main path information and the sub path information by defining the playback order based on the playitem information and the sub playitem information.

In the generation of the playitem information, the stream selection table is generated in the playitem information so that, among the elementary streams multiplexed in the main TS, elementary streams that are defined, in the basic structure of the playitem, to be played back in the 2D playback mode are set to "playable". Also, to define the playback section in the base video stream, the In_TIme and Out_TIme having been defined by the above-described editing are written in the playitem information.

In the generation of the sub playitem information, the extension stream selection table is generated in the extension data of the playlist information so that, among the elementary streams multiplexed in the sub TS, elementary streams that are defined, in the basic structure of the playitem, to be played back in the color depth extension mode are set to "playable". The playitem information and the sub playitem information are defined based on information in the clip information file, and thus are set based on the prototype of the clip information file.

In step S108, the main TS, sub TS, prototype of the clip information file, and prototype of the playlist information are converted into a directory file group in a predetermined application format.

Through the above-described processes, the main TS, sub TS, clip information, playitem information, and sub playitem information are generated. Then the main TS and the sub TS are converted into respective independent stream files, the clip information is converted into the clip information file, and the playitem information and the sub playitem information are converted into the playlist information file. In this way, a set of files to be recorded onto the recording medium are obtained.

Figure 46:
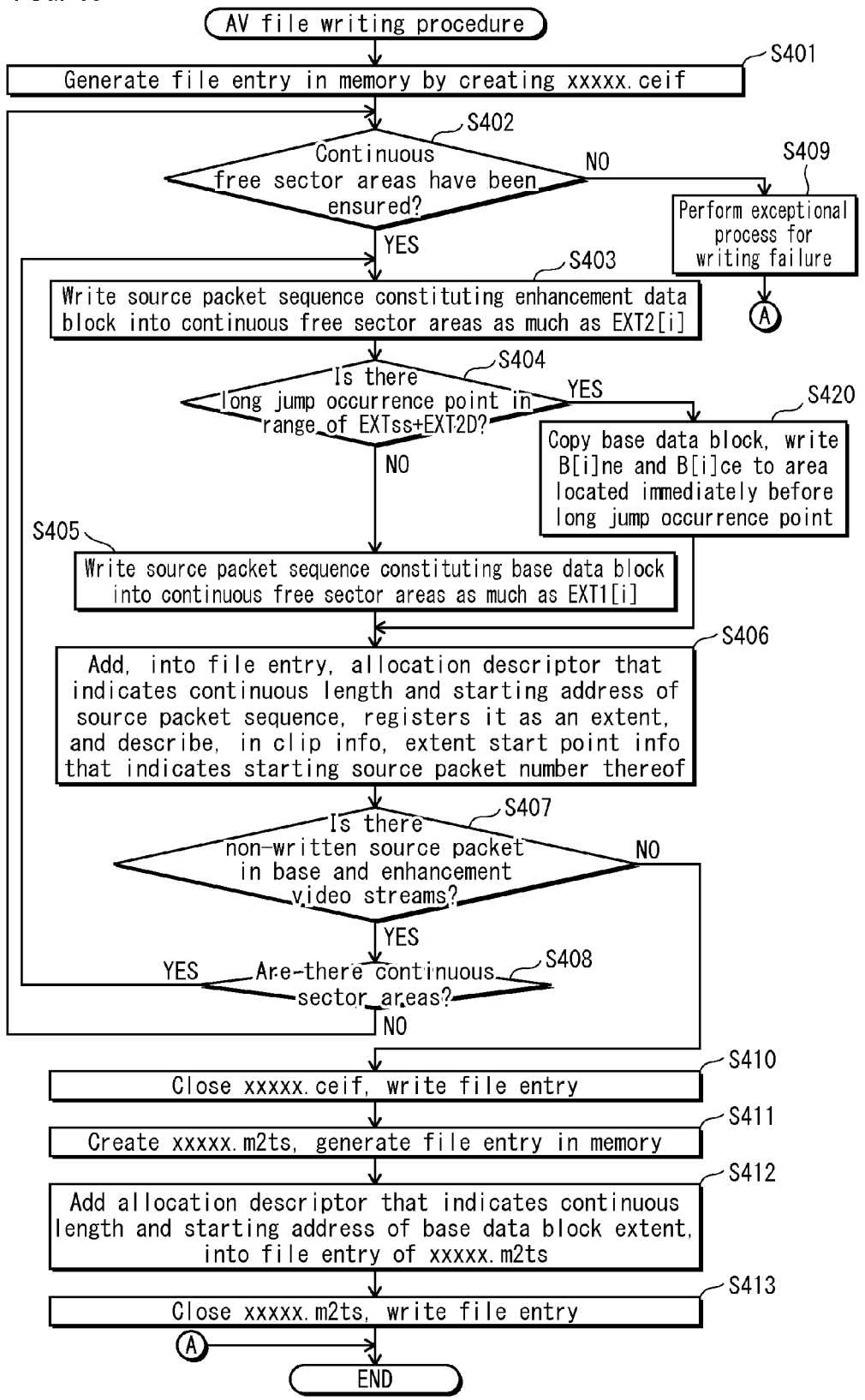
FIG. 46 is a flowchart illustrating the AV file writing procedure.

FIG. 46 is a flowchart illustrating the AV file writing procedure. The AV files are written according to this flowchart when the recording method by the real-time recording or the recording method including the mastering or replication is implemented.

In step S401, the recording device generates the file entry in the memory of the recording device by creating "xxxxx.ceif". In step S402, it is judged whether the continuous free sector areas have been ensured. When the continuous free sector areas have been ensured, the control proceeds to step S403 in which the recording device writes the source packet sequence constituting the enhancement data block into the continuous free sector areas as much as EXT2[i]. After this, steps S404 through S408 are executed. When it is judged in step S402 that the continuous free sector areas have not been ensured, the control proceeds to step S409 in which the exceptional process is performed, and then the process ends.

The steps S404 through S408 constitute a loop in which the process of steps S404 through S406 and S408 is repeated until it is judged "NO" in step S407.

In step S405, the recording device writes the source packet sequence constituting the base data block into the continuous free sector areas as much as EXT1[i]. In step S406, it adds, into the file entry, an allocation descriptor that indicates the continuous length and the starting address of the source packet sequence, and registers it as an extent. In connection with this, it writes, into the metadata in the clip base information and the clip enhancement information, the extent start point information that indicates the starting source packet number of the written source packet sequence.

The step S407 defines the condition for ending the loop. In step S407, it is judged whether or not there is a non-written source packet in the base and enhancement data blocks. When it is judged that there is a non-written source packet, the control proceeds to step S408 to continue the loop. When it is judged that there is no non-written source packet, the control proceeds to step S410.

In step S408, it is judged whether or not there are continuous sector areas. When it is judged that there are continuous sector areas, the control proceeds to step S403. When it is judged that there are no continuous sector areas, the control returns to step S402.

In step S410, "xxxxx.ceif" is closed and the file entry is written onto the recording medium. In step S411, "xxxxx.m2ts" is created and the file entry of "xxxxx.m2ts" is generated in the memory. In step S412, the allocation descriptor that indicates the continuous length and the starting address of the base data block unique to the file 2D is added into the file entry of "xxxxx.m2ts". In step S413, "xxxxx.m2ts" is closed and the file entry is written.

As described above, according to the present embodiment, it is possible to select an appropriate stream from a disc by identifying, in the navigation level, a player that can play back only video whose color depth is represented by 8-bit gradation values, and a player that supports playback of video whose color depth is represented by gradation values of more than eight bits, and to play back the selected stream.

According to the present embodiment, a conventional player plays back a conventional 8-bit-gradation video stream of the video whose color depth is represented by 8-bit gradation values, and the player that supports playback of video whose color depth is represented by gradation values of more than eight bits performs playback by using the conventional 8-bit-gradation video stream and an enhancement video stream for the color depth extension, thereby can restore the color depth of the original image and play back video with the restored color depth.

This makes it possible to create many variations of a content by adding only a partial modification to the data structure that is common with the Blu-ray ReadOnly disc, which would result in provision of enriched contents. This will promote a further growth of the content production industry such as the movie industry, publishing industry, game industry, and music industry. The growth of the production industry will vitalize the domestic industry and enhance the competitiveness of the domestic industry. The present invention contributes to the domestic industry in various ways.

Embodiment 3

Embodiment 3 relates to the judgment on whether the capability to perform an extended function of the color depth extension is present. The content creator can define various extended functions by applying the color depth extension functions described in the above embodiments. Such extended functions include, for example, a function to display the logo of the content provider or the content creator by the extended color depth, a function to display a menu of bonus functions by the extended color depth, and a function to display the setup menu by the extended color depth. In particular, there is a high demand for displaying the logo by the extended color depth since it strongly impresses the company's brand. However, since the above-described extended functions are defined and provided by the content creator, it is impossible for all playback devices manufactured by the manufacturer to support all of the extended functions.

Here, there are variations to the playback device manufactured by the manufacturer, such as the one with high spec, or the one manufactured as one unit with the display device. Thus even if the playback device includes the color depth extension unit, the playback device may not support an extended function created by the content creator. In view of this, as the deal between the content creator and the manufacturer, the manufacturer side should indicate the presence of the extended functions by using player variables of the playback device.

Problem Embodiment 3 is Going to Solve

Conventionally, to enable a program on a disc to judge whether a player supports a predetermined function, it is necessary to define, in the system parameters, a flag that indicates whether or not the player supports the predetermined function. For example, the $24^{th}$ variable, which is in the "Reserved" status, may be used as the field that indicates whether or not the player supports a predetermined function such as the color depth extension described in Embodiment 1. This makes it possible for a program recorded as a navigation or a JAVA script on a disc to judge by referring to the $24^{th}$ variable whether or not a playback by the extended color depth is available.

However, when this method is used to judge whether or not an extended function is supported, a system parameter currently in the "Reserved status" is used. This raises a problem that such system parameters are consumed rapidly because such a system parameter is used each time a function is added.

It is therefore an object of the invention described in Embodiment 3 (hereinafter referred to as "present invention") to provide a playback device that does not consume a reserved area for a player variable when it provides means for judging whether or not an extended function is supported.

Means for Solving the Problem

The above-described problem can be solved by a further aspect of the present invention: a playback device, wherein after the recording medium is loaded, the playback device reads a setting table before reading an index and sets an initial value in one of a plurality of general-purpose registers that is indicated in the setting table, the setting table indicating settings of capabilities to execute the plurality of extended functions.

It is desirable that in the setting table, the plurality of extended functions correspond to two or more general-purpose register numbers, and the playback device sets a predetermined initial value in general-purpose registers that are identified by two or more consecutive general-purpose register numbers in the setting table. This is a subordinate concept for avoiding a "false detection" which is described below.

Introducing the above-described technical feature into the invention of the playback device allows for the above-mentioned problem to be solved. The following describes an approach for solving the problem by the above-described means for solving the problem, with reference to the attached drawings.

In the present embodiment, a general purpose parameter (GPRM) that can be used for a general purpose is used to indicate the capability of an extended function. In general, a predetermined amount of memory in the player is allocated to GPRMs. Typically, a program, which is composed of a set of commands called navigation commands, uses a GPRM to temporarily store a necessary value. However, in the case of an optical disc such as Blu-rayDisc whose main purpose is to play back video, the navigation commands are rarely used to perform complicated processes, and thus all GPRMs allocated in the memory are rarely used up completely.

Figure 47A:
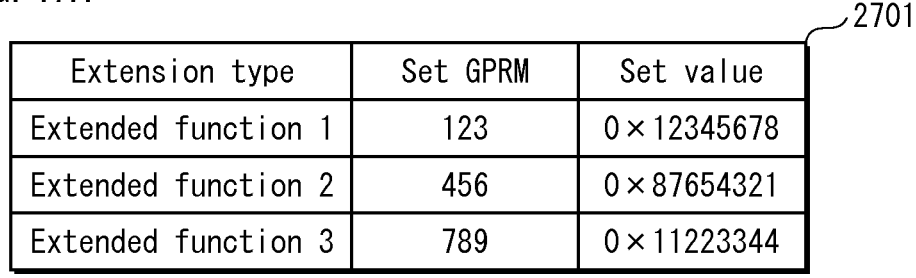
FIGS. 47A and 47B are diagrams illustrating the storage method of the extended function capability by the table format.
Figure 47B:
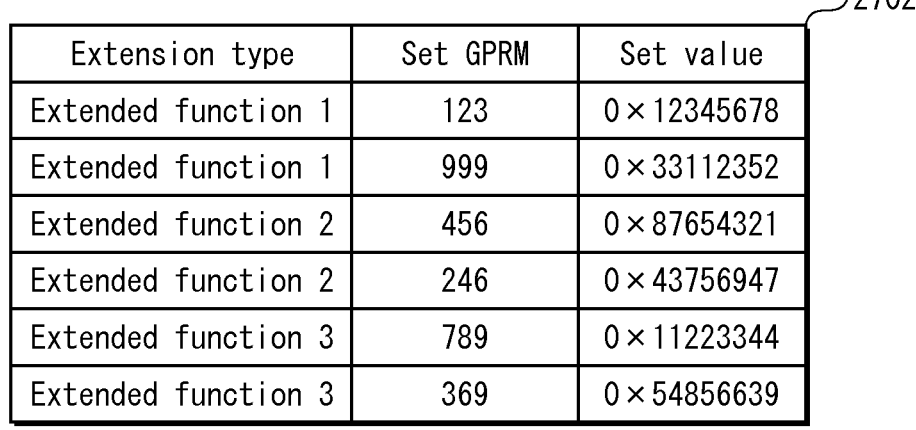

First, an extended function judgment file is prepared on the disc. The extended function judgment file may be recorded directly under the BDMV folder, or may be recorded in other places. The extended function judgment file defines the storage method of the extended function capability with use of GPRM. FIGS. 47A and 47B are diagrams illustrating the storage method of the extended function capability by the table format. According to the storage method illustrated in FIG. 47A, a plurality of types of extended functions are respectively associated with GPRM numbers of GPRMs in which values are set, and set values. In this example, extended functions 1, 2 and 3 are indicated as the types of extended function, and among these, extended function 1 is associated with GPRM "123" and a value "0x12345678". Extended function 2 is associated with GPRM "456" and a value "0x87654321". Suppose here that the extended function 1 is the color depth extension, then, when a disc is loaded in a player device that supports the extended function judgment file, the machine-unique function processing unit 114 first reads the extended function judgment file before a playback is started, and when it judges that the player device supports the extended function 1, the machine-unique function processing unit 114 sets "0x12345678", which is indicated in the "set value" column, in GPRM "123", which is indicated in the "set GPRM" column. When it judges that the player device does not support the extended function 2, the machine-unique function processing unit 114 does not set a value in GPRM "456".

As described above, a value is set in a GPRM as specified by the extended function judgment file during a period after a disc is loaded in a player and before the initial program specified by the title number of the first play title in the index table is read and executed. With this structure, after the playback is started (after the execution of the above-described program is started), each program composed of navigation commands or JAVA scripts refers to GPRMs in which values may be set. This allows for the program to judge whether or not the player supports a desired function, change a playlist to be played back, and play back an AV clip to purposefully notify the user that a predetermined function is supported.

In this way, use of GPRMs makes it possible to judge whether or not a predetermined function is supported. However, there is a possibility that an initial value set in a GPRM happens to be the same as a set value specified by the extended function judgment file. In that case, the above-described program will erroneously judge that the player supports the predetermined function. The reason for this to occur is that GPRMs are allocated in the memory as temporary areas for storing variables that are necessary for the program, and thus GPRMs are not necessarily be initialized to "0" when the disc is inserted.

To prevent such erroneous judgments, the storage method using GPRMs needs to be improved. The storage method using GPRMs is defined by the extended function judgment file. Therefore, the extended function judgment file is improved as illustrated in FIG. 47B so that a plurality of GPRMs are set for each function. When a player reads an extended function judgment file and a type of extended function supported by the player is written in the extended function judgment file, set values are set in all the GPRMs associated with the type of extended function. FIG. 47B is a diagram illustrating the storage method of the extended function capability by the table format. According to the storage method illustrated in FIG. 47B, each of a plurality of types of extended functions is associated with two GPRM numbers and two set values. In this example, extended functions 1, 2 and 3 are indicated as the types of extended function, and among these, extended function 1 is associated with GPRM "123" and a value "0x12345678" and GPRM "999" and a value "0x33112352".

Extended function 2 is associated with GPRM "456" and a value "0x87654321" and GPRM "246" and a value "0x43756947".

In the example of FIG. 47B, information pertaining to the extended function 1 is provided in two continuous rows. This is based on a desirable form. The reason is as follows. Suppose that, for example, information pertaining to the extended function 1 (set GPRM 123) is provided in the first row, information pertaining to the extended function 2 (set GPRM 456) is provided in the second row, and information pertaining to the extended function 3 is provided in the third row. In that case, the player cannot determine how many rows it must read to set values in all the GPRMs associated with the extended function 1.

According to a storage method 2701 illustrated in FIG. 47A, when the player supports the extended function 1, the player sets a value "0x12345678" in GPRM 123. On the other hand, according to a storage method 2702 illustrated in FIG. 47B, when the player supports the extended function 1, the player sets a value "0x33112352" in GPRM 999, as well as setting the value "0x12345678" in GPRM 123. To judge whether or not the extended function 1 is supported, the program refers to both GPRM 123 and GPRM 999. This makes it possible to avoid a false detection and makes the judgment on the support of extended function in a reliable manner.

It is more suitable that a player that supports the extended function judgment file initializes the GPRMs to "0" in advance, and after the initialization, sets appropriate set values in corresponding GPRMs according to the extended function judgment file.

In the present embodiment, a player uses the GPRM numbers and set values as they are. However, not limited to this, a predetermined calculation may be performed on the values written in the "set GPRM" column in the extended function judgment file, or a value obtained by performing a hash calculation may be set as a GPRM number. Also, the set values may be 128-bit long, and a 32-bit value may be obtained by performing a hash calculation, the obtained 32-bit value may be set in a GPRM.

When a predetermined calculation or a formula for obtaining a hash value is incorporated into the setting of a value in a GPRM, only a player that recognizes the predetermined calculation or the formula for obtaining a hash value can set an appropriate value. This reduces the possibility of erroneous detection pertaining to the judgment on whether or not an extended function is supported.

Figure 48:
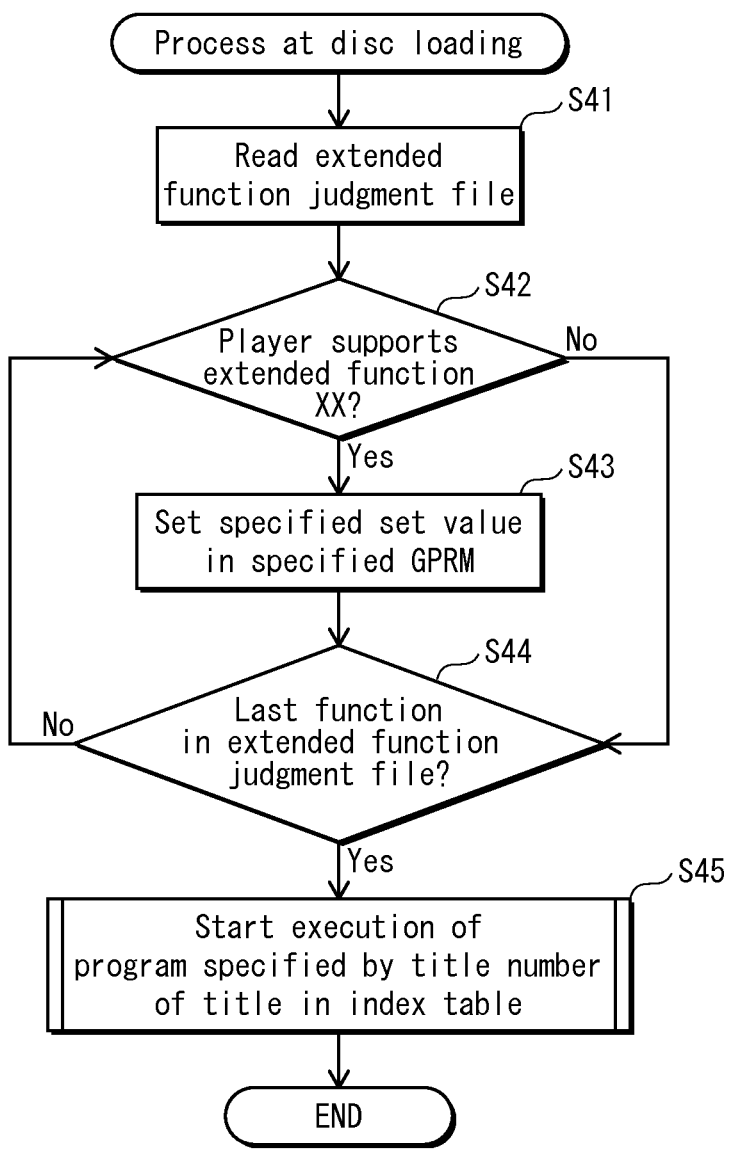
FIG. 48 is a flowchart illustrating a processing procedure for setting set values in GPRMs during a period after the insertion of a disc medium in a player before the start of a playback.

FIG. 48 is a flowchart illustrating a processing procedure for setting set values in GPRMs during a period after the insertion of a disc medium in a player before the start of a playback.

After a disc is inserted, the player reads the extended function judgment file (S41). Subsequently, the extended function judgment file is processed in sequence. More specifically, it is judged whether or not the player supports an extended function written in the extended function judgment file. When it is judged that the player supports the extended function, a value specified in the extended function judgment file is set in a GPRM specified in the extended function judgment file. This process is repeated to the last extended function written in the extended function judgment file (S42, S43, S44).

After all the extended functions written in the extended function judgment file are processed, execution of the initial program specified by the title number of the first play title in the index table is started (S45).

As described above, according to the present embodiment, before the index table is read and the first play title is played back, the presence or absence of capability to perform the extended function is set in a GPRM. This makes it possible to display the logo by the extended color depth when the first play title is played back. Thus the strong demand from the content provider or the content creator is met. Furthermore, since GPRMs are used to indicate whether or not capability to perform extended functions is present, it is possible to avoid the reserved areas in the player setting register and the player status register from being consumed rapidly, allowing for the player model to be extended in future.

Embodiment 4

Embodiment 4 is an application of the mechanism of the above-described color depth extension. More specifically, the present embodiment is aimed to more effectively perform a partial replacement of the parent-screen video image.

Figure 49:
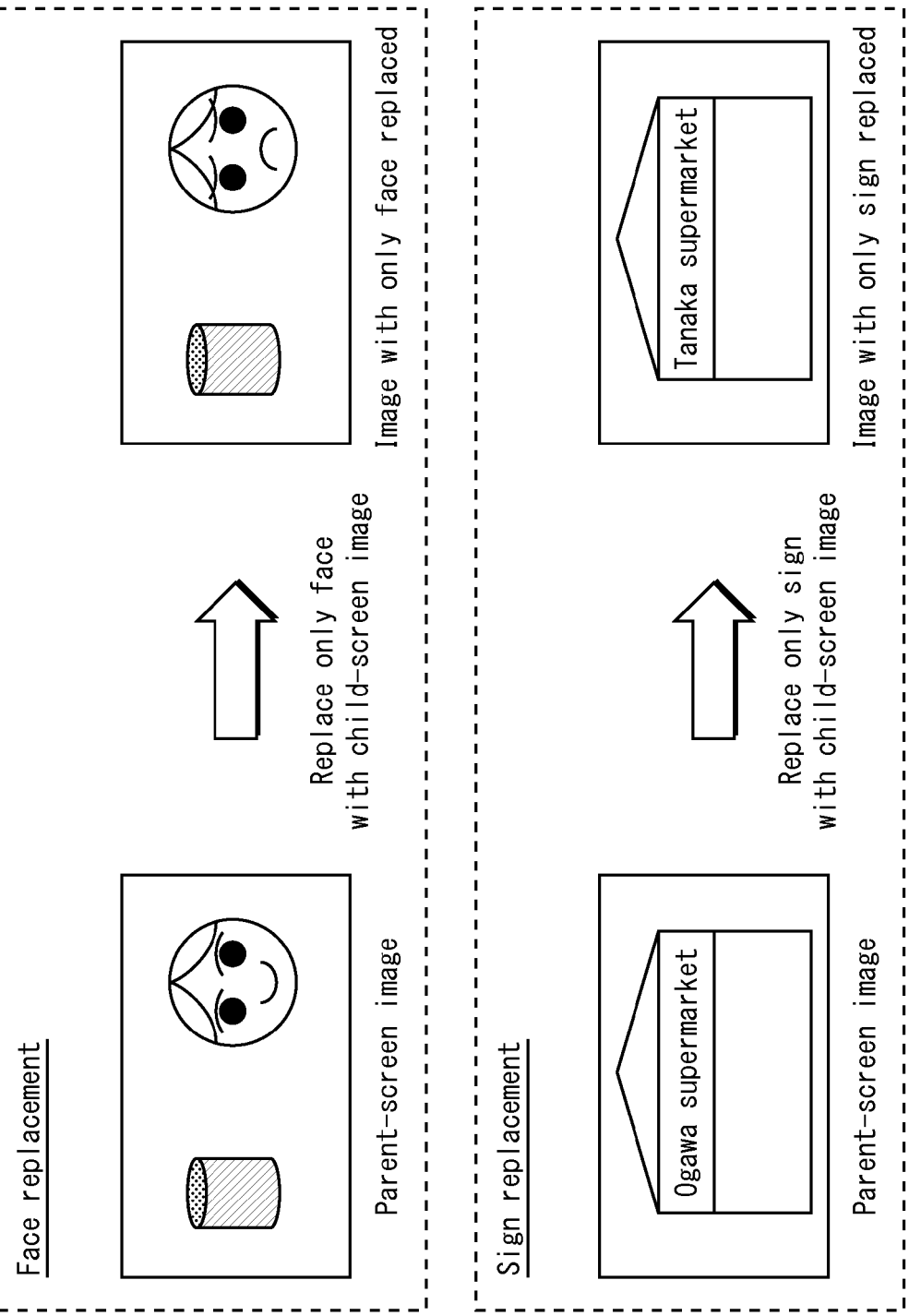
FIG. 49 illustrates one example of PinP content.
Figure 50:
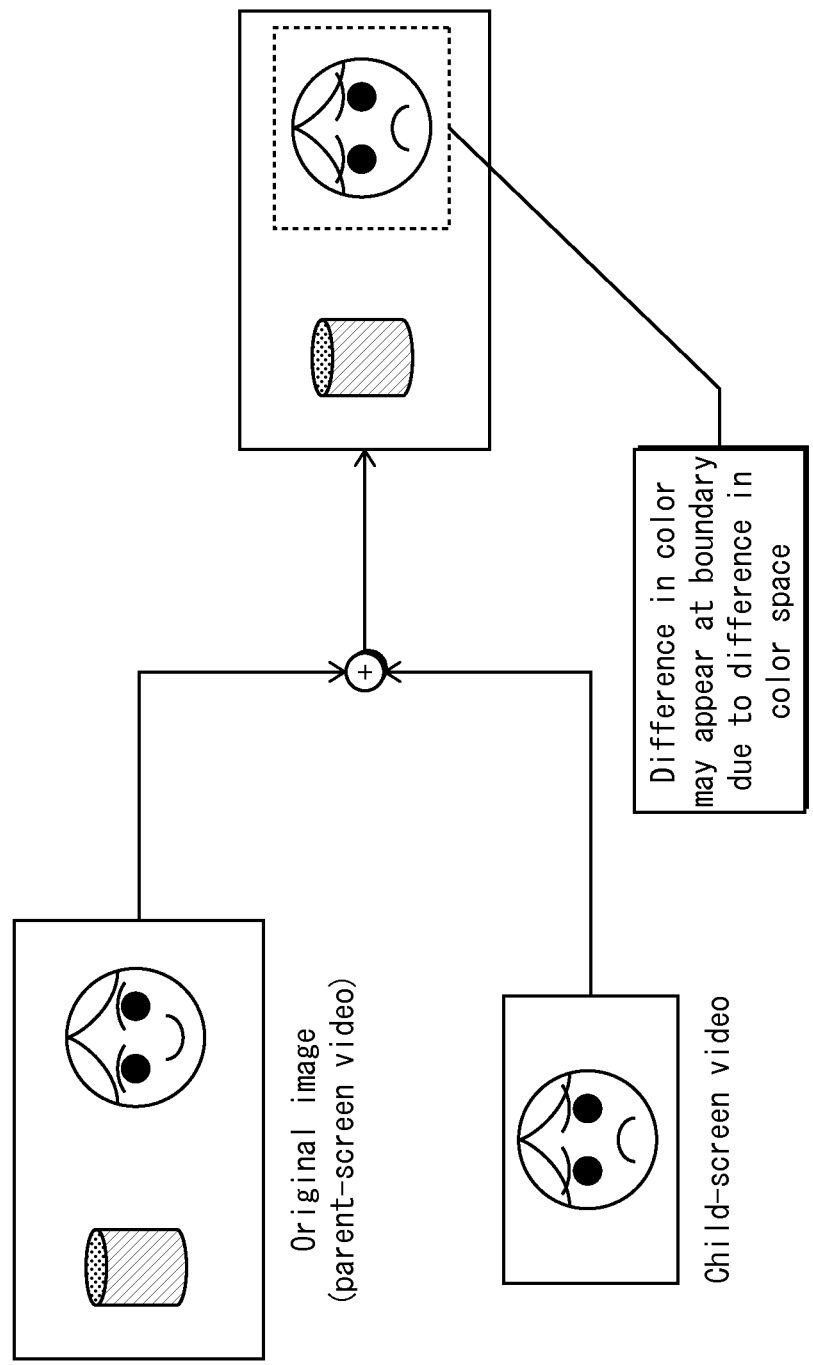
FIG. 50 illustrates a picture-in-picture image realized by overlaying the child-screen video on the parent-screen video.

FIG. 49 illustrates one example of possible applications. The upper portion of FIG. 49 illustrates an example of application, "face replacement", which means, for example, replacing the face of an actor/actress playing the lead role of a movie with a face of another actor/actress, or with the face of the viewer which the viewer captured with a camera and loaded from the camera onto the device. The lower portion of FIG. 49 illustrates another example of application, "sign replacement", which means, for example, replacing a sign appearing in the movie with another sign depending on the country where the movie is viewed, or depending on the sponsor. Conventionally, such applications have been realized by preparing a child-screen video for the parent-screen video, and overlaying the child-screen video on the parent-screen video. FIG. 50 illustrates a picture-in-picture image realized by overlaying the child-screen video on the parent-screen video.

Problem the Invention is Going to Solve

In many cases of such conventional technologies, the parent-screen video has high-definition resolution (1920×1080 or 1280×720), while the child-screen video has a lower resolution (for example, SD resolution) due to the restriction of the disc capacity and the processing amount of the video decoding. This has created the following problems.

(1) In general, the color space (for example, "ITU-R BT.601") used in the SD resolution is different from the color space (for example, "ITU-R BT.709") used the high-definition. As a result, when the child-screen video is overlaid on the parent-screen video stream, a difference in color may appear at the boundary between the child-screen video and the parent-screen video. To avoid this, either color space may be converted to match the other before the child-screen video and the parent-screen video are overlaid. However, even if this conversion is made, it is difficult for the child-screen video and the parent-screen video to match completely in color due to errors that may happen in the conversion.

(2) In the case where the child-screen video is enlarged or reduced before it is overlaid, lines in the image of the child-screen video may blur due to the enlargement/reduction method, and a line of an object that continues between the parent-screen video and the child-screen video may blur.

As a method for avoiding these problems, the child-screen video may be made to have the same resolution as the parent-screen video. However, in that case, when the video is compressed into a video stream, while it is desired to replace a part of the parent-screen video stream, it is necessary to replace the remaining parts as well. This increases the amount of data of the child-screen video, compared to the conventional child-screen video with the SD resolution, which would be another problem.

It is therefore an object of the present invention to provide an encoding method for switching between a normal video and a picture-in-picture video without increasing the amount of data of the child-screen video.

Means for Solving the Problem

The above-described problem can be solved by a further aspect of the present invention: an encoding method comprising: a first encoding step of generating a base video stream by performing an encoding process on an original image; and a second encoding step of generating a picture-in-picture video stream in which each picture data is composed of picture-in-picture data, wherein the picture-in-picture data is picture data representing a part of a screen area for a picture in the base video stream, the part having been replaced with a child-screen area, an inter-picture predictive encoding process is performed in the second encoding step, pixel blocks located in the screen area excluding the child-screen area have been encoded by the inter-picture predictive encoding process by using only picture data of the base video stream as reference pictures.

For the above problem solving means as a superordinate concept, various subordinate concepts can be provided. The following are typical ones among the possible subordinate concepts.

(Subordinate Concept for Specifying Picture-in-Picture Video Stream)

It is desirable that each piece of the picture data included in the picture-in-picture video stream is intermittently located along a playback time axis of the base video stream, and each piece of picture data included in the base video stream includes a presence/absence flag that indicates whether or not there is a piece of picture data included in the picture-in-picture video stream that is to be played back together with that piece of picture data included in the base video stream at a same time point on the playback time axis. This subordinate concept clarifies that the processing of the picture-in-picture video stream can be frozen during a period in which no picture of the picture-in-picture video stream is present, preventing an underflow from occurring in a buffer of the picture-in-picture video stream side.

(Subordinate Concept of Compression-Encoding Method in Child-Screen Area)

It is desirable that a pixel block belonging to the child-screen area in a piece of picture data included in the picture-in-picture video stream is encoded by the inter-picture predictive encoding process by using, as a reference picture, another pixel block belonging to the child-screen area in another piece of picture data included in the picture-in-picture video stream. This subordinate concept clarifies that it is possible to increase the encoding efficiency inside the picture-in-picture video stream by performing a compression-encoding by using the intercorrelation between child-screen video streams.

The above-described problem can be solved by a further aspect of the present invention: a decoding method comprising: a first decoding step of obtaining non-compressed picture data by decoding a base video stream; and a second decoding step of obtaining picture-in-picture data by decoding a picture-in-picture video stream, wherein in the second decoding step, an inter-picture predictive motion compensation is performed on pixel blocks located in a screen area excluding a child-screen area in the picture-in-picture data, by using only picture data included in the base video stream as reference pictures.

For the above problem solving means as a superordinate concept, various subordinate concepts can be provided. The following are typical ones among the possible subordinate concepts.

(Subordinate Concept of Specification of Picture-in-Picture)

It is desirable that each piece of the picture data included in the picture-in-picture video stream is intermittently located along a playback time axis of the base video stream, each piece of picture data included in the base video stream includes a presence/absence flag that indicates whether or not there is a piece of picture data included in the picture-in-picture video stream that is to be played back together with that piece of picture data included in the base video stream at a same time point on the playback time axis, and in the second decoding step, it is determined based on the presence/absence flag whether or not a processing on the picture-in-picture video stream is frozen. This subordinate concept clarifies that the processing of the picture-in-picture video stream can be frozen during a period in which no picture of the picture-in-picture video stream is present, thereby making it possible to use reference pictures, which are present in the decoded data buffer of the picture-in-picture video stream, to be used in processes thereafter.

(Subordinate Concept of Compression-Encoding Child-Screen Image)

It is desirable that a pixel block belonging to the child-screen area in a piece of picture data included in the picture-in-picture video stream is decoded by the inter-picture predictive motion compensation by using, as a reference picture, another pixel block belonging to the child-screen area in another piece of picture data included in the picture-in-picture video stream. This subordinate concept clarifies that it is possible to increase the encoding efficiency inside the picture-in-picture video stream by performing a compression-encoding by using the intercorrelation between child-screen video streams.

In these means for solving the problem, restriction on the reference picture used in the motion compensation is present for each pixel block. Here, the pixel block is a set of pixels represented by the number of horizontal pixels and the number of vertical pixels. In the present embodiment, a macroblock composed of 32 (horizontal pixels)×32 (vertical pixels) pixels is adopted as the pixel block.

Figure 51:
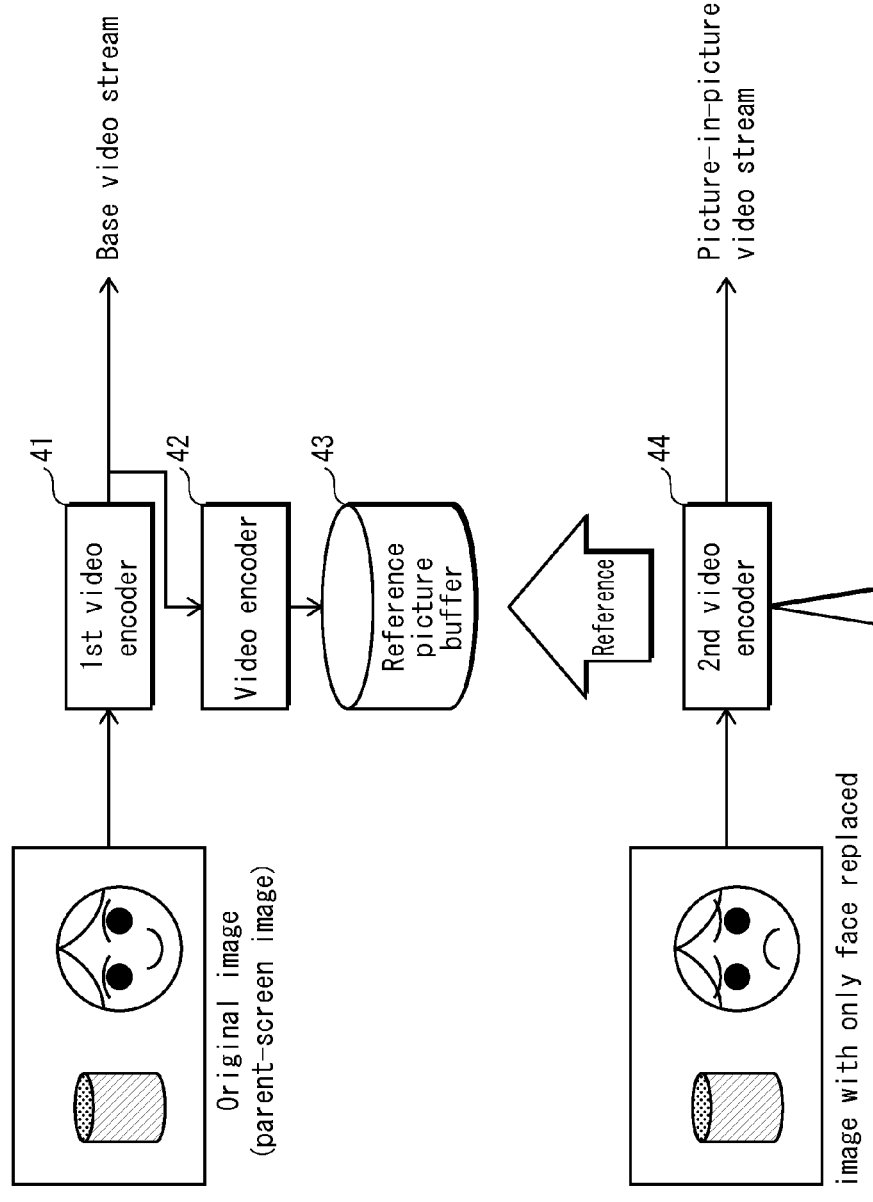
FIG. 51 illustrates one example of the internal structure of the encoding device of the present embodiment.

The following describes an approach for solving the problem by the above-described means for solving the problem, with reference to the attached drawings. FIG. 51 illustrates one example of the internal structure of a device (encoding device) that performs the encoding method of the present embodiment. As illustrated in FIG. 51, the encoding device includes: a first video encoder 41 for obtaining a base video stream by encoding original images; a video decoder 42 for decoding the base video stream; a reference picture buffer 43 for storing non-compressed picture data obtained by the video decoder 42; and a second video encoder 44 for obtaining a picture-in-picture (PinP) video stream by encoding picture-in-picture images that are parent-screen video images part of which have been replaced with the child-screen video images by referencing reference pictures stored in the reference picture buffer 43.

First, the original images are compressed into the base video stream by the first video encoder 41. Subsequently, the base video stream is decoded by the video decoder 42, and decoded pictures are recorded in the reference picture buffer 43 as reference pictures. Next, images, in which only faces have been replaced with other faces, are input to the second video encoder 44, and the second video encoder 44 compresses the input images by referencing the reference pictures. The advantage of this method is that, since the reference pictures referenced by the second video encoder 44 are the same as the images with replaced faces except that the reference pictures have compression errors caused by the irreversible compression performed by the first video encoder 41, and in the actual compression, only the replaced faces need to be compressed and the portions other than the faces are processed by merely referencing the reference pictures.

Here, MPEG-4MVC video encoders may be used as the first video encoder 41 and the second video encoder 44. The MPEG-4MVC was originally developed for the effective compression of a plurality of images of the same object seen from a plurality of viewpoints. Accordingly, a target image can be effectively compressed when it is compressed by referencing a plurality of images of the same object seen from a plurality of viewpoints (a plurality of views).

In the present embodiment, when the images, which are obtained by replacing the faces in the parent-screen video with other faces, are assumed to be the plurality of views, the portions other than the replaced portions are the same as those of the parent-screen video, and thus the images can be compressed effectively.

Furthermore, it provides the following secondary effect. The reference pictures stored in the reference picture buffer have been decoded after the irreversible compress, and thus it is highly possible that the lower bits of the reference pictures are different from those of the original images (this is described in Embodiment 1 with reference to FIGS. 1A to 1C). However, since the second video encoder 44 performs the encoding including errors of the lower bits, it encodes the differences from the reference pictures in the portions other than the faces, and the PinP video stream output from the second video encoder 44 is closer to the original images, namely, has higher image quality.

Problem Caused by Introduction of Encoding Method Unique to Present Embodiment A problem of the above method is that the lower bits of the reference pictures are changed due to the irreversible compression when the second video encoder 44 performs the compression using the reference pictures, and thus even if the reference pictures are compared with the images with replaced faces, the locations of the replaced portions cannot be detected accurately, resulting in the encoding of the whole screen, thereby increasing the amount of processing.

It is therefore a secondary object of the present invention to avoid increase in the amount of processing that would be caused by the encoding of the whole screen.

Means for Solving the Problem

The above-described problem can be solved by a further aspect of the present invention: an encoding method, wherein in the second encoding step, replacement information including a plurality of flags is generated when the picture-in-picture data is generated, and the plurality of flags respectively correspond to a plurality of pixel blocks that are obtained by dividing the picture-in-picture data, each of the plurality of flags indicating whether or not a corresponding pixel block belongs to the child-screen area in the picture-in-picture data.

The above-described problem can be solved by a further aspect of the present invention: a decoding method, wherein in the second decoding step, replacement information including a plurality of flags is obtained when the picture-in-picture video stream is decoded, the inter-picture predictive motion compensation using the reference pictures is not performed on pixel blocks that correspond to flags set ON in the replacement information, and the inter-picture predictive motion compensation using the reference pictures is performed on pixel blocks that correspond to flags set OFF in the replacement information.

Figure 52:
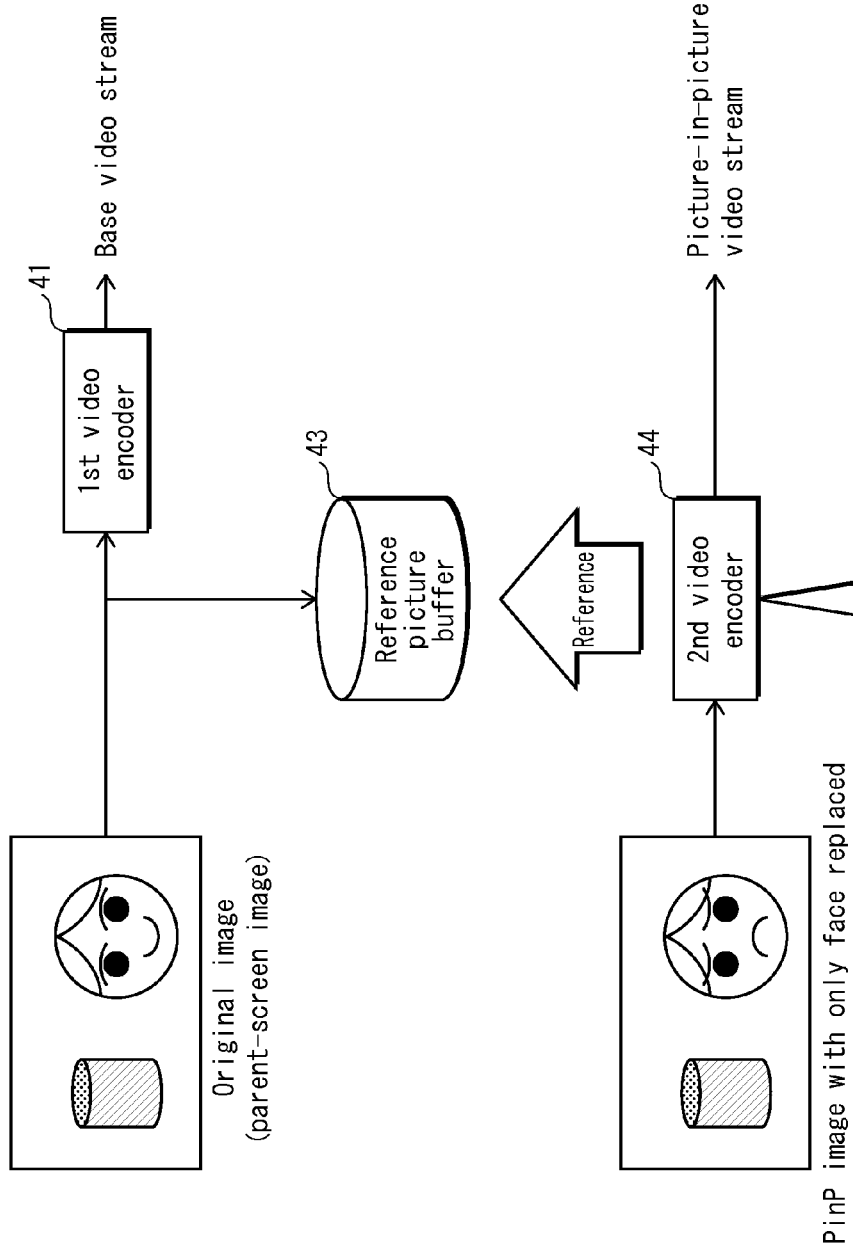
FIG. 52 illustrates one example of the internal structure of the encoding device for obtaining a picture-in-picture video stream.

Introducing the above-described technical feature into the invention of encoding method and decoding method allows for the above-mentioned problem to be solved. The following describes an approach for solving the problem by the above-described means for solving the problem, with reference to FIG. 52. FIG. 52 illustrates one example of the internal structure of the encoding device for obtaining a picture-in-picture video stream. FIG. 52 differs from FIG. 51 in that the reference pictures recorded in the reference picture buffer are not the pictures obtained by decoding the output from the first video encoder, but the original images. In this case, the reference pictures referenced by the second video encoder 44 match, in units of pixels including the lower bits, the images in which only the faces have been replaced, except for the replaced portions. Accordingly, when the images are compressed by using the reference pictures, the encoding process does not need to be performed on the same portions including the lower bits, but it is merely recorded that the reference pictures are referenced for the portions. This makes it possible to restrict the target of the encoding process to the replaced face portions.

Figure 53:
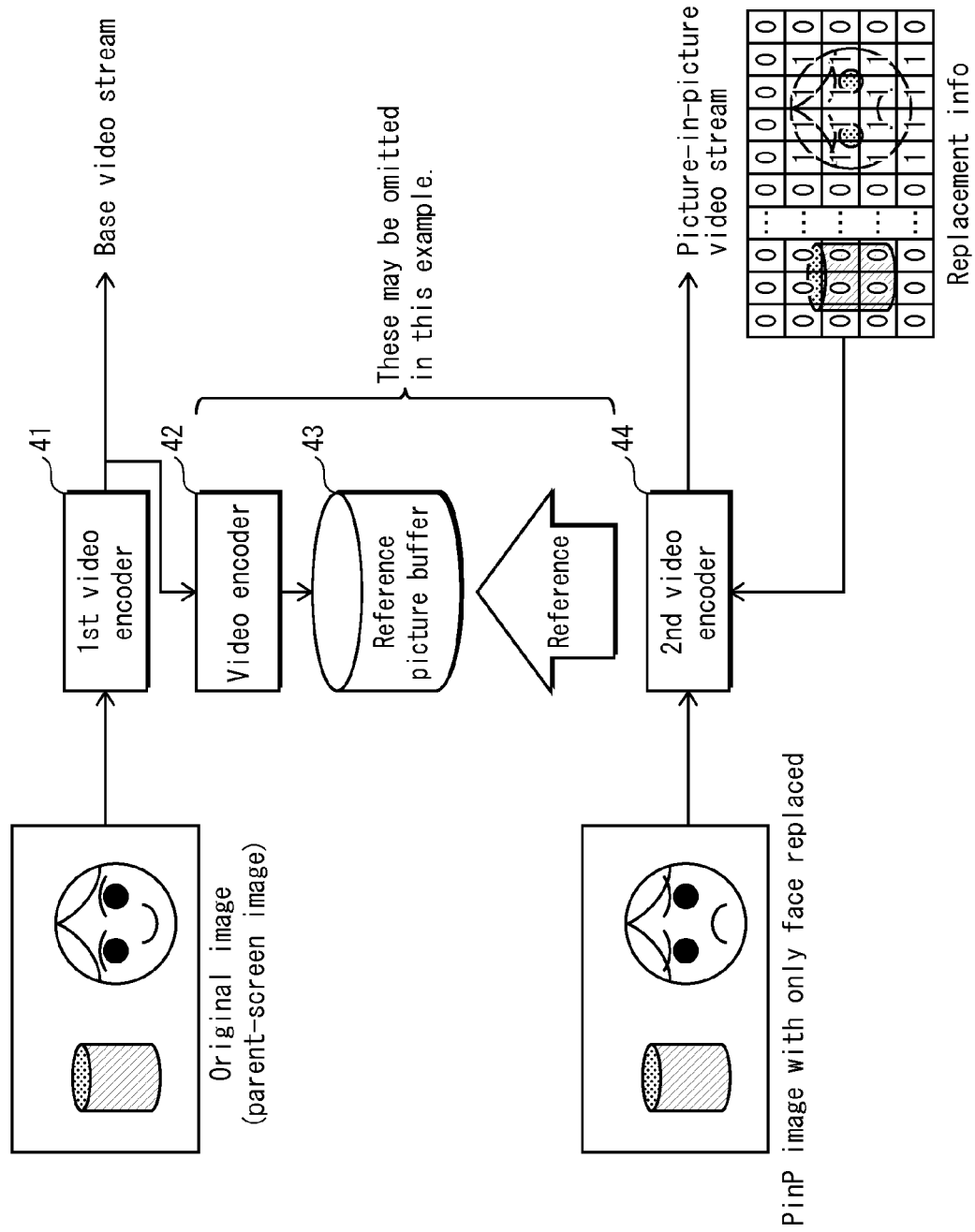
FIG. 53 illustrates one example of the internal structure of the encoding device for performing the compression process illustrated in FIG. 52 more effectively.

FIG. 53 illustrates one example of the internal structure of the encoding device for performing the compression process illustrated in FIG. 52 more effectively. Normally, when a movie content is produced and an application for replacing a portion, such as the face of an actor/actress, is created, the location of the portion to be replaced in the parent-screen video is known in units of pixels at the time when the movie content is produced. Also, the compression technique such as MPEG-4MVC performs the compression process in units of macroblocks that are each composed of 4×4 pixels at the smallest.

Accordingly, first, each image constituting the parent-screen video and each image in which only the face has been replaced is divided into macroblocks that are each composed of 4×4 pixels, the two types of images are compared with each other, and it is judged, for each pair of macroblocks corresponding to each other, whether the macroblocks are the same (marked as "0") or different at least partially (marked as "1"), and information of this comparison result is held as replacement information, as illustrated in FIG. 53.

When the second video encoder 44 compresses an image with replaced faces, it uses the replacement information to detect replacement target macroblocks (the macroblocks marked as "1") and encodes only the replacement target macroblocks, treating the other macroblocks as those for which the reference pictures are referenced.

The compression using the replacement information makes it possible to encode only the pixels/macroblocks constituting the replaced portions such as the face portions.

Also, replacement target pixels/macroblocks are often different from those of corresponding portions in the original images, and thus often fail to be compressed efficiently when they are compressed by using the reference pictures. Accordingly, the second video encoder 44 may encode picture-in-picture data by using only the replacement information without using the reference picture buffer.

Here it is assumed that the replacement information is composed of a plurality of flags that each indicates whether or not a corresponding macroblock is included in the child-screen. The bit width of the flag is one bit. That is to say, the replacement information needs only to have a bit size: "(the number of macroblocks constituting the picture data)×1".

Each flag in the replacement information is set as follows. In the picture plane, the area to be replaced with the child-screen video is defined by coordinates (x,y) of the screen composition entries in the metadata and the vertical and horizontal widths of the child-screen area. It is thus possible to identify the range of the macroblocks by converting the coordinates (x,y) in the picture plane and the vertical and horizontal widths of the child-screen area into macroblock addresses. The macroblock address of a macroblock in the picture plane is represented by a pair of a slice number of a slice to which the macroblock belongs, and a serial number of the macroblock in the slice. Accordingly, it is possible to identify the macroblocks belonging to the child-screen area by obtaining coordinates of the upper-left, upper-right, lower-left and lower right vertexes of the child-screen area from the coordinates (x,y) of the child-screen area in the screen composition entries of the metadata and the vertical and horizontal widths of the child-screen area, and converting the obtained coordinates of the upper-left, upper-right, lower-left and lower right vertexes into macroblock addresses.

In generating the replacement information, first a macroblock Start, which is a macroblock number of a macroblock that includes the upper-left vertex, and a macroblock End, which is a macroblock number of a macroblock that includes the upper-right vertex, are obtained. Also, a slice Start, which is a slice number of a slice that includes the upper-left vertex, and a slice End, which is a slice number of a slice that includes the lower-right vertex, are obtained.

Subsequently, for each of a plurality of slices included in the range from the slice Start to the slice End, the flags of the replacement information corresponding to the macroblocks included in the range from the macroblock Start to the macroblock End are set to "1". This allows for the replacement information to identify the macroblocks constituting the child-screen area. The macroblock Start, macroblock End, slice Start, and slice End may be calculated by using the screen composition entries in the metadata as follows.

The coordinate X of the upper-left vertex of the child-screen area is the coordinate x of the child-screen area in the screen composition entries. Thus the macroblock Start is obtained as the quotient of dividing the coordinate x of the child-screen area by the number of horizontal pixels in the macroblock.

The coordinate X of the upper-right vertex of the child-screen area is equal to a coordinate obtained by adding the horizontal width of the child-screen area to the coordinate x of the child-screen area in the screen composition entries. Thus the macroblock End is obtained as the quotient of dividing (coordinate x+horizontal width) of the child-screen area by the number of horizontal pixels in the macroblock.

The coordinate Y of the upper-left vertex of the child-screen area is the coordinate y of the child-screen area in the screen composition entries. Thus the slice Start is obtained as the quotient of dividing the coordinate y of the child-screen area by the number of vertical pixels in the slice.

The coordinate Y of the lower-right vertex of the child-screen area is equal to a coordinate obtained by adding the vertical width of the child-screen area to the coordinate y of the child-screen area in the screen composition entries. Thus the slice End is obtained as the quotient of dividing (coordinate y+vertical width) of the child-screen area by the number of vertical pixels in the slice.

By setting each of the flags in the range of macroblocks from the macroblock Start to the macroblock End to "1" in the range from the slice Start to the slice End, macroblocks that have been replaced with the child-screen area among the macroblocks constituting a picture of the base video stream are identified. In this way, the replacement information is generated.

In the above example, the replacement information is represented in units of macroblocks. However, not limited to this, the replacement information may be represented in units of pixels, or may be one or more rectangular areas. The invention of the above-described encoding method may be implemented on a transmission device that transmits TV broadcast contents. The TV broadcast contents are in the 1TS-2VS format. In the case of a TV broadcast content in the 1TS-2VS format, the target of decoding is a transport stream file that includes a base video stream and a picture-in-picture video stream.

Furthermore, the PinP video stream may be distributed independently via a network or the like. In that case, it is desirable that information such as URL (information indicating the location of the PinP video stream), which indicates the location on the network where an MP4 file or a transport stream including the picture-in-picture video stream is held, is described in a transport stream including the base video stream that is transmitted via the broadcast waves. More specifically, the information, such as a URL, indicating the location of the PinP video stream may be recorded in the following places.

(1) Base Video Stream or Header in PinP Video Stream

The information indicating the location of the PinP video stream may be recorded in the base video stream or the header in the PinP video stream. Alternatively, instead of the PinP video stream location information being held for each frame/field, the PinP video stream location information of a plurality of frames/fields may be held in bulk in the starting frame of a GOP.

(2) PMT (Program Map Table)

The PinP video stream location information may be recorded in the PMT (Program Map Table). For example, the PinP video stream location information may be held as a piece of information contained in the stream descriptor of the base video stream or the PinP video stream.

(3) Instruction by Navigation Command or JAVA Command

In the case of the PinP video stream location information described in the above items (1), (2) and (4), the location can be changed only in predetermined units/sections such as in units of video frames, in units of sections divided by PMTs, or in units of playitems. In contrast, for example, the navigation command or the JAVA command may be used to obtain the PinP video stream location information, and the PinP video stream may be obtained in accordance with the obtained PinP video stream location information.

(4) Instruction from Playitem Information, Sub Playitem Information

When the PinP video stream is recorded on a recording medium and is supplied to a playback device via the recording medium, the PinP video stream location information may be provided in units of playitems or sub playitems. The recording location of the PinP video stream location information is not limited to the above-mentioned locations, but may be recorded in a server on a network, and may be obtained by apparatuses as necessary.

A broadcast content realized by a pair of base video stream and PinP video stream is called "picture-in-picture broadcast". With the "picture-in-picture broadcast", switching between an original video and a partially replaced video is realized by causing either of the videos to be played back in accordance with a user operation for switching the video stream.

Figure 54:
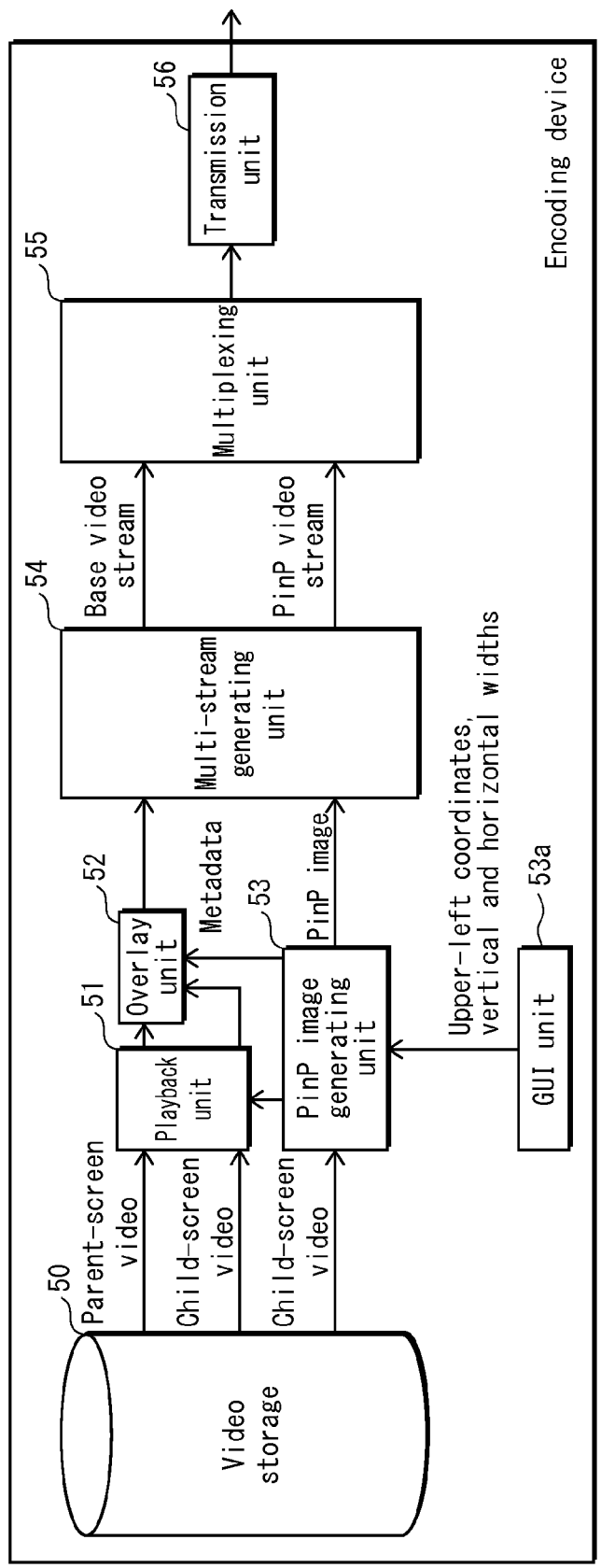
FIG. 54 illustrates one example of the internal structure of a broadcast device that can implement the invention of the encoding method.

FIG. 54 illustrates one example of the internal structure of a broadcast device that can implement the invention of the encoding method. As illustrated in FIG. 54, the broadcast device includes: a video storage 50 storing a parent-screen video stream representing a parent-screen video of picture-in-picture and a child-screen video stream representing a child-screen video of picture-in-picture; a playback unit 51 for playing back the parent-screen video stream and the child-screen video stream; an overlay unit 52 for overlaying the parent-screen video stream and the child-screen video stream in accordance with the metadata; a PinP image generating unit 53 for receiving a user operation and generating the metadata; a GUI unit 53*a* for receiving a user operation; a multi-stream generating unit 54 for obtaining a base video stream composed of original images and a PinP video stream composed of picture-in-picture images by encoding the original images and the picture-in-picture images; a multiplexing unit 55 for obtaining a transport stream by multiplexing the base video stream and the PinP video stream with an audio stream and a subtitle stream; and a transmission unit 56 for transmitting the transport stream obtained by the multiplexing. The multi-stream generating unit 54 includes the first video encoder, the second video encoder, and the reference pictures illustrated in FIGS. 51 through 53.

The transport stream in the TV broadcast content of the 1TS-2VS format is generated by converting a plurality of video streams and a PMT table into a transport stream packet sequence and multiplexing it.

The PMT table includes one or more table descriptors and a plurality of pieces of stream information that correspond to the video streams, each piece of stream information including a stream type, a packet identifier, and a stream descriptor. The table descriptor includes service type information described therein. The service type information indicates whether or not the broadcast content supports switching to a picture-in-picture video.

<Details of PinP Video Stream Generating Unit>

The PinP video stream generating unit is described. The PinP video stream generating unit realizes the picture-in-picture by overlaying, in accordance with the metadata, each picture constituting the child-screen video stream on each picture constituting the parent-screen video stream. The metadata mentioned here is metadata for the picture-in-picture, and is composed of playback section entries that correspond to the playback sections set for the parent-screen video stream. The playback section entry includes: a header that includes a reference to a playback section set for the parent-screen video stream; and a plurality of screen composition entries.

The plurality of screen composition entries define the contents of a plurality of screen compositions that are to be made when the playback section set for the parent-screen video stream is played back. Each screen composition entry defines: specification of a child-screen video to be overlaid; a time stamp indicating the timing of one screen composition; horizontal and vertical coordinates of the child-screen video in the screen overlay; and horizontal and vertical widths after a scaling of the child-screen video.

A plurality of child-screen videos form a child-screen video stream. Thus the specification of a child-screen video in entries of metadata is realized a pair of an identifier of that child-screen video stream and specification of a playback time on the time axis of that child-screen video stream.

The PinP video stream generating unit performs authoring of the picture-in-picture playback so that a child-screen video, which has been enlarged or reduced in accordance with the horizontal and vertical widths included in screen composition entries, which, among the plurality of screen composition entries in a playback section entry, have a time stamp corresponding to the current playback time point, is displayed at a position indicated by the horizontal and vertical positions of those screen composition entries.

The PinP video stream generating unit then displays the child-screen video, which has been enlarged or reduced in accordance with the horizontal and vertical widths included in the screen composition entries, which, among the plurality of screen composition entries in the playback section entry, have a time stamp corresponding to the current playback time point, at the position indicated by the horizontal and vertical positions of those screen composition entries. With this structure, it is possible to change the horizontal and vertical coordinates or the size of the child-screen video in the picture-in-picture in accordance with the progress of the current playback time point.

The header of the playback section entry contains: a Chroma key permission/inhibition flag that indicates whether or not the Chroma key overlay by the overlay unit is permitted; and a Chroma key upper limit value. The PinP image generating unit, when the header of the playback section entry indicates that the Chroma key overlay is permitted, overlays, by the Chroma key overlay, pictures included in the parent-screen video stream with pictures included in the child-screen video stream.

In the Chroma key overlay, the PinP image generating unit sets a pixel transmission rate in the overlay unit such that pixels, whose luminance values are lower than the Chroma key upper limit value contained in the header of the playback section entry that corresponds to the playback section set for the current parent-screen video stream, among the pixels constituting the child-screen video, are transmitted. This allows for the background of the child-screen video, only when it has been filmed with a blue background, to be transparent when it is overlaid with the parent-screen video, allowing for the parent-screen video to be viewed in the transparent portions. This makes it possible for a person to be extracted from the child-screen video in a rectangular shape with the SD quality of 640×480 resolution and be overlaid on the parent-screen video.

The following describes improvements on the encoding limitation with a specific example, for more technical understanding. The specific example discussed here is encoding of video content of sports as illustrated in FIGS. 55A and 55B. FIGS. 55A and 55B illustrate in comparison a picture in the base video stream and a picture in the PinP video stream. FIG. 55A illustrates one example of a picture in the parent-screen video stream that is the base-view video stream (hereinafter the picture is referred to as a "parent-screen picture"). FIG. 55B illustrates one example of a picture in the child-screen video stream that is the PinP video stream (hereinafter the picture is referred to as a "child-screen picture"). A portion enclosed by a dotted line in the picture of FIG. 55B is the child-screen picture replacing the face of the player. In this way, a picture in the parent-screen video in which the face of the subject has been replaced is to be output as a PinP video stream.

Figure 56:
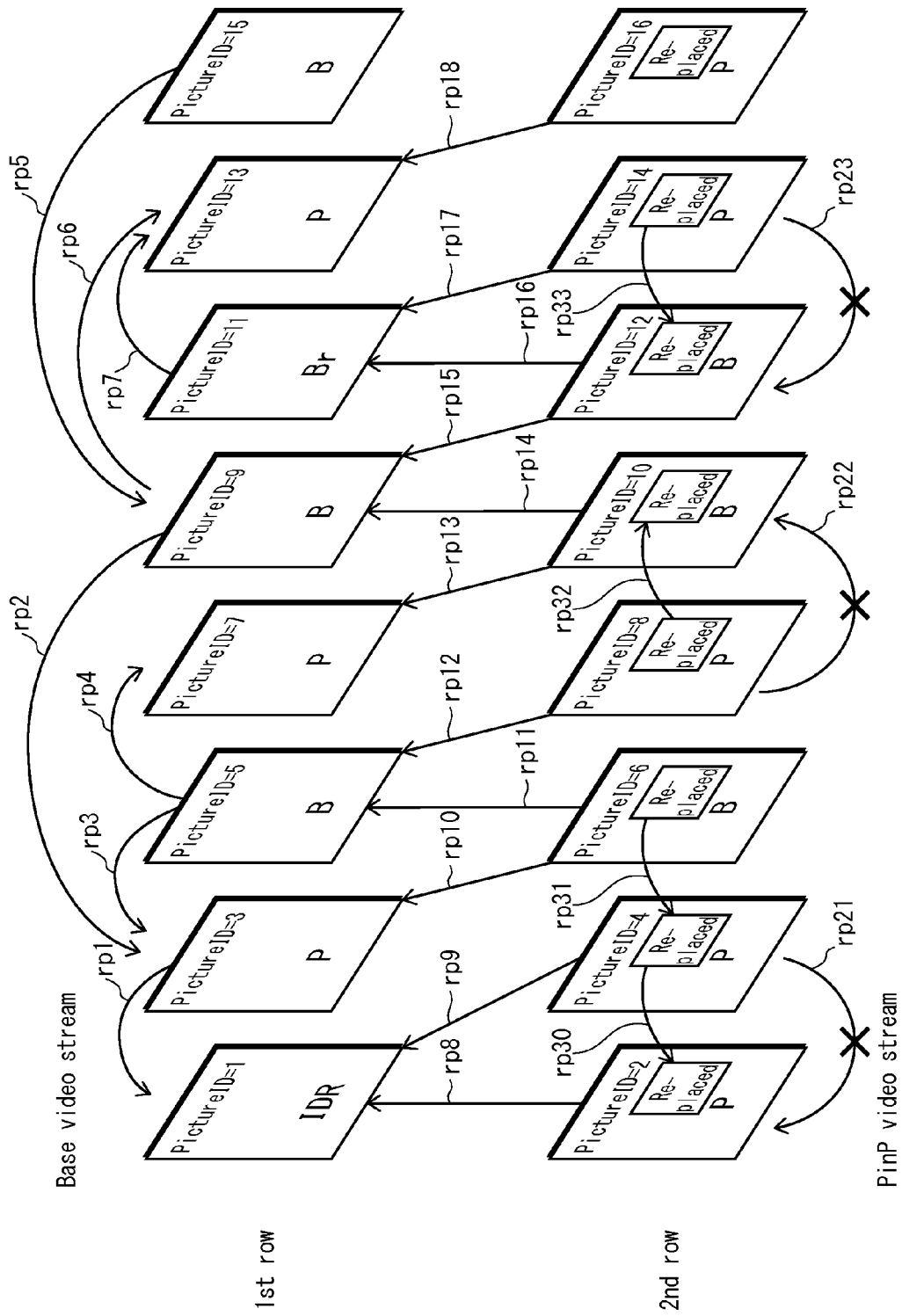
FIG. 56 illustrates a plurality of pictures included in the base video stream and a plurality of pictures included in the enhancement video stream.

FIG. 56 illustrates a plurality of pictures included in the base video stream and a plurality of pictures included in the enhancement video stream. The first row of FIG. 56 illustrates a plurality of pictures included in the base video stream and the second row of FIG. 56 illustrates a plurality of pictures included in the enhancement video stream. The pictures in the base video stream constitute a GOP, and are classified into four types: IDR picture, P picture, B picture, and Br picture. The pictures in the PinP video stream are classified into three types: P picture, B picture, and Br picture.

The arrows rp1 through rp18 between the pictures schematically indicate the reference relationship, namely, which pictures are referenced to satisfy the inter-frame motion requirement. Note that there is no reference relationship in which the whole of a picture in the picture-in-picture video stream references the whole of another picture in the picture-in-picture video stream.

The arrows rp21 through rp23 with sign "x" thereon in FIG. 56 indicate with emphasis that, in the PinP video stream, there is no reference relationship in which the whole of a picture references the whole of another picture. This eliminates the possibility that a part of the child-screen video and a part of the parent-screen video are used as reference pictures in a mixed manner, thereby avoiding occurrence of a pseudo contour or a color blur. This enables a PinP video stream representing a high-definition picture-in-picture to be supplied to a broadcast receiving device.

With regard to the replacement portion, however, pixel blocks of a child-screen area in a picture belonging to the PinP video stream are permitted to reference pixel blocks of a child-screen area in another picture belonging to the PinP video stream. The arrows rp30, rp31, rp32, rp33 . . . in FIG. 56 indicate the reference relationship in which pixel blocks of a child-screen area in a picture belonging to the PinP video stream are referencing pixel blocks of a child-screen area in another picture belonging to the PinP video stream. Compressing the replacement portion by referencing a preceding or succeeding picture as described above improves the compression efficiency of the PinP video stream. That is to say, it is desirable that the replacement portion is compressed by referencing a preceding or succeeding picture in the PinP video stream, and the other portions are compressed by referencing the base video stream.

This is one of the above-mentioned improvements on the encoding limitation in a specific form. The picture-in-picture (enhancement) video stream and the base video stream are composed of the same number of pictures, and the DTS and PTS of each picture in the base video stream are set to the same times as the DTS and PTS of each picture in the enhancement video stream. The vertical lines in FIG. 56 indicate that the DTS of each picture in the base video stream is set to the same time as the DTS of a corresponding picture in the enhancement video stream. The picture identifiers of these pictures are assigned in the order of a picture of base video stream→a picture of enhancement video stream→a picture of base video stream→a picture of enhancement video stream. With this structure, the base video stream is identified by odd-number picture identifiers, and the enhancement video stream is identified by even-number picture identifiers.

On the other hand, a macroblock is composed of such elements as a macroblock type, a reference picture specifier (re_idx), and a motion vector, and it is possible to identify a picture that is to be a reference picture, by using the reference picture specifier. When odd numbers have been assigned to the picture identifiers of the base video stream as described above, the above-described restricted motion compensation can be realized by describing an odd picture identifier in the reference picture specifier. This completes the description of the encoding limitation. The following describes in detail how to structure the replacement information to generate the PinP video stream in the specific example.

Figure 57:
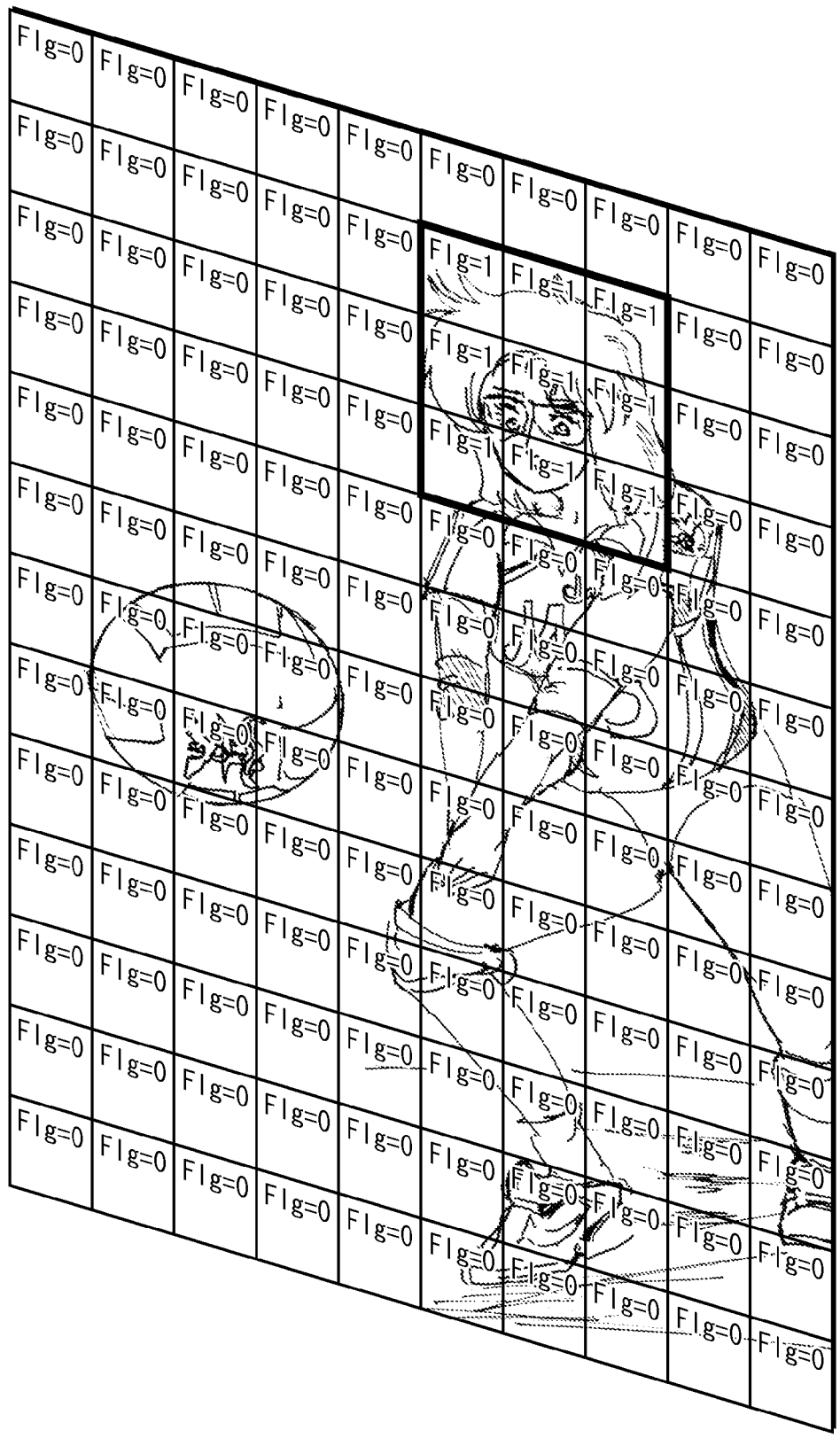
FIG. 57 illustrates one example of the internal structure of a picture in the PinP video stream.

FIG. 57 illustrates one example of the internal structure of a picture in the PinP video stream. FIG. 57 illustrates that a picture, in this example the picture illustrated in FIG. 55B, is composed a plurality of macroblocks. In FIG. 57, "Flg" indicates a flag in the replacement information, wherein the flags correspond to respective macroblocks constituting the picture. The flags corresponding to the macroblocks in the face portion of the character, which has been replaced, are set to "1", and the flags corresponding to the macroblocks in the other portions are set to "0". This is a specific form of the flag setting for each macroblock in the replacement information.

As described above, the metadata that is used in the editing process by the PinP video stream generating unit defines (i) the horizontal and vertical coordinates of the child-screen video for screen overly in each screen composition entry and (ii) horizontal and vertical widths after a scaling of the child-screen video. As a result, when the PinP video stream is generated, it is possible to determine, for each macroblock constituting a picture of the PinP video stream, whether or not a macroblock included in the picture belongs to the child-screen video in the picture-in-picture. Accordingly, after a picture of the PinP video stream is generated, it is possible to generate the replacement information by determining, for each macroblock constituting the picture, whether or not a macroblock included in the picture belongs to the child-screen video, and converting the determined results into information in units of macroblocks.

When the above-described encoding method is implemented, the PinP video stream needs to be generated on the hardware structure of the broadcast device. The following describes the processing procedure that is to be executed by the CPU of the broadcast device, for the implementation of the invention of the encoding method.

Figure 58:
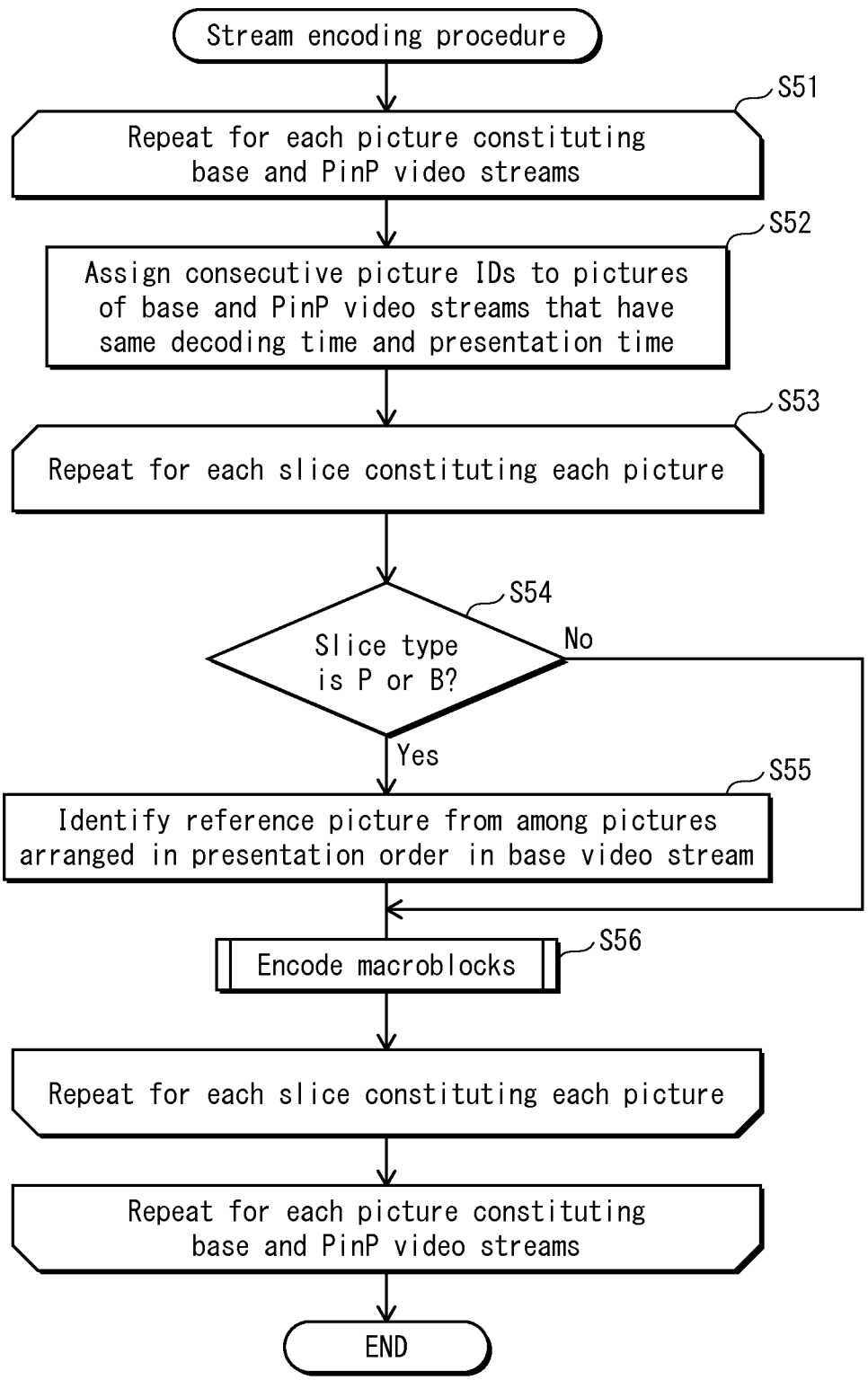
FIG. 58 is a flowchart illustrating the procedure for generating the PinP video stream.

FIG. 58 is a flowchart illustrating the procedure for generating the PinP video stream. The flowchart includes a loop in which the process of steps S52 through S56 is repeated for each picture constituting the base video stream and the enhancement video stream (step S51). In step S52, consecutive picture IDs are assigned to pictures of the base video stream and the picture-in-picture video stream that have the same decoding time and presentation time. Step S53 defines a loop in which steps S54 and S55 are repeated for each slice constituting each picture. In step S54, it is judged whether the slice type is B picture or I picture. In step S55, a reference picture is identified from among the pictures arranged in the presentation order in the base video stream. In step S56, macroblocks are encoded by using the identified reference picture.

Figure 59:
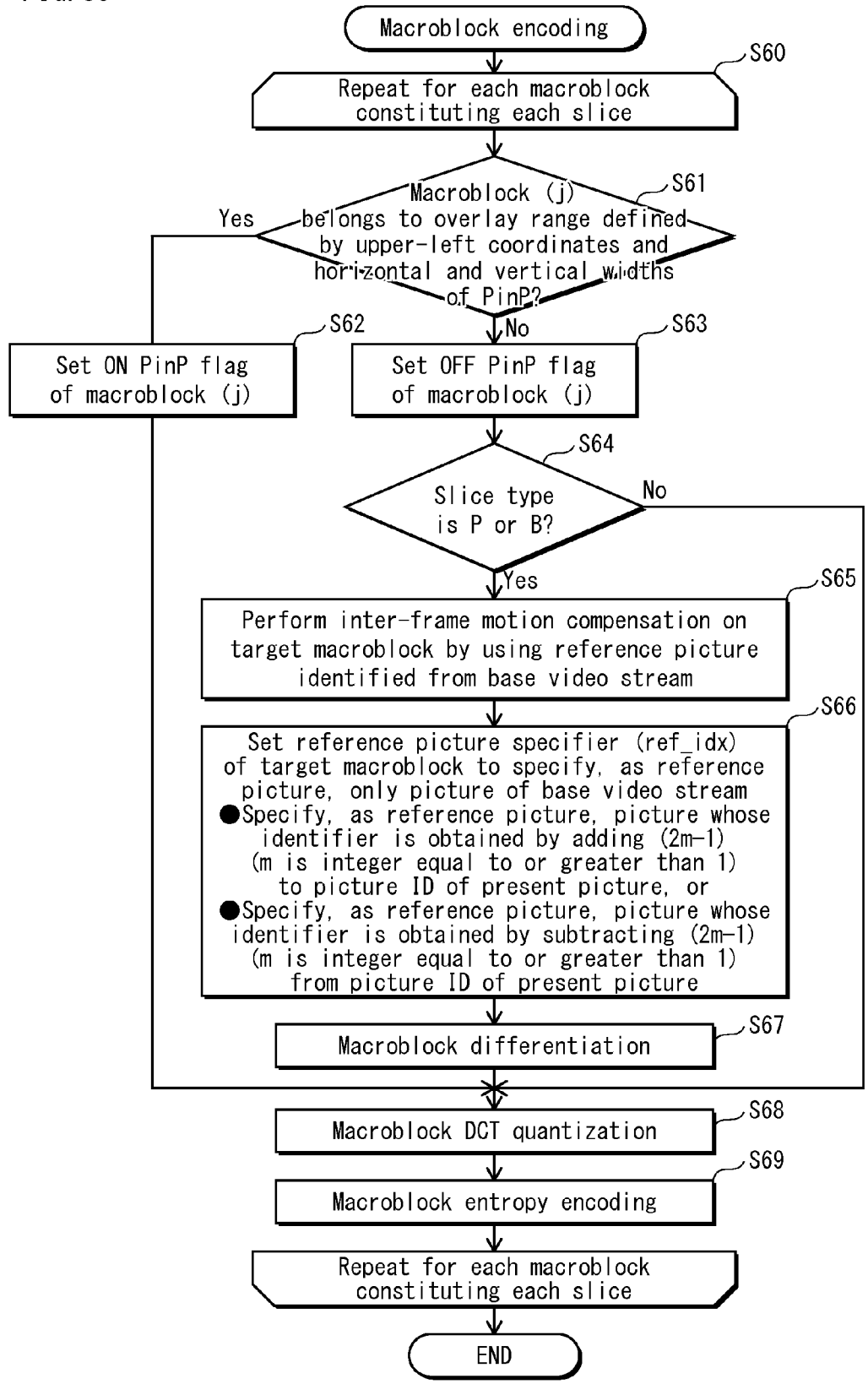
FIG. 59 illustrates the processing procedure of the macroblock encoding method.

FIG. 59 illustrates the processing procedure of the macroblock encoding method. In this flowchart, variable (j) is a control variable that identifies a processing target macroblock. Accordingly, in the following description of the flowchart, the processing target macroblock in the $j^{th}$ round of processing in the loop is denoted as "macroblock (j)".

Step S60 indicates that the predetermined steps are repeated for each macroblock constituting the slice. In step S61, it is judged whether the target macroblock belongs to a range defined by the upper-left coordinates and horizontal and vertical widths of the picture-in-picture. When it is judged that the target macroblock belongs to the range, the flag of the target macroblock is set ON (step S62), and skipping steps S63 through S67, the control proceeds to step S68 in which the DCT quantization is performed on the target macroblock. In step S69, the entropy encoding is performed on the target macroblock.

When it is judged that the target macroblock does not belong to the picture-in-picture overlay range, the flag of the target macroblock is set OFF (step S63). In step S64, it is judged whether the slice type is P picture or B picture. When it is judged No in step S64, the control proceeds to step S68. When it is judged in step S64 that the slice type is P picture or B picture, the inter-frame motion compensation is performed on the target macroblock by using the picture identified from the base video stream (step S65). In step S66, the reference picture specifier of the target macroblock is set to specify, as the reference picture, only a picture of the base video stream. This setting is made by specifying, as the reference picture, a picture whose identifier is obtained by adding (2m−1) (m is an integer equal to or greater than 1) to the picture ID of the present picture, or by specifying, as the reference picture, a picture whose identifier is obtained by subtracting (2m−1) (m is an integer equal to or greater than 1) from the picture ID of the present picture. Subsequently, in step S67, macroblock differentiation is performed, and the control proceeds to step S68.

The replacement information makes it possible to differentiate pixel blocks of the child-screen video from pixel blocks of the parent-screen video from. It is thus possible to determine, at the initial stage of the decoding process, whether or not the inter-frame motion compensation is necessary. When the inter-frame motion compensation is not necessary, it is possible to suitably decode the PinP video stream by processing the pixel blocks in bulk and processing the pixel blocks for which the motion compensation is necessary. This enables the picture-in-picture to be realized even in a decoder model of a scale that can process only the MVC-SD (SD image support version of MPEG4-MVC).

Figure 60:
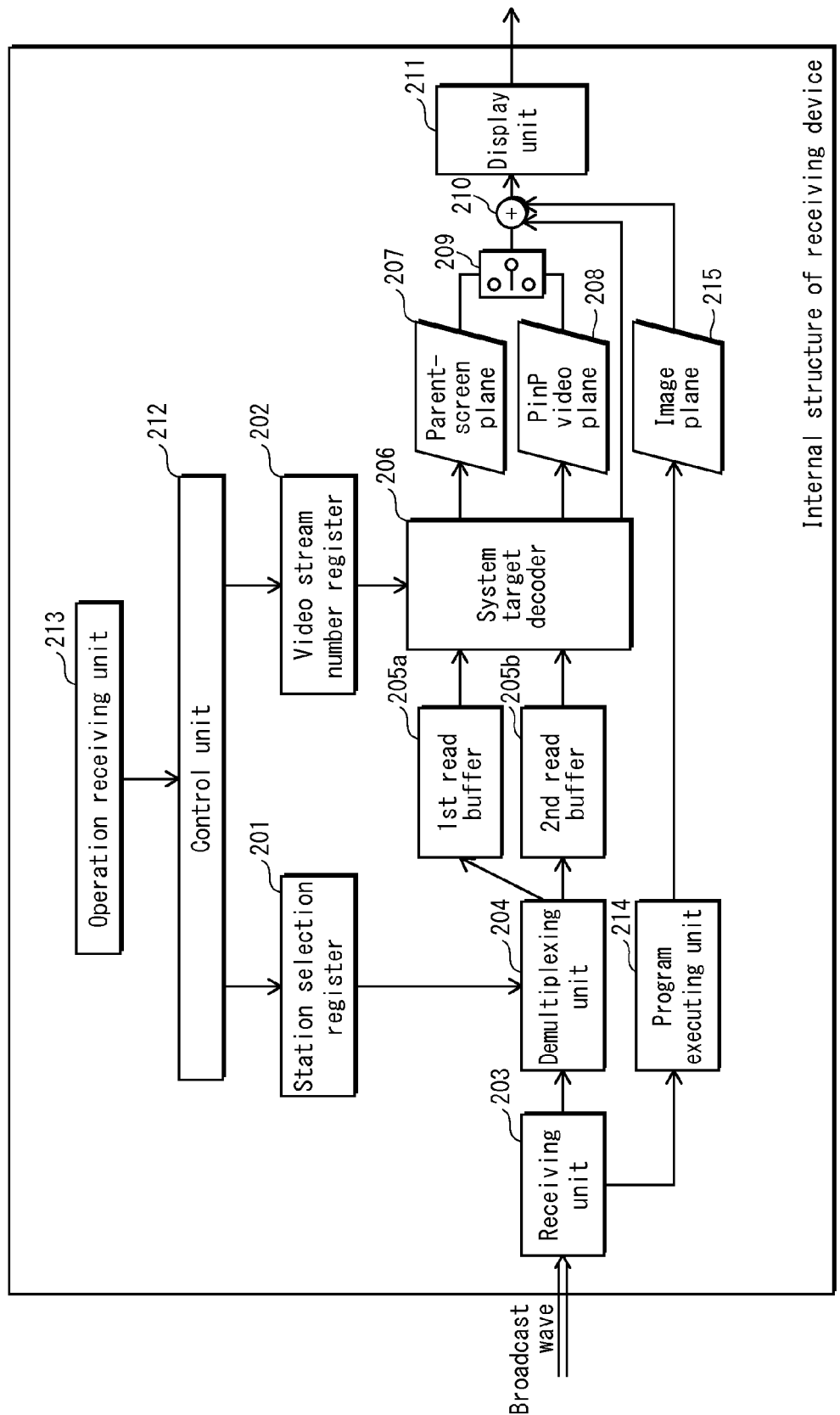
FIG. 60 is a diagram illustrating the internal structure of the receiving device.

The invention of the decoding method can be implemented on a video decoder implemented in a broadcast content receiving device. FIG. 60 is a diagram illustrating the internal structure of the broadcast content receiving device. As illustrated in FIG. 60, the receiving device includes: a station selection register 201 storing a station selection setting in the receiving device; a video stream number register 202 storing a current video stream number in the receiving device; a receiving unit 203 for obtaining a transport stream by receiving broadcast waves; a demultiplexing unit 204 for obtaining a video stream, an audio stream, and a subtitle stream by extracting TS packets from the transport stream in accordance with a PMT table corresponding to the station selection setting stored in the station selection register 201; a first read buffer 205a and a second read buffer 205b for storing TS packets constituting the video stream, audio stream and subtitle stream; a system target decoder 206 for decoding the audio stream and subtitle stream and decoding one of the base video stream and the PinP video stream that corresponds to the video stream number; a parent-screen plane memory 207 for storing pictures obtained by decoding the base video stream; a PinP plane memory 208 for storing pictures obtained by decoding the PinP video stream; a switch 209 for switching between the output from the parent-screen plane memory 207 and the output from the PinP plane memory 208 for display; an overlay unit 210 for overlaying pictures with subtitles; a display unit 211 for displaying the overlaid pictures; a control unit 212 for performing the settings of the station selection register 201 and the video stream number register 202 in accordance with a user operation or a viewing reservation setting, and controlling the whole device; an operation receiving unit 213 for receiving a user operation; a program executing unit 214 for activating an application and executing an application signaling by setting the boundary to a switch between broadcast services; and an image memory 215 for storing images drawn by the application.

In the video stream number register 202, stream numbers "1" and "2" are assigned to the base video stream and the PinP video stream, respectively. A register set of the receiving device includes the video stream number register 202 storing a current video stream number. The user changes the current video stream number as 1→2→1→2→ by operating keys of the remote control assigned to the video switching.

It is not realistic, in view of the cost, for the broadcast content receiving device to be provided with two sets of FullHD video decoders. Accordingly, it is considered realistic to use the MVC-SD video decoder of MPEG4 to process the picture-in-picture video stream.

Figure 61:
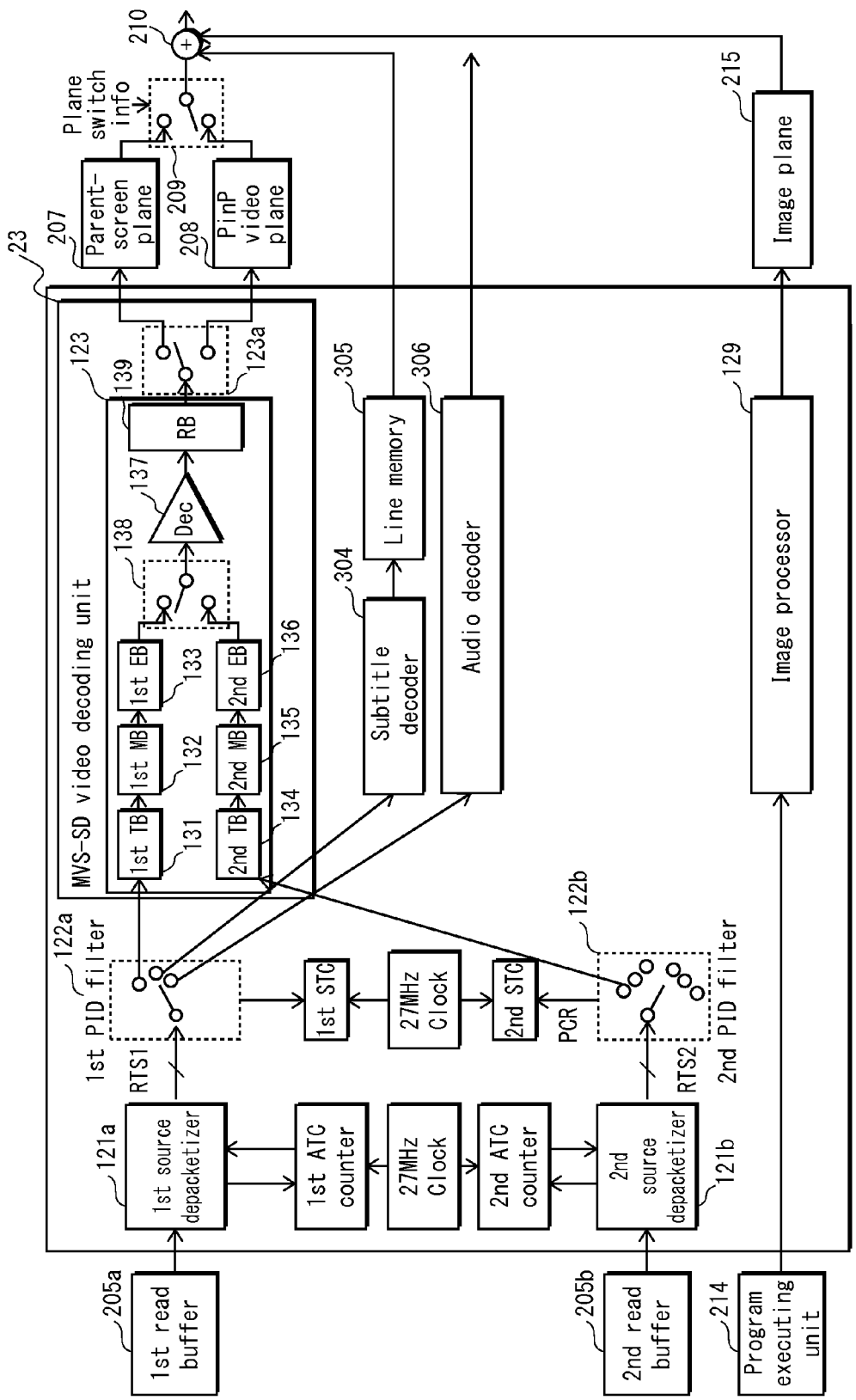
FIG. 61 illustrates one example of the internal structure of the system target decoder 104 in Embodiment 4.

FIG. 61 illustrates one example of the internal structure of the system target decoder 104 in Embodiment 4. FIG. 61 illustrates the structure wherein structural elements unique to processing of the digital broadcast contents are arranged in the peripheral of the video decoding unit 23 and the color depth extension unit 24 described in Embodiment 1.

FIG. 61 is based on the figure of the internal structure of the playback device in Embodiment 2. In comparison with this base structure, it should be noted that some structural elements for the products of Embodiment 2 are replaced with structural elements for the products of the present embodiment (PG decoder 125 and IG decoder 126→subtitle decoder 304 and line memory 305; primary audio decoder 127 and secondary audio decoder 128→audio decoder 306). The following described the replacing structural elements.

A subtitle decoder 304, including two buffer memories: a coded data buffer; and a pixel buffer, decodes a subtitle stream of a digital broadcast content. The coded buffer stores a graphics object and a text object in the encoded state. The pixel buffer stores a non-compressed graphics and a non-compressed text that are obtained by decoding the encoded graphics object and text object, respectively. The subtitle decoder 304 transfers data from the pixel buffer to the line memory in accordance with the page composition segment. For this transfer, a list of Regions is defined in the pixel buffer. The Region is a region defined on the buffer (pixel buffer) on which the graphics is stored, the graphics having been obtained in the subtitle decoding process (subtitle processing) in the subtitle decoder model.

The line memory 305 stores non-compressed graphics of a plurality of lines having been obtained by the decoding.

The audio decoder 306 decodes audio streams of the broadcast content.

This completes the explanation of the replaced structural elements. The following describes structural elements (first PID filter 122a, video decoding unit 123, first transport buffer 131a, second transport buffer 131b, and compressed-video decoder 137) that are modified in connection with the above-described replacement.

The first PID filter 122a, when the current video stream number is set to "1" when the picture-in-picture broadcast is received, causes, among the TS packets included in the transport stream, TS packets constituting the base video stream to be output to the video decoder and to be stored in the first transport buffer 131a therein. The first PID filter 122a, when the current video stream number is set to "2" when the picture-in-picture broadcast is received, causes, among the TS packets included in the transport stream, TS packets constituting the base video stream to be output to the video decoder and to be stored in the first transport buffer 131 therein, and causes, among the TS packets included in the transport stream, TS packets constituting the enhancement video stream to be output to the video decoder and to be stored in the second transport buffer 134 therein.

The video decoder 123, while inputting two lines of streams, namely the base video stream and the PinP video stream, outputs a video stream corresponding to the current video stream number to the screen. For example, when the current video stream number is set to "1", the video decoder 123 supplies, among the pictures obtained by the decoding, pictures having odd-number (2m−1) picture identifiers to the screen display. When the current video stream number is set to "2", the video decoder 123 supplies pictures of the PinP video stream to the screen display. To the pictures of the PinP video stream, picture identifiers 2m are assigned. Thus pictures having such identifiers are supplied to the screen display for the PinP video stream to be played back.

The first transport buffer 131, when the current video stream number is set to "1", stores TS packets output from the PID filter, and supplies the TS packets to the decoding.

The second transport buffer 134, when the current video stream number is set to "2", stores TS packets output from the second PID filter, and supplies the TS packets to the decoding. With this structure, when the current video stream number is set to "2" when the picture-in-picture broadcast is received, the base video stream, which has been obtained by compressing the parent-screen video (the video before partial replacement), is input to a series of processing system including the TB 131, the MB 132, the EB 133, and the compressed-video decoder 137. Also, the PinP video stream, which has been obtained by compressing the child-screen video (video of only the replaced face), is input to a series of processing system including the TB 134, the MB 135, the EB 136, and the compressed-video decoder 137.

The compressed-video decoder 137 transfers the decoded frame/field images to the DPB 139, and at the timing of the presentation time (PTS), transfers the corresponding frame/field images to the picture switch 124. With this, the pictures of the picture type (IDR type) are decoded, the pictures of the picture type (IDR type) being intended for the decoder refresh located at the head of the closed GOPs in the base video stream. In this decoding, coded data buffers and decoded data buffers are all cleared. After decoding the pictures of the IDR type in this way, the video decoder decodes the succeeding pictures in the base video stream, which have been compression-encoded based on the correlation with these decoded pictures, and the pictures in the PinP video stream. After non-compressed pictures are obtained by decoding the base video stream, the non-compressed pictures are stored in the decoded data buffer, and the non-compressed pictures are used as the reference pictures.

By using the reference pictures, the compressed-video decoder performs motion compensation on the macroblocks constituting the pictures succeeding the reference pictures in the base video stream, and the macroblocks constituting the pictures in the PinP video stream.

In the motion compensation of each macroblock, the motion prediction mode and reference frame are determined for each of 16×16, 16×8, 8×16, and direct/skip, the prediction direction is determined for each mode for the B frame, and an optimum mode is determined from among the sub partition mode, intra 4×4 mode, and intra 8×8 mode.

The above-described motion detection is performed hierarchically with, for example, a motion detection with the accuracy of integer pixels, a motion detection with the accuracy of ½ pixels, and a motion detection with the accuracy of ¼ pixels. In the motion detection with the accuracy of integer pixels, a predictive value of a motion vector is obtained by the median prediction, and the detection is performed centering on the predictive value. By repeating such motion compensation processes, the decoding of the base video stream and the PinP video stream is proceeded. As described above, the picture specifier of the macroblock specifies only a macroblock included in the parent-screen video as the reference picture. Accordingly, in such a motion detection, a macroblock of the parent-screen video is detected, without fail.

After non-compressed pictures of the succeeding pictures in the base video stream and pictures of the PinP video stream are obtained by the motion compensation, only the non-compressed pictures of the base video stream are stored in the decoded data buffer and they are used as the reference pictures.

The above-described decoding is performed when the decode start time indicated in the decode time stamp of each access unit is reached. The frame/field images encoded in this way are transferred to each plane via the picture switch 123*a*. The decoded images of the base video stream are transferred to a parent-screen video plane 207. The decoded images of the picture-in-picture video stream are transferred to a PinP video plane 208. A switch 209 allows for one of images output from the parent-screen video plane 207 and the PinP video plane 208 to be transferred to a plane adder 210 in accordance with plane switch information. Here, the plane switch information is information indicating which of the video in the parent-screen video plane and the video in the PinP video plane is to be transferred to the plane adder 210. The following describes the plane switch information. It is desirable that the plane switch information is recorded in any of the following locations (1) to (4).

(1) Base Video Stream or Header in PinP Video Stream

The plane switch information may be recorded in the base video stream or the header in the PinP video stream. For example, information indicating which of the planes should be output may be recorded for each frame/field constituting the base video stream. The compressed video decoder 137 inputs the information, together with the PTS that is assigned to each frame/field, to the plane switch 209 as the plane switch information indicating which of the storage contents of the parent-screen video plane 207 and the PinP video plane 208 is to be transferred to the plane adder 210. With this structure, either of the storage contents of the parent-screen video plane 207 and the PinP video plane 208 is transferred to the plane adder 210.

Alternatively, instead of the plane switch information being held for each frame/field, the plane switch information of a plurality of frames/fields may be held in bulk in the starting frame of a GOP.

(2) PMT (Program Map Table)

The plane switch information may be recorded in the PMT (Program Map Table). For example, the plane switch information may be held as a piece of information contained in the stream descriptor of the base video stream or the PinP video stream.

(3) Indication by Navigation Command or JAVA Command

In the case of the plane switch information described in the above items (1), (2) and (4), the location can be changed only in predetermined units/sections such as in units of video frames, in units of sections divided by PMTs, or in units of playitems. In contrast, for example, the navigation command or the JAVA command may be used to change it in an interactive manner. That is to say, the viewer may operate, for example, the remote control to switch between the parent-screen video and the video in which only the face has been replaced.

(4) Instruction from Playitem Information, Sub Playitem Information

When the PinP video stream is recorded on a recording medium and is supplied to a playback device via the recording medium, the plane switch information may be provided in units of playitems or sub playitems. For example, images in the parent-screen video plane 207 may be transferred to the plane adder 210 in the initial playitem section, and in the next playitem section, images in the PinP video plane 208 may be transferred to the plane adder 210.

The recording location of the plane switch information is not limited to the above-mentioned locations, but may be recorded in a server on a network, and may be obtained by apparatuses as necessary.

(Intermittent Transmission of Pictures of PinP Video Stream)

In the above-described transfer, there may be a case where the pictures of the PinP video stream exist intermittently on the playback time axis of the base video stream. Here, the case where the pictures of the PinP video stream exist intermittently means that the transmission device performs an intermittent transmission by not transmitting pictures of the PinP video stream in correspondence with pictures of the base video stream that are not partially replaced with other images. In that case, if information indicating the presence/absence of a PinP picture is not stored in any location, an underflow will occur in a buffer (the second TB, second MB, or second EB) provided on the video decoder side.

In an actual application of the PinP video stream, there is a case where a person is replaced with another person only in one scene in the video of the base video stream, and for the other scenes, the base video stream is output as it is. In such a case where the base video stream is output as it is, it is desirable that a corresponding portion of the PinP video stream is not transferred.

However, from the viewpoint of the decoder provided in the device, if a transfer of the PinP video stream stops suddenly, an underflow may occur in buffers for the PinP video stream complying with the MPEG (the second TB, second EB and second MB), and a reference picture may be lost in the middle of decoding of the PinP video stream, or the decoding parameter may be reset. To avoid this, it is desirable that a presence/absence flag is included in each picture of the base video stream, the presence/absence flag indicating whether or not a corresponding picture of the PinP video stream is present. Alternatively, it is desirable that a presence/absence flag is included in any of the above-described locations (1) to (4), the presence/absence flag indicating, with regard to each picture of the base video stream, whether or not a corresponding picture of the PinP video stream is present. On the other hand, the video decoder extracts in sequence the presence/absence flag, which indicates whether or not a corresponding picture of the PinP video stream is present, from the base video stream or any of the above-described locations (1) to (4), and when the flag extracted from the playback target picture changes from the one indicating the "presence of the picture" to the one indicating the "absence of the picture", freezes the decoding of the PinP video stream while maintaining the state of the buffers in the video decoder. With this structure, the video decoder can omit the processing of the PinP video stream while maintaining the storage contents of the second TB, second EB and second MB for the PinP video stream, and saving the decoding parameters.

Conversely, when the flag extracted from the playback target picture changes from the one indicating the "absence of the picture" to the one indicating the "presence of the picture", the video decoder stops freezing the decoding of the PinP video stream, and resumes the decoding operation from the state of the buffers immediately before the freezing. This structure makes it possible to avoid an underflow from occurring in a processing system pertaining to the PinP video stream.

Figure 62:
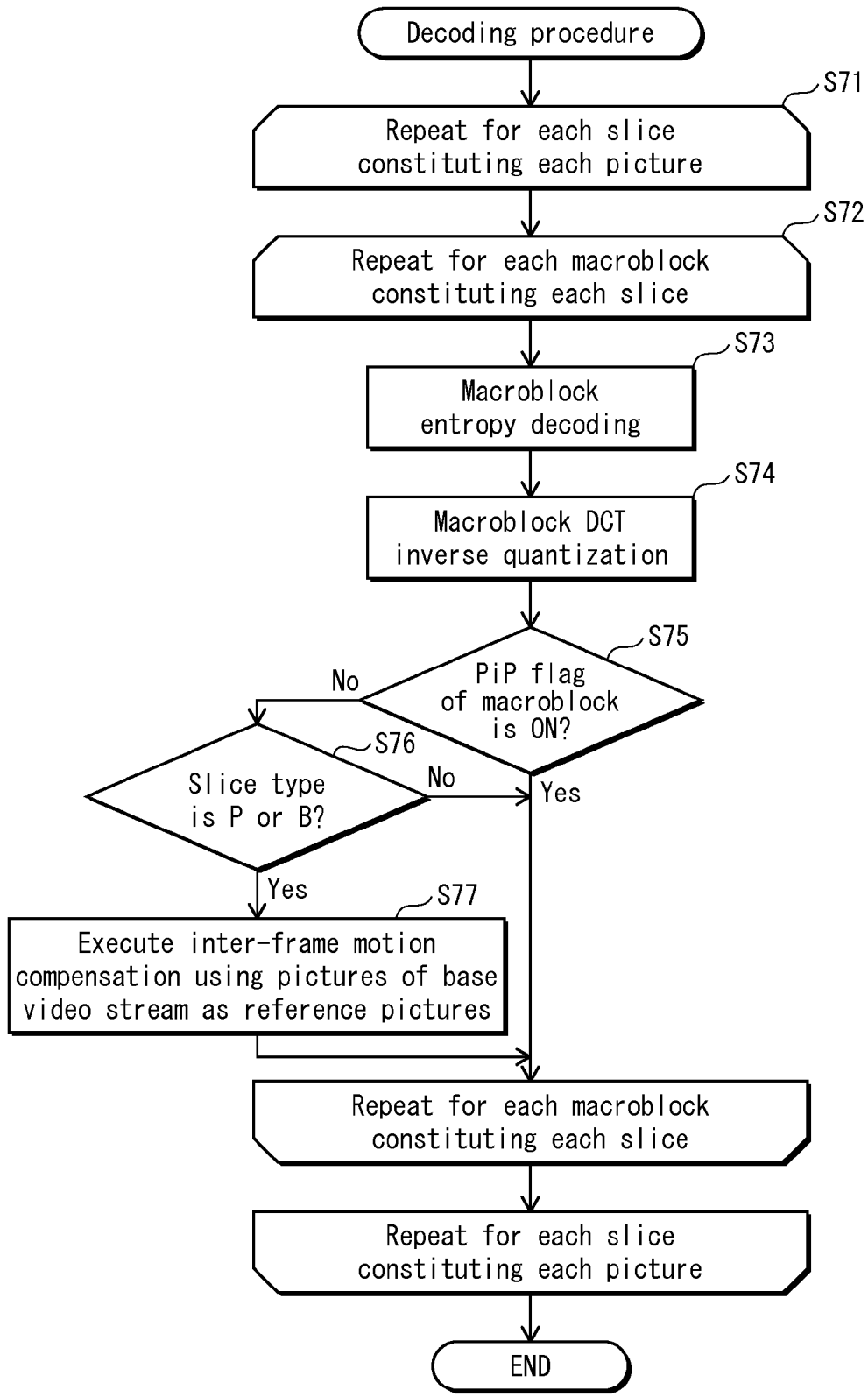
FIG. 62 is a flowchart illustrating the decoding procedure in Embodiment 4.

The following describes the implementation of the decoding method. When the above-described decoding method is implemented, the PinP video stream needs to be decoded on the hardware structure of the content broadcast receiving device. The following describes the processing procedure that is to be executed by the CPU of the content broadcast receiving device, for the implementation of the invention of the decoding method. FIG. 62 is a flowchart illustrating the decoding procedure. In this flowchart, variable (i) is a control variable that identifies a processing target picture. Accordingly, in the following description of the flowchart, the processing target picture in the "i"th round of processing in the loop is denoted as "picture (i)". A processing target macroblock in the slice (i) is denoted as macroblock (j).

Step S71 defines a loop in which steps S72 to S77 are repeated for each slice constituting each picture. Step S72 defines a loop in which steps S73 to S77 are repeated for each macroblock constituting each slice. In step S73, an entropy decoding of macroblock (j) is performed. In step S74, a DCT inverse quantization of macroblock (j) is performed. In step S75, it is judged whether or not the flag of macroblock (j) in the replacement information is ON. When it is judged that the flag is ON, the control proceeds to processing of the next macroblock. When it is judged that the flag is OFF, the control proceeds to step S76, in which it is judged whether the slice type is B picture or I picture. When it is judged Yes in step S76, the control proceeds to step S77, in which the inter-frame motion compensation is executed by using pictures of the base video stream as the reference pictures.

Effects of the Invention

As described above, according to the invention of the present embodiment, pixel blocks of portions other than the child-screen video portion match in units of pixels, including the lower bits. Accordingly, even when compressing by using the parent-screen video as a reference picture, the encoding process does not need to be performed on the portions that are the same including the lower bits, and as the structure of the macroblocks of the child-screen video, only a list of picture specifiers specifying macroblocks in the base video stream needs to be provided. This makes it possible to restrict the target of the encoding process to the child-screen video stream portion, which is the replacement target portion. This enables the picture-in-picture to be realized even in a video decoder model (MVC-SD video decoder) of a scale that does not assume playback of full HD video.

Embodiment 5

In the previous embodiment, the PinP video stream is created on a transmission device that transmits broadcast contents. In the present embodiment, the PinP video stream is created on a playback device.

With regard to an application for replacing an actor/actress in the parent-screen video with another actor/actress, the author may create a PinP video stream and record it on a Blu-ray ReadOnly disc in advance, or a PinP video stream may be held by a server on a network, and when the PinP video stream is to be played back, a player may download an AV stream (PinP video stream) including the PinP video stream from the network. In an embodiment for that case, a PinP video stream may be created by the method of the previous embodiment, and a playback device may play back the PinP video stream recorded on a recording medium.

In the present embodiment, in addition to a playback of the above-described PinP video stream, the playback device realizes the process of obtaining a child-screen video that is the replacement target and creating the PinP video stream.

Figure 63:
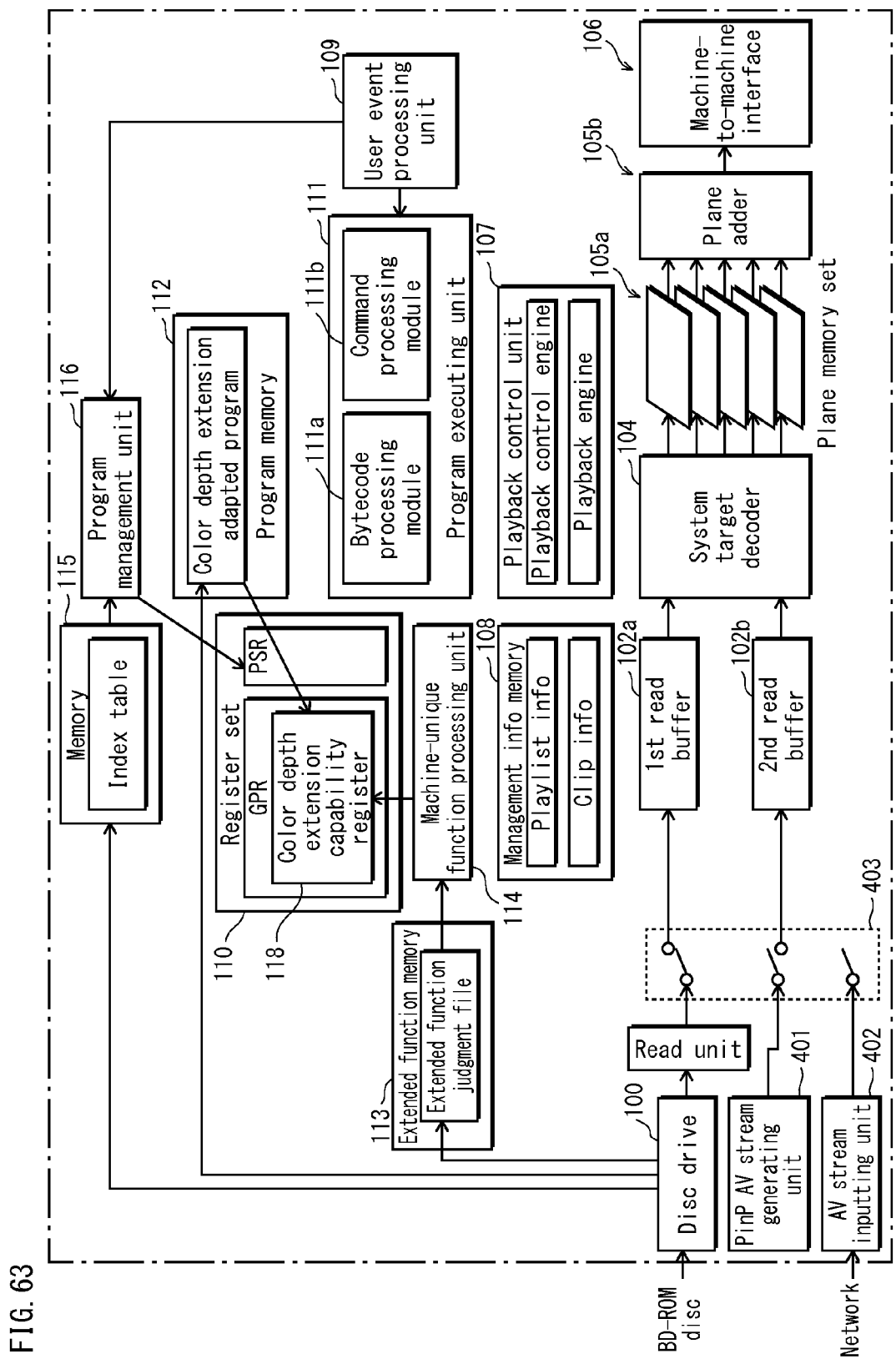
FIG. 63 illustrates one example of the internal structure of the playback device in Embodiment 5.

FIG. 63 illustrates one example of the internal structure of the playback device in Embodiment 5. An improvement provided by the playback device lies in the presence of a PinP video stream generating unit 401 for generating a PinP video stream, an AV stream inputting unit 402 for inputting an AV stream, and an input switch 403. As illustrated in FIG. 63, an AV stream inputting unit for obtaining a PinP video stream from a network is additionally included. The AV stream inputting unit is an apparatus for inputting an AV stream, which is stored, for example, in a recording medium on a network, via the network, and is connected to the first read buffer 102a or the second read buffer 102b via the input switch 403. In spite of the difference of whether the PinP video stream is recorded on a Blu-ray ReadOnly disc or a server, the latter process is the same as the one that has been explained up to now.

Here, the following discusses a device structure for the case where the face of an actor in the parent-screen video is replaced with the face of the viewer.

As a device for replacing an image with an image of the viewer, the PinP video stream generating unit has been added in the drawing.

The following describes the PinP video stream generating unit. The PinP video stream generating unit realizes the picture-in-picture by overlaying, in accordance with the metadata, each picture constituting the child-screen video stream on each picture constituting the parent-screen video stream. This metadata is composed of playback section entries that correspond to the playback sections set for the parent-screen video stream. The playback section entry includes: a header that includes a reference to a playback section set for the parent-screen video stream; and a plurality of screen composition entries. In accordance with this metadata, the PinP video stream generating unit performs a process of replacing the face of an actor/actress playing the lead role of a movie with the face of the user himself/herself, and obtains a PinP video stream.

Figure 64:
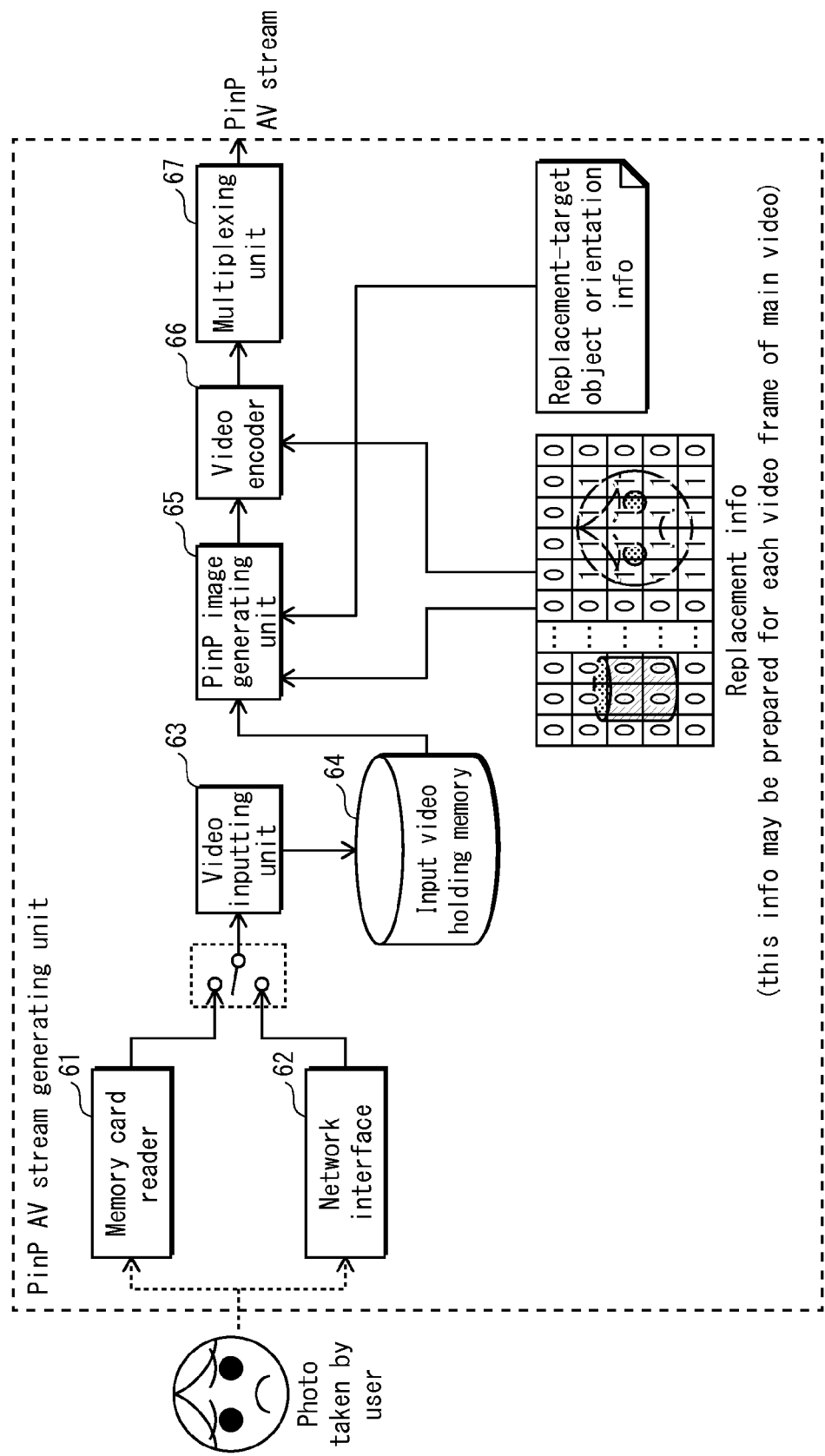
FIG. 64 illustrates the internal structure in which an AV stream inputting unit has been added for the PinP video stream to be obtained from a network.

FIG. 64 illustrates details of the PinP video stream generating unit for generating the PinP video stream based on a photograph taken by the user. As illustrated in FIG. 64, the PinP video stream generating unit includes: a memory card reader 61 for reading data from a semiconductor memory card; a network interface 62 for performing data transmission/reception with the network; a video inputting unit 63 for inputting image data that is to be the parent-screen video and image data that is to be the child-screen video; an input video holding memory 64 for storing the input video; an image generating unit 65 for obtaining a picture-in-picture image by using the replacement information, replacement target, and metadata; a video encoder 66 for obtaining a PinP video stream by encoding the picture-in-picture image obtained by the conversion; and a multiplexing unit 67 for generating a transport stream by multiplexing the PinP video stream.

It is assumed here that the photograph taken by the user is recorded on a recording medium such as a memory card, or on a recording medium provided in a server on a network. In the case where the photograph is recorded on a memory card, the video inputting unit 63 inputs the photograph into the playback device via the memory card, and in the case where the photograph is recorded on a recording medium of a server, the video inputting unit 63 inputs the photograph into the playback device via the network interface. The input photograph is held by the memory of the playback device.

The image held by the input video holding memory is converted by the PinP video stream generating unit into a replacing image. There may be cases where the photograph taken by the user is a front face of the user, while the actor/actress playing the lead role of a movie faces a direction other than the front, or the size of the lead role changes depending on the scene. The PinP video stream generating unit converts the photograph taken by the user such that the user in the photograph faces the same direction as the replacement-target object (in the present embodiment, the face in the parent-screen video stream), by using the "replacement-target object orientation information". Also, since the size of the replacement-target object changes for each scene, the PinP video stream generating unit performs enlargement or reduction based on the replacement information such that the face of the user matches the replacement-target object (face) in size.

The photograph taken by the user is converted as described above by the PinP video stream generating unit for replacement, and is input into the second video encoder 44. The second video encoder 44 generates a PinP video stream by the method explained with reference to FIG. 53. The PinP video stream is multiplexed by the multiplexing unit, and an AV clip is generated.

<Supplementary Notes>

Up to now, the present invention has been described through the best embodiments that the Applicant recognizes as of the application of the present application. However, further improvements or changes can be added regarding the following technical topics. Whether to select any of the embodiments or the improvements and changes to implement the invention is optional and may be determined by the subjectivity of the implementer.

<Form of Replacement Information>

A macroblock is composed of such elements as a macroblock type, a reference picture specifier, and a motion vector. In the PinP video stream described in Embodiment 4, a motion compensation is not performed for the child-screen video stream. Accordingly, the motion vector field of the macroblock may be used as a flag. In that case, the replacement information does not need to be defined independently, which reduces the data size.

<Implementation of Encoder>

The conversion to positive values described in Embodiment 1 is performed in the case where the second video encoder cannot compress the image information including a negative value. However, the conversion may not be performed when the adopted video compression method can deal with negative values. With regard to the color depth extension, the above embodiments describes that the current 8-bit sequences are extended. Not limited to this, however, for example, the base video stream may be composed of 6-bit sequences and the original image may be composed of 8-bit sequences.

Furthermore, video codec used by the first and second video encoders may be MPEG2, MPEG-4AVC, or VC1. However, not limited to these, for example, the first video encoder may perform the encoding as the baseview of the MPEG-4MVC, and the second video encoder may perform the encoding as the non-baseview of the MPEG-4MVC. As another example, different video codecs may be applied to the two encoders, for example, the first video encoder conforming to MPEG2 and the second video encoder conforming to MPEG-4AVC.

Furthermore, the number of bits represented by N, which indicates the color depth of each color of each pixel constituting the original image, may be the same for each picture constituting the original image, or may be different for each picture. In these cases, it is desirable, in view of the decoding process described below, that the number of bits constituting the gradation bit sequence of the original image is included in the base video stream or the enhancement video stream.

<Association with Extended Files>

It is desirable that file names of files to be recorded in the color depth extension directory for the color depth extension are determined based on the following conversion rules. That is to say, for each file stored in the BDMV directory, the file name body and the extension of the file name are combined to form a new file body, an extension ".ext" is attached to the file body, and the file is stored in an extended directory by the new file name. For example, with regard to a file "00001.mpls", the file name is converted into "mpls00001.ext", and the file is stored in the extended directory by the file name as a color depth extension playlist. Also, with regard to a file "00001.m2ts", the file name is converted into "m2ts00001.ext", and the file is stored in the extended directory by the file name as a color depth extension playlist.

<Realization of Processing in Units of Macroblocks>

Encoding and decoding are performed in units of macroblocks. Accordingly, it is desirable to provide, in each of the structural elements of the color depth extension unit and the stream generating unit described in Embodiments 1 and 2 (shift circuit, subtracter, adder, encoder, and decoder), an internal buffer for storing a set of pixels of macroblocks, and store an intermediate computation result data in the internal buffer.

<Shift Amount>

In Embodiment 1, the highest bit in the gradation bit sequence of the enhancement video stream is used as the target bit position when the target bit position is used as the shift amount by which the gradation bit sequence of pictures of the enhancement video stream is shifted. However, not limited to this, a shift count indicating the number of bits to be shifted toward the MSB may be used instead. For example, in the case where the gradation bit sequence is composed of six bits (the highest bit is the $6^{th}$ bit), "2 (=6−4)" may be indicated as the shift amount.

<Location of PinP Video Stream Generating Unit>

In Embodiment 5, the PinP video stream generating unit is explained as one functional block included in a player, as illustrated in FIG. 64. However, not limited to this, the same function may be realized by an application on a server on a network. In that case, the user uploads the photograph taken by the user onto the server, and an application of the server side generates a PinP video stream from the uploaded photograph, and the player obtains the PinP video stream via the AV stream inputting unit 402. In this way, the same function is realized by the application.

<Location of Replacement Information, Replacement-Target Object Orientation Information>

Information such as the replacement information and the replacement-target object orientation information illustrated in FIG. 65 may be recorded on a Blu-ray ReadOnly disc as supplementary information, or may be held on a server on a network.

<Embodiment of Integrated Circuit>

Among the hardware structural elements of the display device and playback unit described in the embodiments, components which correspond to logic circuits and storage elements, namely, the core of logic circuits excluding a mechanical part composed of the drive unit of the recording medium, connectors to external devices and the like, may be realized as a system LSI. The system LSI is obtained by implementing a bare chip on a high-density substrate and packaging them. The system LSI is also obtained by implementing a plurality of bare chips on a high-density substrate and packaging them, so that the plurality of bare chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as a power supply, ground, and an interface with other circuits. Since, as described above, the pins in the system LSI play a role of an interface, the system LSI, which is connected with other circuits via the pins, plays a role as the core of the playback device.

<Embodiments of Program>

The application program described in each embodiment of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language he/she uses.

The written source program is sent to the compiler as files. The compiler translates the source program and generates an object program.

The translation performed by the compiler includes processes such as the syntax analysis, optimization, resource allocation, and code generation. In the syntax analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and Java™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program described here may be recorded on a computer-readable recording medium, and may be provided to the user in this form.

<Realization by BD-J Application>

The program file for performing the process of the extended functions may be a BD-J application whose operation is defined by a BD-J object.

In the platform unit of the BD-J application (BD-J platform), the main operating body is a group of software including a HAVi device, a playback control engine for playing back a playlist by the Java media framework, a cache manager for the Cache-In-Cache-Out management, and an event manager for the event process, namely, a group of software that resembles a group of software in a multimedia home platform terminal for digital broadcasting (DVB-MHP).

When an extended-function-adapted application is implemented as a system application for operation on the BD-J platform, usable APIs include "Java2Micro_Edition (J2ME) Personal Basis Profile (PBP 1.0)" and "Globally Executable MHP specification (GEM1.0.2) for package media targets". Use of these APIs makes it possible to describe the processes pertaining to the color depth extension display by the structured programming using the method, constructor, interface, and event of such classes as java.net for the network process, java.awt for the GUI process, java.lang for the language process, java.io for the input/output process with the recording medium, java.util which is a utility, and javax.media for media framework.

The extension API for the BD-J platform (called "BD-J extension") is used to realize the data structure for the color depth extension playback described in the above embodiments, and the control using playback units of the color depth extension playback. The BD-J extension includes methods having been inherited from the methods of the following classes: java.net, java.awt, java.lang, java.io, java.util, and javax.media. The interface of these classes is provided as an embedded interface or a super interface. It is therefore possible to create an application that is suited for the color depth extension playback, as an extension of a programming technique using the classes java.net, java.awt, java.lang, java.io, java.util, and javax.media.

The "BD-J object" defines detailed operations of the playback device in the BD-J mode. More specifically, the detailed operations of the playback device include: (1) class load of application when the corresponding title has become the current title; (2) application signaling when the corresponding title has become the current title; (3) HAVi device configuration when the application started by the application signaling executes the GUI process; (4) playlist access in the current title; (5) Cache In Cache Out of the class archive file when the corresponding title has become the current title; and (6) event assignment in which an event, which is a trigger for the started application, is assigned to a key.

The "class load" is a process of generating an instance of a class file archived in the class archive file into the heap area of the platform. The "application signaling" is a control for defining whether to automatically start an application that is an instance of a class file, or whether to set the life cycle of the application as a title boundary or a disc boundary. Here, the title boundary is a control that erases a thread as an application from the heap area at the same time as a title ends; and the disc boundary is a control that erases a thread as an application from the heap area at the same time as a disc eject. Conversely, a control that does not erase a thread from the heap area even if a disc eject is performed is called a "disc unboundary". The "HAVi device configuration" defines the resolution of the graphics plane, fonts to be used in display of characters and the like when the application executes the GUI process.

The "playlist access" specifies a playlist that the started application can instruct to be played back, and a playlist that is to be played back automatically when a title is selected.

The "Cache In of the class archive file" is a process for reading a class archive file, which is a target of the class load, into the cache preliminarily. The "Cache Out of the class archive file" is a process for deleting a class archive file from the cache. The "event assignment to drive an application" is a process for assigning an event, which has been registered in the event listener of the application, to a key that can be operated by the user.

<Recording Areas of Color Depth Extension Interleaved Stream File and m2ts Stream File>

The color depth extension interleaved stream file and the m2ts stream file are formed on a plurality of sectors that are physically continuous in the partition area. The partition area is an area accessed by the file system and includes an "area in which file set descriptor is recorded", "area in which end descriptor is recorded", "ROOT directory area", "BDMV directory area", "JAR directory area", "BDJO directory area", "PLAYLIST directory area", "CLIPINF directory area", "STREAM directory area", and "CLREXT directory area". The following explains these areas.

The "file set descriptor" includes a logical block number (LBN) that indicates a sector in which the file entry of the ROOT directory is recorded, among directory areas. The "end descriptor" indicates an end of the file set descriptor.

Next, a detailed description is given of the directory areas. The above-described directory areas have an internal structure in common. That is to say, each of the "directory areas" is composed of a "file entry", "directory file", and "file recording area of lower file".

The "file entry" includes a "descriptor tag", "ICB tag", and "allocation descriptor".

The "descriptor tag" is a tag that indicates that the entity having the descriptor tag is a file entry.

The "ICB tag" indicates attribute information concerning the file entry itself.

The "allocation descriptor" includes a logical block number (LBN) that indicates a recording position of the directory file. This completes the explanation of the file entry. Next, a detailed description is given of the directory file.

The "directory file" includes a "file identification descriptor of lower directory" and "file identification descriptor of lower file".

The "file identification descriptor of lower directory" is information that is referenced to access a lower directory that belongs to the directory file itself, and is composed of identification information of the lower directory, the length of the directory name of the lower directory, a file entry address that indicates the logical block number of the block in which the file entry of the lower directory is recorded, and the directory name of the lower directory.

The "file identification descriptor of lower file" is information that is referenced to access a file that belongs to the directory file itself, and is composed of identification information of the lower file, the length of the lower file name, a file entry address that indicates the logical block number of the block in which the file entry of the lower file is recorded, and the file name of the lower file.

The file identification descriptors of the directory files of the directories indicate the logical blocks in which the file entries of the lower directory and the lower file are recorded. By tracing the file identification descriptors, it is therefore possible to reach from the file entry of the ROOT directory to the file entry of the BDMV directory, and reach from the file entry of the BDMV directory to the file entry of the PLAYLIST directory. Similarly, it is possible to reach the file entries of the CLREXT directory, JAR directory, BDJO directory, CLIPINF directory, and STREAM directory. The "file recording area of lower file" is an area in which the substance of the lower file that belongs to a directory. A "file entry" of the lower entry and one or more "extents" are recorded in the "file recording area of lower file".

The color depth extension stream file that constitutes the main feature of the present application is recorded in a file recording area that exists in the directory area of the directory to which the file belongs. It is possible to access the color depth extension stream file by tracing the file identification descriptors of the directory files, and the allocation descriptors of the file entries.

INDUSTRIAL APPLICABILITY

The information recording medium of the present invention stores video with extended color depth, and can be played back by either a playback device supporting video with color depth represented by eight bits or a playback device supporting video with color depth represented by more than eight bits. This makes it possible to supply a high-definition video content such as a movie content with extended color depth into the market without considering the compatibility, and therefore will activate the movide market and commercial equipment market. Accordingly, the recording medium and playback device of the present invention have high usability in the movie industry and commercial equipment industry.

REFERENCE SIGNS LIST

1000 playback device
1001 disc medium
1002 remote control
1003 display device

The invention claimed is:

1. A recording method for recording a base video stream and an enhancement video stream, the recording method comprising:
a first step of generating the base video stream by performing an irreversible conversion on an original image; and
a second step of generating the enhancement video stream that includes a shift parameter and picture data, wherein
a gradation bit sequence of each pixel constituting the picture data of the enhancement video stream is a bit string representing a portion of a difference between a gradation bit sequence of each pixel constituting picture data of the original image and a gradation bit sequence of each pixel constituting picture data of the base video stream,
the shift parameter relates to shift processing that is performed by a playback device when the gradation bit sequence of the base video stream is added to the gradation bit sequence of the enhancement video stream,
the shift processing is either (i) a combination of a first shift operation of shifting the gradation bit sequence of the base video stream by a predetermined bit width and a second shift operation of extending an added gradation bit sequence to a bit width of the gradation bit sequence of the original image, the added gradation bit sequence obtained by adding the gradation bit sequence of the base video stream to the gradation bit sequence of the enhancement video stream, or (ii) a combination of a third shift operation of shifting the gradation bit sequence of the enhancement video stream by a predetermined bit width and a fourth shift operation of extending the gradation bit sequence of the base video stream, which is to be added to the shifted gradation bit sequence of the enhancement video stream, to a bit width of the gradation bit sequence of the original image, and
the shift parameter specifies the predetermined bit width for the first shift operation or the predetermined bit width for the third shift operation.

2. The recording method of claim 1, wherein
the gradation bit sequence of the enhancement video stream is obtained by extending a bit width of the gradation bit sequence of the base video stream to a bit width of the gradation bit sequence of the original image to obtain an extended gradation bit sequence, subtracting the extended gradation bit sequence from the gradation bit sequence of the original image to obtain a subtraction-result value, and converting the subtraction-result value into a positive value.

3. The recording method of claim 1, wherein
each of the picture data of the base video stream and the picture data of the enhancement video stream is composed of a plurality of groups of pictures, each of the plurality of groups of pictures is composed of a plurality of frames, and a plurality of shift parameters respectively corresponding to the plurality of frames are provided as a parameter sequence.

4. A recording device for recording a base video stream and an enhancement video stream onto a recording medium, the recording device causing a computer comprising a processor and a memory to execute the steps of:
obtaining the base video stream by performing an irreversible conversion on an original image, the base video stream being composed of pixels each including a gradation bit sequence of a predetermined bit width;
obtaining a non-compressed picture by decoding the base video stream, the non-compressed picture being composed of pixels each including a gradation bit sequence that is shorter than a gradation bit sequence of pixels of the original image in bit width;
calculating a difference between a gradation bit sequence of each pixel constituting the original image and a corresponding gradation bit sequence of the non-compressed picture of the base video stream; and
generating the enhancement video stream that includes a shift parameter and picture data, wherein a gradation bit sequence of each pixel constituting the picture data of the enhancement video stream is the difference calculated in the calculating, wherein
the shift parameter relates to shift processing that is performed by a playback device when the gradation bit sequence of the base video stream is added to the gradation bit sequence of the enhancement video stream,
the shift processing is either (i) a combination of a first shift operation of shifting the gradation bit sequence of the base video stream by a predetermined bit width and a second shift operation of extending an added gradation bit sequence to a bit width of the gradation bit sequence of the original image, the added gradation bit sequence obtained by adding the gradation bit sequence of the base video stream to the gradation bit sequence of the enhancement video stream, or (ii) a combination of a third shift operation of shifting the gradation bit sequence of the enhancement video stream by a predetermined bit width and a fourth shift operation of extending the gradation bit sequence of the base video stream, which is to be added to the shifted gradation bit sequence of the enhancement video stream, to a bit width of the gradation bit sequence of the original image, and the shift parameter specifies the predetermined bit width for the first shift operation or the predetermined bit width for the third shift operation.

5. The recording device of claim 4, wherein the calculating includes:

obtaining shifted gradation bit sequences by shifting a gradation bit sequence of each pixel constituting the non-compressed picture of the base video stream toward the most significant bit;

obtaining subtraction results by subtracting each of the obtained shifted gradation bit sequences from the gradation bit sequence of each pixel constituting the original image; and obtaining differences by adding a predetermined correction value to each of the obtained subtraction results, wherein the enhancement video stream includes the obtained differences, and a shift parameter that is used in the obtaining of shifted gradation bit sequences.

6. A computer-readable non-transitory recording medium having recorded thereon a base video stream generated by performing an irreversible conversion on an original image and an enhancement video stream that includes a shift parameter and picture data, wherein a gradation bit sequence of each pixel constituting the picture data of the enhancement video stream represents a portion of a difference between a gradation bit sequence of each pixel constituting picture data of the original image and a gradation bit sequence of each pixel constituting picture data of the base video stream, the shift parameter relates to shift processing that is performed by a playback device when the gradation bit sequence of the base video stream is added to the gradation bit sequence of the enhancement video stream, the shift processing is either (i) a combination of a first shift operation of shifting the gradation bit sequence of the base video stream by a predetermined bit width and a second shift operation of extending an added gradation bit sequence to a bit width of the gradation bit sequence of the original image, the added gradation bit sequence obtained by adding the gradation bit sequence of the base video stream to the gradation bit sequence of the enhancement video stream, or (ii) a combination of a third shift operation of shifting the gradation bit sequence of the enhancement video stream by a predetermined bit width and a fourth shift operation of extending the gradation bit sequence of the base video stream, which is to be added to the shifted gradation bit sequence of the enhancement video stream, to a bit width of the gradation bit sequence of the original image, and the shift parameter specifies the predetermined bit width for the first shift operation or the predetermined bit width for the third shift operation.

7. A playback system including a recording medium and a playback device, the recording medium having recorded thereon a base video stream generated by performing an irreversible conversion on an original image and an enhancement video stream that includes a shift parameter and picture data, wherein a gradation bit sequence of each pixel constituting the picture data of the enhancement video stream represents a portion of a difference between a gradation bit sequence of each pixel constituting picture data of the original image and a gradation bit sequence of each pixel constituting picture data of the base video stream, the shift parameter relates to shift processing that is performed by the playback device when the gradation bit sequence of the base video stream is added to the gradation bit sequence of the enhancement video stream, the playback device performs shift processing, the shift processing performed by the playback device is either (i) a combination of a first shift operation of shifting the gradation bit sequence of the base video stream by a predetermined bit width and a second shift operation of extending an added gradation bit sequence to a bit width of the gradation bit sequence of the original image, the added gradation bit sequence obtained by adding the gradation bit sequence of the base video stream to the gradation bit sequence of the enhancement video stream, (ii) a combination of a third shift operation of shifting the gradation bit sequence of the enhancement video stream by a predetermined bit width and a fourth shift operation of extending the gradation bit sequence of the base video stream, which is to be added to the shifted gradation bit sequence of the enhancement video stream, to a bit width of the gradation bit sequence of the original image, and the shift parameter specifies the predetermined bit width for the first shift operation or the predetermined bit width for the third shift operation.

* * * * *